United States Patent
Dietz

(10) Patent No.: US 11,856,968 B2
(45) Date of Patent: Jan. 2, 2024

(54) METHOD FOR ECONOMICAL REMOVAL/FRACTIONATION OF CONSTITUENTS OF VEGETAL STARTING MATERIALS

(71) Applicant: Max Dietz, Wiesbaden (DE)

(72) Inventor: Max Dietz, Wiesbaden (DE)

(73) Assignee: Max Dietz, Wiesbaden (DE)

( * ) Notice: Subject to any disclaimer, the term of this patent is extended or adjusted under 35 U.S.C. 154(b) by 251 days.

(21) Appl. No.: 16/498,473

(22) PCT Filed: Mar. 27, 2018

(86) PCT No.: PCT/EP2018/057841
§ 371 (c)(1),
(2) Date: Sep. 27, 2019

(87) PCT Pub. No.: WO2018/178119
PCT Pub. Date: Oct. 4, 2018

(65) Prior Publication Data
US 2021/0106024 A1    Apr. 15, 2021

(30) Foreign Application Priority Data

Mar. 28, 2017  (DE) ............... 10 2017 003 178.9
Dec. 13, 2017  (EP) ................................ 17207165
Dec. 13, 2017  (EP) ................................ 17207167

(51) Int. Cl.
A23J 1/14        (2006.01)
A23J 3/16        (2006.01)
(Continued)

(52) U.S. Cl.
CPC ............... *A23J 1/142* (2013.01); *A23J 3/16* (2013.01); *A23J 1/006* (2013.01); *A23L 13/426* (2016.08); *A23L 33/185* (2016.08)

(58) Field of Classification Search
CPC .... A23J 1/142; A23J 3/16; A23J 1/005; A23J 1/14; A23J 3/14; A23J 1/006; A23L 13/426; A23L 33/185
(Continued)

(56) References Cited

U.S. PATENT DOCUMENTS

2004/0009263 A1    1/2004  Liu
2005/0176936 A1*   8/2005  Neumuller ............. A23J 1/006
                                                        530/412
(Continued)

FOREIGN PATENT DOCUMENTS

EP          2404509           1/2012
WO    WO-2008143914 A1 *  11/2008  ........... B01D 9/0059

OTHER PUBLICATIONS

Arikawa et al. Biophysical Chemistry 127 (2007) I-8 (Year: 2007).*
(Continued)

*Primary Examiner* — Subbalakshmi Prakash
(74) *Attorney, Agent, or Firm* — AMIN, TUROCY & WATSON, LLP

(57) ABSTRACT

The present invention relates to a process-economic method for the disconnection/detachment of constituents consisting of water-soluble and dissolved compounds comprising proteins and/or carbohydrates and/or flavorings and/or colorant agents and/or fats and/or toxins; —optionally water-soluble and undissolved compounds comprising starch; —solid matter comprising cellulose-based fibers and/or lignin-rich shells; of a protein-containing biogenic starting material.

17 Claims, 1 Drawing Sheet

(51) Int. Cl.
*A23L 13/40* (2023.01)
*A23L 33/185* (2016.01)
*A23J 1/00* (2006.01)

(58) Field of Classification Search
USPC .......................................................... 426/656
See application file for complete search history.

(56) References Cited

U.S. PATENT DOCUMENTS

2007/0054031 A1* 3/2007 Liu ...................... A23J 1/006
426/634
2015/0073127 A1 3/2015 Wnukowski

OTHER PUBLICATIONS

Shah et al. Biotechnol. Prog., 2011, vol. 27, No. 2, 513-520 (Year: 2011).*
International Search Report and Written Opinion for International Patent Application No. PCT/EP2018/057841 dated Jun. 14, 2018, 11 pages.
Liu, et al. "Establishment of an Aqueous PEG 200-Based Deep Eutectic Solvent Extraction and Enrichment Method for Pumpkin (*Cucurbita moschata*) Seed Protein", Food Analytical Method, Springer New York LLC, vol. 10, No. 6, Nov. 21, 2016, pp. 1669-1680.
Schneider, et al. "Preparation of broad bean (*Vicia faba* L. minor) products Part 4. Effects of recirculation of waste water on the quality of protein isolates", Nahrung—Food, vol. 33, No. 2, Jan. 1, 1989, pp. 177-182.

* cited by examiner

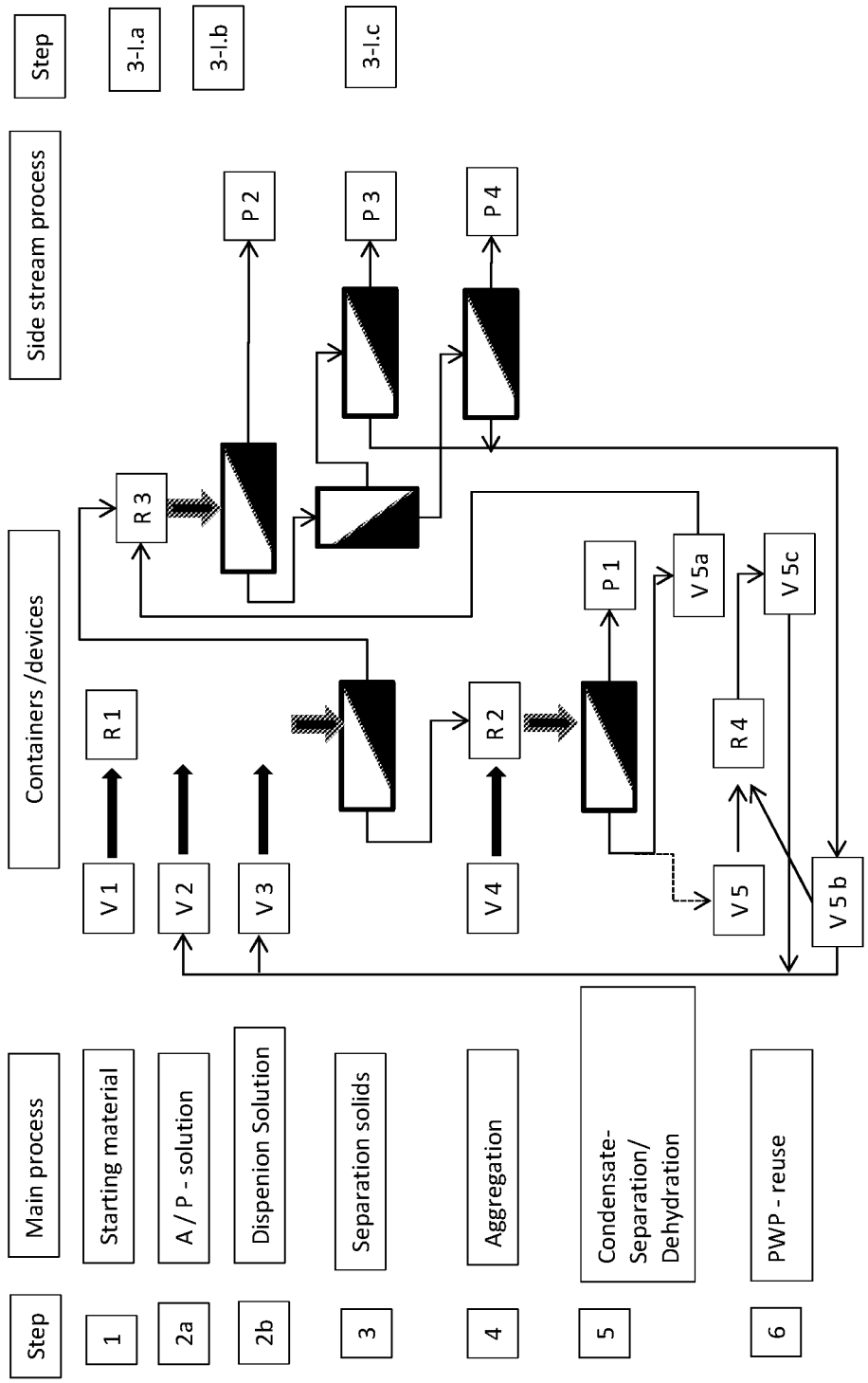

METHOD FOR ECONOMICAL REMOVAL/FRACTIONATION OF CONSTITUENTS OF VEGETAL STARTING MATERIALS

BACKGROUND

The composition of plant products, such as seeds, kernels or grains, can be divided essentially into four main constituents: neutral lipids (8-40%), carbohydrates (15-35%), proteins (20-50%) and fibrous materials (20-40%). Furthermore, plant-based products contain variable amounts of coloring agents (colorants) and aromas, polar lipids, antioxidants, minerals, etc. The use of the constituents of such plant-based products is of central importance in the diet of humans and animals. For example, seeds that have a high oil content are pressed to extract oil. After separation of the neutral lipids, an oil content of 5 to 15% by weight remains in the press residues based on the weight of the press residues. This proportion can be reduced to values of 2-8% by weight by subsequent extraction processes, but at a higher process cost.

Plant seeds with a low neutral fat content are crushed or ground and the resulting particles are sorted by physical means, such as sieving or air classification, to obtain fractions with a high proportion of certain constituents. To comply with the quality standards for the use of the available products, limits must be observed with regard to the contents of neutral lipids, colorants, aromas, flavors and anti-nutritional compounds.

In addition to neutral lipids, minor amounts of lipophilic components are also contained in press residues or milling products; these include carotenoids, lecithins or lipophilic alkaloids, which are disturbing when the main components are used, in particular in a protein fraction. Aromas and flavoring substances are often disturbing and reduce the quality of the product. For this reason, methods, for example to remove bitter aromas or toxic substances, have been developed to allow the use of the recoverable products, particularly proteins, for human nutrition. These processes are energy consuming and/or require the use of organic solvents. Furthermore, anti-nutritive compounds such as ureases, trypsin inhibitors, alpha-glucosidases may be contained in press residues and milling products. Inactivation of such compounds can be achieved according to the prior art methods, e.g. by means of blanching, which comprises exposing the plant material to hot steam, inactivating anti-nutritive enzymes, but also ultimately structurally altering storage proteins, thereby their native form and properties gets lost. To be able to carry out such methods as efficiently as possible, it is also necessary that the plant material is very finely ground to e.g. to achieve the most efficient removal of bitter aromas/substances with the conventional techniques. For example, it is proposed in WO 83/00419 to grind the seed material to the finest flour, with grain sizes between 1 μm and 50 μm, for which further process steps are required, as well as an increased expenditure of energy. In other prior art processes, aromas causing an odor and flavors are separated from the isolated plant-based protein fractions by washing with organic solvents such as isopropanol (Yumiko Yoshie-Star, Functional and bioactive properties of rapeseed protein concentrates and sensory analysis of food application with rapeseed protein concentrates, LWT—Food Science and Technology Volume 39, 2006, p 503-512).

Furthermore, it is usually required that the residual content of neutral lipids in the products obtained from plant seeds is <1% by weight. Thus, prior art requires de-oiling the plant-based material prior to product recovery or further digestion. This applies in particular to protein fractions which can be obtained from plant-based starting materials. More recently, techniques have been proposed that allow simultaneous de-oiling and protein recovery. The methods are based essentially on the displacement of the oil from the open cell clusters by an alcoholic solution. However, it turned out that to obtain a high yield of oil requires complete digestion of the seed material. Even with the use of high shear forces introduced using shear mixers or high pressure homogenizers, only 63% of the oil present in the starting material could be separated with the aqueous extract and about one quarter remained bound in the fine solid. In the best case, an oil yield of only 72% was achieved. Although this deficiency could be improved by using an aqueous alcoholic solution according to the Friolex method (EP1228701 A1), the process costs are also significantly higher.

Due to the quality requirements for the use of sustainable products from the digestion of plant seeds and kernels as a nutrient for humans, the economic usability of many press residues or ground products of plant seeds/kernels has for the most part not been possible. For example, the majority of press residues from rapeseeds are used for animal feed. In the press or regrind products, however, there are also plant materials included that are not nutritive, such as the lignin-containing materials. These, in turn, can be potentially very valuable, since biopolymers and derivatives which can be used sustainably can be produced therefrom. A process for obtaining a pure lignin-containing material fraction from press residues or ground products is not yet known. Furthermore, plant seeds contain relevant amounts of fibrous materials, which also constitute a valuable substance fraction. Due to the strong binding of proteins and soluble carbohydrates to these fibrous structures, there exists no method by which the fibrous fractions of plant seeds can be separated economically and in a pure form.

To obtain proteins from plant seeds, wet-technical processes have been proposed (DE19643961 C2), in which the aim is to extract proteins with alkaline earth metal solutions or inorganic or organic acids. Again, complete mechanical degrading of the seed material and intensive mixing of the ground material with aqueous extraction agents using homogenizers are required. In order to obtain a fraction with a protein content of more than 50%, the seed material must be heated to above 70° C. The use of separators or decanters is the necessary for material separation. The protein fraction which can be dissolved under these conditions in an aqueous medium can only be separated in relevant amounts at a pH of 2.5 to 4.5 following coagulation (precipitation) of the proteins. Recovery of the process water requires ultracentrifugation or ultrafiltration. The application of these separation methods contributes significantly to the high process costs compared to other processes. It could be shown that the physical properties of proteins which have been obtained under the separation conditions of the prior art, i.e., by acidic or thermal coagulation in a wet-technical process, are significantly worse than if a separation is carried out under neutral pH conditions, e. g., by ultracentrifugation.

It is also known that with the increasing degree of denaturation of the proteins, their water solubility decreases and their functional properties such as water binding capacity and emulsifying capacity, foam formation and stability, correlate with this. Therefore, in particular temperatures >60° C., as commonly used in wet-technical extraction methods, should be avoided. Furthermore, most of the known methods do not remove anti-nutritive substances from the recoverable protein fraction. This is especially true for phytic acid, which is present, for example, in pea protein fractions with a dry weight content of 3-5%. Another example is alpha-glucosidases present in such recovered protein fractions in a mass concentration of 0.5 to 3.5 wt %. Other anti-nutritive compounds include, among others, trypsin inhibitors, tannins, saponins, lectins, cyano-glycosides, phytohemagglutinin protease inhibitors, tannins, phytic acid alkaloids, gossypol, glucosinolates, sinapine.

Plant products, such as plant seeds, also contain endogenous or exogenous substances that are potentially toxic to humans. Endogenous toxins that are produced by the plant itself include, for example phorbol esters in the case of Jatropha oilseed or the erucic acid in the case of camelina seeds. Exogenous compounds that accumulate in compartments (protein or oil) of plant products are, for example, pesticides, herbicides or fungicides.

In order to improve the nutritive and/or functional properties of the protein fractions which can be obtained by aqueous digestion from pressed or ground plant seeds, it may be necessary to add further compounds, such as, for example, carbohydrates or vitamins or antioxidants, to the protein fraction. This is done according to the art for protein fractions obtained from a separation process by subsequently adding and mixing these compounds with the protein condensates or isolates. However, a uniform distribution/binding of these compounds with proteins, which may be crucial for the establishment of particular functional and nutritional properties, can only be achieved if these compounds are self-assembled electrostatically in the region of hydrophilic or hydrophobic protein domains. This gives the combination product (protein+self-assembled compound (s)) other physical properties than if, as in the prior art, already condensed proteins are "coated" with other compounds, i.e., adhered to the aggregated proteins or are agglomerated with these. This difference can be of great importance for the qualitative and functional result of the desired product. From the prior art, no methods are known with which proteins can loaded and separated with other compounds during an extraction process, so that a combination product can be obtained in which a physiological spatial arrangement of the compounds has been achieved by self-assembly.

Therefore there is a need for a process by which the constituents of plant-based products, such as ground products and press residues from plant seeds, can be separated and fractionated with respect to their main constituents with a simple aqueous unlocking and extracting process to obtain products with improved product quality. There is also a great need for a wet technical process by which ingredients/constituents of plant seeds and kernels can be obtained and which operates economically. This applies in particular to a reusability of the process agents used and in particular of the process water, since in such processes large amounts of process water are produced with considerable amounts of organic material (TOC). Furthermore, these processes are energy intensive, so that there is a great need for a low-energy process to unlock plant seeds and kernels. In addition, there is a great need to provide a wet-technical process that can ensure complete material utilization of the major constituents of the plant seeds and ground products, so that pure fractions of oils, proteins, carbohydrates and fibers can be produced in an immediately usable form. The Chinese patent application CN 106 720 920 A describes a process for the production of soy protein isolate, wherein a large volume of water is necessary for the hydration of compounds.

In US patent application US 2004/009263 A1, a method for zein extraction from corn meal is disclosed. The protein particles are larger than 10 μm.

EP 2 404 509 A1 is a European patent application which is directed to the extraction of protein from fresh grape seeds. Precipitation is achieved by acid at a pH of 3.

Liu Rui-Lin et al. describe in the scientific publication Food Analytical Methods, Springer New York LLC, US, Vol. 10, No. 6, 21 Nov. 2016, pages 1169-1680 an extraction of proteins from pumpkin seeds. In this case, an ionic liquid (PEG-choline chloride) is used as an extraction agent. One problem is that polyphenols and tannins are also known to be extracted by such a method and thus enter the product phase.

Schneider et al. (Nahrung—Food, Vol. 33, No. 2, 1 Jan. 1989, pages 177-182) describe the aqueous extraction of proteins from field beans. Water is used for the extraction of proteins. There is a protein precipitation with hydrochloric acid at a pH of 4.2. After separation of solids, neutralization with NaOH is performed. The neutralized water is reused parallel to this/alternatively an aqueous rinse solution of the protein phase is used. It was reused 10 times. As expected, the salt concentration increases; thus, because a plateau is reached, sodium chloride must be discharged into the protein phase, which is undesirable. A 100% reuse is not recommended; the fresh water saving rate is given as 40%.

US Patent Application US 2015/073127 A1 is directed at methods for isolating proteins from flour or oil cakes. The extraction is carried out with a large amount of water, the volume of water is then reduced again by ultrafiltration, whereby the toxic compounds and soluble carbohydrates are removed from the aqueous protein solution.

From the exemplary processes presented from the prior art, it can be seen that there is no process yet which aims to completely separate all constituents of a plant-based starting material and thereby ensure an economically operable and industrially applicable process technology in which all the constituents are directly obtained as usable products.

Thus, there is a great need for a process that not only allows the constituents of a plant-based starting material to be completely unlocked to directly obtain usable products of the purified constituents, but to also ensure an economically feasible process execution, and in which no need exists to use organic solvents, while allowing for complete reuse of the substances used and in addition minimizes water volume demands and ultimately improving the products obtained by the process.

BRIEF DESCRIPTION OF THE DRAWINGS

FIG. 1 depicts an example of a process execution with recycling of process water phases. The process steps of process step I are carried out for the treatment of the main stream and the process step II for the treatment of the side-stream process methods. The starting material is filled from reservoir V1 into reaction container R1. From storage tank V2, a water phase in which amino acids and/or peptides are dissolved (A/P solution) is added to the reaction container R1 and mixed with the starting material. In process step 2b), a water phase from reservoir V3 is filled into reaction container R1 and the reaction mixture is mixed.

In step 3, the solid matter is separated with a phase separation device, the obtained solid matter is transferred into reaction container R3 and the liquid phase is fed to reaction container R2. In step 4, an aqueous solution containing an aggregating agent is fed to reaction container R2 and the phases are mixed. In step 5, the condensed soluble compounds are then separated and dehydrated with a phase separation device. The phase with containing dehydrated soluble compounds is filled into product container P1. The separated clarified process water phase is directed to storage tank V5 or V5a. Then the following process sequences are possible in step 6:

1. Transfer of the clarified process water phase (PWP) from V5a into reactor container R3 by mixing, in which the solids separated in step 3-I.a are combined with those separated in step 3). Subsequently, separation of a fraction of solid matter in step 3-I.b. The separated solids are filled into product container P2. The eluate/filtrate of this step is fed to an cyclone separation process in step 3-I.c and the separated solids are removed from the water phase by means of a separation technique and filled into product containers P3 and P4. The PWPs are fed together or separately to storage tank V5b.

2. Transfer the PWP from storage tank V5 or V5b into reaction container R4, in which a cleaning is performed. Subsequently, the treated PWP is directed to the storage tank V5c.

For the reuse of PWP, the clarified and cleaned PWP of storage tank V5c, which may contain the clarified, recycled and then cleaned PWP in one process execution, and the PWP from storage tank V5b containing the clarified reused PWP of step 3-Ic, are used. The introduction of the PWP to a further process execution takes place optionally by feeding to the storage tank V2 and/or V3.

DESCRIPTION

The present invention relates to a process for the process-economic disconnection/detachment of all constituents comprising

- water-soluble and dissolved compounds comprising proteins and carbohydrates and/or flavorings and/or colorant agents and/or fats and/or toxins;
- optionally water-soluble and undissolved compounds comprising starch;
- solid mater comprising cellulose-based fibers and/or lignin-rich shells present in dehydrated/compacted form;

from a protein-containing biogenic starting material, wherein the method comprises the steps:

1) providing the protein-containing biogenic starting material,
2a) adding the starting material of step 1) with an aqueous solution having a pH between 7.5 and 13.5, containing at least one dissolved amino acid with a molar mass of less than 400 g/mol and a solubility of at least 35 g/L in water at 20° C. and/or peptide with 2 to 50, preferably 2 to 10 amino acids of these amino acids for complete wetting/impregnation of the constituents of the protein-containing biogenic starting material, until hydrated soluble compounds and decompacted solid matter are obtained,
2b) adding an aqueous dispensing volume having a weight ratio to the dry mass of the protein-containing biogenic starting material of 5:1 to 500:1 and mixing to obtain a dispensing mixture of the disconnected and/or detached constituents from step 2a) to obtain dissolved soluble compounds, and decompacted solid matter,
3) separation of the solid decompacted matter and optionally the undissolved water-soluble compounds from the dispensing mixture of step 2b) to give an aqueous solution of the water-soluble and dissolved compounds without solid matter and without the optional water-soluble and undissolved compounds,
4) adding an aggregation agent comprising an aqueous solution containing at least one organic acid and aggregating the water-soluble and dissolved compounds comprising proteins and/or carbohydrates of the aqueous solution of step 3) until obtaining a suspension of the aggregated compounds comprising the proteins and/or carbohydrates (that means the proteins and, if present, the carbohydrates) and an aqueous phase containing the non-aggregated, water-soluble and dissolved compounds,
5) separation of the suspension of step 4) and dehydration of the aggregated compounds by separation of water and obtaining dehydrated aggregated compounds and a clarified aqueous phase, and optionally purification of the clarified aqueous phase,
6) adding the clarified aqueous phase from step 5) as an aqueous solution to step 2a) and/or as an aqueous dispensing volume to step 2b), or using the clarified aqueous phase from step 5) to purify the separated solid matter from step 3), or
use of the clarified aqueous phase from step 5) to purify the separated solid matter from step 3) to obtain an aqueous rinsing phase and add the aqueous rinsing phase as aqueous solution to step 2a) and/or as aqueous dispensing volume to step 2b).

Preferred is a protein-containing biogenic starting material which is a non-woody plant-based material.

It is preferred that at least the one amino acid and/or the one peptide is a cationic amino acid and/or is a cationic amino acid-containing peptide.

For the purpose of disconnection/detachment of the main constituents of plant seeds, grains or kernels their disintegration is required. Disintegration may be achieved using a physical process known in the art, such as mechanical processes such as peeling/skinning, chopping, crushing, pressing or milling, or thermal processes such as blanching. In this case, thermal processes have the disadvantage that they are energy-consuming and above all can thermally damage the constituents of the starting materials, so that they are no longer or only utilizable to a limited extent.

In the mechanical processes, pressing processes differ from other disintegrative processes in that cell and tissue structures in the material to be disintegrated are largely destroyed. This causes the extrusion of oil, so in conjunction with the residual moisture, e.g. of a seed, amphiphilic compounds such as phospholipids, glycolipids, free fatty acids, but also proteins are emulsified and due to frictional heat these and other components of the seed are pressed together and combined to form a homogeneous, virtually anhydrous composite. This also includes fractured fiber fractions. Therefore, press cakes are usually very hard and hydrophobic, so that there is only a low water absorption capacity. A problem with a press cake resulting from a pressing process is that it swells only over the course of days when further processed with water to separate the constituents. Furthermore, insoluble aggregates remain that do not pass a coarse sieve. Thus, an unlocking process of a press cake resulting from a pressing process remains incomplete if pure water is used. Although swelling can be significantly accelerated by addition of a caustic solution, many non-solvated aggregates still remain. Thus, the formation of non-solvated aggregates in the case of a press cake resulting from a press process can not be avoided with either a basic or a neutral water phase. Thus, an almost complete separation of the proteins from the solid constituents can not be achieved with the procedure from prior art, as described above.

Furthermore, in the case of an aqueous work-up, decomposition or swelling of complex carbohydrates can result, for example of starch, which causes the resulting pulp to rapidly become "slimy". When using acids, the components of the pressed or ground products do not dissolve.

The milling process also disintegrates the cell and fiber structures. In contrast to a pressing process, however, no caking of the various components takes place. Therefore, the ground product disintegrates relatively well in water to smaller aggregates. Treatment with alkaline here also results in faster swelling. However, this also results in a "slime formation" and insoluble aggregates are formed that are visible to the naked eye. The insoluble aggregates can not be dissolved in the further course of the process using an aqueous solution. The combination of a grinding process together with a subsequent treatment using a caustic solution has the further disadvantage that an almost complete separation of the proteins from the solid constituents can not be realized. US Patent Application US 2015/073127 A1 focuses on methods for isolating proteins from flour or oil cakes. The extraction is performed with a large amount of water, which is then reduced again by ultrafiltration, whereby the toxic compounds and soluble carbohydrates are removed from the aqueous protein solution. Precipitation is then carried out using an alcohol or acetone. The separation of hydrophobic compounds, such as polyphenols, can only be achieved according to the disclosure by the use of organic solvents. Since organic solvents destroy the tertiary structure of proteins, the functionality of the proteins may be impaired. Whether the functionality of the products has been preserved is not apparent from the patent. The product claims relate to isolates with a low content of solvents, sinapinic acid, glucosinolates and fats. The content of flavorings is not disclosed. Details about other hazardous substances are not available. The protein solubility is 74% and 81%, respectively.

Surprisingly, it has been found and is disclosed in this application that solutions of dissolved amino acids and/or peptides effect a rapid and complete disconnection/detachment of the constituents in plant-based starting products such as seeds, kernels or grains. Thus, it has been found that the constituents present in press residues and milling products can be completely wetted, i.e., impregnated, with such an aqueous solution, which then allows them to be separated very easy from each other in an aqueous medium. It could be shown that due to contacting an aqueous solution having a pH between 7.5 and 13.5, containing at least one dissolved amino acid with a molar mass of less than 400 g/mol and a solubility of at least 35 g/L in water at 20° C. and/or peptides with 2 to 50 of these amino acids, the soluble constituents formed a mushy mass and there were insoluble aggregates. However, complete wetting/impregnation of the constituents of the protein-containing biogenic starting material is required.

Particularly surprising is the dissolution of the proteins from solid constituents, wherein the proteins simultaneously decompose into their subunits, so that the dissolved proteins pass through a membrane filter with a sieve mesh size of 10 µm and most likely due to a large volume of bound water, partly remain permanently dissolved in the aqueous medium. The solvated (hydrated) state can be recognized, for example, by the fact that the proteins remain in suspension, that means do not sediment or only to a small extent, which can be detected, for example, by visual inspection or the determination of the turbidity of the solution. Furthermore, there is no or only a minimal dissolution or swelling of complexed carbohydrates, such as starch, by aqueous solutions with dissolved cationic amino acids and/or peptides. On the other hand, proteins are rapidly and completely dissolved from both fiber compounds and shell fractions, so that the latter sediment very rapidly while the proteins remain in solution, thus allowing a very simple and efficient separation of the lignin-rich shell fractions. The disconnection/detachment of proteins is particularly effected by the aqueous solutions containing dissolved cationic amino acids and/or peptides from 2 to 50, preferably 2 to 20, still more preferably from 2 to 10 cationic amino acids such as Arg, Lys, His and Phe, preferably Lys, His and Arg, and particularly preferably Lys and His, so that for the first time the separation of fiber structures from these plant-based products, which by their nature can be classified as cellulose-based fibers, is possible. Furthermore, it has been found that cellulose-based fibers obtained in a process in which proteins have been dissolved and liberated from the cellulose-based fibers whereby they are decompacted, swell extremely well in the aqueous phases, whereby they can be very easily separated from the dissolved proteins, e.g. with conventional filter techniques. In addition, it has been found that the solubility minimum of the dissolved proteins is shifted to a neutral pH range, so that the proteins can condense and be separated under very mild conditions. In addition, it is possible with the method to completely reuse the process water phases used and to make the obtainable products directly accessible to applications without generating residues or effluents. This was particularly the case when using cationic amino acids and peptides.

Therefore, a method is preferred in which the aqueous solution with a pH between 7.5 and 13.5 contains no further amino acids besides the at least one cationic amino acid and/or peptides with 2 to 50 of these amino acids.

Therefore, the invention is directed to a wet-technical unlocking process which enables complete disconnection/detachment of plant-based products, in particular of plant disintegration products, such as pressed and ground products of seeds, kernels and grains, for the purpose of obtaining pure ingredients (constituents), in particular proteins, carbohydrates, cellulose-based fiber and lignin-rich shell fractions.

Furthermore, the method is directed to the separation and production of functionally and/or nutritionally high-quality protein products from disintegrated plant-based products.

Furthermore, the method is directed to the production of functional and/or nutritive high-quality combined products/aggregates with proteins from plant-based disintegration products.

Furthermore, the method is directed to producing and obtaining of qualitatively and/or functionally high quality cellulose-based fibers and/or lignin-rich shell products.

In addition, the method is directed to an economical use of the compounds and volume of water required for the process implementation, including the reusability (recycling) of the process solutions and residue-free usability/reusability of the starting and process materials.

Furthermore, the methods of the invention are directed to the use of obtainable functional and/or high-quality value-added fractions, e. g. as food, food additives, and starting materials in chemical, pharmaceutical or agricultural processes.

The object of the present invention is therefore to provide a process with which the constituents of plant-based starting materials and in particular of disintegration products, such as press residues and ground products of plant seed can be separated, so that the major components are completely separable from each other in an aqueous process liquid, from which the dissolved and the solid constituents can be separated in consecutive process steps and obtained in pure form.

It is also the object of the invention to simultaneously remove undesirable or separately usable organic and/or inorganic compounds and to direct these, if necessary, after the separation for further use.

It is a further object of the invention to provide a method for obtaining protein fractions containing other organic compounds derived from or added to the starting material, thereby improving the product properties of the obtainable combination products.

Finally, it is the object of the invention to provide a method to ensure an economical reusability of the process liquids and the compounds used for the unlocking process.

Surprisingly, it is possible to unlock disintegration products of plant seeds, kernels and grains with an aqueous process and to separate them into the major constituents by means of a suitable process technology, to obtain pure products with improved product quality.

In an extremely advantageous manner, the requirements for economical process technology can also be realized by one of the process sequences described herein.

DETAILED DESCRIPTION

Surprisingly, it has been found that aqueous solutions containing amino acids and/or peptides in dissolved form disconnect the cohesive attachments that proteins form with each other and with other constituents, thereby enabling detachment of proteins from other constituents of a plant-based starting material that was present in a composite/compacted form. Then the various constituents of the starting material are present in a decompacted individual and pure form.

Surprisingly, it has been found that in addition to the disconnection/detachment of proteins from their matrix and their decomposition into subunits, there is complete hydration of the proteins in the aqueous solutions used for the unlocking process according to the invention. This causes considerable expansion and water binding of the proteins dissolved with the aqueous solutions containing dissolved cationic amino acids and/or peptides, whereby they remain in suspension in the aqueous medium used for unlocking in isolated form, with a low specific density. Thus, the strong turbidity of an aqueous solution used for unlocking according to the invention, which had been obtained after treating a rapeseed press cake with an aqueous solution used for unlocking, remained consistently turbid over the course of more than 6 weeks. Upon subsequent aggregation/condensation of the dissolved proteins, the solution used for unlocking could be completely clarified; the resulting condensates consisted of >90% by weight of proteins.

It has been found that aqueous solutions containing dissolved amino acids and/or peptides cause a rapid disintegration of press residues or flours into their constituents, which was not the case with pure water, an alkali or an acidic solution. These effects were particularly pronounced when cationic amino acids and/or peptides containing cationic amino acids were present in the solutions used for unlocking. It has been shown that the disconnection of the constituents of the plant-based starting material takes place at the interfaces/surface boundaries of the constituents of the starting material, since there were virtually no adhesions at the surfaces of the solid constituents, such as those of fiber-materials, shell fractions or complex carbohydrate compounds. Thus the highly effective disconnection/detachment process is already achievable at room temperature. Such a residue-free detachment of surface adhesions from the solid constituents of the starting materials could not be achieved by other solutions or not under the same conditions.

The effectiveness of the method was documented for both, the use of aqueous solutions of individual dissolved cationic amino acids and of dissolved peptides and peptides containing said amino acids or functionalities of these amino acids, as well as for combinations of different dissolved amino acids and of dissolved peptides with cationic amino acids and/or peptides present in the aqueous solutions. The cause for this surprising effect, of a disconnection/detachment of the constituents at their interfaces, remained unclear.

Preference is given to a process for the separation of organic constituents of plant-based starting materials, in which a disconnection/detachment of the constituents by an aqueous solution containing dissolved amino acids and/or peptides, is achieved. Particularly preferred is an embodiment of the method in which the dissolved amino acids and/or peptides are dissolved cationic amino acids and/or peptides.

The inventive method can be carried out with one or different dissolved amino acids and/or dissolved oligo- or polypeptides having a different amino acid sequence or different dissolved oligo- or polypeptides, which are each oligo- or polypeptides of an amino acid, as long as these are soluble in an aqueous medium. It has thus been possible to demonstrate that hydrophobic amino acids are also suitable for carrying out the disconnection/detachment of proteins according to the invention, provided that they were dissolved, for example phenylalanine in an oligopeptide with lysine. In this respect, it is necessary that the amino acids and/or peptides are present in a form that is completely dissolved in water and can be added to the organic material to be unlocked or can be brought into contact with this material in a dissolved form in water. Particularly suitable are the amino acids arginine, lysine, histidine and phenylalanine. But other alpha-carboxylic acids are also suitable. Also suitable are di-, tri- or oligopeptides and polypeptides composed of one, two or more amino acids. Preference is given to short-chain peptides, e. g. RDG. Particularly preferred are peptides which consist of amino acids which have both hydrophobic and hydrophilic side groups, such as (letters according to amino acid nomenclature) GLK, QHM, KSF, ACG, HML, SPR, EHP or SFA. Furthermore, particularly preferred are peptides which have both hydrophobic and cationic and/or anionic side groups, such as RDG, BCAA, NCR, HIS, SPR, EHP or SFA. Further examples with 4 amino acids are NCQA, SIHC, DCGA, TSVR, HIMS or RNIF or with 5 amino acids are HHGQC, STYHK, DCQHR, HHKSS, TSSHH, NSRR. Particularly preferred are RDG, SKH or RRC. Particularly preferred are di, tri- or oligopeptides and polypeptides containing at least one cationic amino acid or di, tri- or oligopeptides and polypeptides containing a functionality that is characteristic of a cationic amino acid.

When cationic amino acids are used, the term "peptide", which is then used without further specification, means that a peptide consists of 2-50, preferably 2-20, and more preferably 2-10 amino acids, preferably proteinogenic amino acids, wherein the peptide consists of at least 20% of the amino acids, preferably at least 30% of the amino acids, more preferably at least 50% of the amino acids, even more preferably at least 80% of the amino acids and most preferably 100% of the amino acids from cationic amino acids, in particular Lys, His and Arg. Thus, the present invention also relates to a process for economic disconnection/detachment of all constituents comprising water-soluble and dissolved compounds comprising proteins and carbohydrates and/or flavorings and/or coloring agents and/or fats and/or toxins;

optionally water-soluble and undissolved compounds comprising starch;

solid matter comprising cellulose-based fibers and/or lignin-rich shells;

of a protein-containing biogenic starting material, where the method comprises the steps of:

1) providing the protein-containing biogenic starting material,
2a) combining of the starting material of step 1) with an aqueous solution having a pH between 7.5 and 13.5, containing at least one dissolved cationic amino acid with a molar mass of less than 400 g/mol and a solubility of at least 35 g/L in water at 20° C. and/or peptides with 2 to 50, preferably 2 to 10 of these amino acids, preferably at least one dissolved proteinogenic cationic amino acid and/or peptides with 2 to 50, preferably 2 to 10 of these proteinogenic cationic amino acids, until complete impregnation/wetting of the constituents of the protein-containing biogenic starting material, for obtaining complete hydration of the constituents of the protein-containing biogenic starting material until obtainment of hydrated soluble compounds and decompaction of the solid matter,
2b) adding an aqueous dispensing volume having a weight ratio to the dry mass of the protein-containing biogenic starting material of 5:1 to 500:1 and mixing to obtain a dispensing mixture of the disconnected/detached constituents from step 2a) to obtain dissolved soluble compounds, and decompacted solid matter,
3) separation of the decompacted solid matter and optionally the undissolved water-soluble compounds from the dispensing mixture of step 2b) to obtain an aqueous solution of the water-soluble and dissolved compounds without solid matter and without the optional water-soluble and undissolved compounds,
4) adding an aggregating/condensing agent comprising an aqueous solution containing at least one organic acid and aggregating the water-soluble and dissolved compounds comprising proteins and/or carbohydrates of the aqueous solution of step 3) until obtaining a suspension of the aggregated compounds comprising the proteins and if present the carbohydrates and an aqueous phase containing the non-aggregated, water-soluble and dissolved compounds,
5) separation of the suspension of step 4) and dehydration of the aggregated compounds by separation of water and obtaining dehydrated aggregated compounds and a clarified aqueous phase, and optionally purification of the clarified aqueous phase,
6) adding the clarified aqueous phase from step 5) as an aqueous solution to step 2a) and/or as an aqueous dispensing volume to step 2b), or using the clarified aqueous phase from step 5) to purify the separated solid matter from step 3), or use of the clarified aqueous phase from step 5) to purify the separated solid matter from step 3) to receive an aqueous rinsing phase and add the aqueous rinsing phase as an aqueous solution to step 2a) and/or as aqueous dispensing volume to step 2b).

Preferably, the protein-containing biogenic starting material is non-woody plant-based material.

However, the use of sulfur-containing amino acids can lead to sensorially undesirable effects and to structural and functional changes to the proteins and cellulose-based fibers. Thus, in the first step of the process according to CN 106 720 920 A, an aqueous solution containing cysteine with a pH of the solution of 6-7 is provided. Since cysteine has an isoelectric point at 5.3, it is not sufficiently possible to hydrate proteins, in particular hydration of compounds enclosed by solids, such as cellulose-based fibers, can not be effected. The description of the Chinese patent application shows that in step 1, the pH is adjusted to 6-7 with an aqueous sodium hydroxide solution. Thus, cysteine was present in the form of an acidic solution and had to be neutralized with caustic soda. Thus, hydration of the proteins by cysteine did not occur.

Effective hydration of proteins bound in/to fibers can not be achieved under these conditions as known in the art and as disclosed in the Chinese application. Furthermore, initially, a large volume is added for hydration, which is very impractical when an expensive ingredient in a certain and relevant concentration must be present therein. In this disclosure the minimum required amount of water with the least amount of compounds contained that is required for the hydration process is used, which can be applied means of a soaking-through or wetting process which is also referred as to be an impregnation according to the present application. Furthermore, cysteine interacts chemically with proteins; for example, gluten (protein fraction of flour) is modified by depolymerizing the molecules of the gluten fraction by thiol disulfide exchange with the intermolecular disulfide bonds, which means that cysteine breaks the bonds that holds the long chain molecules together. As a result, the dough becomes more elastic and develops faster, which is not always desired and often presents a problem.

In US patent application US 2004/009263 A1, a method for zein extraction from corn meal is disclosed. Sulfur-containing compounds and in particular sulfur-containing amino acids are used in order to specifically crosslink them with sulfur compounds of proteins. In both cases, proteins are chemically altered, which is a problem if the natural proteins are to be recovered. During extraction, a maximum pH of 7 is allowed. For extraction, an alcohol is used. The protein particles are larger than 10 μm.

In a particularly preferred method, the aqueous solution with a pH between 7.5 and 13.5 does not contain any amino acids apart from the at least one cationic amino acid and/or peptides with 2 to 50 of these amino acids.

The at least one dissolved amino acid according to step 2a) preferably has a molar mass in the range from 75 g/mol to 350 g/mol, more preferably from 100 g/mol to 320 g/mol, more preferably from 140 g/mol to 300 g/mol and/or a solubility of at least 75 g/L in water at 20° C., preferably of at least 100 g/L in water at 20° C. and more preferably of at least 140 g/L in water at 20° C. and/or it is an α-, β- or γ-amino acid and/or proteinogenic and/or non-proteinogenic amino acids.

The use of amino acids is particularly advantageous because they are physiological constituents of proteins and can remain in a protein fraction to be obtained. In a particularly advantageous manner, it is possible to select amino acids which are present in the protein fraction that can be incompletely separated off such that these can be supplied in a targeted manner with the obtained product for human or animal nutrition. In principle the same applies to the use of oligo- and polypeptides, as long as they have no allergenic or toxic potential. Preference is given to an aqueous solution in which the dissolved amino acids and/or peptides according to the invention automatically adjust the pH of the solution without further additives.

In further preferred embodiments, the pH of the aqueous solution containing dissolved amino acids and/or peptides, is adjusted by the addition of a base or an acid. This can be done, for example, to increase the solubility of one or more of the amino acid (s)/peptide (s). In particular, cationic amino acids such as arginine, lysine or histidine are suitable for this purpose. Also suitable for this purpose are hydroxide ions, but also tertiary or quaternary amines, such as triethylamine or ammonia. The selection and usable concentration depends on the application (e.g. production of a food ingredient), the effects on the organic constituents to be dissolved (e.g. induction of hydrolysis or denaturation) and the dischargeability from the product and from the process liquid (if disturbing). The selection of a suitable acid and the selection of a suitable concentration depends in an analogous manner on the application and the possibility of remaining in a product. Suitable acids include, e.g. organic acids such as lactate, pyruvate, citric acid, oxalic acid, phosphoric acid, ascorbic acid, acetylic acid, EDTA and inorganic acids such as phosphoric acid or sulfuric acid. The selection criteria for a suitable base or acid are known to those skilled in the art.

However, it is also possible to carry out a solubilization with ternary systems, which means with the help of co-solvents. Suitable co-solvents are, for example, alcohols, such as isopropyl alcohol, ethanol or methanol, furthermore ethoxylates, ethers, esters, DMSO, betaines, sulfobetaines or imidazolines, but also other solvents can be used. The use of only low concentrations is preferred. Suitable co-solvents may also be organic compounds with little or no polarity. For example, carboxylic acids can be added, such as hexanoic or octanoic acid. On the other hand, alkyl compounds such as hexane or octane but also methyl esters of fatty acids and triglycerides can be used, such as rapeseed or sunflower oil. Preferred are combinations of various low to non-polar organic solvents. The use of a low concentration in relation to the concentration of the dissolved amino acids and/or peptides used is preferred. The use of less polar or apolar compounds is particularly advantageous if amphiphilic or nonpolar compounds are present in the organic agglomerates to be dissolved.

As a result of the low- to non-polar organic compounds added, the amphiphilic to nonpolar compounds to be separated can be more easily combined in a forming lipid phase and thus be separated more easily from an aqueous phase in which proteins and other hydrophilic compounds are contained. Preferred nonpolar compounds are neutral fats, such as triglycerides, alkanes, or fatty acid methyl esters.

Preference is given to a process for the separation of organic constituents of plant-based starting materials, in which low to non-polar organic solvents are used for the separation of amphiphilic or nonpolar compounds.

Still more unexpected was the effect of using a solution of dissolved cationic amino acids and/or peptides on the solubility properties of the proteins hydrated by the methods. It is known from the literature that aqueous dissolved plant proteins have a solubility minimum at a pH between 2.5 and 4.5 and can be coagulated/precipitated by addition of acids or corresponding buffer systems in this pH range, whereas this is not the case at a pH range that is above 5. Coagulation/precipitation causes the proteins to unfold, resulting in complete loss of the tertiary structure and, depending on the pH, loss of the secondary structure. This significantly changes the physico-chemical properties of such degenerated proteins. Among other things, the water binding capacity is greatly reduced. But other properties, such as the crosslinkability are also lost. The degree of denaturation is inversely correlated with the pH during coagulation with an acid. Depending on the degree of degeneration, coagulated/precipitated proteins can no longer or only to a limited extent be dissolved in water. Surprisingly, there was a very rapid and complete aggregation/condensation of proteins which had been disconnected/detached with dissolved cationic amino acids and/or peptides dissolved in the aqueous medium, already after the addition of minimal amounts of acids. It was found that complete aggregation/condensation of the dissolved proteins occurred at a neutral pH, that means pH 7, or in an approximately neutral pH range, that means at a pH of 5.5 to 8. Such aggregates/condensates can be dispersed into the finest particles by strong agitation.

Particularly preferred is a method wherein in step 4) the pH of the aqueous solution of step 3) is adjusted to a pH in the range between 5.5 and 8.

Thus, it has surprisingly been found that with the method, the solubility minimum of dissolved proteins can be shifted to a neutral or approximately neutral pH range.

Surprisingly, a rapid reduction of the pH of the solution containing the separated and dissolved proteins according to the invention to a pH of <5 only resulted in a low aggregation of the dissolved proteins; the aggregation rate was further reduced with decreasing pH and was in a milk-like form. Even when the pH was lowered to values below 3, there was no coagulation/precipitation of the dissolved proteins. Thus, in a surprising and extremely advantageous manner with the method according to the invention, the solubility minimum of dissolved proteins can be shifted to a pH range which is greater than 5. It was further surprising that no loss of the tertiary structure occurred in the aggregates; thus, the physicochemical properties of the protein aggregates obtained were preserved in contrast to protein coagulates/precipitates in which the tertiary structure was lost. In addition, it could be shown that the once initiated, the aggregation process continues on its own, without the need for the addition of any of the aggregation agents listed herein.

Thereby, a complete spontaneous aggregation/condensation of non-denatured proteins can be achieved without relevant inclusion of compounds added to initiate the aggregation/condensation reaction. This is particularly advantageous since a purification process of the protein mass obtained that is customary in the prior art can be dispensed with. Furthermore, only small amounts of aggregation/condensing agents are needed.

Furthermore, consuming purification steps of the process solution, e.g. a neutralization of an acidic process solution, can be dispensed with. Furthermore, the process solution, as further illustrated below, is immediately available for reuse in another process step. In addition, it was possible to document that the obtainable protein products, as a result of the preservation of their physicochemical properties, have improved product properties compared to protein preparations from the prior art. Thus, with the method according to the invention a separation of proteins at a neutral pH is possible, whereby the functional properties of the separated proteins can be significantly improved, as demonstrated below. Therefore, a preferred embodiment of the method according to the invention is the dissolution of proteins in/with a cationic amino acid and/or peptide solution to shift the solubility minimum of the dissolved proteins to a pH range of preferably >5, more preferably >5.5, more preferably >6 and more preferably of 7. Further preferred is the preparation of a solubility minimum of the solubilized proteins that is at a pH of <13, more preferably <12, even more preferably <11, and even more preferably <10. Particularly preferred is a shift of the solubility minimum of the dissolved proteins to pH 7.

Preference is given to a process in which an increase in the solubility minimum of dissolved proteins is achieved.

Preference is given to a process in which the solubility minimum of dissolved proteins is shifted to a pH range between 5.5 and 8.

Preference is given to a process for aggregating/condensing and obtaining non- or almost non-degenerated proteins by aggregating/condensing dissolved proteins in an aqueous solution containing dissolved amino acids and/or peptides by means of an aggregation/condensing agent. Particularly preferred is an embodiment of the method in which the dissolved amino acids and/or peptides are dissolved cationic amino acids and/or peptides.

Preference is given to proteins which are not or almost not degeneratively modified, which can be obtained by condensation of dissolved proteins.

Preferred is a method in which the solubility minimum is shifted to a pH range between 5.5 and 8 by a solution of dissolved amino acids and/or peptides and the dissolved proteins can be condensed and separated/obtained by adjusting the pH of the solution to a value between 5.5 and 8. Particularly preferred is an embodiment of the method in which the dissolved amino acids and/or peptides are dissolved cationic amino acids and/or peptides.

It has been shown that when the same proteins, in which an increase in the solubility minimum has been achieved with the method according to the invention, for example, those from a rapeseed or soy press cake, had been preparatively extracted from the starting material, the solubility minimum would have been in the pH range of 2.8 to 4.2.

Furthermore, it has surprisingly been found that in the proteins in which, due to the dissolved cationic amino acids and/or peptides, the solubility minimum has been shifted into a neutral or approximately neutral range, the dissolved and hydrated proteins can also be aggregated/condensed with a variety of ionic or nonionic compounds. Thus, for example, with a pH-neutral $CaCl_2$ solution, but also solutions containing silicate and/or carbonate anions, an aggregation/condensation according to the invention can be achieved. The protein condensates are characterized in that they form very voluminous spatial structures, which have only a slight tendency for sedimentation, due to a large hydration shell. In contrast to coagulates prepared by acid precipitation of protein isolates of plant proteins with acids at a pH between 2.5 and 4.5, the aggregates/condensates or the dehydrated mass of condensates were rapidly soluble when resuspended in a water, which was not the case or only to a small extent with the acid-coagulated proteins. Such coagulated proteins also had significantly smaller volumes and a significantly lower proportion of bound water.

Therefore, in the aggregated/condensed proteins according to the invention, in contrast to coagulated proteins, a hydration shell is obtained which allows rapid hydration of condensed, and/or condensed and dehydrated proteins. Surprisingly, it has been found that precisely these properties have a decisive influence on further processing steps of the condensed, and/or condensed and dehydrated proteins. In particular, due to an easier hydratability, for example, purification, conditioning, functionalization or attachment/contacting with other compounds is significantly improved.

Surprisingly, it has been found that dissolved cationic amino acids and/or dissolved peptides containing cationic amino acids or having a total positive charge are particularly suitable for increasing the solubility minimum of dissolved proteins according to the invention. Particular preference is therefore given to dissolved cationic amino acids and/or dissolved peptides which contain cationic amino acids or have a positive charge. Particularly preferred are arginine, lysine, histidine, and their derivatives.

Preference is given to a process in which an increase in the solubility minimum of dissolved proteins is achieved by dissolved cationic amino acids and/or dissolved peptides containing cationic amino acids.

Furthermore, it was surprising that the proteins were completely or almost completely odorless and tasteless and also contained no or almost no colorant agents that can be dissolved out by an aqueous medium, when those proteins were obtained after the solubility minimum had been shifted into a neutral pH range by means of the amino acid and/or peptide solutions according to the invention and after the dissolved proteins had been condensed and separated from the aqueous medium by a pH adjustment in this area. Further, the obtained protein fraction had a neutral pH.

Proteins obtained in this manner could easily be dissolved when resuspended in water. Surprisingly, it was found that, in particular, cationic amino acids and/or peptides which were added in solution to such a suspension caused, already at very low concentrations, hydration of the proteins, which led to the above mentioned hydrated and condensed proteins to have a very high water-binding capacity. This was determined by condensing the hydrated proteins and removing free water with a filter (sieve size 10 μm) under vacuum. The no longer flowable residue was weighed and then dried in an oven to determine the dry weight. Based on the weight difference in relation to the dry weight, the water binding capacity was calculated. This was between 430 and 850% by weight for such resuspended proteins.

Furthermore, it was shown that proteins from a conventional extractive preparation method which have a solubility minimum in a pH range between 2.5 and 4.5 have a solubility minimum between pH 6.5 and 8.5 after being suspended in an amino acid and/or peptide solution prepared according to the invention, which can then be condensed, dehydrated and separated with the compounds listed herein. It was then found that the water binding capacity of the same proteins obtained from the starting materials by means of an extraction process and having a solubility minimum at a pH between 2.8 and 4.2, after resuspending in water for 10 hours, was between 140 and 220 wt %, while the water binding capacity of the same proteins, when suspended or resuspended in a solution of dissolved cationic amino acids and/or peptides, increased to between 450 and 650 wt %.

Therefore, in a preferred method embodiment, coagulated proteins are suspended and/or resuspended and hydrated by means of an amino acid and/or peptide solution, thereby obtaining a water binding capacity of preferably >400% by weight, more preferably >500% by weight, more preferably >600% by weight % and even more preferably >700% by weight.

Preferred is a method of hydrating coagulated proteins by suspending them in a solution of dissolved amino acids and/or peptides. Particularly preferred is an embodiment of the method in which the dissolved amino acids and/or peptides are dissolved cationic amino acids and/or peptides.

Preferred are cationic amino acids and/or peptides. The preferred concentration of the cationic amino acids and/or peptides present in the suspension of proteins to be hydrated is between 10 µmol and 3 mol/l, more preferably between 10 µmol and 1 mol/l, more preferably between 1 mmol and 0.5 mol/l. The temperature at which the hydration of proteins according to the invention takes place is preferably between 5° and 90° C., more preferably between 10° and 60° C. and more preferably between 15° and 45° C. The pH of the solution in which the hydration of proteins according to the invention is carried out is preferably between 7.5 and 13.5, more preferably between 7.5 and 12.5 and more preferably between 7.5 and 11.5. Preferably, the solution is agitated with the proteins to be hydrated, preferably by the use of a propeller mixer. The duration required for complete hydration of the proteins depends on the other process parameters and must therefore be determined individually. Preferred is a duration between 5 minutes and 5 days, more preferably between 10 minutes and 1 day and more preferably between 15 minutes and 1 hour.

Preference is given to a process in which hydration of proteins is achieved by means of amino acid and/or peptide solutions. Particularly preferred is an embodiment of the method in which the dissolved amino acids and/or peptides are dissolved cationic amino acids and/or peptides.

Preferred is a method for suspension and/or resuspension and hydration of condensed/aggregated/complexed proteins with amino acid and/or peptide solutions. Particularly preferred is an embodiment of the method in which the dissolved amino acids and/or peptides are dissolved cationic amino acids and/or peptides.

Preferred is a method for increasing the water-binding capacity of proteins by dissolved cationic amino acids and/or peptides.

Disconnection/Detachment Process.

It is known from the prior art that proteins which are bound or complexed with other compounds have only a low water absorption and water binding capacity. This explains why, even after mechanical disintegration and mechanical disruption, seeds, grains or kernels can only be penetrated slowly and incompletely by water. It has been shown that prior art bases and acids are not suitable for achieving complete degradation of plant-based starting material into its major constituents, even after mechanical disintegration. Investigations into the separation of constituents of plant-based starting materials in aqueous solutions showed that alkaline aqueous solutions which had been prepared by alkaline earth metals did not result in complete solvation of the solid aggregates of press residues. Surprisingly, however, aqueous solutions of highly water-soluble amino acids initially allowed a very strong swelling of the starting materials, which then spontaneously disintegrate. By gentle stirring, the major constituents were identifiable in the water phase and could be separated. It has then been shown that incorporation of the starting materials into aqueous solutions in which the amino acids and/or peptides are present in dissolved form also results in rapid and complete dissolution/solvation of the constituents of the starting materials, which can be singulated/isolated herein. This was especially the case in the presence of cationic amino acids or peptides containing cationic amino acid.

In a preferred method embodiment, mechanically disintegrated plant-based starting materials are introduced into an aqueous solution containing one or more amino acids and/or peptides in dissolved form and left until complete disconnection/detachment of the major constituents of the starting materials has been achieved and which are then present herein in isolated, dissolved or suspended form. The weight ratio between the starting material and the aqueous solution is preferably between 1:5 and 1:500, more preferably between 1:10 and 1:150 and more preferably between 1:15 and 1:50. The temperature at which this can be achieved is arbitrary; preferred is a temperature between 10° and 120° C., more preferred between 15° and 90° C. and more preferred between 20° and 60° C. Preferably, continuous or discontinuous mixing is carried out.

The duration of the process step in which a disconnection/detachment and dispensing of the constituents of the starting material in a water volume is performed simultaneously depends on the process parameters and must be determined individually. Such a test can be carried out, for example, by removing a representative sample from the agitated solution mixture and filtering with a sieve (sieve mesh size 100 µm). If no more agglomerates of the various constituents of the starting materials are recognizable in the sieve residue and the constituents can be easily separated, the process is complete.

Preferred is a method in which disconnection/detachment of the constituents of mechanically disintegrated seeds, grains or kernels is achieved by placing the seeds, grains or kernels in a solution containing dissolved amino acids and/or peptides until the constituents are easily separable.

Surprisingly, it was then found that by impregnating/wetting the plant-based starting materials with aqueous solutions in which amino acids and/or peptides were present in dissolved form, complete penetration of the aqueous solution through the plant-based starting material occurs very rapidly, which swells easily. Subsequent addition of water then allowed complete dissolution/solvation of the constituents of the starting material. This was especially the case in the presence of cationic amino acids or peptides with cationic amino acids. It was found that even low concentrations of dissolved cationic amino acids and/or peptides, such as arginine or its derivatives, are sufficient to achieve such disconnection/detachment of the composite structures of the starting materials. On the other hand, the solution process could be accelerated by using high concentrations of dissolved amino acids and/or peptides. It has been shown that disintegration of the plant-based starting material is achieved due and/or during the process method, yielding separation of the major constituents of the plant-based material. It has been found that by dispensing a fully impregnated/wetted plant-based starting material in a sufficiently large volume of water, there is an immediate and complete dispension of the constituents of the starting material so that the various constituents are already directly present in isolated/singulated form. It has been found that by this method, in contrast to loading the starting materials into an aqueous solution in which a disconnection/detachment process and a dispensing of the unlocked constituents of the starting material is accomplished simultaneously, the amount of dissolved amino acids and/or peptides required to completely dissolve/hydrate the constituents can be significantly reduced. For example, it could be demonstrated that a solution of arginine at a concentration of 10 mmol/l resulted in complete disconnection/detachment of the constituents of the starting material within 1 hour, after inserting of the starting material into the solution in a weight ratio of 1:20. This weight ratio was sufficient to allow separation/singularization of the constituents. If the plant-based starting material was completely wetted with the same solution which was achieved at a mass to weight ratio of 1:1.2 which was allowed to penetrate for 4 hours and then the wetted/impregnated mass was suspended/dissolved and dispensed in water at the mass ratio that corresponded to that of the previous investigation (1:20), there was an according immediate complete separation/singularization of the constituents of the starting material.

It has thus been shown that impregnation of the plant-based starting material with an aqueous solution of amino acids and/or peptides dissolved herein causes that the constituents of the plant-based starting material get unlocked, whereby a dispension of the constituents in a sufficiently large volume of water is possible without further addition of the inventive substances. The process implementation thus allows a considerable saving of amino acids and/or peptides, which are required for a separation of the constituents of the starting materials according to the invention. In a preferred method embodiment, a disconnection/detachment phase is maintained in which the plant-based starting material is contacted with an aqueous solution of amino acids and/or peptides present therein in dissolved form such that complete penetration/wetting of the protein-containing plant-based starting material with the aqueous solution is obtained. The presence of a complete wetting/impregnation can be tested, for example, by mechanically finely dividing the wetted/impregnated starting material and determining the completeness of a moisture penetration (moisturization) visually or by analytical methods.

Preference is given to a process for the separation of constituents of plant-based starting materials, in which disconnection/detachment of the constituents of the plant-based starting material is achieved by impregnation of the plant-based starting material with an aqueous solution containing dissolved amino acids and/or peptides. Particularly preferred is an embodiment of the method in which the dissolved amino acids and/or peptides are dissolved cationic amino acids and/or peptides.

In a preferred method embodiment, a process step is performed in which the mechanically disintegrated plant-based starting material is applied in a suitable container with one of the aqueous solutions according to the invention, containing dissolved amino acids and/or peptides, in order to impregnate it herewith. Impregnation means that in a finely divided wetted/impregnated material this is completely moist (moisture content >20% by weight). The presence of moisturing (wetting) of the starting material can be detected, for example visually, by a change in color, or analytically, e.g. by a change in the electrical conductivity. The term "wettend" does not mean that the starting material is soaking wet or dripping wet; centrifugation of the wetted/impregnated starting material at 2,000*g does not separate any free liquid. Application of the aqueous solutions may be carried out by prior art methods. Suitable for this purpose, for example, is a stirred tank, which allows complete contacting of the mixed material and in which the aqueous solution is added until a complete wetting/impregnation is found in a representative sample. In another process embodiment, the plant-based starting material is spread on a conveyor belt or a conveyor sieve belt and the spread out starting material is sprayed with the aqueous solution. Preference is given to impregnate the plant-based starting material with a volume of the aqueous solution containing dissolved amino acids and/or peptides and in particular cationic amino acids or cationic amino acid peptides in a mass ratio of 1:0.5 to 1:10, more preferably between 1:1 and 1:8 and more preferably between 1:1.2 and 1:4. The temperature at which the impregnation can be carried out is arbitrary, preferred is a temperature between 6° and 90° C., more preferably between 10° and 60° C. and more preferably between 18° and 40°.

The impregnated plant-based starting material may remain in the container or filled into another container after documentation of completion of impregnation in a resting or further agitated state, until the next process step is carried out. Transfer can be accomplished by means of known conveying techniques, for example with a conveyor belt.

In a further preferred embodiment, a complete swelling of the plant-based starting material is carried out with the disconnection/detachment process according to the invention. The volume of aqueous solutions required for complete swelling of the starting material, containing dissolved amino acids and/or peptides, is greater than that required for complete wetting/impregnation of the starting material. This can be particularly advantageous when the reaction mixture of this process step is to be transported to another container with a pumping device; the swollen material can be easily removed by prior art pumping devices, e.g. through a pipeline. It could be shown that after a swelling of the mechanically disintegrated starting material, which does not increase further with a further addition of water, the disconnection/detachment process is complete and the constituents can then be completely separated from each other by water and without further addition of dissolved amino acids or peptides or other compounds. In contrast to wetted/impregnated starting materials, the completely swollen starting material is to be described as soaking wet. For example, complete swelling can be recognized by the fact that the swollen material can no longer bind more water, recognizable by the fact that a further addition of water does not lead to any further increase in volume of the swollen homogeneous material and with centrifugation (2,000*g) only a minimal free liquid phase separated. A test of whether further water binding is possible can be carried out by adding a 0.3 molar solution of the amino acid and/or peptide solution in small volume units to a sample of the swollen material whose mass is known. If a free water phase forms, the swelling process is complete, otherwise the addition of the amino acid and/or peptide solution used for the mixture is to continue. The addition volume of aqueous solutions containing dissolved amino acids and/or peptides naturally varies greatly depending on which starting material is used and in what form it is present. The mass ratio of the starting material with the aqueous solutions containing dissolved amino acids and/or peptides is preferably between 1:4 and 1:20, more preferably between 1:5 and 1:15 and more preferably between 1:6 and 1:10. The temperature at which the impregnation can be carried out is arbitrary, preferably a temperature between 6° and 90° C., more preferably between 10° and 60° C. and more preferably between 18° and 40° C. The completely swollen plant-based starting material may remain in the container in a resting or further agitated state or be filled into another container until the next process step is carried out. Transfer can be accomplished by known conveying techniques, such as a screw pump that allows for passage through a pipeline.

Preference is given to a process for the separation of constituents of plant-based starting materials, in which a disconnection/detachment of the constituents of the plant-based starting material is achieved by a swelling of the plant-based starting material with an aqueous solution containing dissolved amino acids and/or peptides. Particularly preferred is an embodiment of the method in which the dissolved amino acids and/or peptides are dissolved cationic amino acids and/or peptides.

In a preferred method embodiment, the process step of disconnection/detachment of the plant-based starting material, which is processed by means of a wetting or swelling process, aqueous solutions containing amino acids and/or peptides present in dissolved form are added wherein the concentration of the amino acids and/or peptides is preferably between 1 mmol/l and 5 mol/l, more preferably between 50 mmol/l and 1 mol/l and more preferably between 100 mmol/l and 400 mmol/l.

The addition of the aqueous solution can be carried out once, repeatedly or continuously and as needed. The process for unlocking is preferably carried out at ambient temperatures, or in the previously indicated temperature ranges. In further process embodiments, it may be advantageous to carry out the disconnection/detachment process at a lowered or elevated temperature. A lower temperature is advantageous if, for example, a thermosensitive compound is to be obtained as a product from the mixture of substances, and an elevated temperature is advantageous if, for example, a simultaneous reduction in bacterial load (incl. germs and spores) is desired.

In order to achieve complete disconnection/detachment of the constituents of the plant-based starting material, it is preferred to maintain a residence time between complete impregnation or complete swelling and performance of the next process step, which is preferably between 5 minutes and 24 hours, more preferably between 10 minutes and 12 hours and more preferably between 20 minutes and 6 hours. It is not necessary to agitate the mixture after wetting or swelling. However, to prevent settling of ingredients, agitation, e.g. by means of a stirrer, can be performed. The temperature of the mixture during the storage/transport period until the next process step can be chosen freely, preferred is a temperature between 6° and 90° C., more preferred between 10° and 60° C. and more preferred between 18° and 40° C.

A simple test procedure can be used to determine whether a mixture of this process step is suitable for feeding to the next process step. For this purpose, a representative sample is taken from the mixture and placed in water (25° C.), in a mass ratio of 1:20 and is agitated for 2 minutes at 200 rpm. Subsequently, the entire suspension is filtered (sieve mesh size 100 µm). The screen residue is examined visually and/or microscopically for the presence of aggregates/agglomerates of constituents of the plant-based starting material. If no aggregates/agglomerates are present, sufficient disconnection/detachment of the constituents of the starting material has been achieved and the process step has been completed.

Dispensing Method

In a preferred embodiment, a dispensing and separation of the constituents of the plant-based starting material is carried out after the process step in which a disconnection/detachment of the constituents of the plant-based starting material has taken place. Due to the complete detachment/release of the proteins from other constituents, a great water-binding capacity is achieved. Therefore, a large aqueous dispensing volume is required for spatial separation of the constituents.

Surprisingly, it has been found that the separation of constituents of plant-based starting material according to the invention is made possible in a particularly advantageous form by providing a sufficiently large volume of water for dispensing and separation of the solid matter and soluble dissolved constituents of the starting material, whereby particularly pure fractions are obtained directly. It has been found that if a sufficiently large volume of water is not provided in the dispensing phase, the solid constituents of the plant-based starting material obtainable by filtration techniques are not separable and have attachments/adhesions of soluble constituents of the starting material. Therefore, a decisive criterion for dispensing and separating the solid constituents of the starting material according to the invention is the provision of a sufficiently large dispensing volume.

Furthermore, it was possible to show that the condensation and/or aggregation and/or complexing of dissolved compounds according to the invention by condensing agents does not take place or only proceeds incompletely if the dissolved soluble compounds are not dissolved in a sufficiently large aqueous dispensing volume. It has been shown that the required volume of water depends in particular on the composition, type and concentration of the soluble constituents of the starting material and therefore the required amount of a water volume that is required to carry out the method step according to the invention must be determined individually. The determination of a sufficiently large volume of water, which allows both for the separation of the solid constituents of the starting material, as well as for a complete or almost complete execution/achievement of condensation and/or aggregation and/or complexing of the soluble compounds dissolved herein with the condensing agents according to the invention, can be easily carried out by the examination methods described below, by a person skilled in the art.

In a preferred embodiment, the disconnection/detachment mixture is dissolved in water. For this purpose, clarified process water of subsequent process steps can be used or deionized or not further treated city or well water.

Preferably, the determination of a sufficiently large volume of water of the dispensing phase is made by preparing a dilution series with a sample from the previous process step (the disconnection/detachment mixture) (e.g., 10 g). After a stirring for 3 minutes, the suspension is filtered (sieve mesh size 100 µm). The filter residue is analyzed (visually or microscopically) for adhesions/attachments of soluble and water-rinsable compounds. The filtrate is admixed with a suitable solution of a condensing agent in an increasing dosage. A sufficiently large dispensing volume is present when there are no adhesions/attachments to the solid constituents of the starting material present in the filter residue, as well as complete condensation and/or aggregation and/or when complexation of the dissolved soluble compounds present in the dispensing mixture has been achieved.

Preference is given to a process for the separation of constituents of plant-based starting materials, in which a disconnection/detachment of the constituents of the plant-based starting material by means of an aqueous solution containing dissolved amino acids and/or peptides is achieved, and subsequently a sufficiently large volume of water to dispense the constituents is provided. Particularly preferred is an execution of the method with dissolved cationic amino acids and/or peptides.

Preferred is a method for determining a volume of water sufficient to separate solid constituents of a plant-based starting material without adhesion and to completely or almost completely condense soluble compounds of the starting material which are in dissolved form with a condensing agent to obtain condensation/aggregation/complexation thereof.

The volume of water required to carry out the following process step according to the invention is provided in a suitable container.

In a preferred embodiment, the determination of the water volume of this process step, or the mass ratio between the disconnection/detachment mixture of the previous process step and the water phase of the dispensing process step, is based on empirical or standard values. Naturally, such ranges of values may be above or below the value determined from a determination of a sufficiently large volume of water required for optimal further process performance. Preferred in this process embodiment is a ratio of the water volume to the dry mass of the starting material between 5:1 and 500:1, more preferably between 10:1 and 150:1 and more preferably between 15:1 and 50:1. The type of introduction or contacting of the disconnection/detachment mixture and the water phase of this process step is arbitrary. Preference is given to an admixture which is carried out by means of a high-performance shear mixer or another intensive mixer, together with the water phase. This is therefore particularly advantageous because this results in direct separation of the constituents of the starting material in the water phase and thus an immediate further processing of the dispensing mixture for material separation can be made. In principle, all known methods for mixing solutions and suspensions for this process step can be used. The dispensing process can be continuous or discontinuous. The dispensing process can be carried out at any temperature, preferred is a temperature range of the aqueous suspension between 6° and 90° C., more preferred between 10° and 6° C. and more preferably between 18° and 40° C. The duration of the dispensing process is arbitrary, preferred is a duration of between 1 minute and 24 hours, more preferred from 5 minutes to 5 hours and more preferably from 10 minutes to 1 hour.

In one embodiment of the method described herein, the mixing to obtain a dispensing mixture of the disconnected and/or detached constituents from step 2a) is performed by means of an intensive mixer.

The dispensing process is sufficient and complete when a representative sample, which is taken from the dispensing mixture and then is filtered using a coarse (1 mm mesh size) sieve and thereafter a fine sieve (mesh size 100 µm), and no aggregates/agglomerates of different constituents of the plant-based starting materials are recognizable to the naked eye in the residues. The successful dispensing of the constituents of the starting material can also be recognized by the fact that a sample of the dispensing mixture is filled into a measuring cylinder and within a short time 3 phases separate or in the presence of lipids 4 phases are easily distinguishable from one another. The time required for this should not exceed 4 hours.

The lowest phase is characterized by a high proportion of lignin-rich fiber materials, if they are present. In the layer above there is a high proportion of cellulose-based fiber materials and complex carbohydrates. In the aqueous phase above are the dissolved soluble compounds, especially the dissolved proteins and dissolved soluble carbohydrates as well as other soluble compounds. In the presence of lipids, these are above the aqueous solution.

The compositions and the ratios of the other dissolved compounds vary considerably with the possible applications with the method. These may be compounds, such as sugars, vitamins, amino acids, carboxylic acids, polyphenols, colorants, odor- and flavoring-agents, which are present in dissolved form in the aqueous dispensing volume.

Thus, if the investigation for the completeness of the dispensing process has revealed a sufficient separation of the constituents of the starting material, a subsequent residue-free separation of the dissolved organic compounds and solid matter is possible.

Preference is given to a process for the separation of constituents of plant-based starting materials in which, following a disconnection/detachment of the constituents of the plant-based starting material by means of an aqueous solution containing dissolved amino acids and/or peptides, a dispensing of the constituents of the starting material in a water phase is performed. Particularly preferred is an embodiment of the method in which the dissolved amino acids and/or peptides are dissolved cationic amino acids and/or peptides.

In a particularly preferred embodiment, the concentration of the dissolved amino acids and/or peptides present in the dispensing mixture following the dispensing process is not diluted in water to be less than 10 mmol/l, more preferably not <30 mmol/l and more preferred not <50 mmol/l. The presence of a particular concentration of the amino acids and/or peptides according to the invention can be adjusted in a further preferred embodiment of the method by a further addition of dissolved amino acids and/or peptides. This can be done by a single intensive mixing process or by continuous mixing. It is advantageous to avoid air entrapment or bubble formation, as this can lead to foaming. In this respect, the use of a mixing process which causes a laminar flow is advantageous. Foaming can be counteracted by known techniques. Furthermore, controlling and optional adjustment of the pH of the dispensing solution according to the invention is possible. This can be done with base or acids from the prior art, preferred acids are HCl or formic acid, preferred bases are NaOH or urea. The dispensing solution preferably has a pH between 7.5 and 13, more preferably between 8.0 and 12.5, and even more preferably between 8.5 and 11.

In further preferred embodiments, additives/auxiliaries can be added to the dispensing mixtures to achieve further particularly advantageous results and effects. Such effects relate, for example, to a surface conditioning of cellulose-based fibers which are expanded in this process step with the process water. Such conditioning can, for example, result in an increase in the water-binding capacity, as a result of which the cellulose-based fibers can, on the one hand, be separated more easily in the subsequent process steps and can, on the other hand, improve product properties of the cellulose-based fibers.

Further, for example, by the addition of adsorbents, a removal of colorant agents or toxins or electrolytes, etc., can be achieved. The selection of one or more additives to add to the dispensing volume of this process step depends on the specific application and the starting material and can be decided by a person skilled in the art. Examples of possible additives include: urea, DMSO, zeolites, ion exchange resins.

In a further preferred embodiment, separation of the solid matter from the aqueous dispensing mixture is carried out in a further method step, in which in one embodiment the solid matter is essentially represented by the fiber materials and complex carbohydrates. The separation is particularly advantageous, since the fiber materials which are present after disconnection/detachment according to the inventive method in an aqueous dispensing volume have a very high water binding capacity and thereby entrap dissolved proteins, but also other dissolved soluble compounds present in the aqueous solution in the spatial structures formed by these fibrous structures. If in such a suspension condensation/aggregation/complexation of the dissolved organic compounds is initiated, the dissolved organic compounds present within the fiber material are thus lost to recovery, or such loaded fiber material are aggregated or complexed with the forming condensates, causing them to be introduced in the obtainable fraction of condensed organic compounds. Thus, the separation of the fiber mass with recovery of the bound water content is a particularly preferred embodiment of the method. It has also been found that this is a crucial criterion for obtaining fractions of condensed soluble compounds that are completely or nearly completely odorless and/or tasteless. It has also been found that aromas and/or flavoring agents, but also other compounds, such as coloring agents, which are not desirable in a food, are present especially in the water phase that is enclosed in/bound to the fibrous materials and in particular by the cellulose-based fibers. Thus, if condensates of organic compounds include the expanded cellulose-based fibers containing the dissolved aromas/flavor-agents and/or coloring agents, and thus remain herein, those cellulose-based fibers are essentially responsible for an undesirable taste/smell and/or color even after a dehydration of the condensates. Therefore, a key criterion for obtaining a fraction of condensed and dehydrated soluble constituents of the starting material that is free of off-odors and off-tastes is complete or nearly complete separation of solid matter. It could be shown that this criterion is fulfilled if, after expansion/hydration of soluble compounds and of the fiber materials and after swelling of complex carbohydrates, the suspension of the dissolved soluble compounds can be freely passed through a filter with a screen size of 10 µm. Such solutions/suspensions are fiber-free or nearly fiber-free. Nearly means >98% by weight. Surprisingly, it has been shown that complete or nearly complete separation of solid matter that is present in the aqueous dispensing mixture is possible by the use of filters having a significantly larger sieve mesh size than the spatial diameters determined for the particles and fibers present in the dispensing mixture.

The term solid mater as used here describes corpuscular structures that do not pass through a filter with a screen mesh size of 10 microns. Thereby, a very simple process technology can be provided, with which all or nearly all solid matter is selectively separated from the dispensing mixture in which the dissolved proteins as well as other soluble and dissolved compounds remain. The surprising and particularly advantageous effect resulting from the process according to the invention is that an aqueous phase is obtained, in which major constituents of the plant-based starting material, which represent the fraction of solid matter, are no longer present herein and which contains virtually all of the soluble proteins present in the starting material in a dissolved and hydrated form. Thus, in a preferred embodiment, the method of the invention is practiced in that way that after dispensing of the constituents in an aqueous dispensing volume an aqueous solution is obtained by means of a filtration process, containing dissolved and hydrated proteins, which are free of solid matter.

Preference is given to a process for the separation of constituents of plant-based starting materials, in which a disconnection/detachment of the constituents of the plant-based starting material is achieved by means of an aqueous solution containing dissolved amino acids and/or peptides, so that the solid matter is completely or nearly completely removed from dissolved proteins present in an aqueous dispensing phase by means of filtration separation techniques. Particularly preferred is an embodiment of the method in which the dissolved amino acids and/or peptides are dissolved cationic amino acids and/or peptides.

Preference is given to a process for the separation of constituents of plant-based starting materials, in which a disconnection/detachment of the constituents of the plant-based starting material is achieved by means of an aqueous solution containing dissolved amino acids and/or peptides, and following a dispensing of the constituents in aqueous dispensing volume, an aqueous solution containing dissolved and hydrated proteins is obtained after a filtration process, which is free or nearly free of solid matter. Particularly preferred is an embodiment of the method in which the dissolved amino acids and/or peptides are dissolved cationic amino acids and/or peptides.

Suitable sieving devices are known in the art. Particularly suitable for this purpose are sieve devices which, at the same time, agitate the dewatered material/screen residue, such as, vibrating or tumbling sieves, since the sieve residue which builds up greatly impairs/restricts the passage of the water phase. Other particularly suitable filtration techniques are, for example, curved screens, band filters or sieve decanters. However, it is also possible to use centrifugal separation processes, such as decanters, centrifuges or separators. A disadvantage of a centrifugal separation is, that also higher molecular weight proteins can be discharged/separated in the gravitational field together with the solid matter and a further purification of the solid mass obtained has to be performed, in order to separate the discharged dissolved soluble compounds from the solid matter, which in turn is preferably performed by means of a suitable filtration technology.

The sieve size that is required to obtain a filtrate of the aqueous distribution solution that, after passing one or more sieves, has a content solid matter of <2% by weight, more preferably <1% by weight and more preferably <0.1 wt %, is to be determined for the individual application. Preferred is a screen mesh size of one of the filters is >50 µm, more preferably >80 µm and more preferably >100 µm. The advantage of using a sieve with a larger screen mesh size is that a significantly larger volume of the dispensing solution per time unit can be filtered, which effects significantly lower material and process costs. In a preferred embodiment, a fractionated separation of solid constituents of the plant-based starting material is performed, which can preferably be carried out in one process step. For example, complex carbohydrates (e.g., starch granules), which may have dimensions of 0.5 to 2 mm, are selectively separated by means of a preliminary sieve, since depending on the starting material, the cellulose-based fibers completely pass such a preliminary sieve when present in the flowing water volume. Therefore, the method is also suitable for selective separation of complex carbohydrates, such as starch granules.

Preference is given to a process for the separation of constituents of plant-based starting materials, in which a disconnection/detachment of the constituents of the plant-based starting material by means of an aqueous solution containing dissolved amino acids and/or peptides is performed, and where after a dispensing of the constituents in an aqueous dispensing volume complex carbohydrates are selectively separated by filtration. Particularly preferred is an embodiment of the method in which the dissolved amino acids and/or peptides are dissolved cationic amino acids and/or peptides.

In a particularly advantageous embodiment, the obtained filter residue of this process step is dewatered. Methods for this are known in the art. Particularly suitable are screen presses or screw presses or centrifugal processes, such as centrifuges or decanters. As a result, the moister content of the sieve residue can be reduced to a residual moisture content of preferably <80% by weight, more preferably <60% by weight and more preferably <40% by weight. In a preferred embodiment of the method, the recoverable filtrate liquid is supplied to the filtrate liquid of the previously performed filtration process. This advantageously allows almost no loss of the process liquid from the dispensing phase and the dissolved compounds contained therein. On the other hand, the solid constituents thus obtained, which are almost free from soluble constituents of the plant-based starting material, can be obtained in a highly condensed and thus transportable form. Furthermore, the further processing of the solid constituents is significantly simplified.

Surprisingly, it could be shown that upon receipt of both of the following conditions: a dispensing solution in which solid matter is not agglomerated with soluble constituents, and a filtrate in which particles >10 μm do not occur, the aggregated and condensed soluble constituents that are obtained from the filtrate solution do not contain the odorants (aromas)/flavorings and/or colorants which have been present in the dispensing mixture phase.

With this process step, a fiber-free solution is obtained which preferably contains >98% by weight, more preferably >99% by weight and most preferably >99.5% by weight of the mass of proteins originally present in the starting material.

The remaining process conditions can be freely selected. The filtrate and the screen or press residue are collected or introduced in separate and suitable containers.

In a further preferred embodiment, condensation and/or aggregation and/or complexing of the dissolved proteins and/or other dissolved compounds of the filtrate of the preceding process step is performed in a further process step. The aim of this condensation process is to bring about an aggregation of dissolved or hydrated proteins and/or other dissolved compounds, which makes it possible to form a protein mass or product mass which can be separated by known separation techniques and if possible can be obtained with as little process water as possible. Surprisingly, this goal can be achieved already at low concentrations of the condensing agents listed here in dissolved form. Particularly suitable condensing agents are, for example, acids, preferably organic acids, such as citric acid or lactic acid, furthermore salts, such as NaCl, and also complexing agents, such as EDTA, but also adsorbents. Furthermore, soluble divalent cations are preferred, such as aluminum, calcium and magnesium salts. Furthermore, ammonium compounds, such as ammonium sulfate, and betaines, sulfobetaines, imidazolines. Furthermore, surface-active compounds such as DMSO or DDT. Furthermore, silicates and carbonates. Furthermore, combinations of the condensing agents listed herein are advantageous, such as a combination of citric acid and aluminum chloride. Preference is given to the use of aqueous solutions of the condensing agents.

The temperature at which condensation and/or aggregation and/or complexing can be performed can in principle be chosen freely. Preferred is a temperature between 6° and 90° C., more preferred between 10° and 60° C. and more preferred between 18° and 40° C. Preference is given to the setting of a specific pH range, the optimum results from the selection or combination of the condensing agent(s). The optimum pH range can be determined by the method described above. The pH of the aqueous solution containing dissolved compounds, in which the condensation and/or aggregation and/or complexing of the dissolved proteins and/or other dissolved compounds according to the invention is carried out, is preferably >5.5, more preferably >6 and more preferably of 7. Further preferred is the preparation of solubilized proteins that have a minimum solubility at a pH of <13, more preferably of <12, even more preferably of <11 and more preferably of <10. Surprisingly, the addition of carbonates led to the formation of condensates which predominantly contained proteins but also other compounds such as soluble carbohydrates. Solutions of sodium carbonate, sodium bicarbonate, or sodium hydrogen carbonate added to the fiber-free filtrate solution containing dissolved compounds were more time-efficient in the condensation of dissolved compounds than when these compounds were added as a solid to the process solution. Surprisingly, a similar formation of condensates, which contained predominantly proteins, was also possible with silicate compounds. Particularly suitable are compounds, such as sodium-metasilicate, sodium-orthosilicate. Particularly suitable are aqueous solutions of these compounds.

Furthermore, it was surprising that a combination of carbonate and silicate compounds increased the aggregation effect of the individual compounds, so that in a combination of the compound classes, the amount of condensing agent used was lower while achieving the same separation result as was the case with the amount required for this when using only one of the compounds.

Preference is given to a process in which condensation/aggregation/complexing of a protein-containing aqueous phase is achieved by means of carbonates and/or silicates.

Preference is given to a process for the separation of constituents of plant-based starting materials, in which a disconnection/detachment of the constituents of the plant-based starting material by means of an aqueous solution containing dissolved amino acids and/or peptides, is followed by a dispensing of the constituents in an aqueous distribution volume, and in which after separation of solid constituents, a condensation of dissolved compounds is achieved by means of carbonates and/or silicates. Particularly preferred is an embodiment of the method in which the dissolved amino acids and/or peptides are dissolved cationic amino acids and/or peptides.

The suitability of the various possible condensing agents must be selected individually for each application. The suitability can be very easily recognized by the person skilled in the art by adding and admixing different condensing agents in increasing concentrations to samples of the fiber-free solution of dissolved compounds and in particular of the dissolved proteins herein. Condensation can be detected after a short residence time with the naked eye. The selection of the appropriate concentration may be made by centrifuging a sample solution that has undergone condensation and treating the supernatant again with condensing agents. If no visible condensates/aggregates/complexes can be formed and/or separated off, the solution contains <6% by weight, preferably <4% by weight and most preferably <2% by weight of the dissolved compounds or dissolved proteins to be condensed.

The amount to be added which is determined with this test method can be used for process execution and process control. On the other hand, the process can also be controlled by these test methods in that, in the case of formation of condensate/aggregates/complexes by addition of the one or more further condensing agents according to the invention to the supernatant of the process solution in which the condensation process has already taken place and after centrifuging the process liquid, the corresponding condensing agent (s) may still be added to the process liquid and mixed with it. In other words, the required amount of condensing agent (s) has been added to the process liquid when no condensation of hydrated proteins occurs in a supernatant of a sample of the process liquid obtained by centrifugation, to which a condensing agent was added. Surprisingly, this goal can be achieved already by low concentrations of the condensing agents listed herein. Particularly suitable condensing agents are, for example, acids, among them preferably organic acids, such as citric acid or lactic acid, furthermore salts, such as NaCl, and also complexing agents, such as EDTA, but also adsorbents. Furthermore, soluble divalent cations are preferred, such as aluminum, calcium and magnesium salts. Furthermore, combinations of the condensing agents listed herein are advantageous, such as a combination of citric acid and aluminum chloride.

The preferred condensing agents are preferably completely dissolved in an aqueous medium. It is also according to the invention to prepare two or more of the condensing agents according to the invention together in a solution and to add them to the solution with dissolved compounds. It is possible, for example, to adjust the pH of the solution containing condensing agent by adding a buffer. The appropriate concentrations can be readily determined by one skilled in the art and are determined by the process conditions. The influence of other process parameters can also be studied with the described techniques.

The preferably one or more dissolved condensing agents added together and/or consecutively to the solution containing dissolved compounds may be added in continuous and/or discontinuous form, as a jet or drop by drop. When applied as a solid, it is preferred to add the condensing agent (s) in a powdered form.

In a preferred process embodiment the condensing agent (s) are added to the process liquid under gentle agitation of the mixture. It is important to ensure thorough mixing. The duration of the mixing process is in principle freely selectable. In a preferred method embodiment, this can be carried out only over the duration of the addition of one or more condensing agent (s) or for a duration of between 10 seconds and 5 minutes, more preferably between 20 seconds and 2 minutes.

Surprisingly, it has been found that after admixing of the condensing agents according to the invention, condensation and/or aggregation and/or complexing of previously dissolved compounds occurs in the course of a few seconds to a few minutes, which is recognizable with the naked eye as spatial (3-dimensional) formations, while the previously turbid aqueous solution clarifies at the same time. It has been shown that the process flow can also be controlled on the basis of the visual assessment and the onset of clarification of the process solution. The resulting condensates increase in size, even without further addition of condensing agents, and begin to sediment over the course of a few minutes to a few hours, whereby they are very easily separated as a fraction from the water phase that is then clarified and which can be further condensed. It has been found that the condensation process by the addition of an amount of condensing agent, which is greater than the amount required for complete condensation, the amount of obtainable condensed organic compounds is decreased considerably. This is especially the case when the pH of the reaction solution is lowered by a condensing agent to below 5.0. In a preferred method embodiment, therefore, the pH of the reaction mixture is monitored and controlled continuously or discontinuously during the addition of condensing agents. Furthermore, it is preferable to monitor and control the process such that the pH value does not fall below a given value. It is preferred that the pH does not fall below 4.5, more preferably not below 5.0, even more preferably not below 5.5, and even more preferably not below 6.0.

In a preferred embodiment of the process described herein, the pH of the aqueous solutions during the process does not fall below the value of 5.

An innovation of the process described herein for the separation of the proteins is that the pH is not decreased to values below 4.5, and optimally not below <5 and that voluminous aggregates/condensates of dissolved proteins are formed, which are suspended and which spontaneously sediment, even at a neutral pH. In contrast to a protein precipitate, the protein aggregates/protein condensates obtainable by the method described herein are completely soluble in neutral water and then give a milky suspension which can pass completely through a 10 μm sieve; in contrast, a protein precipitates not readily soluble in water. For this reason, hydrolysis must be carried out in CN 106 720 920 A in step 5 and homogenization of the protein fraction is performed in step 8 in order to obtain a protein isolate, since in step 2 a precipitation is carried out at a pH of 4.5. It is known in the art that proteins which have undergone a pH in the range below 4 have altered physicochemical properties and that proteins altered in this manner are virtually no longer foamable.

As in other methods of obtaining proteins described in the prior art, which involve separation of dissolved proteins from an aqueous phase by means of precipitation (acid and/or solvent precipitation), it was not considered here, that other compounds are also present in the aqueous suspension, such as soluble carbohydrates, colorant agents, flavors, phenols, anti-nutritive compounds or toxins, which are included in a forming precipitate and can not be washed out by a simple rinse of the precipitate phase. This represents the decisive difference in the process engineering of the present application, as the completely dissolved proteins aggregate in a physiological form while retaining the hydrated shell, thereby largely blocking the adherence of other compounds, which are solubilized by the amino acids/peptides present in the solution. In addition, the aggregated and condensed proteins can be rinsed with water to remove residues of impurities present in the bound water phase. Therefore, the protein fractions obtainable by this process step are also directly usable as a product, e.g. for human consumption, and contain no sensorial detectable flavorings or anti-nutritive compounds. In particular, deodorization of the resulting protein fraction, as proposed in CN 106720920 A, is not required in the process technology proposed herein, which is of particular importance for the process economy.

In particular, dissolved and hydrated pectins may be incorporated into a protein precipitate phase by acid treatment. The technique described herein enables the non-protein compounds dissolved by the amino acid/peptide solution to be selectively aggregated and selectively separated. This can be done after by changing the pH of the solution and/or adding other aggregating agents, thus following aggregation/complexation of the proteins and their separation. Furthermore, it is known in the art that protein precipitates which are obtainable by means of an acid and/or an organic solvent essentially lose their water-binding capacity.

This is also evident in CN 106720920 A in which, after acid precipitation, the moisture content of the available protein fraction is less than or equal to 55%. The low water content of this protein phase indicates that coagulation has taken place; these proteins have essentially lost their water-binding capacity, which is associated with a loss of functional properties of proteins, such as the foaming behavior and the rheological properties (thickening effect), which should be present especially with protein concentrates. As an example of the methods according to the state of the art, CN 106 720 920 A discloses the dilemma resulting from a technique of solubilization with an alkali metal hydroxide and precipitation with an acid, as well as the need for subsequent neutralization (again by means of an alkali solution). Hereby a salt is produced which, when using the process water phases in subsequent process repetitions, has a negative effect on the process and necessitates removal thereof or addition of fresh water. This has a significant impact on the process economy. Thus, in CN 106 720 920 A, subsequent to precipitation, neutralization is accomplished by adding a caustic solution to the acidic precipitate to adjust the pH of the protein slurry to between 6 and 8. The disadvantage of this step is that the therefore required solution volume is 3-5 times of the weight of the protein phase and thus the energy for drying the protein phase is significantly increased. Therefore, it is desirable to avoid neutralization so that the protein phase can either be dried or used directly after dehydration. By way of example, it is shown in CN 106 720 920 A that flavors and astringents can not be sufficiently removed from the protein precipitate by the proposed aqueous process; therefore, in a further step, steam deodorization must be carried out in order to achieve a low-aroma final product. This further worsens the process economy. Also exemplified in the prior art, CN 106 720 920 A discloses the need for a spray-drying process step to achieve an at least partial solubility of the protein preparation. With the method described herein, spray drying which has a very high energy consumption is not required. Furthermore, it has been found that sulfur-containing amino acids or peptides by the known reactivity with proteins lead to undesirable product properties of the obtainable proteins (see below), so that sulfur-containing amino acids or peptides should not be present or only to a minor proportion in one of the inventive aqueous solutions.

European Patent Application EP 2 404 509 A1 discloses a method for extracting protein from fresh grape seeds. The use of a buffer containing glycine, soda and hydrogen chloride or sodium hydroxide is necessary to achieve a pH between 8.5 and 10.5. The minimum ratio between the extraction solution and the solid is 1:5, the minimum time for this step is 3 hours. Precipitation is achieved by an acid, with the pH being 3. A wetting/impregnation for achieving hydration in order to allow efficient process economy through a lower water volume ratio is not suggested. Furthermore, product properties of the proteins are not mentioned.

Liu Rui-Lin et al. (Food Analytical Methods, Springer New York LLC, US, Vol. 10, No. 6, 21 Nov. 2016, pages 1169-1680) use an alcohol for precipitation. The process uses microwave heating and ultrasound and is energy intensive and thus is not aimed at an economic process.

In a particularly preferred embodiment of the process according to this invention, step 4 of the process is carried out without the use of organic solvents.

In a particularly preferred embodiment, a standing time is maintained following the addition of one or more condensing agents in which no or only minimal mixing of the mixture takes place. In an analogous manner, the required time of the condensation phase can be determined, which is preferably between 5 minutes and 10 hours, more preferably between 10 minutes and 5 hours and more preferably between 15 minutes and 2 hours. If the standing time is to be reduced to a minimum, the minimum duration of standing time after addition of the condensing agent can easily be determined on the basis of a sample which is centrifuged and in which, in a manner analogous to that described above, the completeness of condensation and/or aggregation and/or complexation achieved by the condensing agent (s) is checked.

In a preferred method embodiment, the condensed/aggregated/complexed soluble compounds/proteins are made obtainable in the form of a sediment. The outlet of the sediment phase is preferably accomplished via a bottom outlet and is fed to a further process sequence. The condensation phase is preferably performed at ambient temperatures, preferred is a temperature range between 15° and 40° C. In further advantageous embodiments, this takes place at a lowered or elevated temperature.

Preference is given to a temperature range between 5° and 15° C. on the one hand and between 40° and 80° C. on the other hand. The selection of a lowered temperature may be advantageous, for example, in the recovery of thermolabile compounds. The choice of a high temperature, e.g. 60° C., may be chosen, for example, to reduce the microbial loading of the starting material, e.g. in the form of a pasteurization. On the other hand, heating can also inactivate allergens and certain toxins and anti-nutritive compounds.

Preferred is a method for obtaining a protein-containing sediment consisting of condensed/aggregated/complexed proteins.

Surprisingly, it was found that aromas and flavoring-agents which are also dissolved by the unlocking process and are present in a dissolved form in the solution of the dispensing mixture are not adsorbed or complexed with protein-condensates/agglomerates/complexes while performing the inventive method for condensation/aggregation/complexation. Aromas- and flavoring-agents still present in the water fraction bound to or enclosed by the protein fraction can be separated from the condensates/aggregates/complexes of the protein fraction, together with the water in which they are dissolved by the methods described herein. If desired, the protein fraction produced may be rinsed by any of the side-stream process methods described herein. Furthermore, it was surprising that toxins and hazardous substances that may be present in plant-based press residues or milling products, such as the erucic acid, phorbol esters or synthetic pesticides, are separated from the proteins and are present in dissolved form in the dispensing solution.

Under the process conditions according to the invention used for the condensation of the dissolved compounds/proteins, the solubility of dissolved compounds that do not correspond to a protein or a soluble carbohydrate or a phospholipid or a glycoglycerolipid persists. Thus if the condensing agent was selected according to the invention, there was no condensation/aggregation/complexation of toxins or health-endangering substances, which are also referred to below as hazardous substances, and there was no incorporation or binding of such compounds into the condensates/aggregates/complexes of condensed soluble compounds/protein fraction or into the obtainable protein fractions. In a preferred embodiment, the solubility of toxins and hazardous compounds contained in plant-based press residues or milling products can be maintained or increased, for example, by adding one or more classes of compounds such as alcohols, esters or ethers during this and/or other process steps.

Preference is given to a method in which the solubility of toxins and hazardous substances in an aqueous protein solution is maintained or increased following a removal/separation of the constituents of the plant-based starting material by means of an aqueous solution containing dissolved amino acids and/or peptides. Particularly preferred is an embodiment of the method in which the dissolved amino acids and/or peptides are dissolved cationic amino acids and/or peptides.

In a further preferred embodiment, in a further process step, dehydration of the condensed/aggregated/complexed soluble compounds/proteins is achieved by dewatering. This can be achieved by techniques known to those skilled in the art. Particularly suitable are centrifugal processes, particularly suitable is the use of a decanter. The removal of water makes it possible to obtain a dehydrated mass of the soluble compounds or to obtain a protein mass which is preferably free-flowing, it is further preferred to obtain a spreadable mass and it is particularly preferred to obtain a dimensionally stable mass of condensed and dehydrated soluble constituents of the starting material. Accordingly, preferred is a protein mass whose residual moisture content is <90% by weight, more preferably <80% by weight, more preferably <70% by weight and even more preferably <60% by weight and even more preferably <40% by weight. The desired residual moisture content may vary for the different applications, so the parameter setting of the separation device must be adjusted accordingly. In principle, the highest possible separation performance is sought for the separation process. When using a decanter, the separation is preferably carried out at >2,000*g, more preferably >3,000*g and more preferably >3,500*g. The dwell time in a decanter is preferably >10 seconds, more preferably >20 seconds and more preferably >30 seconds. Preference is given to a separation which is performed at ambient temperatures in a range between 15° and 40° C. In further advantageous embodiments, a lower or higher temperature can be selected, which is in the range between 5° and 15° C., or between 40° and 80° C.

Surprisingly, it has been found that the compounds condensed with the process technology according to the invention and in particular condensed proteins form 3-dimensional structures which make it possible to carry out a dehydration by means of filtration techniques. The soluble and dissolved compounds, which were present prior to condensation/agglomeration/complexing, and which freely passed through a sieve of 10 μm sieve mesh size, had a volume in the condensed form at the end of the condensation process step that no longer permitted free passage through a filter having a sieve mesh size of 200 μm; the filtrate thereof contained virtually no proteins. Thus, in a most advantageous manner, dehydration of condensed soluble proteins and/or other condensed constituents can be accomplished by filtration, which results in no or nearly no loss of condensed soluble compounds/proteins. Furthermore, it has been shown that the proteins condensed according to the invention can be separated by means of a press which can be performed on or in a filter fabric, so that the previously specified residual moisture contents are maintained/achieved. Therefore, the process according to the invention is particularly suitable for obtaining a dehydrated protein phase having a residual moisture content of <90% by weight, more preferably <80% by weight, more preferably <70% by weight and still more preferably <60% by weight and still more preferably <40% by weight, obtainable by means of a filtration technique of condensed proteins. Filtration processes are known to the person skilled in the art. Preference is given to belt filters or chamber filters, or filter presses and chamber filter presses, as well as vacuum belt filters.

Preference is given to a process for obtaining dehydrated proteins which, after disconnection/detachment of the constituents of the biogenic starting material by means of an aqueous solution containing dissolved amino acids and/or peptides, can be obtained by filtration of condensed proteins. Particularly preferred is an embodiment of the method in which the dissolved amino acids and/or peptides are dissolved cationic amino acids and/or peptides.

Surprisingly, it has been found that dehydrated proteins obtained in this way are completely or almost completely odorless and/or tasteless and dissolve very rapidly in water and release no or virtually no colorants into the aqueous medium. Nearly complete means >98%.

Preference is given to a process for obtaining dehydrated proteins which are obtained following disconnection/detachment of the constituents of the biogenic starting material by means of an aqueous solution containing dissolved amino acids and/or peptides and which are completely or almost completely odor- and/or taste-neutral and dissolve very quickly in water and give no or virtually no colorants to the aqueous medium. Particularly preferred is an embodiment of the method in which the dissolved amino acids and/or peptides are dissolved cationic amino acids and/or peptides.

Furthermore, it has been found that such dehydrated proteins can be purified very simply and gently in the obtained dehydrated form. In a preferred embodiment, the dehydrated protein mass is applied to a filter belt/fabric with a certain layer thickness and a passage through this layer is performed, with or without a support of another filter, of a liquid and/or a vapor and/or a gas which enters from below or from above. The re-dewatering process can be done as before or with another method for dewatering/drying. In one embodiment, further processing of the dehydrated soluble constituents/proteins obtained is carried out in a side-stream process, which preferably involves purification.

Preference is given to processing the condensed and dehydrated constituents in a side-stream process.

Surprisingly, in a mass balance of the products obtained from biogenic starting materials, it was found that >95% by weight of the proteins contained herein were separated and obtained in dehydrated form. Therefore, a method is preferred in which preferably >95% by weight, more preferably >97% by weight and more preferably >98.5% by weight of the proteins present in a plant-based starting material are separated and dehydrated.

Preference is given to a process in which >95% by weight of the proteins contained in a biogenic starting material are obtained in the form of dehydrated proteins, following disconnection/detachment of the constituents of the biogenic starting material by means of an aqueous solution containing dissolved amino acids and/or peptides. Particularly preferred is an embodiment of the method in which the dissolved amino acids and/or peptides are dissolved cationic amino acids and/or peptides.

The obtainable dehydrated soluble constituents/proteins in the resulting form may be used directly for an application or stored or further processed. Storage, which takes place in suitable containers, is preferably carried out under refrigerated conditions. Surprisingly, it has been found that the protein condensates produced according to the invention have a very good storage stability. Thus, for example, no microbial colonization of a protein condensate obtained from a rapeseed press cake and having a residual moisture content of 50% by weight was observed after storage for 14 days at 6° C. Furthermore, it could be shown that there was no change in the initially existing taste and small neutrality.

Furthermore, there was still a very good solubility of the dehydrated proteins in water.

In a preferred embodiment of the method, the dehydrated proteins are subjected to a drying process in the form as obtained or after suspension in water or a liquid solution.

Preference is given to spray drying and freeze drying. Advantageously, powdered protein mixtures, protein concentrates or protein isolates can be produced thereby. However, other prior art drying processes and techniques can be used.

Preference is given to a process for the preparation of dehydrated proteins having a high storage stability, obtainable by a disconnection/detachment of the constituents of the biogenic starting material by means of an aqueous solution containing dissolved amino acids and/or peptides. Particularly preferred is an embodiment of the method in which the dissolved amino acids and/or peptides are dissolved cationic amino acids and/or peptides.

Depending on the starting material used and the process execution, large quantities of the clarified process water phase of process step 5) are incurred, in particular in industrial large-scale production. Since there are still relevant amounts of the dissolved amino acids and/or peptides (some exceed more than 100 mmol/l) present in the clarified process water phases, a reuse of those phase for the implementation of a process-economic process is required.

It has been found that the condensing agents also contained herein, which were not discharged with the product of process step 5), make the reusability of the clarified water phase of process step 5) in the process steps of the main process difficult to impossible, as it thereby leads to condensates, e.g. of proteins, in the process steps 2b) and 2), respectively, which were then present in the filter residue in process step 3) and thus resulted in product loss and a higher cleaning effort for the products obtainable from this process step.

Surprisingly, it has been found that just the use of the clarified process water phase of process step 5) in a particularly advantageous manner provides depletion of dissolved soluble proteins which are still present in the bound water phase of the filter residue of the process step 3) of the obtainable cellulose-based fibers and lignin-rich shells. Thus, it has been shown that by flushing and purifying the separable solid matter of process step 3) with the clarified process water phase of process step 5), there is an extremely effective discharge of dissolved organic compounds still present herein, thereby reducing these organic compounds, which accumulate in the process water and remain there after separation of the solid matter. Surprisingly, the effectiveness of the depletion of dissolved compounds, which were still in the filter residue of process step 3), with the clarified process water phase of process step 5) was significantly higher than when flushing and cleaning (rinsing) the filter residue was carried out with a fresh water phase. Surprisingly, this also resulted in a significant reduction in the concentration of complexing agents present in the clarified process water phase of process step 5), whose concentration after rinsing and cleaning of the solid matter obtained from process step 3) was significantly lower than before. It was found that the remaining concentrations of condensing agents in the process water phase obtained after separation of the purified solid matter, when introduced (added) into the process steps 2a), 2b), and 2 of the main process, does not cause an aggregation of soluble organic compounds. In addition, it has been found that the concentration of the dissolved amino acids and/or peptides used to disconnect/detach the constituents of the starting material was higher in the process water phase of the side-stream step, which was obtained after flushing and cleaning (rinsing) the filter residues of process step 3), as was the case in the clarified process water phase of process step 5). As a result, in an advantageous manner compounds used for disconnection/detachment of the constituents of the starting material can be recovered and at the same time due to their presence a process water phase becomes available which is suitable for an application for disconnection/detachment of constituents of the starting material. Thus, a further usage of the process water phase, which is obtained from process step 5), via a side-stream process method for rinsing and cleaning of cellulose-based fibers and/or lignin-rich shells is a particularly preferred process execution, which enables a the highly efficient recycling of the compounds used for disconnection/detachment of constituents of the starting material and the condensing agent used, with optimal product production. Furthermore, this process execution can considerably reduce process costs in the side-stream process, which are incurred for rinsing and cleaning the cellulose-based fibers and/or lignin-rich shell portions. Thus, a process economics method of separating constituents of a starting material may be provided by recycling/further usage of the process water phases between/in a main process method and a side-stream process method.

Preference is given to a process and a process execution for the process-economic separation of constituents of a plant-based starting material.

If one of the side-stream processes according to the invention is not executed or does not take place immediately, in a further preferred embodiment a purification of the clarified aqueous process water phase (s) obtained after the separation of the condensates/aggregates/complexes of process step 5) and/or of the separated water phase, which is obtained in the dehydration of the condensed condensates/aggregates/complexes can be carried out in a further side-stream process step. It has been found that depletion of condensing agents which are still in the clarified process water phase of process step 5) can be carried out by various methods. Thus, for example, ionized calcium can be precipitated by titration with phosphoric acid and then removed by filtration from the aqueous medium. On the other hand, in the case of a change of the process water pH range to values <10, which was caused by the use of an acid as a condensing agent, the pH can be adjusted to the required pH level by addition of a suitable base, e.g. by means of urea, which does not hinder the process flow in a reuse of the purified process water. Still other compounds may be reduced or removed by adsorption or by means of a dialysis procedure, e.g. by electrodialysis.

In a process implementation according to the invention, the obtainable clarified process water phases from process step 5) contain only small amounts of suspended matter and are already clear or almost clear. Suspended matter and/or turbid agents can be easily removed by methods of the prior art. Particularly suitable for this purpose are fine and ultrafine filters from the prior art. As a result, a turbidity-free (without turbid agents) water phase can be obtained. Further, electrolytes dissolved therein such as sodium, potassium, calcium, chloride, iron, copper and the like may be present in variable amounts. If necessary, these can be removed by methods known in the art, for example by electrodialysis or ion exchange compounds. Furthermore, toxins and/or harmful compounds may be present in the process solution. Methods are known from the prior art with which such, mostly organic, compounds can be removed from an aqueous medium. Among others, adsorptive process techniques are suitable for this purpose, such as column chromatography or activated carbon. In the event of thermolabile compounds having a hazard to human health, the process water phase may also be heated to a temperature and for a duration sufficient to inactivate or decompose those compounds. Advantageously, none of the dissolved amino acids and/or peptides present herein are removed by the aforementioned optional purification steps of the process water phase (s). With one or more of these process executions for purifying process water phases, which can be carried out sequentially or in parallel in any sequence, a purified process water phase containing dissolved amino acids and/or peptides suitable for disconnection/detachment of constituents of a biogenic starting material is obtained and which contain a low concentration of condensing agent that does not interfere with the reuse of the purified process water phase and in which a sufficient reduction or elimination of toxic and harmful compounds has been achieved.

In a preferred embodiment, the process water phase obtained from the rinsing and cleaning of filter residues of process step 3 is subjected to one of the purification process steps in a side-stream process or to another method of the side-stream processes according to the invention.

Thus, by a process-adaptive selection of one or more of the optional process steps of process step 6), the process water phase flow can be designed in an extremely advantageous manner so as to ensure optimum added value of the process and to guarantee the reusability of the process water phases. The individual optional process designs can be summarized in the following optional process method sub-steps:

6.1) Provision of process water for a side-stream process
6.2) Return and provision of the used process water phase from the side-stream method step 6.1)
6.3) Purification of the process water phase, obtainable from step 5) and/or 6.2) and/or a side-stream process method step
6.4) provision of a clarified and purified process water phase.

This results in various possible combinations in the execution of the process step 6), which are characterized by the number and order of the optional process steps, such as: 6.1 then 6.2 then 6.3 then 6.4, or 6.3 then 6.4 or 6.3 then 6.1 then 6.2 then 6.4, or 6.2 then 6.3 then 6.1.

The aqueous process water phases from different process steps of the main and/or side-stream processes may also be combined and fed to reuse in one of the process steps or to purification processes as listed herein for purification thereof.

It is therefore particularly advantageous to supply the clarified and purified process water phase to one of the process steps for disconnection/detachment of constituents of plant-based starting materials during a subsequent process execution. Thus, the process water phase obtainable with this process step is suitable for reuse as a process water phase.

Preference is given to a process for the separation of constituents of plant-based starting materials, in which a disconnection/detachment of the constituents of the biogenic starting material is performed by means of an aqueous solution containing dissolved amino acids and/or peptides, which is followed by a dispensing of the constituents in an aqueous dispensing volume and a subsequent separation of solid and condensed soluble constituents, and thereafter a clarified process water phase is obtained, which is purified and then reusable for one of the process steps.

Particularly preferred is an embodiment of the method in which the dissolved amino acids and/or peptides are dissolved cationic amino acids and/or peptides.

Preference is given to a process for the separation of constituents of plant-based starting materials, in which a disconnection/detachment of the constituents of the biogenic starting material is performed by means of an aqueous solution containing dissolved amino acids and/or peptides, which is followed by a dispensing of the constituents in an aqueous dispensing volume and after subsequent separation of solid and condensed soluble constituents a clarified process water phase is obtained, which is used in a side-stream process method for rinsing/cleaning and then is purified and then is used again in one of the main process steps. Particularly preferred is an embodiment of the method in which the dissolved amino acids and/or peptides are dissolved cationic amino acids and/or peptides.

Preference is given to a process in which the clarified and purified process water phase is reused for execution of a disconnection/detachment of the constituents of a biogenic starting material by means of an aqueous solution containing dissolved amino acids and/or peptides. Particularly preferred is an embodiment of the method in which the dissolved amino acids and/or peptides are dissolved cationic amino acids and/or peptides.

Preferably, <3% by weight, more preferably <1.5% by weight, and most preferably <0.5% by weight of organic compounds are present in the clarified and/or clarified and purified process water phase. Preferably, it is a clear solution that has no or only a minimal amount of suspended matter. The method preferably allows wastewater-free process control.

Preferably, the clarified and/or clarified and purified process water phase is stored or temporarily stored in a suitable container or is directly reused. When stored, the establishment of suitable conditions is advantageous. In one embodiment, the clarified and/or clarified and purified process water phase is cooled during the storage period. Preference is given to cooling to <10° C., more preferably to <8° C., and more preferably to <6° C. The shelf life of the clarified and/or clarified and purified process water phase is preferably >7 days, more preferably >14 days and more preferably >4 weeks. Shelf life in this context means the absence of potentially harmful germs or pathogens or toxins, in a concentration that is harmful to health that exists or occurs during that time. In other words, a clarified and/or clarified and purified process water phase have a shelf time during which they are suitable for reuse and are safe for use in food production. The clarified process water phase can be returned to the process in the various process steps via a suitable pump and pipe system.

In a preferred embodiment, a reuse of a clarified and/or clarified and purified process water phase, obtainable from process step 6), is executed. It has been shown that, especially when using the process water phase of process step 6) (providing a clarified and purified process water phase), the amount of amino acids and/or peptides used for the disconnection/detachment of constituents of the starting material can be reduced as compared to the use of a fresh water phase in the process steps 2a) and/or 2b), or 2).

Thus, a very good dissolution of the soluble constituents of the starting material can be ascertained by the amino acids according to the invention and/or peptides which were present in both the clarified and the clarified and purified process water phase of the process step 6). Furthermore, there is an identical dispensing result when using the process water phase of process step 6) (recycling and provision of the used process water phase from the side-stream process), as when using an equal volume of a fresh water phase to dispense the disconnected/detached constituents of the starting material in the process steps 2b) or 2).

It has also been shown that there is a greater amount (dry matter) of condensed/aggregated/complexed soluble constituents can be obtained than was the case by using fresh water for the same process step execution. This was the case in particular in the production of a protein fraction. Furthermore, there was a measurable difference in the products produced. Thus, there is excellent reusability of a clarified and/or clarified and purified process water phase for a separation and recovery of constituents of a starting material in one of the inventive steps.

Preference is given to a process for the separation of organic constituents of plant-based starting materials, in which a clarified and/or clarified and purified process water phase of the main and/or side-stream process steps is used for re-processing. The preferred method is thus characterized by the following method steps:
1) providing starting materials,
2a) adding the starting material of step 1) with an aqueous solution containing dissolved amino acids and/or peptides for disconnection/detachment of the constituents of the starting material,
2b) providing an aqueous dispensing volume and dispensing of the disconnected/detached constituents of the mixture from step 2a),
3) separation of solid matter from the dispensing mixture of step 2b) thereby obtaining a fiber-free aqueous solution of dissolved constituents of the starting material,
4) condensation/aggregation/complexation of the dissolved constituents of the aqueous solution of step 3) to obtain an aqueous phase containing condensed soluble constituents of the starting material,
5) separation and dehydration of the condensed soluble constituents of the starting material of step 4) and obtaining a dehydrated condensate of step 4) and a clarified process water phase,
6) using the clarified process water phase of step 5) for one or more of optional process steps:
6.1) providing a process water phase for a side-stream process;
6.2) return of the process water phase of step 6.1) available from a side-stream process and providing the used process water phase from a side-stream process
6.3) purification of the process water phase obtainable from process steps 5) and/or 6.2)
6.4) provision of a clarified and purified process water phase,
7) Reuse of the clarified and/or clarified and purified process water phase wherein the clarified and/or clarified and purified process water phase of step 7) is obtained from one or more processes of step 6) and reused is performed in step 2a) and/or 2b) or a side-stream process.

In a further process variant, the process steps 2a) and 2b) are performed in a single process step, the process step 2. For this purpose, the plant-based starting material of process step 1) is brought into direct contact with the volume of a solution which contains on the one hand a sufficient concentration of dissolved amino acids and/or peptides, the dissolved amino acids and/or peptides being dissolved, preferably are cationic amino acids and/or peptides, in order to ensure the disconnection/detachment of the constituents of the biogenic starting material according to the invention and on the other hand has a volume of the aqueous dispensing volume that is sufficiently large in order to dispense the constituents of the starting material according to the invention. The concentration of the dissolved amino acids and/or peptides, as well as the volume, or quantity ratio to the starting material, can be determined by the methods described herein. A concentration of the dissolved amino acids and/or peptides that is between 10 mmol and 800 mmol is advantageous. The other applicable process parameters apply analogously, as described in the individual process steps 2a) and 2b). Following process step 2), the process as described herein may be continued with process step 3).

Thus, a method is also preferred which is characterized by the following method steps:
1) providing plant-based starting materials,
2) adding the plant-based starting material of step 1) with an aqueous solution, containing dissolved amino acids and/or peptides for disconnection/detachment of the constituents of the plant-based starting material and with an aqueous dispensing volume and dispensing of disconnected/detached constituents,
3) separation of solid matter from the dispensing mixture of step 2) thereby obtaining a fiber-free aqueous solution of dissolved constituents of the starting material,
4) condensation/aggregation/complexation of the dissolved constituents of the aqueous solution of step 3) to obtain an aqueous phase containing condensed soluble constituents of the starting material,
5) separation and dehydration of the condensed soluble constituents of the starting material of step 4) and obtaining a dehydrated condensate of step 4) and a clarified process water phase,
6) 6.1) providing a process water phase for a side-stream process;
6.2) return of the process water phase of step 6.1) available from a side-stream process and providing the used process water phase from a side-stream process
6.3) purification of the process water phase obtainable from process steps 5) and/or 6.2)
6.4) provision of a clarified and purified process water phase,
7) reuse of the clarified and/or clarified and purified process water phase
wherein the clarified and/or clarified and purified process water phase of step 7) is obtained from one or more processes of step 6) and reused is performed in step 2a) and/or 2b) or a side-stream process.

The method according to the invention additionally allows numerous variants of the method which enable further highly advantageous embodiments.

Process Variants of Process Step 1

In a preferred method embodiment, the preparation of the plant-based starting material and in particular in the case of press residues or ground products of plant seeds is executed under special conditions. In one embodiment, the filling of the container (and possibly also in the following process steps) is performed under protective or inert gas conditions. As a result, for example, oxidative changes that occur under ambient air conditions can be prevented. This can be of decisive in particular for obtaining specific product properties. In the case of such a design, the containers of the subsequent process steps are to be equipped accordingly.

In a further method embodiment, the container (s) of step 1 and the subsequent process steps are protected against explosions.

Preference is given to a process for the separation of constituents of plant-based starting materials, in which the plant-based starting materials are provided in a suitable container.

Preferred is a process for separating constituents of plant-based starting materials in which the plant-based starting materials are provided in a suitable container and apparatus by and with which a protective/inert gas atmosphere can be prepared and maintained.

Process Variants of Process Steps 2), or 2a) and 2b)

In one embodiment, before, during or after the biogenic starting material of step 1 is mixed with an aqueous solution containing dissolved amino acids and/or peptides, one or more further compound (s) are added. In a preferred embodiment, in particular lipophilic constituents of the biogenic starting material can hereby be separated from the amphiphilic and hydrophilic constituents of the biogenic starting material and then separated.

Thus, for example, an alcohol may be added to dissolve and/or dissolve ingredients of the press residue or a ground product during subsequent process steps. Suitable alcohols are, for example, isopropyl alcohol, methanol or ethanol or octanol. The addition of a small volume fraction of one or more alcohols or alcohols is preferred. Preference is given to a volume fraction of 0.1 to 30% by volume, more from 0.5 to 20% by volume, moreover between 0.8 and 10% by volume and even more preferably between 1 and 8% by volume.

Hereby, compounds, such as colorants, can be detached from other constituents of the starting material and/or kept in solution. In a preferred method embodiment, one or more alcohol (s) is/are added to the process mixture in an optional process step 2a1) and/or 2b1).

In one process embodiment, oxidative processes which can take place in one of the aqueous media in which the dissolved constituents of the starting material, are reduced or prevented by antioxidants. Preferably, the optional process step (s) 2a2) and/or 2a2) in which one or more antioxidant/antioxidants are added to the process liquid is/are preferred. This is particularly advantageous for protecting, for example, polyphenols, vitamins or colorants from oxidation which may take place during the course of the process and for obtaining them in unoxidized form.

Preference is given to a process in which one or more organic and/or inorganic compounds are added to process step 2a) and/or 2b) in the optional process steps 2a1) 2a2), 2b1) or 2b2) to form organic compounds of the starting material to dissolve, to keep soluble and/or to protect.

Preferred is a method in which the at least one compound added in step 2a1), 2a2), 2b1) or 2b2) is an alcohol and/or an antioxidant.

In a further preferred embodiment, the addition of lipophilic compounds and/or organic solvents is carried out in one or both optional process step (s) 2a3) and/or 2b3). This can be particularly advantageous in order to enable the formation of a separate organic phase/lipid phase in subsequent process steps and/or to facilitate removal, in particular of neutral lipids. Suitable solvents are, among others, hexane, pentane, octane, methyl ester, triglycerides, paraffins or silicone oils. Preference is given to thorough mixing of the added compounds and solutions with the reaction mixture.

It has been shown that lipids, and in particular neutral lipids, do not bind to the hydrated constituents of the starting material which are present in the dispensing mixture and are liberated from hydrated compounds. This effect can be used in a particularly advantageous manner in order to selectively or non-selectively unify lipids and/or lipophilic compounds which are present in the dispensing mixture in a lipid phase. The lipid phase-forming lipids may have already been present in the biogenic starting materials and/or are added in one of the process steps. The use of lipid mixtures and/or combinations with organic solvents is advantageous. It is particularly preferred to use an already purified triglyceride phase which was obtained by pressing the starting material. Due to the formation of a lipid phase, micellar lipids and lipophilic compounds can be absorbed into the lipid phase in a particularly advantageous manner, whereby they can very easily be separated from the aqueous phase and, if necessary, can be used further. This applies, among others, to the extraction of sinapine, tocopherols, fat-soluble vitamins or colorant agents. The preferably spontaneously forming lipid phase separates on the surface of the aqueous medium and can be separated from the aqueous medium by known separation techniques such as a skimmer.

In further preferred embodiments, in the optional process steps 2a3) and/or 2b3) lipophilic compounds can be added, which advantageously allow the formation of a lipid phase.

It has been found that the addition of, for example, edible oil separates a lipid phase, which floats on the aqueous process phases. It was found that lipids which have been present as constituents in the biogenic starting material were present herein. Preference is given to a mixture of the aqueous process solution (s) with the lipophilic compounds. Separation of the lipophilic phase can be achieved by a settling method or a centrifugal method. The separation of a separate lipid phase is preferably performed at the end of the process step 2, i.e., before process step 3.

Preference is given to a process for the separation of lipophilic constituents of plant-based starting materials, in which lipophilic compounds are added in the process step 2a3) and/or 2b3) and mixed with the process mixture.

Preference is given to a process in which, in process step 2a3) and/or 2b3), a neutral lipid and/or organic lipophilic solvent is/are added and mixed with the aqueous mixture.

Preferred is a method wherein a lipid phase is formed through which and with which the lipophilic compounds can be removed from the dispensing mixture and recovered.

Preference is given to a method in which a lipid phase, which forms or can be formed during method step 2b) or 2), is removed from the aqueous dispensing solution before carrying out method step 3).

Process Variants of Process Step 2b)

In one embodiment of process step 2b), removal of hydrophilic and/or amphiphilic compounds from the dispensing mixture is achieved in process step 2b4). This can be done by adsorption/complexing/filtration/dialysis/hydrolysis methods. Thus, for example, colorant- and odorant-agents can be bound/immobilized to different adsorbents, such as activated carbon or zeolites. Furthermore, for example, enzymes can be used to deactivate, e.g., anti-nutritive compounds. Furthermore, toxins can be complexed by, e.g. chelates.

Furthermore, dialysis methods can in particular be used to reduce ions and small molecule compounds, such as toxins.

Preference is given to a process in which hydrophilic and/or amphiphilic compounds are removed from a dispensing mixture by means of adsorption/complexing/filtration/dialysis/hydrolysis processes.

Preference is given to a method in which, in method step 2b4), adsorption/complexing/filtration/dialysis/hydrolysis of hydrophilic and/or amphiphilic compounds carried out.

Process Variants of the Process Step 3

In one embodiment, differential filtration of the solid constituents of the starting material is performed. In a preferred embodiment of the method, filters with different sieve mesh size dimensions are used for this purpose, wherein first larger particles are filtered off and then smaller particles in one or more further filtration stages. For differential separation according to particle sizes, vibration or rotary vibrating screens are preferably used. In addition to the size-selective separation of the solid corpuscular constituents of the dispensing mixture, separation according to particle density is possible.

For this purpose, methods are known from the prior art, such as the use of hydrocyclones. In a particularly advantageous manner, this allows the fiber materials, but also insoluble and complex carbohydrates to be separated into the individual fractions, which can then be recycled/obtained. The separation of the fiber materials or other solid corpuscular constituents which are present in the dispensing mixture, according to their size and/or their density (specific gravity) can be carried out in optional process step 3a) by means of sieving techniques and/or cyclone separation method, as described in more detail below.

Preference is given to a method in which, in method step 3a), the solvated cellulose-based fibers and solid corpuscular constituents can be separated according to their size and/or their specific weight by means of differential sieving and/or cyclone separation method and subsequently used.

In a preferred process variant of process step 3, a separation of micro-complexes/particles is achieved in process step 3b), following the separation of fiber materials. Micro-complexes/particles are understood as meaning aggregates having a size between 0.5 and 2 μm. Such aggregates consist to a large extent of carbohydrates or fibrous materials. These aggregates can be removed by centrifugal or filter techniques. If suitable process parameters are selected, the smallest complexes can be separated without loss of proteins.

Preferred is a method in which in the process step 3b) micro-complexes/particles are separated without loss of dissolved proteins.

Particularly preferred is a process, wherein in step 3) the solid matter is separated from the dispensing mixture of step 2b) by means of filtration or sedimentation.

Process Variants of Process Step 4

In a preferred embodiment, in process step 4) compounds, comprising carbohydrates, phospholipids, glycolipids, glycoglycerolipids, antioxidants, vitamins are added to and/or are contained already in the aqueous solution of step 3), which are bound to the dissolved proteins and aggregated with the proteins.

In a further preferred embodiment, the method according to the invention after step 4) and before step 5) comprises step 4a):

Separation of the aggregated proteins and subsequent addition of one or more further aggregating agent (s) for aggregation of the dissolved carbohydrates according to step 3).

In a further preferred embodiment, in step 4a) before, during or after the initiation of the condensation/aggregation/complexing of the dissolved soluble constituents, such as the proteins, one or more compound (s) of the fiber-free solution containing protein are added in order to bind/complex with the protein (s) and thus introduce them into the obtainable protein fraction.

In a particularly preferred embodiment, in the process step 4a), compounds are added to the aqueous fiber-free solution containing proteins, which preferably comprise phospholipids, glycolipids, carboxylic acids, antioxidants, vitamins and/or carbohydrates.

In a further particularly preferred embodiment, in the process step 4a) compounds, which are added to the aqueous fiber-free solution containing protein, preferably including phospholipids, glycolipids, carboxylic acids, antioxidants, vitamins and/or carbohydrates and/or which are already contained herein, are bound to the dissolved proteins and aggregated together with the proteins. In a process variant, this method step can also be carried out in method step 2 as method step 2b5).

In a method embodiment, the dissolved compounds or classes of compounds present in the fiber-free aqueous solution of process step 4) are aggregated/complexed differentially with the dissolved proteins and/or other dissolved compounds. This can be done in step 4b) by adding one or more compounds before, during or after the initiation of the condensation/aggregation/complexing of the proteins and/or other dissolved compounds, to the fiber-free protein solution, which changes the solubility of compounds that are not proteins, which is, for example, hereby lowered. This can be done, for example, by adding carbonates to modify the solubility of glycolipids or by adding chelating agents to modify the solubility of phospholipids. But also other compounds can be used, such as $Na_2SO_4$, ammonium sulfate, $CaCl_2$, $MgCl_2$, acetates, tartrates or silicates. This ensures that the solubility of one or more dissolved compounds is lowered, as a result of which they adhere/complex with the proteins. This preferably takes place during the condensation/aggregation/complexing of the proteins in this process step. As a result, the compounds, of which the solubility is lowered in the reaction mixture, are taken up in the forming protein condensates/aggregates/complexes and made obtainable in this form. This process is preferably carried out in a neutral pH range, preferably a pH between 6 and 8. To influence the solubility, a suitable reaction temperature can be set, which may be different from the temperature that is preferred during the addition of consecutive condensing agents.

Preferred is a method in which in process step 4a) one or more compound (s) is/are added to the aqueous process solution in order to bind them to dissolved and/or condensing/aggregating/complexing proteins and/or to bind and/or combine them to/with condensed/aggregated/complexed proteins, before, during or after the initiation of condensation/aggregation/complexation of the proteins.

Preference is given to a process in which, in process step 4b), compounds which are dissolved in the aqueous process solution bind to the condensed proteins or condense/aggregate/complex with them by adding these compounds before, during or after the initiation of the condensation/aggregation/complexation of proteins. The complexed protein fraction can be condensed with centrifugal techniques, such as a decanter, to a dehydrated mass.

Preference is given to a process in which in step 4b) compounds which are dissolved in the aqueous process solution are bound to the dissolved proteins by condensing/aggregating/complexing these compounds with the dissolved proteins.

Preference is given to a process in which, in step 4b), compounds which are dissolved in the aqueous process solution are bound to the dissolved proteins by condensing/aggregating/complexing these compounds with the dissolved proteins.

Particularly preferred is a process, wherein in step 5) the separation of the suspension of step 4) is carried out by a filtration process.

Process Variants of Process Step 6):

In a preferred embodiment, in process step 6), compounds which are still contained in the clarified water phase of process step 5) are reduced/removed by a purification of the process water phase. This can be accomplished by adsorption, aggregation, complexation or dialysis procedures. In this process step, one or more compounds or classes of compounds can be removed from the aqueous phase using methods from the prior art. Thus, for example, dissolved aromas- and flavors can be removed with clay minerals, such as Ca-bentonite, saponite or kerolith. Furthermore zeolites or activated charcoal preparations, activated carbon, silica gels, molecular sieves, clays, alumina, styrene polymers can also be used. Furthermore, colorants can be removed with suitable adsorbents, such as with activated carbon.

The clarified process liquid of step 5) may also contain phospholipids and/or glycolipids. This can be controlled by the process execution of the previously performed process steps.

In one embodiment, one or both of these classes of compounds are removed by adding precipitants to the process fluid. Suitable reagents include, among others, silicates, carbonates, oxides of magnesium, calcium, aluminum or copper compounds, such as copper chloride or Ca-carbonate. This effects aggregation/complexation of these compounds to produce agglomerates that can be detected by the naked eye. After a sufficient time and concentration of the precipitant, which is identified when no further aggregates form, they can be separated and recovered by means of centrifugal separation techniques. Also preferred are coagulants, such as $(NH_4)_2SO_4$, $CaSO_4$, $MgSO_4$, $Na_2SO_4$ or organic substances such as glucano-lactone. It is preferred to remove the resulting condensates/aggregates and complexes from the process water phase by a filter technique or by means of centrifugal processes.

In a further advantageous method embodiment of the process step 6), the ionic and ionizable compounds present in the clarified process liquid, such as sodium, potassium, magnesium or calcium, are removed. For this purpose, known ion exchange resins, such as Amberlite XAD 16HP, XAD 7HP, XAD 1180NFPX 66 or Dowex 1×8 can be added to the process fluid or an electrodialysis of the process fluid can be performed.

Preference is given to a process in which, in process step 6), the process water phase is purified in which dissolved organic and/or inorganic compounds present in the clarified water phase are reduced or removed by adsorption, aggregation, complexation or dialysis processes.

In another preferred embodiment of the method, toxins or herbicides or pesticides or other harmful compounds are removed from the clarified water phase by suitable methods. Suitable methods are, for example, ultrafiltration or nanofiltration of the solution or adsorption of the toxins or hazardous substances.

In a further preferred embodiment, dissolved compounds and/or microorganisms are inactivated and separated by a thermal treatment. The preferred temperature range for the thermal treatment is between 40° and 120° C. or between 18° and 0° C. The separation is thus achieved by changing the solubility of the compounds/microorganisms to be separated due to the thermal treatment and thereby condensing and/or complexing them, whereby the condensates/aggregates can be removed from the liquid by known separation techniques. Suitable separation processes are centrifugal processes as well as filtering and screening techniques. With this process step it is possible to separate compounds that belong to the substance class such as carbohydrates.

Preference is given to a process in which, in process step 6), the process water phase is purified, by execution of a thermal treatment, by/in which dissolved compounds and/or microorganisms are condensed and/or complexed and subsequently separated.

In a further particularly preferred method embodiment of process step 6), further purification steps are carried out in order to reuse of the clarified process water phase. Such include, among others, any reduction or removal of germs/spores if necessary. For this purpose, known methods, such as microfiltration (sterile filtration) or irradiation (UV or gamma rays) can be used.

Preference is given to a process in which in process step 6) a method for reducing and/or removing germs and spores is carried out.

Surprisingly, it has been shown that the water phases used can be completely recycled and reused in the process. Since process technology requires large amounts of process water, this is of considerable economic importance. The formation of wastewater from the separation process can be completely avoided. It could be shown that the continuous reuse of the process liquids has no negative influence on the quantity and quality of the product fractions.

In a particularly preferred embodiment of the method, one or more side-stream process steps are executed in addition to the described main process steps. The execution of these process steps is optimal and can be independent of time and space. For process economization, however, it is advantageous and therefore preferable to connect the main process sequence and the side-stream process method 3-I with one another in terms of time and space.

Preference is given to a process consisting of a main process sequence and a side-stream process for obtaining separated and purified constituents of plant-based starting materials in which the process water phases of the main process steps are used in side-stream process steps and vice versa for process economization.

Side-Stream Process Method 3-I

The process steps of the optional side-stream process method according to the invention make it possible, in a particularly advantageous and surprising manner, to obtain further highly advantageous effects in the use of the sieve residues obtainable in process step 3). The composition of the solid corpuscular organic constituents of the sieve residue is dependent on the constituents present in the starting material. In principle, the following main solid components can be found: cellulose-based fibers, lignin-based shells, complex carbohydrates, where the complex carbohydrates are predominantly present in the form of solid corpuscular fractions up to completely preserved starch granules. Microscopic analyzes have shown that the individual fractions are present in pure form, that means that they are not complexed with one another or with proteins or other organic compounds. Thus by using very simple mechanical separation process a further fractionation of these components can be achieved. In the optional process steps of the side-stream process method 3-I, the sieve residue or filter cake (optionally pre-fractionated by the process step 3a) or 3b)) obtained in the process step 3) is used. The material is mixed in process step 3-I.a with a water phase in a reaction vessel (R3 according to scheme 1). This is preferably a clarified process water phase, which was obtained e. g. after the process step 5) and is supplied from the storage tank V5a to this process step. But any other water phase and fresh water can also be used. The addition ratio of the amount of water in relation to the filter residue depends on the impurities still present, preferably the ratio is between (m:m) 1:1 and 500:1 wt %, more preferably between 2:1 and 200:1 wt % and more preferably between 3:1 and 100:1% by weight. Preferred is an intensive mixture procedure, for example with a high performance shear mixer or a colloid mill. For process execution, the process temperature can be increased, preferably to values between 35° and 70° C., more preferably at 40° to 60° C. The duration of the mixing depends on the process parameter settings and on the purity of the constituents that are to be obtained by fractionation. In the optional process step 3-I.b., first a separation of complex carbohydrate aggregates and insufficiently comminuted starting materials (for example grains, leaves) is performed. In a preferred method application, this is done by sieving the suspension from reaction container R3, which is done within a container filled with a liquid using a suitable sieve having a mesh size which allows >95% of the cellulose-based fibers and lignin-based shell components to pass through. The passing fibers and shell particles then sediment in the collecting container (A3) and are present together with the process liquid. In performing the sieving process, for example, the sieve is overflowed and/or a passage through is facilitated by a vibration of the sieve, wherein carbohydrate particles and large particles do not pass through the sieve.

The retained complex carbohydrates or particles can then be removed from the screen and fed to product container P2. These products can be used for other applications. In a further preferred method step 3-Ic, the solid corpuscular fractions suspended in collecting vessel A3 are separated from each other according to their density by means of a cyclone separator (e.g. hydrocyclone); preferably the lighter cellulose-based fibers are separated in the volume flow via the upper outlet and the heavier lignin-based shell particles are separated through the lower outlet.

In a further preferred process step of the method, the water phases of the upper and the lower drain from the hydrocyclone separation, a process for the separation of the solid corpuscular constituents, are fed to the process water phase. Preferably, the separation is carried out by means of filtration techniques, such as a vibrating screen or by centrifugal methods, such as centrifuges or decanters. The resulting fractions (cellulose-based fiber and lignin-rich shells) are then subjected to a drying process or fed to a further use. The process water phases obtained can be combined and, for example without further purification, be recycled to process steps 2a), 2b) or 3). Thus, in an extremely advantageous manner pure fractions of cellulose-based fibers and lignin-rich shell fractions can be obtained by this process method. Furthermore, the required process water for this can be recirculated to upstream process steps. Preferably, for this purpose, the process water of the sidestream process step 3-I.c is fed into the storage tank V5b.

Preference is given to a process in which cellulose-based fibrous materials, lignin-rich shell fractions and/or complex/ complexed carbohydrates originating from biogenic starting materials can be separated and used in pure form.

Preference is given to pure fractions of cellulose-based fibrous materials, lignin-rich shell fractions and/or complex/ complexed carbohydrates, obtainable in pure form by one of the processes according to the invention.

Pure means that other organic constituents/compounds are present in a weight fraction of <10%.

In the following, particularly advantageous procedural aspects will be disclosed.

Extraction of Lipids from Biogenic Starting Materials.

According to the prior art, in oil-containing biogenic starting materials, such as seeds of oil plants, e.g. rapeseed or soybeans, prior to recovery of proteins and/or carbohydrates from these, first a de-oiling process is performed, in which the seeds or grains are squeezed or extraction by means of organic solvents is carried out. This is necessary because lipophilic compounds, primarily triglycerides, are otherwise extracted together with the proteins or carbohydrates, thereby reducing product quality. Complete de-oiling of plant seeds or extracts is also required because of the aromas and flavors contained in the oil fraction. It is known from the literature that the remaining lipids accumulate in the protein fraction during the process of protein isolation and adversely affect the sensory properties (bitter, rancid taste and odor). This off-flavor is transferred to food when protein preparations are applied hereto and is therefore undesirable.

For de-oiling, methods are proposed in the prior art in which nonpolar lipids were extracted from aqueous solutions/suspensions of comminuted plant seeds by contacting the plant material with organic solvents at room or elevated temperatures for an extended period of time. Subsequently, the neutral fats and dissolved toxins are in the solvent.

Such applications require increased process cost and may result in organic solvents remaining in the products to be recovered. This is the case, in particular, when an alcohol is used as the solvent which can be removed from the aqueous phase only at great expense and therefore, in particular, considerably restricts the reusability of the aqueous extraction solution. In addition, valuable ingredients are irreversibly damaged by alcohols, such as polyphenols. In patent DE10101326 A1, a simplified method was presented in which supercritical $CO_2$ was added as a solvent to the crushed plant seeds and by means of a phase separation crude oil and a deoiled residue were obtained; the qualitative properties of obtainable protein factions is not disclosed. Such methods are associated with a significant expenditure of energy and are hardly suitable for large-scale application.

In other methods, again, the extraction process of neutral lipids is carried out directly with organic solvents, such as hexane or pentane and high temperatures are usually used. In this case, amphiphilic compounds, such as free fatty acids, phospholipids or vitamins and polyphenols, are removed, whereby these compounds are lost or must be extracted from the effluents. On the other hand, it has been shown that lecithin-rich protein concentrates have excellent emulsifying properties and are therefore of high interest in the food industry.

To achieve this, purified lecithin or crude lecithin is added to the isolated proteins according to the prior art, for example by using a spraying technique. Such a procedure requires a considerable technical and thus also economic effort to obtain protein isolates with exceptionally good emulsifying properties. In a study on qualitative differences of 2 protein fractions obtained from rapeseed press cake, one fraction was obtained after hexane de-oiling, followed by aqueous fractionation and acid precipitation and the other by aqueous fractionation and recovery of the protein fraction by ultracentrifugation, it was found that the water solubility of the protein fraction was only 24% in the first process at a pH of 7-9, whereas in the second process it was 50% (Yumiko Yoshie-Stark, Chemical composition, functional properties, and bioactivities of rapeseed protein isolates, Food Chemistry, Volume 107, 2008, pp. 32-39). It is known from the literature that the solubility of the globulins is influenced by the folding of the protein chain. If a physical modification takes place by pH shift and/or by thermal treatment that is above the denaturing temperature, the structure and charge distribution at the molecular surface changes. When nonpolar amino acid residues reach the solvent interface, the solubility (in water) decreases significantly. Certain physical modifications of the structure, e.g. those that are pH induced are often reversible, whereas thermal denaturation usually leads to irreversible structural and property changes.

Therefore, it is advantageous to use a method for de-oiling, in which neither an organic solvent is used, nor a heating takes place.

Surprisingly, it has been found that by a process application according to the invention neither the presence of an organic solvent nor the use of an elevated temperature is required to separate neutral lipids from proteins and carbohydrates. In addition, it was possible to obtain protein fractions with the process variants according to the invention in which phospholipids were present in a proportion of 2 to 15% by weight. Furthermore, other so-called fat accompanying substances in protein or carbohydrate fractions could be found in addition to phospholipids, such as free fatty acids, carotenoids, isoflavonoids, tocopherols. Such amphiphilic ingredients of the biogenic starting materials have a high nutritional potential and may be desirable in protein and carbohydrate fractions. It has been shown that such amphiphilic compounds can be obtained in chemically and physically unchanged form together with the protein fractions obtainable from the process. In addition, the obtainable protein fractions had no off-flavor. Further, the protein fractions obtained showed very good physical properties, with a water solubility (NSI) which was >70%.

Furthermore, a separation of neutral fats could be achieved with the process techniques according to the invention. Since these are usually in a micellar form together with phospholipids and/or glycoglycerolipids, their separation is considerably more difficult in an aqueous medium. Surprisingly, it has been found that it is possible under certain conditions during the process according to the invention to separate/liberate neutral lipids completely or almost completely from the other constituents of the biogenic starting material and to separate them. In a particularly preferred process embodiment, the temperature of the reaction mixture in step 2b) or 2) is raised, and/or before or during the feeding and mixing of the condensing agent in step 3). Preferred is to increase the temperature to between 50° and 95° C., more preferably to between 55° and 75° C. and more preferably to between 60° and 70° C. It has been found that by this means, bound neutral fats dissolve and depending on their specific gravity, float on the surface of the aqueous reaction mixture. Preferably, the condensing agents are added only after reaching the desired temperature under gentle agitation of the medium. It is particularly advantageous to carry out one or more of the method steps 2a1)-2a3) and/or 2b1)-2b3) separately or together before/during or after the increase of the temperature has been reached. Preference is given to obtain lipid phase which is formed and can be recovered, e.g. by medium skimming or overflow method.

Preference is given to an aqueous process for de-oiling plant-based proteins which can be carried out at room temperature and/or elevated temperature.

Preference is given to a process for the separation of organic constituents of plant-based starting materials, in which removal of neutral lipids is effected by an aqueous solution containing dissolved amino acids and/or peptides and a protein fraction having a water solubility of >70%. Particularly preferred is an embodiment of the method in which the dissolved amino acids and/or peptides are dissolved cationic amino acids and/or peptides.

Preference is given to a process for the separation of organic constituents of plant-based starting materials, in which removal of neutral lipids and recovery of proteins is achieved by an aqueous solution containing dissolved amino acids and/or peptides without heating.

Particularly preferred is an embodiment of the method in which the dissolved amino acids and/or peptides are dissolved cationic amino acids and/or peptides.

No heating means that a temperature of 60° C. is not exceeded.

Preference is given to a neutral fat-free protein fraction.

Neutral weight-free means a mass fraction of <0.1% by weight.

Surprisingly, in the aqueous unlocking process according to the invention, a spontaneous phase separation of the neutral lipids and the water phase results. These lipid phases showed only slight emulsion formation in the area of the phase boundary and were in part almost clear. Separation could be achieved by separately draining the phases. From samples taken from water phase that have been beneath the lipid phase no neutral lipids could be extracted by organic solvents. This process effect is therefore particularly advantageous since an additional process step for the removal of neutral lipids by solvents is omitted. The sedimentary separation process can be accelerated by centrifugal separation techniques. Furthermore, the lipid phase can skimmed off in various process steps. In a preferred method embodiment, the spontaneously separating lipid phase can be removed continuously or discontinuously in a container with a controllable discharge in the upper region, so that the lipid phase can be separated by discharged through the outlet either due to continuous filling of the container, or in the case of a discontinuous filling after formation of a lipid phase, before draining the water phase. In a preferred embodiment of the method, the lipid phase is skimmed off after process step 2b) or 2), wherein preferably the organic constituents have already completely dissolved. In a further preferred embodiment, the lipid phase is skimmed off following the separation of the solid matter in process step 3). In a further preferred method implementation, the skimming is performed after the pH of the aqueous solution is adjusted. This is especially advantageous when, for the separation of a condensed protein phase, the entire water phase is fractionated by means of a centrifugal field separator, whereby separation of the phases with a tricanter is particularly advantageous. This makes it possible in a particularly advantageous manner to separate the three phases that are present: solid matter, aqueous phase and lipid phase in one process step and to obtain them in a high degree of purity. If a neutral fat phase was added to the aqueous process solution during a process step, it can be removed again in the same or in one of the subsequent process steps using the abovementioned methods.

The separation of the neutral fat phase is favored by a high dilution ratio of the water phase of the aqueous process mixture in relation to the solid matter content contained therein or by an elevated process temperature.

Disintegration of Plant-Based Starting Material and Obtainable Products

The inventive method is also directed to a complete recycling of all constituents of the plant-based starting material. In the prior art, for efficient fractionation of constituents, such as the protein fraction with a protein content of >80% by weight, it is necessary to perform a mechanical disintegration of the plant-based starting material in order to obtain a very fine flour or powder. This process is energy intensive and does not allow separation of all constituents from each other, so that no pure fractions of material are obtained.

It has surprisingly been possible to demonstrate that the process steps according to the invention also make it possible to disintegrate the plant-based starting material and, as a result, to dispense with complex mechanical disintegration processes. At the same time, a complete usability of all constituents of the plant-based starting material, with a high degree of purity, can be achieved. It has thus been possible to show that it is not necessary to mechanically disrupt the plant-based starting material as finely as possible in order to ensure a high efficiency of separation of the constituents with the process according to the invention; finer mechanical fragmentation only reduced the duration of wetting/impregnation of the plant-based starting material with the aqueous solutions according to the invention and the product results did not differ if only the plant-based starting material has rough prepared, as with a meal or semolina compared to a fine flour. It has also been found that even large aggregates, which may also be on a centimeter scale, are completely permeated over time by the aqueous solutions according to the invention, which is not the case with aqueous solutions containing bases, acids or surfactants.

However, the prerequisite is that there is a water permeability of the plant starting material to be unlocked. Therefore, in a preferred embodiment, first a disintegration of the plant casing/shell material, which forms a water-repellent and/or water-impermeable layer or layers, is carried out, so that the plant-based starting material can be penetrated by the aqueous solutions according to the invention at room temperature. With the methods as described herein, it is easily possible to decide whether sufficient disintegration of the plant-based starting material has been achieved and the constituents have separated from one another and thus can be separated in a dispensing volume. Thus, the inventive method is particularly suitable for a disintegration of not or only slightly mechanically disintegrated plant-based starting material, with simultaneous disconnection/detachment of the constituents of the plant-based starting material, which allows the recovery of the constituents in pure form. In this case, a mechanical disintegration is not necessary, in particular, if the aqueous solutions according to the invention containing dissolved amino acids and/or peptides can freely penetrate into the plant-based starting material.

Preference is given to a process for disintegrating plant-based starting material by means of an aqueous solution containing dissolved amino acids and/or peptides, by means of which the constituents of the starting material can be obtained in pure form. Particularly preferred is an embodiment of the method in which the dissolved amino acids and/or peptides are dissolved cationic amino acids and/or peptides.

Another aspect of the invention aims at a complete utilization of all constituents of plant seeds, kernels or grains. As a rule, processes from the prior art have the goal of making available only one fraction of the ingredients in a form that is as pure as possible; processes that allow constituents of the plant-based starting materials to be completely unlocked are not available.

Surprisingly, it has it could be shown that it is now possible with the processes according to the invention to separate all constituents present in the plant-based starting materials from one another and to obtain them in a pure form for commercial use. This applies in particular to the main constituents of the plant-based starting material, such as proteins, carbohydrates, cellulose-based fibers and lignin-rich shell fractions and neutral lipids, but also minor components, such as phospholipids, glycolipids, glycoglycerolipids, colorants, antioxidants or vitamins and minerals.

Preference is given to a process in which, without further pretreatment of starting plant-based products, complete recovery is accomplished by obtaining these in pure form by aqueous unlocking process of the main constituents.

Thus, the invention relates to a process for the aqueous unlocking method resulting in complete disconnection/detachment of the constituents of plant-based starting materials for complete utilization of materials.

The process according to the invention is furthermore particularly suitable for obtaining an unaltered form of thermolabile compounds which are present in the biogenic starting material and whose structure and/or function are destroyed by heating. The inventive method allows unlocking and recovery of ingredients/constituents at ambient temperatures.

The temperature of the aqueous phases while performing the process steps is preferably between 1° and 60° C., more preferably between 5° and 40° C., more preferably between 10° and 40° C. and particularly preferably between 15° and 35° C.

Obtainable Protein Fractions and Minor Fractions

Another aspect of the invention relates to aromas and flavors which are contained in particular in plant seeds and are predominantly bound to the proteins contained therein.

These compounds, such as ketones or aldehydes, are difficult to separate with techniques of the prior art. An aqueous process by which flavors or colorants of proteins can be detached (liberated) and separated is not known. Methods are known from the prior art, with which first a debittering is performed by treatment of the ground grain with acids, before an extraction of the other ingredients is carried out (DE 5 37 265). Such methods require a high process cost and have a limited efficiency.

Surprisingly, it has now been found that by disconnecting/detaching the constituents of the biogenic starting materials with the aqueous solutions containing dissolved cationic amino acids and/or peptides, it is possible to also dissolve the aromas and flavors from their bonds and extract them into the aqueous dispensing solution. It can be assumed that the expansion of the proteins as a result of the hydratability achieved with the process promotes the detachment/liberation of the aromas and flavors and prevents re-deposition/adhesion.

The clarified aqueous solutions obtained after separation of solid matter and the condensed/aggregated/complexed soluble constituents (proteins) contain the corresponding aromas and flavors to a great extent. As a result, the obtainable protein fractions are completely or almost completely odorless and tasteless. In obtaining a protein fraction by means of aqueous extraction, it could be shown in investigations conducted without the compounds of the present invention that the aromas and flavors (especially the bittering agents) remained associated with the protein fraction and were still present in a protein extract obtained by precipitation or centrifugal separation, leading to unwanted sensory and anti-nutritive effects. Thus, in one process embodiment, protein fractions can be obtained which are low or free of off-flavors. On the other hand, dissolved aromas- and flavor-agents, including the bitter substances, can be obtained separately. For this purpose, methods are known from the prior art.

Preference is given to a process in which aromas and/or flavors and/or anti-nutritive compounds and/or endogenous or exogenous toxins are separated from the constituents.

Preferred is a process for the recovery of biogenic aromas and flavoring substances.

In one embodiment, the method steps according to the invention can also be used for purifying protein fractions. It has been shown that not only aromas and flavoring substances can be dissolved and separated from the constituents of the biogenic starting materials, but also other physiologically or non-physiologically occurring substances. Physiological substances include, among others, phytosterols, glycosides, alkaloids, inositols, polyphenols, flavinoids, vitamins, phytosterols, saponins, glucoinolates, phytoestrogens, monoterpenes and endogenous toxins such as phorbol esters or certain fatty acids, such as erucic acid or phytic acid. Non-physiological substances include, among others, pesticides, herbicides, fungicides or exogenous toxins, e.g. from fungi, such as aflatoxins, ochratoxins, *alternaria* toxins, alternariol monomethyl ether (AME), altenuen and tenuaconic acid, fumonisins, *fusarium* toxins or ergot alkaloids. As previously stated, some of the physiologically occurring substances are responsible for anti-nutritive properties, such as alpha-glucosidases, trypsin inhibitors, phytic acid, tannins, or oxidized phenols. It could be shown that the protein fractions produced by the process according to the invention had virtually no measurable traces of anti-nutritional or toxic compounds, if these were originally present in the biogenic starting materials.

Preference is given to a process for detaching/liberating and separating aromas and/or flavorings and/or anti-nutritive substances and/or endogenous or exogenous toxins.

Preference is given to an off-flavor-poor protein fraction with no or minimal residual contents of anti-nutritive substances and/or toxins.

It has also been found that already isolated fractions of the constituents present in biogenic starting materials can also be purified from accompanying substances/minor constituents by means of one of the methods according to the invention.

It is particularly advantageous in this case that only protein fractions that have already been separated have to be treated with the aqueous solutions for unlocking disclosed herein.

Thus it could be shown that in a protein concentrate from an algae culture with a high proportion of chlorophyll, neutral lipids and carboxylic acids, which was present in powdered form and used instead of the plant-based starting material in the process step 1) and treated with the consecutive process steps according to the invention, a virtually complete separation of chlorophyll, neutral lipids and carboxylic acids was achieved so that the protein concentrate obtained contained no or virtually no chlorophyll and no neutral lipids or carboxylic acids. Furthermore, a milk protein condensate in which a high content of neutral lipids, phospholipids and free fatty acids, but also soluble carbohydrates was treated with the process steps 2, 4 and 5. The protein mass obtained had a protein content (in terms of dry matter) which was 11% by weight higher than that of the starting material. Only a very low content of carbohydrates was found to be present in the protein fraction, free fatty acids were not present and neutral lipids and phospholipids were present in a range that was less than 1% by weight with respect to the protein mass. In a further study, a meal of animal carcasses of fish, with a proportion of solid matter of 32% by weight, a protein content of 51% by weight and a content of lipids of 12% by weight was used as starting material and treated with a method according to the invention. Step 2b) was carried out at a temperature of 60° C. At the end of the process step, a lipid fraction with a slight haze that floated top of the process fluid was skimmed off. The solid matter obtained in step 3 was free of attached soluble compounds. The protein mass obtained contained no solid matter and no free fatty acids or neutral lipids.

If necessary to meet specific requirements on the purity, the protein fractions (P1) according to scheme 1) but also other protein fractions obtained from process step 5, again or for the first time, are completely dissolved in one of the solutions for unlocking in order to perform purification. The proportions and concentrations as well as the compositions of the solutions for unlocking are to be selected analogously to those of process step 2a. The same applies to the pH of the process solution, which is preferably adjusted to between 6.5 and 13, more preferably between 7 and 12 and more preferably between 8 and 12. To obtain a homogeneous solution or suspension, a shear mixer can be used. The process conditions and the residence time can also be carried out/chosen analogously to those of process step 2a. The recovery of the dissolved protein fraction then is performed according to process steps 4 and 5.

All obtainable protein fractions of the described investigations were odorless and tasteless, whereby the starting products had a distinct intrinsic taste.

When deactivation and/or removal of anti-nutritive and/or toxic substances from the obtainable protein fractions is desired or required, prior art methods may be used. Thus, for example, it is possible to homogenize the protein mass obtained with a suitable amount of water and to heat to a defined temperature at which deactivation, e. g. of enzymes, is achieved.

It is known from the literature that enzymes, when present in a protein flour dissolved in water, are completely deactivated after just a few minutes at a temperature of 85-90° C. In contrast, such a deactivation in dry protein meal or in grains is not possible.

Thus, the method allows proteins that include thermosensitive compounds, such as toxins or enzymes, to inactivate or alter thermosensitive compounds in an aqueous solution containing dissolved cationic amino acids and/or peptides by suspending the proteins, containing thermosensitive compounds, in the aqueous solution and heating the suspension. Preference is given to heating to a temperature between 50° and 140° C., more preferably between 60° and 121° C., more preferably between 70° and 90° C. The duration of the heat treatment depends on the compound to be deactivated and must be determined experimentally.

Preferred is a method for deactivating enzymes and toxins in an aqueous dissolved protein fraction.

The aqueous unlocking process separates the organic constituents of the starting material from each other in a particularly advantageous manner and thus makes them separable from each other. The cellulose-based fibers or particulate material that had been separated from the aqueous process mixture by a simple sieving and freed from residual/adhering water were practically pure, that means, no or only minimal amounts of soluble organic compounds could be separated off by further rinsing steps with aqueous solutions or organic solvents. By unlocking the constituents of the starting material, it is also possible to extract ingredients/constituents that interfere with the further processing and can be discharged into a product phase, which are already dissolved in the aqueous process mixture. This can be done by methods of the prior art. In an advantageous process embodiment, phenols and/or polyphenolic compounds are removed from the aqueous dispersion mixture of process steps 2), 2b), 3) or 6.3) by binding them by means of adsorptive techniques. Suitable for this purpose are e.g. ion exchange resins, zeolites or activated carbon and clays. Further preferred process embodiments, in which a water-immiscible organic phase is mixed into the aqueous reaction mixtures in order to bind hereto/herewith amphiphilic and/or lipophilic compounds and to separate them by means of a phase separation, have already been described. Particularly suitable here are paraffinic oils, aliphatic or cyclic hydrocarbons, but also methyl esters of fatty acids or paraffin compounds. Preferably, then, thorough mixing or contacting of the phases is carried out. This type of process is particularly suitable for binding organic compounds which are lipophilic and/or amphiphilic in the organic phase, and are to be removed from the aqueous reaction mixture and separated with the organic phase. The separation of the organic phase is preferably carried out by a spontaneous phase separation; the phases can then be separated by one of the methods described herein. The organic compounds which can be removed by such a process include, among others, lipophilic colorants such as carotenoids or chlorophylls, lipophilic vitamins such as retinol, calciferol or tocopherol, phytosterols, polyphenols, saponins, glucoinolates, phytoestrogens or monoterpes.

It has been shown that the amphiphilic or lipophilic compounds discharged into a lipid phase can be extracted from them using established techniques and be obtained for use. For example, chlorophylls with a purity of >80% or glycoglycerolipids with a purity of >70% could be extracted from the lipid phases. Furthermore, a circulation of the lipid extraction phase can also be established here.

Preference is given to a process in which amphiphilic and/or lipophilic compounds are separated and made obtainable by mixing an organic substance mixture with an aqueous solution containing dissolved amino acids and/or peptides and then separating a lipid phase. Particularly preferred is an embodiment of the method in which the dissolved amino acids and/or peptides are dissolved cationic amino acids and/or peptides.

Thus, the method also aims at obtaining a protein fraction which is odorless and low in taste. Low odor (aromas) and low in flavor in this context means that compared with the starting material, preferably >70%, more preferably >85% and more preferably >95% of the odorants/aromas and flavorings that can be perceived are reduced. In other words, a protein fraction can be obtained by one of the processes according to the invention which contains <30%, more preferably <15% and more preferably <5%, of sensorially perceived odorants/aromas or flavorings compared to the starting material. Furthermore, the method also aims to obtain a protein fraction which is free from off-flavors.

Preferred is a process for producing protein fractions which are free from off-flavors.

Preferred is a method for obtaining a protein fraction that is low in flavors and aromas.

Preference is given to a protein fraction that is low in flavors and aromas.

Surprisingly, toxins of the seeds, such as the erucic acid or phorbol esters and hazardous substances that were taken up by the seeds, such as pesticides, herbicides, fungicides could also be dissolved by the solution for unlocking. Such compounds were no longer bound to proteins in the dispensing phase. It turned out that the dissolved toxins or hazardous substances remained in solution in a similar way to the behavior of odorants/aromas and flavorings, and were present only in minimal amounts or not at all in the obtainable protein fraction. In this respect, the method aims to dissolute toxins and hazardous substances from the starting material. Dissolving in this context means that >70% by weight, more preferably >85% by weight and further >95% by weight of the toxins or hazardous substances present in the starting material are completely dissolved in the aqueous solution of the dispensing phase, i.e., are not bound to a protein. In other words, a low-toxin and low-hazard substance protein fraction can be obtained by any of the methods of the invention which contains <30%, more preferably <15% and more preferably <5% of the toxins or as compared to content of the starting material.

Preference is given to a process for the preparation of protein fractions which are low in toxins and hazardous substances.

Protein Isolation

In studies on the isolation of dissolved proteins from aqueous solutions with other dissolved soluble constituents obtained by the disconnection/detachment method in the aqueous solution containing dissolved amino acids and/or peptides, it has been found that by the hydration of the proteins achievable by the method and selection of suitable process parameters a very pure fraction thereof can be obtained. Pure means that the protein fractions have a protein content of preferably >60% by weight, more preferably >70% by weight, more preferably >80% by weight and still more preferably >85% by weight and most preferably >90% by weight. This was the case in particular for the use of cationic amino acids and/or peptides.

It has been found that such pure protein fractions can be produced in particular by a large dispensing volume after an unlocking process of the constituents according to the invention. Such dissolved proteins, for example, pass through a membrane filter with a pore permeability of at least 1 μm. This allows a size-selective separation of dissolved proteins. Furthermore, it has been found that precisely in this situation of optimal hydration of the dissolved proteins and the presence of a physiological pH range, a very rapid and pronounced interaction with the condensing agents listed here is achieved, resulting in an aggregation of the hydrated proteins with displacement or exclusion of the process water. This can be recognized, for example, by the fact that spatial structures visible to the naked eye are formed with partial or complete clarification of the process fluid, which sediments only very slowly after formation. The process fluid is then moderately to intensely colored and contains aroma- and flavor agents as well as soluble carbohydrates. Thus, the hydration and condensation process requires that the compounds previously released from the proteins remain in a dissolved state in the process water phase and do not combine with the condensing proteins or with the condensed proteins.

The method also opens up the possibility of using very different compounds as condensing agents for the dissolved proteins, and, as a result of which, further very advantageous effects on the obtainable pure protein fractions can be achieved. Thus, for example, condensing agents which combine with the proteins and remain in the obtainable protein fraction can be used. In this way, for example, antioxidants, such as ascorbic acid or compounds with surface-active properties, such as glycoglycerolipids or calcium compounds, such as calcium carbonate, can be added in a targeted and metered manner and be taken up in different combinations into the obtainable protein fraction. Advantageously, the protein fractions obtained by the inventive processes retain the extremely good solubility properties.

It has been found to be particularly advantageous that the protein fractions obtainable by these processes have a very homogeneous consistency and a pH of between 6.0 and 7.5. After a centrifugal separation of binding water, the obtainable paste-like mass remains homogeneous and can be easily dissolved in water again.

This can be used in a particularly advantageous manner to completely dissolve the obtainable condensed protein fraction in a washing (rinsing) step with water or a protic solvent followed by separation by a renew centrifugation. However, it is also very easy to achieve a suspension in a slightly or completely non-polar solvent, which also allows strongly hydrophobic compounds to be extracted from the dissolved protein mass. Thus, by the process technology according to the invention a sequential leaching of organic compounds in the obtainable protein fractions can be ensured. Furthermore, it is also possible to remove polar compounds, for example electrolytes, which are contained in the remaining residual water content. Particularly suitable for this purpose is a process where a protein fraction which is obtained from the method according to the invention and which is preferably present in the form of a very dehydrated protein mass achieved by means of filter techniques is placed in a filter cloth and inserted into deionized water or the deionized water is passed through it. It has been found that virtually no relevant amounts of proteins are lost from the protein mass.

Thus, with the process steps and techniques, high purity protein fractions which correspond to the product specifications of protein condensates, protein concentrates and protein isolates can be obtained.

Preferred is a process for the preparation of protein condensates and/or protein concentrates and/or protein isolates from organic starting material by means of aqueous solutions containing dissolved amino acids and/or peptides. Particularly preferred is an embodiment of the method in which the dissolved amino acids and/or peptides are dissolved cationic amino acids and/or peptides.

Further advantageous effects result from the consistency of the obtainable protein fractions, which can be adjusted by the process execution. Thus, protein fractions which are liquid, pasty, stable or friable can be obtained. It is also advantageous that thickened protein fractions can be very easily dissolved in water and can be supplied in a flowable form, for example a spray-drying process for producing a powder.

Obtainable Carbohydrate Fractions

Carbohydrates are present in plant seeds, kernels or grains predominantly in the form of amyoplasts, the so-called starch granules. They break down to a great extent during pressing and grinding, releasing glycogen. These, polysaccharides which are suitable for human nutrition, are predominantly present in a high molecular weight form as a starch. Starch consists of microscopically small, polymeric solid-state particles which, depending on the plant species or variety, have a characteristic size and shape as well as different proportions of amylose and amylopectin. Native starch granules are insoluble in water. They only swell reversibly in cold water by up to 28% by volume, with the free hydroxyl groups of the starch molecules forming hydrogen bonds. Above a certain temperature, which depends on the type of starch, the starch gelatinizes within a very small temperature range. This gelatinization is irreversible and is due to a softening of the amorphous starch structure with gradual absorption of water and the breaking of hydrogen bonds.

With the method according to the invention dissolved and undissolved and insoluble carbohydrates can be solvated/dissolved and separated from other organic and inorganic compounds in a very advantageous manner in order to make them available for further use.

In one embodiment, the process step 2), or 2a) and 2b) and 3) are performed under cold or cooled conditions (<10° C.). As a result, the time for degradation of complex carbohydrates, depending on the process time, can be adjusted to a required level, so that, for example, the release of amylopectins does not take place or only to a small extent. In addition, the swelling magnitude of complex carbohydrates is minimized, whereby the complex carbohydrates can be obtained in a largely unchanged state compared to the initial state, but freed from other constituents of the starting mixture. In a particularly advantageous manner, undissolved complex carbohydrates, which correspond, for example, to a starch granule or parts thereof, can be separated from the other solid matter and the soluble dissolved compounds by simple filtering techniques or a cyclone separation method. After drying, e.g. in a drying oven, they can be used, e.g. for production of a corn starch.

Undissolved carbohydrates are present, for example, in the form of polysaccharides which, depending on the molecular weight, have a different sedimentation rate. It has been found that poly-saccharides which can not be removed by filtration from the process mixture of process step 2b) or 2) or 3) sediment only very slowly. Surprisingly, with the proper selection of a condensation agent for the condensation/aggregation/complexation of the proteins present in the mixture, these compounds are not included in or associated with the condensates/aggregates/complexes so that this carbohydrate fraction remains in the clarified process water when the condensed soluble proteins have been separated by means of a suitable filter material. It has been found that following the separation of the proteins or possibly other fractions, e.g. lipids or amphiphilic compounds, the higher molecular weight carbohydrates located in the process water can be separated by centrifugal techniques, such as a decanter or separator. The hereby solid material obtained can be further purified with a simple process technology. Surprisingly, it has been found that with the same aqueous solutions containing dissolved amino acids and/or peptides, a purification of the obtainable higher molecular weight carbohydrates is possible. Particularly suitable for this purpose were cationic amino acids/peptides. For this purpose, the carbohydrate fraction, which is preferably freed from free liquid, is added to and dissolved in a container with one of the aqueous solutions according to the invention containing dissolved amino acids and/or peptides in one of the concentrations given herein. After a residence time of preferably between 2 minutes and 3 days, more preferably between 5 minutes and 24 hours and more preferably between 15 minutes and 3 hours, a phase separation is preferably performed by means of filtration techniques or by centrifugal methods. The obtainable mass can be dried by prior art processes and processed into a flour that can be used immediately.

It could be shown that a product with high purity is obtained. It has been shown that when centrifugal processes are used, a larger proportion of dissolved proteins is removed with the solid phase, therefore only filtrative methods or a cyclone separation method are suitable in order to allow the most complete possible separation of dissolved proteins from solids. This was not known in the prior art, as can be illustrated, for example, with reference to the Chinese application CN 106 720 920 A. It does not describe how the cellulose-based fibers are released from the proteins and are separated. In particular, it is unclear how a separation of the protein phase is achieved.

On the other hand, it is possible with the methods of the invention to integrate specifically soluble carbohydrates in an obtainable protein fraction. It has been found that, under certain conditions, the dissolved carbohydrates can be taken up during the formation of condensates/agglomerates/complexes of proteins resulting in a very homogeneous combination product. Further advantages result from the possibility of heating the unlocking mixture and/or the dispensing mixture. As a result, complex carbohydrates can be completely or partially unlocked or hydrated, resulting in water-soluble carbohydrate fractions. Thus it is possible to produce soluble carbohydrates, e.g. pectins, which can then be incorporated into the recoverable protein fraction and separated with these together, but also can be separated separately.

Preferred is a method in which the water-insoluble and/or undissolved carbohydrates are separated from organic components and can be used.

Preferred is a method in which dissolved carbohydrates are condensed/agglomerated/complexed together with dissolved proteins, whereby protein-carbohydrates condensates/agglomerates/complexes are obtained.

Preference is given to a process in which in step 4) dissolved carbohydrates and/or phospholipids and/or glycoglycerolipids are condensed/agglomerated/complexed together with dissolved proteins, whereby protein condensates/agglomerates/complexes containing carbohydrates and/or phospholipids and/or glycoglycerolipids are obtained.

Preferred is a method in which insoluble carbohydrates are brought into a soluble form and are condensed/agglomerated/complexed with dissolved proteins, whereby a homogeneous mixture of proteins and carbohydrates is obtained.

Another aspect of the invention relates to the separation of carbohydrates from ground products. It was found that in a coarse or fine-grained flour, which, e.g. emerged from an impact milling or grinding process and in which the starch granules remain mostly intact, soluble constituents and in particular the soluble proteins adhering to these can be removed virtually residue-free with the inventive method. As a result, the intact starch granules can be obtained in pure form and separated by means of a simple screening technique. Since these have a different sieve size compared to cellulose-based fibers and lignin-rich shell fractions, a virtually pure fraction of starch granules or carbohydrate aggregates can be obtained immediately. After drying, they can be processed further. It has been shown that the removal of proteins from the starch granules or complex carbohydrates has a very positive effect on the baking behavior of the flours obtained therefrom.

Thus, it was shown that there is a greater volume when making dough and in the subsequent baking process, compared to making a dough with flour in which the protein content was not removed. Furthermore, there was less sticking to the baking surface. Furthermore, the obtainable flours of the complex carbohydrates were free from an off-flavor, or off-odor and/or bad taste.

Preference is given to a process in which protein-free complex carbohydrates and/or starch granules are separable in pure form from plant press products or meal products.

In one embodiment of the present invention, the methods described herein further include step 4a) after step 4) and before step 5):

Separation of the aggregated proteins and subsequent addition of further aggregating agent to aggregate the carbohydrates according to step 3).

Preference is given to a process in which protein-free flours are obtained from complex carbohydrates or starch granules which have improved baking properties compared with a flour having a protein fraction. Improved baking properties means, e.g. an increased volume during rising or less stickiness of a dough preparation or a fermentation product.

Particularly preferred is a method wherein in step 3) after the separation of solid mater from the dispensing mixture of step 2b) to obtain a fiber-free aqueous solution of the water-soluble and dissolved compounds of the starting material, protein-free complex carbohydrates and/or starch granules are separated from the separated solid matter in step 3a).

The present invention is also directed to protein free complex or complexed carbohydrates and/or starch granules obtainable by a method described herein.

In a preferred embodiment, the protein-free complex or complexed carbohydrates and/or starch granules are obtainable by a process wherein in step 3) after the separation of solid matter from the dispensing mixture of step 2b) and thereby obtaining a fiber-free aqueous solution of the water-soluble and dissolved compounds of the starting material, protein-free complex carbohydrates and/or starch granules are separated from the separated solid matter in step 3a).

In a preferred embodiment of the method according to the invention, in step 3) after the separation of solid matter from the dispensing mixture of step 2b) a fiber-free aqueous solution of the water-soluble and dissolved compounds of the starting material is obtained and in a step 3a") decompacted cellulose-based fibers and/or decompacted lignin-rich shell, and/or complex/complexed carbohydrates, which are free of dissolved soluble compounds, are obtained from the separated solid matter.

Furthermore, the present invention is directed to cellulose-based fibers having a water binding capacity of >200% by volume and/or lignin-rich shells having a fat binding capacity of >200% by weight, obtainable by a process described herein.

Particular preference is given to cellulose-based fibers having a water binding capacity of >200% by volume and/or lignin-rich shells having a fat-binding capacity of >200% by weight, obtainable by a process, wherein in step 3) after the separation of solid matter from the dispensing mixture of step 2b) to obtain a fiber-free aqueous solution of the water-soluble and dissolved compounds of the starting material, decompacted cellulose-based fibers and/or decompacted lignin rich shells and/or complex/complexed carbohydrates that are free from dissolved soluble compounds are obtained from the separated solid matter in a step 3a").

Also particularly preferred is a process in which in step 4) dissolved carbohydrates and/or phospholipids and/or glycoglycerolipids are aggregated together with dissolved proteins, and after step 5), in a step 5a), protein aggregates containing carbohydrates and/or phospholipids and/or glycoglycerolipids are obtained.

Therefore, the present invention is also directed to protein aggregates containing carbohydrates obtainable by a process according to the invention.

Particularly preferred are protein aggregates containing carbohydrates obtainable by a process in which dissolved carbohydrates and/or phospholipids and/or glycoglyceolipids are aggregated together with dissolved proteins in step 4), and after step 5), in a step 5a), protein aggregates containing carbohydrates and/or phospholipids and/or glycoglycerolipids are obtained.

Cellulose-Based Fibers and Lignin-Rich Shell Fractions

The nature and composition of shell materials naturally varies depending on the type of plant-based starting material used. For the extraction of flours, the shells are usually separated before grinding, since these are usually not desirable in the obtained products. This usually succeeds only with a large process engineering effort and loss of grain/seed material due to mechanical fragmentation/segregation. Fiber material which are present as structural constituents in seeds, kernels and grains, but also in other plant-based starting, can not be separated or isolated without residues with prior art processes, since they are completely bonded/crosslinked to the ingredients, or compacted herewith. In particular, a mechanical separation of these fiber materials is not possible in the prior art.

It was therefore completely surprising that both, the lignin-rich shell fraction, as well as the cellulose-based fibers of the plant-based starting materials can be separated and obtained in an immediately pure form. Thus, after the inventive removal of bound water fractions, no or almost no proteins, soluble carbohydrates, aromas or flavoring substances or other organic or inorganic detachable compounds could be detected. Microscopically, no attachments of other organic components were evident.

The lignin-rich shells have a lignin content of 50 to 95% by weight. They are present as submillimeter-sized platelets or in amorphous form. After drying, they are in a free-flowing and pourable form. There is a significant water retention capacity that can be >40%. Microscopically, the cellulose-based fibers have a cotton-like 3-dimensional spatial structure with average diameters between 50 and 500 µm with an aspect ratio (length/diameter) of 1:1 to 100:1. These are isolated/discrete structures that are not interconnected and have a very low length weight of <70 mg/100 m. It has been found that such cellulose-based fibers differ significantly from cellulose fibers in chemical composition, secondary and tertiary structure, and physicochemical properties. Furthermore, it was found that both the obtainable cellulose-based fibers and the lignin-rich shells had a significant water binding capacity of more than 200 vol %.

In addition, it has been found that both the lignin-rich shells and the cellulose-based fibers are free or nearly free of odorants/aromas or flavors or colorants that dissolve in an aqueous medium. Thus, the lignin-rich shell fraction and cellulose-based fibers obtainable by the process are readily usable for further processing in the form as they are obtained and prepared by the methods of the invention or after drying which may be accomplished by prior art techniques.

Preference is given to a process in which pure lignin-rich shells and/or cellulose-based fibers are obtained from a biogenic starting material having a water binding capacity of >200 vol %.

Surprisingly, dried lignin-rich shells in addition to a high water-binding capacity and high water retention capacity also have an extremely large binding capacity for oils and fats. In experiments on various lignin-based shell fractions this was between 250 and 550% by weight. Noteworthy was that, the hydrophobic interaction with the surfaces leads to a rapid transport of oils and fats along the outer surfaces of a granulate. As a result, oils and fats can be transported against a pressure gradient by means of capillary forces at the inner and outer surfaces of a poured lignin-rich shell granulate. The height of the saturated material in riser tests was more than 5 cm.

Furthermore, it could be shown that the dried and powdered cellulose-based fibers also had a very high binding capacity for oils and fats, which was between 220 and 360% by weight.

Preference is given to a process in which pure lignin-rich shells and/or cellulose-based fibers are obtained from a biogenic starting material having an oil and/or fat binding capacity of >200% by weight.

Surprisingly, it has been found that the lignin-rich shell fractions and the cellulose-based fibers, which were in the filter residue of process step 3 in many of the investigated plant-based starting materials, such as rapeseed and jatropha press residues, could be easily separated from each other with prior art techniques. Preference is given to cyclone separation method, such as hydrocyclones, but also filter techniques can be used. It has been shown that this makes it possible to produce pure fractions of cellulose-based fibers on the one hand and lignin-rich shell fractions on the other hand, in which no or almost no proteins, soluble carbohydrates, odorants/aromas or flavorings, or other organic or inorganic dissolvable compounds or colorants which dissolve into an aqueous medium are obtained.

The resulting shell or fiber fractions are preferably freed from still bound water by a pressing process. Alternatively, centrifugal processes can be used. The dewatered shell or fiber fractions can be used in the resulting form or completely dried. Drying processes are known in the art. Preferred is drying with hot air. Advantageously, the lignin-rich shell fractions obtainable after drying are present in a readily separable and free-flowing form.

It has been found that the cellulose-based fibers produced, differ in their chemical composition in comparison with cellulose fibers and cellulose derivatives. While in cellulose fibers and cellulose derivatives virtually no further elements could be detected besides C, H and O, in cellulose-based fibers numerous elements such as N, S, P, Fe, Cl, Na, Ca, K, Ni, Cl, Cu, as well as other elements are present. Because of the binding properties found for the cellulose-based fibers, it is believed that these elements are at least in part associated with functional groups covalently linked either directly or indirectly to the polymeric framework structures. A covalent indirect connection may be present, e.g. via a sugar residue or a peptide. But it is also conceivable that non-covalently bound compounds are connected to the polymeric backbone via electrostatic exchange forces that have these functional groups or elements. The presence of functional groups on the surfaces of the cellulose-based fibers is responsible for many of the effects found so far.

Surprisingly, it has been shown that the obtainable cellulose-based fibers are outstandingly suitable for various applications for humans and animals. For example, it has been shown that cellulose-based fibers are eminently suitable for incorporating, formulating, or transporting or storing substances/compounds or even microorganisms herein or herewith. In particular, for the formulation of proteins which are present in dry or water-soluble form, cellulose-based fibers are suitable. Furthermore, cellulose-based fibers can also be used as a substitute for carbohydrates or fats in food preparations. Furthermore, they are suitable as calorie-free dietary fiber and have stool-regulating effects. In addition, a weight reduction could be achieved with diets that incorporated the cellulose-based fibers produced according to the invention. In addition, it could be shown that there are still other positive effects, e.g. on the formulation of creams/lotions/ointments or pastes or on the reduction of off-flavors in foods or for the cultivation and activity of microorganisms such as yeasts or algae.

Introduction of Compounds into Obtainable Products

Another aspect of the invention relates to a method for the controlled introduction and/or contacting of compounds into/on the protein fraction/proteins obtainable by the methods according to the invention. This process variant is made possible by the advantageous solubilization of the compounds used for the aqueous disconnection/detachment method. It may be necessary to increase the concentration of this compound (s) in subsequent process steps. For example, free fatty acids, phospholipids, glycolipids, antioxidants or water-soluble vitamins can be dissolved in the aqueous process mixtures where they stay stable in dissolved form, for which purpose the compounds already present in the reaction mixture can be used or compounds can be added to the reaction mixture in suitable concentration.

Preferably, this process step is performed before the condensation/aggregation/complexing of the proteins. In one embodiment, preferably by changing the solubility of one or more dissolved compounds, these compounds adhere to the dissolved proteins in a physiologically occurring spatial arrangement, e.g. via hydrophilic and/or hydrophobic molecule domains, thereby binding them. Preferably, a change in the solubility of one or more of these compounds is accomplished before condensation/aggregation/complexation of the dissolved proteins, whereby an adhesion of the one or more compounds onto the dissolved proteins preferably takes place. In a particularly advantageous manner, it is possible to assemble one or more compounds at a region of the protein which, due to the hydration strongly expanded proteins and the physiological conditions under which the condensation/aggregation/complexing of the dissolved proteins takes place, is also the physiologically preferred binding region of the protein. As a result, a "physiological loading" of the dissolved proteins is achieved, which leads to particularly advantageous functional effects of the obtainable protein fractions. However, preference is also given to a change in the solubility of the one or more compounds that are to be brought into contact with the dissolved proteins, which takes place during the initiation of a condensation/aggregation/complexing of the proteins. As a result, the incorporation into the resulting condensates/aggregates/complexes can be effected.

Preferably, a change in the solubility of the one or more dissolved compounds is accomplished by adjusting the pH and/or salinity and/or temperature of the reaction mixture and/or introducing a gas and/or adding further compounds such as divalent cations. Thus, it could be shown that phospholipids, e.g. phosphotidylcholine or fatty acids, e.g. linoleic acid were bound to the proteins and were present with the obtainable protein fraction in a weight ratio of 0.2 to 1.6% by weight. The method is particularly advantageous because the loading of proteins with other organic compounds, which are preferably produced by electrostatic exchange forces by a self-assembly and thereby a physiological orientation and arrangement of the compounds is achieved, whereby a stable integration of the introduced compounds is made possible and at the same time the proteins can be stabilized. In this context, stabilize means that they, among others, have a higher stability to physical influences. Of particular note is that, for example, the formulability in an aqueous medium of such protein fractions produced by a self-assembly with phospholipids or glycolipids can be significantly improved. Furthermore, in protein fractions produced in this manner which have been loaded with free fatty acids, there was a significantly improved mouthfeel. Furthermore, oxidation-labile compounds can be homogeneously introduced and stabilized in protein fractions arranged in this way. Such properties could be documented in particular for free fatty acids that have been incorporated.

Obtainable Products

Surprisingly, protein fractions were obtained with the process types according to the invention that did not have off-flavors. Off-flavors mean odors/aromas and flavors that lead to a qualitative reduction of the product. It is furthermore advantageous that the obtainable protein fractions were virtually or completely free of any aroma and odor flavoring substances and thus a taste and odor-neutral protein product was obtained.

Preference is given to a process in which a protein fraction is obtained which is free of off-flavors and/or is practically odorless and tasteless.

An extremely advantageous aspect of this invention is the possibility to enrich the obtainable protein fractions with other compounds/groups of substances, thereby producing higher quality products. Higher product quality relates, for example, to a higher nutritive value that can be achieved here compared to a pure protein fraction. This is the case, for example, when a combination of proteins and soluble carbohydrates is present. Further possibilities for a higher nutritive value of a combination product are the inclusion of vitamins or antioxidants, which preferably originate from the related starting material itself, but can also be added before a condensation/aggregation/complexing of the solution with dissolved proteins. However, qualitatively higher value refers, among others, also to the achievable product properties. Thus, for example, with one of the embodiments according to the invention, phospholipids and/or glycolipids can adhere or aggregate to/with these in a condensation/aggregation/complexation of the dissolved proteins, so that a very homogeneous product of proteins and phospholipids and/or glycolipids is obtained. Such a product is characterized by very good protein solubility as well as excellent interface properties, resulting in improved quality, e.g. for forming and stabilizing of food foams and emulsions. Preference is given to a protein fraction in which the protein solubility index (PDI) is >80%. Further preferred is a protein fraction which ensures high foam stability.

Preference is therefore given to low-odor and low-flavor and/or low-toxin and low-hazardous substances containing aggregated proteins obtainable according to step 5) by a method according to the invention having a protein solubility index (PDI)>80%.

In addition, incorporation of one or more compounds can provide improved storage stability, e.g. that during storage there are no sensory changes. Another aspect of the invention is also directed to the preparation of a shelf-stable protein-containing food ingredient. It has thus been possible to show that a protein fraction obtained by condensation/aggregation/complexing of proteins and/or glycolipids and/or phospholipids and/or antioxidants and/or vitamins by means of one of the processes according to the invention has extremely advantageous storage stability. Storage stability in this context means that storage at room temperature does not result in a functional or sensory change from baseline over the course of 12 months.

Surprisingly, it was possible to obtain cellulose-based fibers which are present in pure and isolated form in the submillimeter range for immediate use. The three-dimensional structure of the fibers results in a very large surface that has remarkable binding properties. In addition to the enormous water binding capacity, oleophilic compounds are adsorbed.

Surprisingly, in particular, excellent coatability of the cellulose-based fibers with proteins, which had been obtained in the context of the extractions according to the invention, has been found. Hereby, the spatial structures of the cellulose-based fibers after their recovery by one of the processes described herein were completely filled with proteins, resulting in spherical, discrete particles with very good solubility. In contrast to a similar coating of cellulose fibers, which originated from husk or stem mass, with proteins, there was detachment of adherent proteins during the course of drying and after mechanical shearing, while this was not the case in the coated cellulose-based fibers.

In baking experiments, excellent stabilization of doughs by the addition of cellulose-based fibers or the substitution of flour by them was documented. The cellulose-based fibers swell very quickly due to the large surface area, which is associated with a very pleasant mouthfeel when consumed. The cellulose-based fibers obtained and produced according to the invention are, after being incorporated into water, completely soft and not grainy, which was the case with cellulose fibers made from husk or stem mass, even if these had mean maximum diameters of <100 μm and therefore were significantly smaller than the cellulose-based fibers. Comparative studies in which extraction methods according to the prior art or alternative methods for extracting proteins from flours and press residues were carried out showed that the cellulose-based fibers which can be obtained and produced by the methods according to the invention and with the properties achievable by one of the methods according to the invention, can not be obtained by means of these methods.

Due to the large surface area, cellulose-based fibers are very suitable as stabilizers or carriers for e.g. dissolved proteins, but also dissolved carbohydrates. Furthermore, a stabilization of the consistency in cheese production could be observed. In this respect, the use as a fat substitute is also possible. It has also been shown that cellulose-based fibers can be used excellently formulated as a fiber additive in food preparations. Furthermore, persons who consumed a high-fiber diet prepared with the cellulose-based fibers obtained and produced in accordance with the invention, lost weight.

Preference is given to the use of cellulose-based fibers as low calorie dietary fiber for the human or animal diet.

Preference is given to the use of cellulose-based fibers as a substitute for fats and/or thickening agents for food preparation.

Because it is possible to separate proteins and carbohydrates, the obtainable cellulose-based fibers are of no caloric value for humans and can be used as energy-free dietary fiber due to their origin and approval as a food or foodstuff. Low-calorific plant cellulose fibers made according to the prior art from husks and stem material of various crops, such as corn, wheat, oats, potatoes, are used as dietary fiber and structuring or thickening agents in the food industry. For this purpose, fibers with a fiber length of 30 to 90 microns with a large length/width aspect ratio are produced by finely grinding structural plant cellulose which is associated with high energy costs. It is also necessary to ensure that compounds that had previously been externally applied to the starting material, such as pesticides, herbicides or fungicides are removed without residue. Corresponding to their origin as biopolymer, which is optimized for the supporting- and holding-functionality, cellulose fibers are fibers which consist of bundled fibrils and thus also differ completely morphologically from the cellulose-based fibers produced according to the invention. Furthermore, the cellulose-based fibers obtainable by the process according to the invention differ in their structural composition, the chemical constituents and their original physiological function. It can therefore be assumed that functional and sensory properties found in various edible preparations with the cellulose-based fibers which were produced according to the invention are significantly improved compared with those prepared from cellulose fibers which were produced from a grinding operation of husk and stem material, due to the differences in the spatial structure, but also due to the different surface properties. Thus, cellulose-based fibers that can be obtained and produced by the process of the present invention differ from cellulose fibers made from the milling of husk or stem materials, both in their structural and functional properties.

The lignin-rich shells have, like the cellulose-based fibers, large inner surfaces, which are responsible for the enormous water binding capacity. As a result, they are particularly suitable for water binding and storage cultivation soils. When dried, they are easily stored and transported. There is optimal miscibility with all soil types studied (e.g., loam, humus). The water absorption index and water retention index of all investigated soils could be significantly increased by the addition of lignin-rich shells.

Preference is given to the use of lignin-rich shells for improving the water-binding and holding capacity of cultivation soils.

Lignin-rich shells in the dried state have an excellent oil and fat absorbing effect and are therefore very well suited for the absorption of oils and fats, e.g. from surfaces or from air/gas mixtures with oils and fats. The absorbed oils and fats do not spontaneously emerge from the lignin-based shells, but at the same time there is no "caking" of the material saturated with oil or grease, so that a very good transportability is maintained.

It could also be shown that the adsorbed oils and fats could be completely removed from the lignin-rich shells using solvents and hereafter they had an unchanged uptake capacity for oils and fats. Lignin-rich shells have a low bulk density and air or a gas can be flowed through them without much resistance. It could be shown that this can be used to clean air or gas mixtures containing vapors of oils and fats, such as the exhaust air from deep fat fryers, almost completely from the oil or fat droplets. Thus, lignin-rich shell fractions are ideal as oil separators or oil adsorbers for applications on surfaces or for the up-take from air/gas mixtures.

Preference is given to the use of lignin-rich shells for up-take and binding of oils and fats from surfaces and from air/gas mixtures.

Reuse of Process Solutions and Process Execution

In a particularly advantageous manner, the types of processes according to the invention enable a recovery, purification and reuse of the liquids used as well as of substances that were not consumed or which have been discharged with the product(s). As a result, wastewater streams and pollution of the environment with organic material can be completely avoided. The recycling can take place at different points in the process, both prior and after depletion of dissolve components and in partly unchanged manner and with a synergistic benefit in the respective process step. The reuse is also particularly resource-saving, since compounds and/or dissolved products still present in process solutions that are obtained after a separation process and, if this process water phase is reused, the compounds/products can be returned to and re-used in the process at the same or a different step or can be recovered as a product. This applies in particular to a reuse of the clarified process water phase after process step 5), which is obtained after the separation of the condensates/aggregates/complexes. It was found in investigations using this solution that dissolved amino acids and/or peptides, depending on the process execution, are still present in a concentration/amount which dissolute soluble constituents of the starting material. When this process water phase was reused without further purification, a renewed use with an identical starting material was possible. However, it may be necessary to change the pH of this recycled process water phase to ensure protonation and/or deprotonation of the compounds used. Surprisingly, it has been found that the clarified process water phase of process step 5) is very well suited to achieve complete depletion of dissolved compounds present in the water portion that is bound to the cellulose-based fibers and lignin-rich shell fractions if they are perfused with the clarified process water phase of step 5), whereby the soluble constituents are completely or almost completely separated with the water phase, which is obtained by dehydration of the rinsed cellulose-based fibers and lignin-rich shell fraction. In this way, on the one hand, a complete or almost complete removal of soluble constituents of the starting material can be achieved and, on the other hand, the leachable soluble constituents with the obtainable process water phase can be fed to one of the process steps in a subsequent process implementation, whereby the dissolved constituents can be recovered as a product.

It was found that residues of the condensing agents, which were still contained in the clarified process water phase of process step 5), were no longer or almost no longer found in these clarified and reused process water phases, depending on the process control, when this process water phase is used for a rinsing the filter residue of process step 3) and after the separation of the process water from the cellulose-based fibers and/or lignin-rich shell fractions in process step 3-I.

In a further preferred method embodiment, the clarified water phase that is used in process step 5) is first purified in process step 6).

It has been shown that by using the clarified process water phase of process step 5) and the clarified and purified process water of process step 6) to rinse the cellulose-based fibers and/or lignin-rich shell fractions in side-stream process step 3-I), dissolved amino acids and/or peptides which are rinsed out of the bound water portion of the cellulose-based fibers and lignin-rich shells into the process water phase during the rinsing process are included in the process water phase, which is obtained after dehydration/dewatering of the cellulose-based fibers and/or lignin rich shells; thus, this process water phase has concentrations of the dissolved amino acids and/or peptides that are much higher than was the case in the clarified and/or clarified and purified process water phase used initially. Furthermore, small amounts of condensed proteins were contained in the process water phase obtained and the content of condensing agents was not measurable or only at a minimal concentration. This condensing agent-poor and amino acid/peptide-rich and protein-containing process liquid is preferably used in a subsequent process procedure in process steps 2a) and/or 2b) or 2) as the water phase. Through this procedure, a loss of obtainable products and in particular the constituents of the starting material and the dissolved amino acids and/or peptides used for carrying out the process and the condensing agent can be reduced to a minimum and wastewater streams which are contaminated with organic constituents can be avoided.

The clarified and/or purified process water phases are stored in storage containers (V 5a and V 5b, as shown in Scheme 1) until their reuse under suitable conditions. Suitable conditions may include, for example: cooling, UV irradiation, exposure to an inert gas, or protection from light.

Preferred is a process in which the process liquids are completely recycled and reused for process execution.

It has been shown that the process water phases which are obtained, for example, after side-stream process method 3-III), can be reused without further purification in process steps 2a) and/or 2b), or 2) and/or 3) on the one hand and or in process method 3-I) by adding the clarified or clarified and purified process water phases to the reaction mixture(s) of this process step(s). Even with repeated reuse, there were no changes in the process parameters or the product qualities obtained. It is also advantageous that there are no costs for disposal of the process water. It is also advantageous that both the compounds used/substances for disconnection/detachment of constituents of the starting material and the condensing agents and possibly dissolved residues of proteins or other organic compounds still present can be fed back into the process and thus can be recovered or obtained in one of the process steps as a product. This contributes significantly to the economics of the process.

The above methodologies can also remove compounds that fall under the generic term toxins and harmful/hazardous substances, such as pesticides, herbicides and insecticides. In a particularly advantageous embodiment, the compounds adsorbed or precipitated from the clarified process water phase can be used for further applications by separating them and, if necessary, further purifying them. Thus, for example, the precipitated glycolipids and/or phospholipids can be separated from the process water phase by centrifugal separation and then further purified or used immediately. In principle, all compounds obtainable from the process fluid can thus be made available for further use.

In a preferred method embodiment, one or more process water phase (s) is nano-filtrated.

Preferably, small molecular compounds, such as colorants or carbohydrates, are retained and thereby removed from the process water phase, which can then be reused.

Advantages of the Manufacturable Products and the Process Technology

With the method according to the invention, complete unlocking of plant-based starting materials can be carried out in a very advantageous manner to obtain the main constituents and minor fractions of these constituents with improved product properties compared to prior art products.

The process steps according to the invention make it possible to obtain pure phases of the constituents, such as proteins, carbohydrates, fibers and shell components, in a low-energy cyclic process, in which the compounds used to make the products are almost completely recycled from the various process steps and are reused in the course of the same process or in a new application. This also applies to the process water phases used.

In a particularly advantageous manner, pure products are obtained. The process can produce protein fractions with a high protein content, corresponding to that of a concentrate or isolate. Furthermore, functionalized proteins with improved product properties, such as, for example, a higher water solubility, a high foaming capacity or improved emulsifying properties, can be prepared by the processes according to the invention. In particular, hydrated proteins can be prepared which can be bound together with other compounds in a physiological pH range. Furthermore, the processing techniques allow the recovery of complex undissolved and dissolved carbohydrates, which can then be used immediately. Furthermore, the process techniques make it possible to obtain and separate cellulose-based fibers and lignin-rich shell components that contain no residues of other components, such as proteins or carbohydrates, and thereby have special product characteristics.

Thus, for example, the obtainable cellulose-based fibers and lignin-rich shell components have a very high water and oil binding capacity. The latter, in particular, are therefore particularly suitable for improving the quality of cultivated soil. The obtainable cellulose-based fibers which can be obtained by one of the processes according to the invention can be used in many areas of life. Thus, they are particularly suitable as substitutes and/or supplements in nutrients or preparations, in particular as a substitute for sugar, flour/starch or fat/oils. Thus, there is a very broad applicability in food preparation and as a food additive. Furthermore, the obtainable cellulose-based fibers are suitable for formulation and stabilization in applications for skin and mucous membranes, and also for culturing and improving the production of microorganisms.

Furthermore, the process according to the invention makes it possible to produce protein fractions that are of high quality. Thus, protein fractions are obtained which are tasteless and odorless or completely free from odorants or flavors. In particular, they do not contain any bitter substances or other compounds which are perceptible as off-flavors. Furthermore, toxins or harmful compounds present in the biogenic starting materials can be dissolved and discharged without being entering into the obtainable protein fraction. With the same method, a de-oiling of the starting material can be done with recovery of the separated oil fraction. Furthermore, the method allows recycling of compounds used for unlocking and the process water for repeated applications, so that economic process management is possible. Furthermore, compounds which are only present in a low concentration in the aqueous unlocking solution can be removed by the methods provided and can be used for other applications.

Particular preference is therefore given to a process in which in step 2b) and/or 3) and/or 4) a separation of lipophilic constituents of the starting material is carried out by additionally adding one or more lipophilic compound (s) in step 2a) and/or 2b) to the reaction mixture and mixing it and/or a de-oiling of plant-based proteins takes place at room temperature and/or elevated temperature.

It has been shown that the presence of soluble organic compounds in and on cellulose-based fibers significantly affects the obtainable product quality. Thus it was found that a protein content of >0.5% by weight causes a noticeable reduction of the water absorption after previous drying of the fiber mass. It is very likely that the surfaces of the cellulose-based fibers stick together due to the remaining proteins which, when dried, have hydrophobic properties. Depending on the amount of protein remaining in the fiber mass, the dried fibers were no longer swellable in water and had an unpleasant mouthfeel when consumed. This was usually not the case when the product phase 2 was post-treated with process water phase 1. It has been found that the protein content of the fiber mass can be significantly reduced by process water phase 1 to a much greater extent than with the addition of an identical volume of a fresh water phase. This result correlated with the reduction in residual protein content of the subsequently dewatered cellulose-based fibers. Thus, the use of process water phase 1 for a post-treatment of product phase 2 is particularly advantageous and at the same time allows the production of cellulose-based fibers with perfect sensory properties.

It has additionally been found that the process water phase 1 used for the post-treatment of product phase 2 during this treatment step is enriched with the proteins dissolved out of the fiber mass and the pH of the solution is raised to a neutral to slightly base range. Therefore, a neutralization of this process water phase before reuse in step 2a) and/or 2b) is not required. It has been found that over the course of 3 and more process cycles, reusing process water phase 1 after treatment of product phase 2 in process step 2a) means that the amount of amino acids that have to be used for preparing the solution for unlocking can be reduced because these substances become concentrated with the resuse of the process water phase. Thus, an improvement of the process economy of the process sequence according to the invention can also be achieved by reducing the demand of unlocking compounds to be added. Furthermore, it has been shown that process water phase 1 is suitable for dilution of the water phase in process step 4) after being used in the purification of product phase 2. A dilution of the water phase is particularly advantageous if in the previous process steps, a very small volume of water was used and a high protein concentration is present herein. The sedimentation of the organic compounds initiated by the aggregation compounds is then slow, as is the dehydration of the separated aggregate phase in step 5). By adding the process water phase that was obtainable after purification of product phase 2 in step 2b), the concentration of aggregation compounds can be adjusted so that optimal aggregation can be ensured by the aggregation compounds, without additional water and without the otherwise necessary addition of a basic compound and the aggregable organic compounds can also be recycled. This results in further advantageous effects on the process economy.

Definitions

Plant-Based Starting Materials

By the term "starting materials" also referred as "biogenic starting material", as used herein is meant all biogenic products containing one or more of the major constituents: proteins, carbohydrates, fiber material/shells or fats/oils. In principle, the starting materials may have any proportion of the main constituents as well as other constituents and compounds. The preferred starting materials are plant-based starting materials such as seeds, grains, kernels, nuts, legumes, bulbous plants, tubers, vegetables, fruits or roots. These may be in the form of unripe, ripening, ripened, overripe, aged or even damaged starting materials.

The most preferred plant-based starting materials are non-lignified, that means that they contain a low level of lignin. In particular, the non-lignified plant-based materials referred to herein have a lignin content of <10% by weight. Also suitable are contaminated or spoiled plant-based starting materials.

The term "non-woody" as used herein means a protein-containing biogenic starting material having a lignin content of less than 10% by weight. Lignification is the name given to lignin deposition in the cell walls of plants.

The term "biogenic," as used herein, is defined as follows: biological or organic origin, created by life or by living things. Preference is also given to press residues which are found, for example, in the recovery of juices (for example apple, tomato or carrot juice) or pomace, e.g. of grapes or apples or extracts, as obtained in the production of jellies or liqueurs (e.g., blackberry jelly, cassis).

Further products of plant-based starting materials derived from a peeling, dehulling, or deseeding process may be used.

Under this definition belong in particular all plant seeds, such as linseed, poppy seeds, chia, amaranth, chili, tomatoes, anise, berries; grains, e.g. of rapeseed, camelina, oats, hemp, wheat, buckwheat, rye, barley, maize, sunflowers, greens, jatropha; fruit seeds/pits, e.g. from apples, pears, grapes, oranges, cherries, plums, apricots, peaches, vetches, medlars, mirabelle plums, rowanberries, pumpkins, melons, avocados; legumes, such as soybeans, field beans, mat beans, mung beans or kidney beans, peas, lentils, e.g. Duckweed, lupins or sesame seeds; Vegetables such as cauliflower, broccoli, kohlrabi, celery, zucchini, paprika, artichokes or okra; bulbous plants, such as carrots or sugar beet; Fruits, such as apples, pears, quince, bananas, breadfruit, mango, kiwi, maracuja fruit, melons, passion fruit, figs, pumpkin, pineapple, avocado, olives, mango, chayote, guava, papaya, tamarillo, marmota apple, grape fruit, oranges, lemons or grapes; Berries such as rose hips, gooseberries, blueberries, blackberries, strawberries, elderberries, currants, cranberries, mulberries, chokeberries, raspberries, blackberries, sandorn; tuberous plants and roots, such as potatoes, beetroot, batata, turmeric, cassava, horseradish, celery, radishes, ginger, arakascha, taro, wasabi, yacon, salsify, asparagus, parsnip, mustard, Jerusalem artichokes, cattail, swede, Siberian angelica, yam root, yam, sunflower root, devil's claw or ginko; as well as cucumbers, such as salad or pickled cucumbers, as well as eggplant or zucchini; Nuts, such as almonds, hazelnuts, peanuts, walnuts, cashew nuts, Brazil nuts, pecans, pistachios, chestnuts, sweet chestnuts, dates or coconuts. Furthermore, sugarcane.

Preference is given to dried starting products. Pre-shredding by a mechanical method is preferred. Preference is given to a GMO-free vegetable starting material for the production of GMO-free products. Proteins By the term "proteins" as used herein is meant macromolecules consisting of amino acids linked together by peptide bonds. The proteins referred to herein have a number of >100 amino acids. They may be present in their primary structure, secondary structure or tertiary structure as well as in a functionally active form. In the case of the secondary structure, the spatial geometry can be in the form of an α-helix, β-sheet, β-loop, β-helix or can be present in random form as random-coil structures. Also included herein are supramolecular compounds of proteins, such as collagen, keratin, enzymes, ion channels, membrane receptors, genes, antibodies, toxins, hormones or coagulation factors. According to the ubiquitous occurrence in all life forms and areas of life, the proteins referred to herein may be macromolecular compounds in any of the stated forms, the physiological task of which has been, for example, shaping, supporting, transporting, or defending, or they serve for reproduction, energy production, or metabolism or to promote reactions/metabolism. By this is meant, in particular, the proteins as defined above which are extractable from the starting materials described herein.

Carbohydrates

The term "carbohydrates" as used herein includes all C3 to C6 sugar molecules as well as compounds composed thereof. This includes but is not limited to: monosaccharides, such as hexoses, including glucose or fructose, and pentoses, including ribose and ribulose, and trioses: glyceraldehyde, dihydroxyacetone; furthermore, disaccharides such as maltose, sucrose, lactose, as well as polysaccharides such as dextrans, cyclodextrins, starch or cellulose. In starch, amylose and amylopectin are to be distinguished.

While monosaccharides and disaccharides as well as some polysaccharides are water soluble, higher molecular weight carbohydrates are water insoluble. Higher molecular weight carbohydrates, which are preferably linked to each other alpha-1,4-glucosidically and/or alpha-1,6-glucosidically, are herein included among the complex carbohydrates. In addition to starch and cellulose, glycogen, chitin, callose, fructans, pectins, among others, belong to this group. This also means complex structures made of carbohydrate agglomerates, as is the case with a starch granule.

Cellulose-Based Fibers

As used herein, the term "cellulose-based fibers" encompasses all of the corpuscular (three-dimensional) structures of the plant-based starting materials consisting of a primary cellulose backbone having at least two of the following characteristics:

originates from a plant-based starting material an aspect ratio of one longitudinal and one transverse diameter of 1:1 to 1000:1 a water binding capacity of >200% by weight a proportion of chemical compounds and functional groups of >2.5% by weight which do not correspond to the elements C, H or O.

Lignin-Rich Shell Fractions

As used herein, the term "lignin-rich shell fractions" encompasses all of the shell and support structures of the plant starting material having a lignin content of >30% by weight. The preferred lignin-rich shell portions have a weight fraction of lignin of >40% by weight, more preferably >50% by weight, more preferably >60% by weight and even more preferably >80% by weight. They have no specific outer shape, which can be flat and polymorphic to corpuscular and round. The dimensions depend on the manufacturing process and can be from a few microns to a few millimeters. Lignin-rich shell fractions are present, for example, in press residues of rapeseed or jatropha seeds in a weight fraction of 8 to 15% by weight.

Oils/Fats

The term "oils/fats" includes all lipid compounds present in the starting material. The preferred lipid compounds are arylglycerides, in particular mono-, di- and triglycerides, furthermore carboxylic acids, in particular free fatty acids and fatty acid compounds, such as fatty acid methyl esters, furthermore glycolipids and glycerol glycolipids, furthermore hydrocarbon compounds with a carbon number >5.

Disintegration

The term "disintegration" encompasses all processes which lead to permeability/separation of water-impermeable tissue or structures of the starting material, whereby the main constituents contained therein are completely wetted with an aqueous solution according to the invention containing compounds for unlocking. Thus, the definition includes all processes that result in the creation of cracks, voids or crevices of shells or shell materials of the plant starting material, to complete unlocking with exposure of the surfaces of the constituents of the plant-based starting material.

It is crucial that the disintegration allows wetting of the surfaces of the constituents of the plant-based starting material with the dissolved compounds to achieve unlocking of the starting material. A disintegration by definition is therefore equivalent to the preparation of constituents of the starting material by wetting for aqueous unlocking and access to the compounds contained therein.

Aqueous Unlocking Solution

The term "aqueous unlocking solution" or "aqueous solution for unlocking" is understood herein to mean an aqueous solution of dissolved compounds for disconnection/detachment of constituents of the starting material. In a preferred method embodiment, the compounds for disconnection/detachment of constituents of the starting material are one or more amino acid (s) and/or peptide (s) present in water in a completely dissolved form. In a very particularly preferred embodiment, dissolved amino acids and/or peptides are dissolved cationic amino acids and/or peptides. The water may be clarified, clarified and purified process water, deionized, partially deionized, well or city water. The preferred compounds for to disconnection/detachment of the constituents of the starting material in a dissolved form are naturally occurring amino acids and/or peptides consisting of or containing these amino acids. The most preferred compounds for disconnection/detachment of the constituents of the starting material in a dissolved form are naturally occurring amino acids and/or peptides consisting of or containing these amino acids. The aqueous unlocking solutions according to the invention are preferably solutions of one, two or more amino acid (s) and/or peptide (s) which are present in the individual and/or total concentration in a range from 10 μmol/l to 3 mol/l, more preferably between 1 mmol/l and 1 mol/l and more preferably between 0.1 mol/l and 0.5 mol/l. These may be L- or D-forms or racemates of the compounds. Preferred is the use of the L-form. Preferably, the amino acids are arginine, lysine and histidine.

Further preferred are derivatives of the aforementioned amino acids. Particularly preferred are cationic amino acids and peptides with cationic groups. The peptides which can be used according to the invention may be di-, tri- and/or polypeptides.

The peptides of the invention have at least one functional group that can bind a proton or bind a proton. The preferred molecular weight is less than 500 kDa, more preferably <250 kDa, more preferably <100 kDa and particularly preferably <1,000 Da. The preferred functional groups are in particular a gunanidine, amidine, amine, amide, hydrazino, hydrazono, hydroxyimino or nitro group. The amino acids may have a single functional group or contain several of the same class of compounds or one or more functional group (s) of different classes of compounds. The amino acids and peptides according to the invention preferably have at least one positively charged group or have a positive total charge.

Particularly preferred peptides contain at least one of the amino acids arginine, lysine, histidine and glutamine in any number and sequential order. Particular preference is given to amino acids and/or derivatives of these which contain at least one guanidino and/or amidino group. The guanidino group is the chemical residue H2N—C(NH)—NH— and its cyclic forms, and the amidino group is the chemical residue H2N—C(NH)— and its cyclic forms. These guanidino compounds and amidino compounds preferably have a distribution coefficient $K_{ow}$ between n-octanol and water of no more than 6.3 ($K_{ow}$<6.3). Particularly preferred are arginine derivatives. Arginine derivatives are defined as compounds having a guanidino group and a carboxylate group or an amidino group and a carboxylate group, wherein guanidino group and carboxylate group or amidino group and carboxylate group are separated from each other by at least one carbon atom, that means at least one of the following groups is located between the guanidino group or the amidino group and the carboxylate group: —CH2-, —CHR—, —CRR'—, wherein R and R' independently represent any chemical residue. Of course, the distance between the guanidino group and the carboxylate group or the amidino group and the carboxylate group can also be more than one carbon atom, for example in the following groups —(CH2)n-, —(CHR)n-, —(CRR')n-, where n=2, 3, 4, 5, 6, 7, 8 or 9, as it is the case, for example in amidinopropionic acid, amidinobutyric acid, guanidinopropionic acid or guanidinobutyric acid. Compounds having more than one guanidino group and more than one carboxylate group are, for example, oligoarginine and polyarginine. Other examples of compounds included in this definition are guanidinoacetic acid, creatine, glycocya mine.

Preferred compounds have as a common feature the general formula (I) or (II)

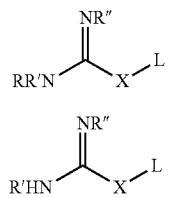

Formula (I)

Formula (II)

where
R, R', R", R'" and R"" independently from each other represent —H, —CH=CH$_2$, —CH$_2$—CH=CH$_2$, —C(CH$_3$)=CH$_2$, —CH=CH—CH$_3$, —C$_2$H$_4$—CH=CH$_2$, —CH$_3$, —C$_2$H$_5$, —C$_3$H$_7$, —CH(CH$_3$)$_2$, —C$_4$H$_9$, —CH$_2$—CH(CH$_3$)$_2$, —CH(CH$_3$)—C$_2$H$_5$, —C(CH$_3$)$_3$, —C$_5$H$_{11}$, —CH(CH$_3$)—C$_3$H$_7$, —CH$_2$—CH(CH$_3$)—C$_2$H$_5$, —CH(CH$_3$)—CH(CH$_3$)$_2$, —C(CH$_3$)$_2$—C$_2$H$_5$, —CH$_2$—C(CH$_3$)$_3$, —CH(C$_2$H$_5$)$_2$, —C$_2$H$_4$—CH(CH$_3$)$_2$, —C$_6$H$_{13}$, —C$_7$H$_{15}$, Cyclo-C$_3$H$_5$, cyclo-C$_4$H$_7$, cyclo-C$_5$H$_9$, Cyclo-C$_6$H$_{11}$, —C≡CH, —C≡C—CH$_3$, —CH$_2$—C≡CH, —C$_2$H$_4$—C≡CH, —CH$_2$—C≡C—CH$_3$, or R' and R" together form the residue —CH$_2$—CH$_2$—, —CO—CH$_2$—, —CH$_2$—CO—, —CH=CH—, —CO—CH=CH—, —CH=CH—CO—, —CO—CH$_2$—CH$_2$—, —CH$_2$—CH$_2$—CO—, —CH$_2$—CO—CH$_2$— or —CH$_2$—CH$_2$—CH$_2$—;

X represents —NH—, —NR""—, or —CH$_2$— or a substituted carbon atom; and

L represents a C$_1$ to C8 linear or branched and saturated or unsaturated carbon chain having at least one substituent selected from the group comprising or consisting of
—NH$_2$, —OH, —PO$_3$H$_2$, —PO$_3$H$^-$, —PO$_3^{2-}$, —OPO$_3$H$_2$, —OPO$_3$H$^-$, —OPO$_3^{2-}$, —COOH, —COO$^-$, —CO—NH$_2$, —NH$_3$+, —NH—CO—NH$_2$, —N(CH$_3$)$_3^+$, —N(C$_2$H$_5$)$_3^+$, —N(C$_3$H$_2$)$_3^+$, —NH(CH$_3$)$_2^+$, —NH(C$_2$H$_5$)$_2^+$, —NH(C$_3$H$_7$)$_2^+$, —NHCH$_3$, —NHC$_2$H$_5$, —NHC$_3$H$_2$, —NH$_2$CH$_3^+$, —NH$_2$C$_2$H$_5^+$, —NH$_2$C$_3$H$_2^+$, —SO$_3$H, —SO$_3^-$, —SO$_2$NH$_2$, —C(NH)—NH$_2$, —NH—C(NH)—NH$_2$, —NH—COOH, or

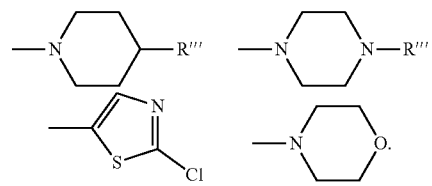

It is preferred that the carbon chain L is in the range of C$_1$ to C$_7$, more preferably in the range of C$_1$ to C$_6$, still more preferably in the range of C$_1$ to C$_5$, and most preferably in the range of C$_1$ to C$_4$.

Preferably L represents —CH(NH$_2$)—COOH, —CH$_2$—CH(NH$_2$)—COOH, —CH$_2$—CH$_2$—CH(NH$_2$)—COOH, —CH$_2$—CH$_2$—CH$_2$—CH(NH$_2$)—COOH, —CH$_2$—CH$_2$—CH$_2$—CH$_2$—CH(NH$_2$)—COOH, or —CH$_2$—CH$_2$—CH$_2$—CH$_2$—CH$_2$—CH(NH$_2$)—COOH.

Also preferred are compounds of general formula (III) as shown below:

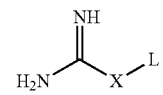

wherein the residues X and L have the meanings as disclosed herein.

Unlocking solutions according to the invention may contain further compounds which are completely dissolved herein. These may be compounds for adjusting the pH of the solution, in particular an acid or base, such as urea or triethylamine or acetic acid or uric acid, or compounds having surface-active properties, such as, for example, DMSO or SDS. Also included herein are stabilizers such as antioxidants or reducing agents. Preference is furthermore given to compounds which permit disintegration of constituents of the starting material, preference being given to compounds from the group of sulfites and sulfates.

These are preferably initially introduced in a concentration of between 0.01 and 30% by weight into the unlocking solution.

Also suitable are di-, tri- or oligipeptides and polypeptides composed of one, two or more amino acids. Preference is given to short-chain peptides, e.g. RDG. Particularly preferred are peptides which consist of amino acids which have both hydrophobic and hydrophilic side groups, such as, for example (letters according to amino acid nomenclature) GLK, QHM, KSF, ACG, HML, SPR, EHP or SFA. Further particularly preferred are peptides which have both hydrophobic and cationic and/or anionic side groups, such as RDG, BCAA, NCR, HIS, SPR, EHP or SFA. Further examples with 4 amino acids are NCQA, SIHC, DCGA, TSVR, HIMS or RNIF or with 5 amino acids are HHGQC, STYHK, DCQHR, HHKSS, TSSHH, NSRR. Particularly preferred are RDG, SKH or RRC.

Aqueous Process Mixture

The term "aqueous process mixture" or the synonymously used terms "process mixture" or "reaction mixture" is understood herein to mean a mixture consisting of/comprising an aqueous solution, emulsion, suspension or solids with a water content of >20% by weight.

The solids may be in a fully hydrated state to a barely wetted state. In particular, this means mixtures which are produced by an aqueous solution which is used during the course of the process, with the starting material and the intermediate and end products of the constituents and constituents separated therefrom during the course of the process.

Reaction Vessel

The term "reaction vessel" or "reaction container" is understood herein to mean vessels in which aqueous process mixtures/reaction mixtures are prepared by contacting, combining or mixing aqueous solutions used in the process with the starting material as well as those intermediate and end products obtained in the course of the process, thus, allowing separated constituents and components to be obtained and produced herein.

Dispensing Solution

The term "dispensing solution", which is used synonymously with the term "dispensing volume" herein, is meant as a water phase which is added to a reaction mixture and which enables dispensing and separation of soluble dissolved, soluble solid and complex insoluble constituents of the starting material. In a dispensing volume according to the invention, these constituents are present in a readily separable form. The presence of a sufficiently large dispensing volume may be tested by sampling, in which the separability of the dissolved and suspended constituents is determined by the techniques and methods described herein.

Condensation/Aggregation/Complexation

The terms "condensation/aggregation/complexing" summarize all physical and/or chemical processes which result in identical and/or dissimilar organic and/or inorganic compounds being combined, thus, resulting in condensates or aggregates or complexes which can be separated from the water phase in the form of solid material and which can be separated from an aqueous process mixture by means of suitable separation processes. The term "condensate" is understood to mean a spatial approximation of macromolecular structures, which thereby form a measurable spatial structure. The binding forces are electrostatic due to hydrophobic or hydrophilic alternating forces. In general, "aggregation" means a clustering or accumulation of atoms or molecules and/or ions into a larger structure/unit, the aggregate. The clustering or accumulation is effected by van der Waals forces, hydrogen bonding, and/or other chemical or physicochemical bonding modes. By "complexes" herein is meant macroscopically visible formations that are joined together by condensates and/or aggregates to form a larger composite structure.

In the condensates/aggregates and complexes, the individual compounds can be isolated easily from the composite structures, e. g. by a mixing process, due to the low binding energies, whereby they can be separated. In contrast, coagulates are spatial structures of small to macromolecular compounds that are formed by a chemical reaction in which covalent bonds between the molecular structures are formed and/or cleaved. In the case of a coagulate, the individual compounds can not be separated from one another or isolated only to a small extent by a solution/dispensing process in water. The condensation/aggregation/complexation referred to herein is different from coagulation that occurs in particular by a precipitation reaction with a (strong) acid which leads to a denaturation whereby at least the original tertiary structure of the proteins is partly or completely destroyed. This is evident, for example, from a lower water-binding capacity.

Condensing Agents

The term "condensing agent" or "aggregating agent" as used herein means one or more organic and/or inorganic compounds which initiate, maintain and/or accelerate the condensation/aggregation/complexing of constituents/compounds of an aqueous process mixture dissolved in water. A condensing agent can have, among others, a catalytic, destabilizing, displacing and/or releasing effect on constituents to be condensed/aggregated or complexed, which leads to an association of the constituents/compounds. A condensing agent may also cause this effect by a change in pH and/or salinity and/or be involved in the aggregation itself.

Organic Compounds

The term organic compounds includes all organic compounds of biogenic origin that can be dissolved/hydrated by one of the methods described herein from biogenic starting materials. According to the different origins, organic compounds of various groups of substances are found, which are present individually, but usually in different combinations and in different proportions. In the following, therefore, only the main groups of substances to which the organic compounds can be assigned, are listed, without being limited to them: waxes, wax acids, lignins, hydroxy and mycolic acid, fatty acids with cyclic hydrocarbon structures, such as shikimic acid or 2-hydroxy-11-cycloheptylic acid, mannosterylerythritol lipid, colorants such as carotenes and carotenoids, chlorophylls, and their degradation products, phenols, phytosterols, in particular β-sitosterol and campesterol and sigmasterol, sterols, sinapine, squalene. Phytoestrogens, e.g. isoflavones or lignans. Furthermore, steroids and their derivatives, such as saponins, furthermore glycolipids and glycoglycerolipids and glycerosphingolipids, furthermore rhamnolipids, sophrolipids, trehalose lipids, mannosterylerythritol lipids. Also polysaccharides, including pectins, such as rhamnogalacturonans and polygalacturonic acid esters, arabinans (homoglycans), galactans and arabinogalactans, as well as pectic acids and amidopectins. Furthermore, phospholipids, in particular phosphotidylinositol, phosphatides, such as phosphoinositol, furthermore long-chain or cyclic carbon compounds, furthermore fatty alcohols, hydroxy and epoxy fatty acids.

Likewise glycosides, lipo-proteins, lignins, phytate or phytic acid as well as glucoinosilates. Proteins, including albumins, globulins, oleosins, vitamins, e.g. retinol, (vitamin A) and derivatives such as retinoic acid, riboflavin (vitamin B2), pantothenic acid (vitamin B5), biotin (vitamin B7), folic acid (vitamin B9), cobalamins (vitamin B12), calcitriol (vitamin D) and derivatives, tocopherols (vitamin E) and tocotrienols, phylloquinone (vitamin K) and menaquinone. Furthermore tannins, terpenoids, curcumanoids, xanthones. But also sugar compounds, amino acids, peptides, including polypeptides, and carbohydrates, such as glycogen. The likewise associated carboxylic acids, flavorings or odors and flavorings, dyes, phospholipids and glycolipids, waxes or wax acids and fatty alcohols.

Aromas and Flavoring Agents

The term aromas and flavoring agents is synonymous with the term flavors as used herein also. Organic compounds which lead to a sensory perception in the sense of a taste or an odor are present in virtually all organic mixtures of biogenic origin. There is an extremely large heterogeneity of the possible organic compounds. The structural composition of these carbon-based compounds are very different. Some typical classes of compounds are alkaloids, alcohols, aldehydes, amino acids, aromatic hydrocarbons, esters, lactones, cyclic ethers, furans, furanoids, free fatty acids, flavonols, glycosides, ketones, saturated and unsaturated hydrocarbons, enamine ketones, ketopiperazines, isoprenoids, monoterpenes, terpenes, cyclic terpenes, triterpenes, triterpenoids, tetraterpenes, sesquiterpenes, sequiterpenoids, sterols, phytosterols, purine derivatives, phenylpropanoids, phenols and/or hydroxycinnamic acid derivatives. These classes of compounds can occur both individually and in any combination. These are, in particular, 1,5-octadien-3-ol, butanal, hexanal, octanal, nonenal, nonadineal, decanal, dodecanal, piperonal, cysteine, cystine, methionine, phenanthrene, anthracene, pyrene, benzopyrene, 4-hydroxybutanoic acid, ethylhexanoate, coumarin, maltol, diacetylfuran, pentylfuran, perillen, rosefuran, caprylic acid, capric acid, hydroxyfatty acids, amygdalin, progoitrin, 2-heptanone, 2-nonanone, decatrienal, 1-octene-3-one, vinylamylketone, 4-(4-hydroxyphenyl)-butan-2-one), mycosporine, diketopiperazine, humulones and lupulones (bitter acids), monoterpenes: myrcene, ocimene and cosme, linalool, myrcenol, ipsdienol, neral; citronellol and geranial, citronellal, myrcene, limonene, linalool, nerol, geraniol, terpinolene, terpinene and p-cymene, carvone and carvenone, thymol, dihydroxy-carveol, 2-pinene, α and β-pinene, limonene, phellandrene, menthane, camphor; fenchone, xanthophylline, bisabolane, germacrane, elemane and humulane, farnesene, rotundone, sterols, phytosterols; p-cresol, guaiacol, ferulic acid, lignin, sinapine, catechins, eugenol, vanillin, 3-butenyl isothiocyanate, 4-pentenyl isothiocyanate, 4-pentenenitrile, 5-hexenitrile, camphene, dodecane, cinnamyl alcohol, fenchyl alcohol, 1R,2S,5R-isopulegol, 2-ethylfenchol, menthol, 4-hydroxy-3,5-dimethoxybenzyl alcohol, (R)-(−)-lavandulol, piperonyl alcohol, thujyl alcohol, 1,8-cineole, 4-ethyl guaiacol, N-[[(1R, 2S, 5R)-5-methyl 2-(1-methylethyl) cyclohexyl] carbonyl]-glycine ethyl ester, (1R, 2S, 5R)—N-cyclopropyl-5-methyl-2-isopropylcyclohexanecarboxamide, L-alanine, aspartic acid, 2,4-dimethylthiazole, lenthionine, (+)-cedrol, 3-methylphenol, anisole, 1-methoxy-4-propylbenzene, 4-allyl-2,6-dimethoxyphenol, 2,6-dimethoxy-4-vinylphenol, ethyl 4-hydroxy-3-methoxybenzyl ether, vetiverol, 2-butylethyl ether, ethylgeranyl ether, carvacrol, 2-methylpropanal, cinnamaldehyde, p-tolualdehyde, 2-methylbutyraldehyde, salicylaldehyde, acetic acid, lactic acid, 3-methylbutyric acid, hexanoic acid, 1-malic acid and/or anethole. These compounds can occur both individually and in any combination.

Plant Pigments and Colorants

The term "colorants" or "colorant agents" as used herein synonymously, is taken to mean organic compounds which, in starting materials of biogenic origin, typically coexist in different quantities and compositions. By the term "plant colorant agents" herein are meant all compounds that have a color. The most dominant, and by far the largest, quantity in plant-based starting materials is the group of chlorophylls and their degradation products, such as pheophylline, chlorophyllide, pheophorbide, phyropheophytine, chlorine, rhodins and purpurins. In addition, however, there are also compounds that belong to the group of carotenes or carotenoids. However, other classes of compounds, such as flavonoids, curcumins, anthrocyans, betaines, xanthophylls, which include carotenes and lutein, and also indigo, camphorol and xanthophyllins, such as neoxanthine or zeaxanthin. These colorant agents may be present in different proportions in the lipid phases.

Phospholipids

The term "phospholipids" as used herein includes amphiphilic lipids containing a phosphate group and which belong either to the phosphoglycerides or the phosphosphingolipids.

Furthermore, acidic glycoglycerolipids, such as sulfoquinovosyl-diacylglycerol or sulfoquinovosyldiacylglycerin. "Phosphoglycerides" (also referred to as glycerophospholipids or phosphoglycerolipids) consist of a diacylglyceride whose remaining terminal hydroxy group is attached to a phosphate radical which is either not further modified (phosphatidic acid) or esterified with an alcohol. The most common members of the latter group are phosphatidylcholines (also called lecithins), phosphatidylethanolamines and phosphatidylserines. "Glycophosphatidylinositols" are compounds that are saccharide glycosidically linked to the inositol group of phosphatidylinositols.

Glycolipids

The term "glycolipid" as used herein means compounds in which one or more monosaccharide residues are linked (bound) via a glycosidic bond to a hydrophobic acyl residue.

Glycoglycerolipids

The term "glycoglycerolipids" herein includes both phosphoglycosphingolipids, as well as phosphonoglycosphingolipids, as well as glycosphingolipids, also sulfoglycosphingolipids, further sialoglycosphingolipids, and mono-, oligo-, and polyglycosylsphingoide and mono-, oligo-, and polyglycosylceramides. Further examples are rhamnolipids, sophor lipids, trehalose lipids and lipopolysaccharides.

Residual Moisture Content

The residual moisture content is calculated based on the differences in weight between the initial measurement and after complete drying in a vacuum oven. This value is set in relation to the initial weight and is expressed as a percentage. Alternatively, automated methods for determining the moisture content can be used.

Clarified Water Phase

A "clarified water phase" or "clarified process water phase" is understood herein to mean the water phase which is obtained after a condensation/aggregation/complexing of organic and/or inorganic constituents according to the invention and their separation. The term "clarified" stands for an optically clear solution in which there is no or only occasionally suspended matter. This is quantifiable, e.g. by a turbidity measurement, whereby a value of 20 FTU is not exceeded. However, the term "clarified" also includes removal of dissolved organic compounds. Methods for quantifying any organic compounds still present herein are e.g. the HPLC and/or MS.

Purified Water Phase

A "purified water phase" is defined herein as a clarified water phase or clarified process water phase, as defined above, in which a depletion of organic and/or inorganic compounds contained therein to <0.5% by weight has been achieved. This can be checked, for example, by elemental analysis (e.g. ICP) or atomic absorption spectroscopy of a dried residue.

Process Economics

The term "process economics" or "process economy", as used herein, means that through a process setting/process execution, the process setting/process execution can be considered as to be economic, since results yield in quantifiable economic advantages over other process designs. The economic benefits may involve different areas of economics that overlap and add up to result in an overall process economics.

The inventive process economy is ensured by one or more of the process steps concerning the utilization/recoverability of resources and/or the energy demand and/or the avoidance of environmental pollution and/or the process costs, and thus relates to the following economic sectors without being limited thereto:

Starting material economics—for example, all constituents of the plant-based starting material can be obtained as valuable fractions with the inventive method.

Energy economics—for example, the methods of the invention can be carried out at room temperature.

Environmental economics—for example, with the process methods, the aqueous process phases can be completely reused in a particularly advantageous manner, so that the amount of fresh water and wastewater used in the various process steps is significantly (>50% by volume) lower and no waste water with organic loads is produced, which is the case when a process is not performed according to the invention.

Production cost economics—for example, if a process is performed according to the invention, not only is the amount of required unlocking compounds less but the amount of fresh and waste water is lower compared to a process not performed according to the invention, thus reducing the total process costs by >15%. In addition, by reusing process water phases, the process ensures improved product quality of the obtainable products.

For most of all, the process-economic advantages are, in particular, achieved through the process execution of reusing the clarified aqueous phase obtained—especially by the arbitrarily frequent reuse thereof. A particular aspect of "process economics" is that no effluents (waste streams), that means no aqueous phases as waste or no aqueous wastewater incurred, which brings a significant process advantage, especially in terms of cost and environmental impact which is especially relevant due if fairly large volume of aqueous solutions used during a process execution.

Decompaction

The term "decompaction" or "decompacting" is understood to mean an unlocking of compacted compounds which results in the easy separation of previously gap-free interconnected compounds from one another in an aqueous medium.

Methods

Method of Providing Plant-Based Starting Material.

Depending on the different origin and the possibilities of preparation of the biogenic starting materials which can be used according to the invention, these can be present in different forms and states. For example, these may be whole/intact seeds, grains, kernels, nuts, vegetables, fruits, flowers, ovaries or roots and/or completely or partially disrupted, broken, comminuted, crushed, ground or pressed plant materials and/or plant-based materials which have partially or completely undergone a fermentative or disintegrative process, in particular by an autolysis/microbial degradation/chemical-physical reaction, and/or is a residue from agricultural production/food production or utilization. The broken, comminuted, crushed, powdered or liquidized or dissolved plant-based starting materials may be presented as continuous or discrete pieces or is compressed, e.g. as pellets or molded compound or in a loose composite, such as granules or bulk or in isolated form, such as a flour or powder or in the form of a suspension. The consistency, shape and size of the plant-based starting materials is in principle irrelevant, but preferred are comminuted plant-based starting materials that allow easier unlocking. Preferably, maximum diameters of the pieces/particles of the biogenic starting materials are between 100 µm and 100 cm, more preferably between 0.5 mm and 50 cm, more preferably between 1 mm and 20 cm, and more preferably between 2 mm and 5 cm. The shape of the suitable plant-based starting materials is arbitrary, as well as the consistency, which may be hard or soft, or they may be in a liquefied form. In this case, the starting material may have any desired temperature, preferred is a heated starting material, as obtained, for example, following a pressing process. Unless the plant-based starting material meets the appropriate properties/requirements for one of the process operations of the present invention, these conditions can be established by methods available from the prior art. These include, in particular, methods with which an inventive unlocking of the plant-based starting material can be facilitated and/or is facilitated. These include, in particular, mechanical processes with which the plant-based starting material can be comminuted. In this case, it may be necessary, in particular for process economization, first to comminute and dry, or dry a biogenic material and then to comminute it. In one process embodiment, the comminuted and then dried plant-based starting material is comminuted to a certain particle size before process step 1), preferable are particle sizes between 10 µm and 2 cm, more preferably between 30 µm and 5 mm.

In one process embodiment, lignin-containing components of the plant-based starting materials are first removed. These may be, for example, shell materials of the plant-based starting materials, such as skins (peels), casings or shells, such as those of apple or grape seeds. For example, mechanical methods known from the prior art are known for this purpose. In a further preferred embodiment of the method, a method for degradation and/or liquefying lignin can be carried out before performing the process step 1). Such methods are known in the art, for example as a "Kraft method". For example, degradation or liquefaction of lignin is achieved by boiling with a caustic solution. However, mechanical disintegration can also be carried out only during or after method step 2a). The use of shear mixers or colloid mills is advantageous.

The starting materials are filled into a suitable container, which can preferably be filled from above and has a closable outlet at the bottom.

Preference is therefore given to a process in which plant-based starting materials are provided in a container to which a liquid can be added.

The container must comply with the regulatory requirements for product manufacture. This also applies to containers that are used subsequently, as well as for system components and piping systems. Preferred is a container design with a conically extending container bottom.

Preferred is a mixing device for mixing the container contents. A cooling/heating device of the containers or of the contents of the container is preferred. Preferably, the unlocking solution is added to this container containing e.g. the pressed residues/ground products and mixed and stored herein for the required time. For use for the next process step, the discharge is carried out by draining through the floor drain.

Methods for Preparation and Use of Unlocking Solutions

The unlocking solutions according to the invention are prepared with the compounds according to the invention for the disconnection/detachment of constituents of the starting material, as defined herein. For this purpose, one or more of the compounds is/are completely dissolved in water, wherein the water may be a clarified or clarified and purified process water, a completely ion-free water or well and city water. For dissolution it may be necessary to increase the temperature and/or continue mixing for up to 2 days. Preferably, the amino acids or peptides solution self assembles in the pH range of 7.5 to 13.5, more preferably between 8 and 13, and more preferably between 8.5 and 12.5. This is especially true when using cationic amino acids/peptides. In one embodiment, the pH may be adjusted to any pH range between 7.5 and 13.5 by the addition of an acid or a base. In this case, acids and bases which are known in the art can be used.

Additives can be added to the solutions which improve or accelerate the unlocking process and recovery of cellulose-based fibers or disintegrate and/or dissolve other constituents of the starting material. Such compounds include, but are not limited to, the following compounds, such as: urea, NH3, triethylamine; ionic or nonionic surfactants such as SDS or DMSO; Antioxidants or Na2SO3, sodium bisulite or Na2SO4. These compounds can be present individually or in combination, in a concentration of between 0.01% by weight and 50% by weight, in the unlocking solution.

Furthermore, the unlocking solutions according to the invention can be combined with additives which in particular improve the solubility of certain compounds of the starting material, these include, among others, alcohols, fatty alcohols, fatty acid esters or lactones.

The unlocking solutions can be prepared at any temperature and added to the starting material in process step 2a), or 2) and, if necessary, also in process step 2b). The application can be carried out in droplets, dropwise or streams, continuously or discontinuously to, into and/or onto the starting material. In a preferred embodiment, this is done under exclusion of air and/or under inert gas conditions. The application is carried out by feeding a prepared unlocking solution in a controlled manner from a reservoir via supply line to the starting material.

Process for Disintegrating Starting Material

To execute the disconnection/detachment of constituents of the starting material according to the invention, it is necessary that the compounds according to the invention for the disconnection/detachment of the constituents completely penetrate the starting material and that then the constituents are present in a hydrated state at least at the interfaces (boundary surfaces). For this purpose, it is required that the aqueous unlocking solution is able to thoroughly penetrate the starting material. In the case of insufficient penetrability, a mechanical and/or physico-chemical disintegration process can be used. While mechanical disintegration processes should preferably be carried out before or at the time of process step 1, in a preferred process embodiment the physico-chemical disintegration can be performed in process step 2a) or 2). Preferred here is a thermal disintegration. Preferred for this purpose is a temperature between 80° and 150° C., more preferably between 90° C. and 140° C., and more preferably between 99° C. and 121° C. Preferred is a pressurization, which takes place simultaneously with the heating, it is preferred to use an autoclave for simultaneous heating and pressurization. In a particularly preferred embodiment, the unlocking solutions used in steps 2a), 2b) and 2), respectively, are used for the disintegration of the starting material, preferred is the use of amino acid and/or peptide solutions for disintegration during a mechanical and/or physicochemical disintegration of the starting material. A solution containing dissolved cationic amino acids and/or derivatives containing at least one guanidino and/or amidino group is preferred for the physico-chemical disintegration of starting material. Particularly preferred is a solution containing arginine and/or arginine derivatives in dissolved form, for the thermal disintegration of starting materials. Further preferred is an unlocking solution which contains at least one compound comprising urea, NH3, triethylamine; ionic or non-ionic surfactants, such as SDS or DMSO, or sodium sulfite Na2SO3 or sodium bisulfite.

Preferred is a disintegration of starting materials with a solution of dissolved amino acids and/or peptides. Particularly preferred is an embodiment of the method in which the dissolved amino acids and/or peptides are dissolved cationic amino acids and/or peptides.

In principle, a thermal disintegration is advantageous if the plant-based starting material has a high water content, as in fresh fruits and vegetables. A mechanical disintegration is particularly advantageous if the plant-based starting materials have a low water content and/or are enclosed in sheaths/shells that are impermeable to water. Furthermore, a mechanical method is preferable when another fraction of the plant-based starting material, such as oil, should be removed first.

In a preferred embodiment a disintegration of the starting material is carried out, by placing the completely or in parts mechanically comminuted material, in a water bath and heating it until the material is so soft that by applying a slight force, e.g. by pressing with the fingers, it decays to a mushy or liquid phase. This is particularly advantageous if, owing to the different degree of strength of different structures, following one of the abovementioned forms of disinterment, the different structures, such as, for example, the mesosperm and the shell-materials, can very easily be differentiated from one another as layers and mechanically separated. In a preferred embodiment, the heating takes place together with a pressure increase in an autoclave. In a preferred embodiment, plant shell materials are removed before and/or after disintegration of the plant-based starting material.

In a particularly preferred embodiment, the plant-based starting material is disintegrated by placing it in one of the aqueous solutions according to the invention, comprising an aqueous unlocking solution according to the invention. In principle, the volume or weight ratio can be chosen freely, but it is advantageous if the plant-based starting material is completely wetted by the unlocking solution. The duration of exposure to the unlocking solution depends on the plant-based starting materials used. Preferred is a duration between 1 minute and 48 hours, more preferably between 10 minutes and 14 hours and more preferably between 20 minutes and 6 hours. The temperature at which the exposure of the plant starting material is carried out with the aqueous unlocking solutions is, in principle, freely selectable. Preferred is a temperature between 5° and 140° C., more preferably between 10° and 120° C. and more preferably between 15° and 90° C. Further preferred is a previous and/or simultaneous and/or subsequent treatment of the plant-based starting material with compounds which cause a disintegration or chemical reaction of/with lignin compounds. Preference is given to the use of sulfite and sulfate compounds. Particularly preferred is sodium bisulfite.

Methods for Carrying Out Method Step 2a):

Applying an aqueous solution containing dissolved amino acids and/or peptides for disconnection/detachment of the constituents of the starting material, to the plant-based starting material of Step 1.

In this process step, the wetting of the surfaces of the constituents within the preferably biogenic starting material must be ensured. This means that the constituents present in a compacted composite have also to be wetted and hydrated. In the preferred economic process embodiment, the compounds used to disconnect/detach constituents of a dry starting material are applied by metering only the minimum required liquid amount of the unlocking solution which ensures complete wetting of the starting material. This can be checked, for example, by determining the moisture content, which is preferably >20% by weight in the case of complete penetration/wetting.

Furthermore, a moistening can be detected visually, e.g. by a change of color or analytically, e.g. be changing the electrical conductivity. In another preferred embodiment, metering of a volume of the unlocking solution to the starting material, which accomplishes a complete swelling of the starting material is performed. For example, complete swelling can be recognized by the fact that the swollen material does not bind more water, recognizable by the fact that a further addition of water leads to no further increase in volume of the swollen homogeneous material and during centrifugation (2,000*g) only a minimal free liquid phase is separated. Whether further water binding is possible can be tested by adding a 0.3 molar solution of the amino acid and/or peptide solution in small volume units to a sample of the swollen material whose mass has been determined. If a free water phase forms, the swelling process is complete, otherwise the addition of the amino acid and/or peptide solution used for the mixture must be continued.

The volume of aqueous solutions containing dissolved amino acids and/or peptides is added in a mass ratio between 0.5:1 and 10:1, more preferably between 1:1 and 8:1, and further preferably between 1.2:1 and 4:1 to the starting material. Preferred is a process execution at a temperature between 6° and 90° C., more preferably between 10° and 60° C. and more preferably between 18° and 40° C.

Addition of the aqueous solutions may be carried out by prior art methods. Suitable containers in which the contacting of this process step is carried out are reaction containers that are open or closed or heated and preferably have a stirring or mixing device, such as a stirred tank, which allows complete circulation of the mixture. The addition of the aqueous unlocking solution is carried out continuously or discontinuously until complete saturation is documented in a representative sample. In another method embodiment, the starting material is distributed on a conveyor belt or a conveyor sieve belt and the distributed starting material is sprayed with the aqueous solution and is thereby impregnated/wetted.

The duration of the penetration phase naturally depends on the nature and consistency of the starting material. Preferred is a duration between 5 minutes and 24 hours, more preferably between 10 minutes and 12 hours and more preferably between 20 minutes and 6 hours.

A simple test procedure can be used to determine whether a mixture of this process step is suitable for feeding to the next process step. A representative sample is taken from the mixture and placed in water (25° C.) in a mass ratio of 1:20 and agitated for 2 minutes at 200 rpm. Subsequently, the entire suspension is filtered (sieve size 100 μm). The sieve residue is examined visually or microscopically for the presence of aggregates of constituents of the biogenic starting material. If no aggregates are present, sufficient disconnection/detachment of the constituents of the starting material has been achieved and the process step has been completed.

In a variant of the method, the impregnation/wetting of the starting material with one of the unlocking solutions takes place during the addition of one of the disintegration methods or immediately afterwards.

This process variant is particularly advantageous for starting materials with a high water content, such as raw vegetables, tubers or roots. In a process variant, impregnation/penetration is performed from the beginning together with compounds that facilitate/accelerate disintegration of the plant-based starting material. This may be the case even if, for example, the aqueous unlocking solution is used for disintegration in a thermal process. In the context of disintegration, impregnation/penetration of the plant material with the compounds of the unlocking solution is carried out here. In a preferred variant of the method, the disintegration and impregnation/penetration is performed under reduced pressure or overpressure conditions in a container suitable for this purpose.

Preferred is application of a pressure from 1 mbar to 50 bar, more preferably from 10 mbar to 10 bar and more preferably from 100 mbar to 5 bar. In principle, the impregnation/penetration can take place at any temperature. Preference is given to simultaneous heating of the starting material in order to accelerate the wetting/soaking process. Therefore, it is preferred to carry out the process step at a temperature between 5° and 150° C., more preferably between 8° and 140° C., more preferably between 10° and 120° C. and more preferably between 15° and 90° C. It is preferred to carry out the process step with simultaneous increase in temperature and underpressure or overpressure. The preferred duration of the process step depends on the permeability and the degree of disintegration reached. Preferred is a duration between 10 seconds and 10 days, more preferably between 1 minute and 2 days, more preferably between 10 minutes and 24 hours, even more preferably between 15 minutes and 8 hours, and most preferably between 20 minutes and 4 hours.

The completeness of disintegration and wetting/impregnation can be very easily checked by, for example, suspending a 1 ml sample of the plant material that had been unlocked in 1,000 ml of water and stirring with a magnetic stirrer for 10 minutes at a rotation frequency of 300/min. If after stopping the agitation visible fiber-structures are identifiable with the naked eye with a slow sedimentation tendency and at the same time the sieve residue of the suspension and, if present also lignin-rich-shell-fragments or other solid constituents, such as starch granules or fragments, does not exhibit any recognizable adhesions the duration of the disintegration and wetting/impregnation phase is sufficient.

Preference is given to a process for the separation of constituents of a plant-based starting material, in which at the same time disintegration and wetting/penetration takes place with an aqueous unlocking solution.

Methods for Execution of Method Step 2b):

Provision of an aqueous dispensing volume and dispensing of the separated constituents from step 2a).

In a preferred embodiment, the disconnection/detachment mixture of process step 2a) is dissolved in water to fully hydrate the separable soluble constituents, thereby being present in an individual form and without attachment of other constituents. For this purpose, clarified process water of several consecutive process steps can be used or deionized or not further treated city or well water.

The determination of the water volume, which is sufficiently large to achieve complete hydration of the soluble constituents in the dispensing phase which ensures separability of the dissolved and insoluble constituents of the starting material is preferably carried out by using a sample of the previous process step (e.g. 10 g of a disconnection/detachment mixture) with which a dilution series is prepared.

After a stirring phase of 3 minutes, filtration (sieve mesh size 100 µm) of the suspension is carried out. The filter residue is analyzed (visually or microscopically) for deposits/attachments of soluble and water-rinsable compounds. The filtrate is then admixed with a suitable solution of a condensing agent in increasing dosage. A sufficiently large dispensing volume exists when there are no adhesions/attachments on the solid constituent of the starting material that are in the filter residue, and there is complete condensation and/or aggregation and/or complexation of the dissolved soluble constituents present in the dispensing mixture.

Preferred is a ratio of the water volume to the dry mass of the starting material of 5:1 to 500:1, more preferably from 10:1 to 150:1 and more preferably from 15:1 to 50:1. The manner in which the unlocking mixture and the dispensing water phase are combined or brought into contact is arbitrary. Preference is given to the addition which takes place by means of a high-performance shear mixer or another intensive mixer, together with the water phase. This is particularly advantageous because it allows direct hydration and separation. The separated fiber mass contains proteins in relevant amounts. To date, no method has been proposed for recovering the proteins contained in solid matter such as cellulose-based fibers and lignin-rich fibers. This is made possible by the method described herein, in which the dispensing step is carried out in step 2b) in which the proteins dissolved in the fiber-material and possibly present soluble carbohydrates are flushed out into the aqueous dispensing phase by means of an intensive mixing process. Therefore, this process step is of particular importance. Further preferred are stirring devices which cause turbulent flow, such as propeller or jet mixers. The dispensing process can be continuous or discontinuous and at any temperature, preferred is a temperature range of the aqueous suspension between 6° and 90° C., more preferably between 10° and 60° C. and more preferably between 18° and 40° C. The duration of the dispensing process is arbitrary, preferred is a duration from 1 minute to 24 hours, more preferably from 5 minutes to 5 hours and more preferably from 10 minutes to 1 hour.

The dispensing process is sufficient and complete when in a representative sample taken from the dispensing mixture, which is filtered through a coarse (1 mm mesh size) and then through a fine sieve (sieve mesh size 100 µm), no aggregates of the constituents of the plant-based starting materials can be microscopically or visually detected in the filter residue. The successful dispensing of the constituents of the starting material can also be recognized by filling a sample of the dispensing mixture into a graduated cylinder where after a short time there is separation of 3 phases or in the case of the presence of lipids 4 well distinguishable phases. The time required for this should not exceed 4 hours.

Further according to the invention is the testing and optional adjustment of the pH of the dispensing solution. This can be done with bases or acids from the prior art, preferred acids are HCl or formic acid, preferred bases are NaOH or urea. Preferably, the pH of the dispensing solution is between 6.5 and 13.5, more preferably between 7.0 and 12.5 and more preferably between 7.5 and 11.

The volume of water required to carry out the following process steps according to the invention is provided in a suitable container.

Methods for Execution of Process Step 2:

In a preferred embodiment, the starting material to be treated with an unlocking process is brought into contact with a volume of the aqueous unlocking solution which at the same time contains sufficient a concentration of the unlocking compounds to ensure disconnection/detachment of the constituents of the starting material according to the invention and, on the other hand, the unlocking according to the invention of the dissolved constituents in the volume of water is ensured. A check as to whether this criterion is fulfilled can be carried out using the methods described above and below. The preferred ranges of process parameters in which the method is preferably carried out are otherwise identical to those described herein for performing method steps 2a) and 2b).

Methods of carrying out process step 3: Separation of solid matter from the unlocking mixture of step 2b or 2 to obtain a fiber-free aqueous solution of dissolved constituents of the plant-based starting material.

Methods for Execution of Process Step 3:

In a particularly advantageous embodiment, a separation of solid matter from the unlocking mixture of process step 2b) or 2) is performed in process step 3). This can be done with known methods for solid/liquid separation. Preference is given to filter techniques which are particularly suitable for separating off high concentrations of small fibers with a high throughput volume. Particularly suitable for this purpose are screening devices which simultaneously agitate the filter medium and/or the separation mixture, which includes e.g. vibration of the sieve or a installing a rapid overflow of the sieve surface. It is preferred to carry out a two-stage or multi-stage screening process, since on the one hand different insoluble constituents which are present in the unlocking mixture can be separated from one another and on the other hand it can be ensured that no or practically no particles which are larger than the predefined size will be in the filtrate of this process step. Also suitable are bow sieve devices, belt filters or chamber filter presses, a sieve decanter, but also centrifugal techniques, such as centrifuges or decanters. It is therefore preferred to carry out a prescreening with a coarse sieve, a fine filtration with a fine sieve and a very fine filtration with a very fine sieve. A coarse screen preferably has a screen mesh size of 1.0 to 4.0 mm, more preferably 1.1 to 2.5 mm, and more preferably 1.2 to 2.0 mm. A preferred fine sieve has a sieve mesh size of 80 to 250 µm, more preferably 90 to 180 µm, and more preferably 100 to 160 µm. A very fine sieve preferably has a screen mesh size of from 5 to 80 µm, more preferably from 10 to 60 µm and more preferably from 15 to 30 µm. Depending on the consistency of the screen residue or the centrate in centrifugal processes, a residual amount of water contained herein can be further reduced, e. g. with a sieve-pressing device or screw press. The residual moisture content of the screen residue is preferably <80% by weight, more preferably <60% by weight and more preferably <40% by weight.

The preferred process conditions according to the invention are fulfilled when the solid constituents obtained in a filter residue are free or nearly free from soluble constituents of the plant-based starting material and can easily be separated in water. Furthermore, according to the invention, the filtered solid constituents are obtained in a very condensed and thus transportable form. With this process step, a fiber-free or almost completely fiber-free solution is obtained which preferably contains >98% by weight, more preferably >99% by weight and most preferably >99.5% by weight of the mass of proteins originally present in the starting material. Almost completely fiber-free here means >98% by weight. This can be verified by, for example, a fiber through-flow meter (FiberLab, Valmet). As used herein, the term "solid matter" describes solid constituents that do not pass through a sieve filter with a mesh size of 10 µm.

The other process conditions, such as temperature, duration of the separation, flow rate, etc., can be freely selected. The filtrate and the screen or press residue of the one or more residue fractions are collected in separate and suitable containers or introduced into those.

Process for Execution of Process Step 4):

condensation/aggregation/complexation of the dissolved constituents of the aqueous solution of step 3) to obtain an aqueous phase containing condensed soluble constituents of the starting material.

In a preferred embodiment, this process step involves condensation and/or aggregation and/or complexing of the dissolved proteins and/or other dissolved organic and/or inorganic compounds of the filtrate of the preceding process step. The aim of this condensation process is to bring about a combination of dissolved or hydrated constituents and in particular of the proteins, with formation of a condensed phase/mass which can be separated by means of known separation techniques and can be obtained with as little water as possible. Preference is given to an addition of one or more suitable condensing agent (s). Suitable condensing agents are, for example, acids, among them preferably organic acids, such as, for example, acetic acid, ascorbic acid, citric acid, lactic acid, malic acid, but also inorganic acids, such as phosphoric acid, furthermore salts, such as, for example, NaCl, KCl, MgCl2, CaCl2) or Na2SO4, AlCl3, and also complexing agents such as EDTA but also adsorbents such as calcium oxide, magnesium oxide, kaolin or other clay minerals. Also preferred are soluble divalent cations, preferably of aluminum, calcium and magnesium salts. Furthermore, combinations of the condensing agents listed herein are advantageous, such as a combination of citric acid and aluminum chloride. Further preferred are carbonates, such as sodium carbonate, sodium bicarbonate or calcium carbonate.

Furthermore silicate compounds, especially sodium-metasilicate, sodium orthosilicate, as well as other soluble silicates. The pH of the aqueous solutions containing dissolved condensing agents can in principle be chosen freely and depends on the effectiveness of the condensation obtainable herewith. If required, the pH of the solution can be adjusts, e.g. with a buffer, which can also be added to a solution of condensing agents.

Suitability can be readily appreciated by one skilled in the art by adding and mixing various condensing agents to samples of the non-fiber containing solution of process step 3, in increasing concentrations, and then a testing for completeness of condensation of the dissolved constituents is performed. For this purpose, to the supernatant after a centrifugal separation of the condensates one or more of the condensation solutions/condensing agent is/are added and mixed.

If after sedimentation of at least 10 minutes upon renewed centrifugation no sediment forms and the water phase is clear or almost clear, a sufficient condensation of the constituents has achieved. In a further embodiment, the application of the condensing agent (s) is carried out as a solid, preference being given to the use of a powdered form which is added to the reaction mixture. Condensation can be detected after a short residence time with the naked eye. The selection of the appropriate concentration may be made by centrifuging a sample solution that has undergone condensation and treating the supernatant again with the same and/or different condensing agents. If this does not allow formation of any visible condensates/aggregates/complexes and/or separation off, the solution contains <6% by weight, preferably <4% by weight and most preferably <2% by weight of proteins.

Preferably, the condensing agents are completely dissolved in water which is preferably ion-free or deionized. The concentration of the condensing agent depends on the process conditions and must be determined individually. Generally preferred is a concentration range from 1 mmol to 5 mol/l, more preferably between 100 mmol and 3 mol/l and more preferably between 200 mmol and 2 mol/l. The volume of the solution with one or more condensing agent (s) or, in the case where condensing agents are provided with different aqueous solutions, is carried out continuously or discontinuously, dropwise or by blasting.

Preferably, an agitation of the reaction mixture, preferably the agitation is performed under slightly turbulent or laminar flow conditions, which avoids a disintegration of forming condensates/aggregates/complexes. Preferably, complete mixing of the reaction mixture is carried out. Preferably, a process control is carried out by a visual inspection of the condensation progress or a process monitoring by determining the degree of turbidity of the clarified water phase that is forming. The completeness of the condensation/aggregation/complexing of the dissolved compounds can be easily checked by the method described above and, if appropriate, one or more of the condensing agents can be added to the reaction solution. The duration of mixing is in principle freely selectable. In a preferred method embodiment, this is performed only over the duration of the addition of one or more condensing agent (s) or for a duration of between 10 seconds and 5 minutes, more preferably between 20 seconds and 2 minutes.

The temperature at which condensation and/or aggregation and/or complexing takes place can in principle be chosen freely. Preferred is a temperature between 6° and 90° C., more preferably between 10° and 60° C. and more preferably between 18° and 40° C. Preference is given to the setting of a specific pH range, the optimum pH results from the selection of or combination with the condensing agent (s). The optimum pH range can be determined by the method described above. The pH of the aqueous solution containing dissolved compounds in which the condensation and/or aggregation and/or complexing of the dissolved proteins and/or other dissolved compounds according to the invention takes place is preferably in a range between 5.5 and 13, more preferably between 6 and 12, and more preferably between 6.5 and 11.

In a particularly preferred embodiment, a service life is maintained following the addition of one or more condensing agents, in which no or only a minimum mixing of the mixture is carried out.

In an analogous manner, as in the method described herein, the time required to carry out the condensation phase can be determined, which is preferably between 5 minutes and 10 hours, more preferably between 10 minutes and 5 hours and more preferably between 15 minutes and 2 hours. If the service life is to be reduced to a minimum, the sufficient minimum duration of service life after addition of the condensing agent can be determined easily, on the basis of a test result from a sample which is centrifuged and in which in an analogous manner, as described above, the achievement of completeness of condensation and/or aggregation and/or complexation by the condensing agent (s) is tested.

The condensation phase is preferably carried out at ambient temperatures, preferred is a temperature ranging between 15° and 40° C. In further preferred embodiments, this takes place at a temperature between 5° and 15° C. on the one hand and between 40° and 90° C. on the other. The selection of a low temperature may be advantageous, for example, in the recovery of thermolabile compounds. The choice of a high temperature, e.g. 60° C., may be chosen, for example, to kill germs on microbial loading of the starting material, e.g. in the form of a pasteurization. On the other hand, heating can also inactivate allergens and certain toxins as well as anti-nutritive compounds. In a preferred method embodiment, the condensed/aggregated/complexed proteins are made recoverable in the form of a sediment. The outlet of the sediment phase preferably accomplished via a bottom outlet and is fed to a further process sequence.

Process for Execution of Process Step 5):

Separation of the condensed soluble plant-based starting materials of step 4) to obtain a dehydrated condensate of step 4) and a clarified process water phase.

In a preferred process embodiment, the condensed/aggregated/complexed compounds of process step 4) are dehydrated to free them from bound process water, to purify, to condition, and/or to easily transport or to formulate them. Dehydrated in this context means that the organic compounds are partially freed from bound water. The sediment obtainable from process step 4) is preferably present as a suspension up to a viscous cream-like mass. Preferred is a dehydration which is carried out by means of filtration process techniques. Preferred is an application onto a belt filter. The preferred filters have a screen mesh size of 50 to 500 µm, more preferably from 80 to 350 µm and more preferably from 100 to 320 µm. Preferably, filter cloth made of polypropylene or other hydrophobic polymer threads are used. Preferred devices are belt filters, chamber filters or filter presses and chamber filter presses, as well as vacuum band filters. Also preferred are centrifugal processes, centrifuges or decanters are particularly suitable. The residual water content of the obtainable dehydrated condensate mass can be selected in a process-specific manner, so that e.g. a flowable or spreadable or dimensionally stable protein mass is obtained. In principle, a separation of the bound process water that is as complete as possible is desired. When using a decanter, the separation is preferably carried out at >2,000*g, more preferably >3,000*g and more preferably >3,500*g. The residence time in a decanter is preferably >10 seconds, more preferably >20 seconds and more preferably >30 seconds. Further preferred is a pressing process for removing bound process water.

Preferably, dehydration is achieved using a filter device with a water-permeable filter fabric/material. Preferably, the condensed or already dehydrated mass which is located, for example, in a filter chamber, is placed under pressure, whereby the residual moisture content can be reduced to the desired level.

It is preferred to carry out the process at ambient temperatures in a range between 15° and 40° C. In further advantageous embodiments, temperatures ranging between 5° and 15° C. and between 40° and 80° C. can be selected.

Preference is given to obtaining a dehydrated mass having a residual moisture content of <90% by weight, more preferably <80% by weight, more preferably <70% by weight and even more preferably <60% by weight and even more preferably <40% by weight.

In a preferred embodiment, one or more cleaning and/or conditioning and/or functionalization processes is/are carried out before, during and/or after dehydration, which is preferably carried out in a side-stream process. In a preferred embodiment, for this purpose, the condensed or dehydrated mass is applied onto a filter belt in a certain layer thickness and, with or without adding another filter onto this layer, a liquid and/or a vapor and/or a gas is flowed through it from below or from above. The re-drying can be done as before or with another drying method. The preferred liquid for this purpose may be water or an organic solvent. Preferred organic solvents are, for example, alcohols. The vapor may be water vapor or the vapor of a solvent. The preferred temperature range is between 40° and 250° C., more preferably between 50° and 180° C., and more preferably between 60° and 140° C. The preferred gas may be, for example, nitrogen or carbon dioxide. The preferred volume flow and the duration of the flow must be determined individually on the basis of the values of parameters that are to be achieved. In a further preferred embodiment, conditioning is carried out by adding one or more inorganic or organic compounds to the above-mentioned media, which flow through the condensed/dehydrated mass with the carrier stream.

The obtainable dehydrated soluble constituents/protein fractions obtained can be directly used in/for an application or can be stored or further processed. Storage which takes place in suitable containers is preferably carried out under refrigerated conditions, preferably <10° C., more preferably <8° C. and more preferably <6° C.

In a further preferred embodiment, a complete drying of the obtainable mass is carried out.

This can be done for example in the form of a granulation under hot air or a vacuum, according to known methods. Preference is given to suspending the already dehydrated mass in water or a liquid solution having a solids content of preferably 10 to 40% by weight. The suspension is preferably spray dried or freeze-dried. Such methods are known to the person skilled in the art. As a result, powdered mixtures, concentrates or isolates are obtained. Preferably, the major component of these products are proteins. However, other prior art drying processes and techniques can be used.

Method for Execution of Method Step 6):

Method step 6) aims for, providing and/or purifying the clarified process water phase of process step 5), as for cleaning of the recycled process water phase of process step 6) and obtaining a clarified and purified process water phase, which is subsequently reused in the process as a process water phase, preferably in one or more of the process steps 2a) and/or 2b) or 2) or in a side-stream procedure.

In a preferred embodiment, in this process step, a process water phase for a side-stream process method is provided from the clarified process water phase obtained from process step 5) and/or a side-stream process step. For this purpose, in this process step, preferably suspended matter and optionally very fine particles still present are removed from the process water. Preferably, prior art methods are used for this purpose. Particularly suitable for this purpose are fine and ultra-fine filters from the prior art. As a result, a turbidity-free water phase can be obtained.

In the preferred process embodiment of process step 6), a process water phase of a side-stream process method is conveyed to a suitable container. In a further preferred embodiment, the process water phase of this process step is purified in process step 6). The respective process water phases are purified individually, but it is also possible to combine the different process water phases.

In one embodiment, electrolytes such as sodium, potassium, calcium, chloride, iron, copper, etc. are removed, for example, by electrodialysis or ion exchange compounds. In a further embodiment, toxins and/or hazardous substances are removed by means of an adsorptive process technology, such as a column chromatography or passage through activated carbon.

In a further embodiment, thermolabile compounds such as enzymes, proteins, lectins or microorganisms or spores are inactivated and/or denatured by heating the process water to be purified to preferably >60° C. The exact temperature and duration of the heating depend on the type and amount of compounds to be inactivated/denatured. In a further embodiment, a reduction or removal of one or more condensing agents from the process water phase to be purified is carried out. The methods that are possible to be used for this purpose are to be selected in each case for the respective compound. Among the possible and known methods from prior art are, for example, titration with an acid or a base, the addition of a complexing or neutralizing agent, the implementation of a dialysis process, in particular an electrodialysis or the use of an adsorptive process. Preferably, in this process step, inorganic and/or organic compounds are separated and thus, flavor, aromas, bitter substances, colorant agents, toxins and hazardous substances or organic compounds that belong to "organic compounds" as defined herein are removed and are obtainable. For this purpose, the above-described methods are applicable, in particular methods such as column chromatography, dialysis or the use of a complexing reaction.

Preferably, during purification of one of the process water phases, no removal/reduction of the dissolved amino acids and/or peptides still present herein occurs.

With this process step, a clarified and purified process water phase is obtained, which is free or nearly free of: suspended matter, turbidity, toxins, harmful compounds and microorganisms, including spores, and condensing agents and, if necessary, of electrolytes or colorant agents or organic compounds.

Preferably, the clarified and purified process water phase does contain <3% by weight, preferably <1.5% by weight and most preferably <0.5% by weight of organic compounds, which do not correspond to any of the dissolved amino acids and/or peptides used according to the invention.

The preferred clarified and purified process water phase contains dissolved amino acids and/or peptides usable in a new/further process application. Particularly preferred is an embodiment of the method in which the dissolved amino acids and/or peptides are dissolved cationic amino acids and/or peptides.

Preferably, the clarified and/or clarified and purified process water phases obtainable with the process steps are stored in suitable containers, temporarily stored or directly reused. In one embodiment, the clarified and/or clarified and purified process water phase is cooled during the storage period. Preference is given to cooling to <10° C., more preferably to <8° C. and more preferably to <6° C. The shelf life of the clarified process water phase is preferably >7 days, more preferably >14 days and more preferably >4 weeks. Shelf life in this context means the absence of potentially harmful germs or pathogens or toxins in a concentration that is harmful to health. The clarified and clarified and purified process water phases suitable for reuse are safe for use in the production of food. The clarified process water phase can be returned to the process in the various process steps via a suitable pump and pipe system.

Reuse of Clarified and/or Clarified and Purified Process Water Phases.

In a preferred method embodiment, reuse of the process water phases is carried out in one of the process executions of process step 6).

In a preferred method embodiment, the clarified process water phase of the process step 6) is fed to the reaction container/reaction mixture of the side-stream process step 3-I) in the process-specific quantity and temperature.

In a further preferred embodiment, the clarified process water phase that was reused in a side-stream process method, which is obtained in process step 6), is fed without purification to one of the main process steps 2a), 2b), or 2) or 3). This can be done in any mixing ratio with a fresh water phase.

In another preferred method embodiment, the clarified and purified process water phase of process step 6) is supplied to process step 2a) by providing the liquid for dissolving the amino acids and/or peptides according to the invention in a suitable container and mixing with the unlocking compounds until they are completely dissolved. In a further particularly preferred embodiment, the process water phase of the process step 6) alone or together with a fresh water phase is fed in the process step 2b) in the form of an aqueous dispensing volume.

In the case of the alternative execution of process step 2), the process water phase of process step 6) can be used to dissolve the amino acids and/or peptides and to dispense disconnected/detached constituents of the starting materials.

In a further preferred embodiment, the process water phase of process step 6) is added to one of the side-stream process procedures. Preference is given to an inlet/feed line to the side-stream process steps 3-I) and/or 4-I).

The suitability for reuse in the various process steps can be demonstrated, for example, in that there are no qualitative and/or quantitative differences between the obtainable products of the process or the side-stream process as compared to the use of fresh water phases.

Method for Carrying Out Side-Stream Process Methods

With the process embodiments according to the invention, product fractions are obtained which can either be used directly for use or an added value of those products can be achieved by performing one of the side-stream process methods according to the invention for purification, or conditioning or functionalization, or for altering the composition, or attachment/incorporation of compounds thereof. Advantageously, the obtainable product fractions can in principle be treated with the same process methods/process steps and with the same production devices as are used in the main process methods.

In the system chosen herein, classification is performed in the following way: the first number refers to the procedure step, the execution method is classified with a suffix e.g. "-I" and process sub-steps are alphabetically numbered. With the methods according to the invention, products obtained or obtainable from the main process methods are advantageously purified/refined and/or conditioned/functionalized/ enriched with one or more compound (s) and/or separated/ sorted, to make them accessible for further processing or direct application. The processes are carried out as an option and can be carried out simultaneously or independently with regard to the time to the main process procedure and with each other. In a preferred method embodiment, the following optional method steps may be performed: side-stream process step 3-I):

a) purification, b) surface treatment, c) modification/ incorporation of compounds of/into solid matter, obtained from process step 3) and side-stream process step 4-I):

a) purification, b) surface treatment, c) modification/ introduction of compounds of/into dehydrated organic material, obtained from process step 4).

The solid matter of process step 3) is preferably a mixture of complex carbohydrates, cellulose-based fibers and lignin-rich shell fractions. The dehydrated organic mass of process step 4) is preferably dehydrated protein.

The following process executions can be carried out together in each process step or separately and at different times. The specific process parameters can easily be adapted by a skilled person to the particular product to be treated/ formulated.

In one process embodiment, the organic matter is purified, preferably by being enclosed by a filter material and preferably inserted into a bath of a liquid cleaning medium. In a further preferred embodiment, the organic material, which is preferably located in or enclosed by a filter material, is rinsed with a cleaning medium. However, resuspension in the cleaning solution is also possible. The preferred cleaning medium is water, further one or more alcohols in any mixing ratio with water. The cleaning medium may contain inorganic and/or organic compounds, preferably in dissolved form, which facilitate the removal of inorganic and/or organic compounds still present in the bulk.

In a further preferred embodiment, inorganic and/or organic compounds which condition the organic mass and/or functionalizes and/or in which these compounds are physico-chemically bound/combined with the organic mass are introduced. As a result, a multiplicity of advantageous effects on/at the solid constituents/organic mass can be achieved/produced. These include, but are not limited to: surface effects which may be classified as anti-static, hydrophilic, hydrophobic, oleophilic, amphiphilic, electrostatic with a positive and/or negative surface charge, hygroscopic and/or conductive. Multiple combinations of the aforementioned surface properties are also possible. The desired surface properties and the selection of the compounds which can be used for this purpose depend on the application of the products conditioned and/or functionalized therewith.

The incorporation and/or attachment of the inorganic and/or organic compounds to achieve these effects is preferably accomplished by dissolving one or more compounds in a suitable liquid medium and the liquid brought into contact with or penetrated by the products in an analogous fashion to the foregoing methods for purifying the products. The residence time, concentrations and reaction conditions are dependent on the desired product properties and must be determined in each case. Preferred liquid media are water, an alcohol or mixtures thereof.

Preferred compounds that can be used for conditioning/ functionalization include, among others, amines, e.g. betaine, furthermore amides, imides, imidazoles, triazoles, melamine, creatine, creatinine, carnitine, furthermore organic acids, such as acetic acid, tartaric acid, lactic acid, malic acid, maleic acid, gluconic acid, nitriloacetic acid, stearic or oleic acid, furthermore fatty acid esters, mono/ diglycerides, phospholipids, glycolipids, glyceroglycolipids, amino acids (especially arginine, lysine and histidine), mono-, di- or polypeptides, such as the RDG peptide. Furthermore, sugar compounds, such as dextrose or fructose, but also macromolecular surface functionalizations are possible, for example with polysaccharides, such as polydextrins or starch. Furthermore, cellulose derivatives, such as methylcellulose.

However, a surface functionalization can also be carried out by accumulation of reactive or reaction-promoting compounds in/onto the cellulose-based fibers/lignin-rich shells/ compounds of the organic composition, for example with carbonates such as sodium bicarbonate or silicates such as sodium metasilicate.

Further preferred is the attachment/incorporation of compounds in the form of micro-/nano-emulsions. Particularly preferred is the use of nano-emulsions of cationic amino acids or peptides, such as arginine or lysine, with organic acids such as linolenic acid or ascorbic acid. If desired, a pretreatment of the surfaces, for example to increase the reactivity, can be carried out using processes from the prior art, such as, for example, an alcohol, an oxidizing or reducing agent, such as, for example, an acid, an alkali or $H_2O_2$.

The aforementioned wet-techniques can, among others, also include a vapor phase, in which the aforementioned or other compounds can be dissolved.

If a wet-technique step has been carried out, one of the aforementioned techniques can be used to discharge/separate the liquid solution phase. Press filtration or vacuum filtration is preferred.

If a formulation of the products obtained is desired, further processing can be performed. Thus, for example, drying can be accomplished by application of the product phases to a belt-drying device. Further, a suspension may be prepared with an appropriate volume of water, and a powdery solid may be obtained by means of spray-drying or granulation formation.

Methods for Testing Product Properties

The water retention capacity can be determined by methods of the prior art. In one of the methods, the water content of a 0.5 g sample is determined and this is suspended in a 100 ml Erlenmeyer flask in 50 ml of distilled water. After agitation for 1 hour at 20° C., the free water phase is removed by filtering through a G3 glass frit; then, together with the glass frit, the sample material is centrifuged at 2,000 g for 15 min. The amount of centrifuged liquid and the sample weight are determined. The water retention value (WRR) is calculated according to the following formula $$WRR\ (\%) = \frac{\text{Sample } wett \text{ material mass} - \text{sample dry mass}}{\text{Sample dry mass}} \times 100$$

The oil retention capacity can be determined analogously using a liquid lipid phase, e.g. a paraffinic oil.

The water solubility (NSI) of proteins is determined according to the standard method AOCS 1990, (Daun and DeClercq, 1994)

Applications

The process methods according to the invention can in principle be used with all biogenic starting materials. The preferred plant starting materials may be in the form of unripe, ripening, ripened, overripe, aged, or even damaged plant-based starting materials. Contaminated or spoiled plant starting materials may also be used for the recovery of main process and side-stream process products of the present invention, thereby yielding the main constituents of the starting material in pure form.

The plant-based starting material may be in intact form, damaged, crushed, peeled, pressed, ground or otherwise disintegrated. In particular, groats or meal are suitable. In particular, also residues, resulting for example after a mechanical extraction of oils, so-called press cake, are suitable. Also suitable are plant-based starting materials which have previously been subjected to a thermal and/or liquid extraction process, e.g. with an alcohol or an organic solvent such as hexane. Also plant-based starting materials, in which a thermal treatment is carried out, are suitable. This also includes plant products that are obtainable from a digestion and/or fermentation process, in particular if they are residues, such as brewery residues (for example in the form of spent grains or grain flour) or pomace of apple cider production or olive pomace. In addition, residues of cocoa beans.

Preference is also given to residues of press residues which result, for example, from the extraction of juices (for example apple, tomato or carrot juice) or pomace, e.g. of grapes or apples or extracts, as obtained in the production of jellies or liqueurs (e.g., blackberry jelly, cassis).

Further, products resulting peeling, shelling or removal of cores of plant-based starting materials may be used.

The plant-based starting materials that can be used for any of the methods of the invention therefore include all plant seeds, such as linseed, poppy seeds, chia, amaranth, chili, tomatoes, anise, pia; Grains such as rapeseed, camelina, oats, hemp, wheat, buckwheat, rye, barley, corn, sunflowers, greens, jatropha; Seeds/pits, e.g. apples, pears, grapes, oranges, cherries, plums, apricots, peaches, vetches, medlars, mirabelle plums, rowanberries, pumpkins, melons, avocados; Legumes such as soybeans, field beans, mats beans, mung beans or kindey beans, peas, lentils such as e.g. Duckweed lupins or sesame seeds; Vegetables such as cauliflower, broccoli, kohlrabi, celery, zucchini, paprika, artichokes or okra; Beet plants, such as carrots or sugar beet; Fruits, such as apples, pears, quince, bananas, breadfruit, mango, kiwi, passion fruit, melons, passion fruit, figs, pumpkin, pineapple, avocado, olives, mango, chayote, guava, papaya, tamarillo, marmota apple, grape fruit, oranges, lemons or grapes; Berries, such as rose hips, gooseberries, blueberries, blackberries, strawberries, elderberries, currants, cranberries, blackberries, mulberries, apples, raspberries, sandorn; tuberous plants and roots, such as potatoes, beetroot, batata, turmeric, cassava, horseradish, celery, radishes, ginger, arakascha, taro, wasabi, yacon, salsify, asparagus, parsnip, mustard, Jerusalem artichokes, cattail, swede, Siberian angelica, yam root, yam, sunflower root, devil's claw or ginko; as well as cucumbers, such as salad or gherkin, as well as eggplant or zucchini; Nuts, such as almonds, hazelnuts, peanuts, walnuts, cashew nuts, Brazil nuts, pecans, pistachios, chestnut, sweet chestnuts, dates. Furthermore, sugarcane.

The products produced according to the invention can in principle be used in all areas of life as well as in industrial processes and process sequences.

The obtainable protein fractions can be used, for example, as food or nutritional supplements. Further, they can be used as a formulating agent in food preparations. They are also suitable for animal nutrition. The process can also be used for the removal of aromas and/or flavors and in particular for debittering of the starting materials or constituents of the starting materials.

Cellulose-based fibers obtained and produced by the process of the present invention are particularly suitable for human nutrition applications. In particular, it is suitable as a dietary food additive for calorie-reduced food preparations. In addition, cellulose-based fibers are suitable for dietary weight reduction. Additionally as a substitute or for the reduction of soluble carbohydrates, such as pectins or starch, in food preparations. Furthermore, as a substitute or for the reduction of oils or fats in food preparations. Cellulose-based fibers are suitable for regulating intestinal activity and altering/softening stool consistency. Further, they can be used as a dietary anti-oxidant. Cellulose-based fibers can also be used in animals for stool control and dietary weight reduction. Furthermore, cellulose-based fibers are suitable for the thickening and stabilization of liquid or flowable foods and food preparations. Cellulose-based fibers increase the water-binding and retention capacity of food preparations. As a result, cellulose-based fibers are also suitable for maintaining the water content in foods or food preparations or keeping them fresh and reducing the risk of dehydration for longer periods of time. Further, cellulose-based fibers can be used to incorporate and/or stabilize substances/compounds or microorganisms in foods or food preparations. This makes it possible, for example, to stabilize/distribute labile compounds, such as vitamins or antioxidants, in foods or preparations. Furthermore, microorganisms that exhibit increased metabolic activity, such as yeasts or lactic acid-splitting bacteria, can be introduced into foods. These properties of the cellulose-based fibers can also be used to cultivate algae or other microorganisms and use them to produce substances/compounds or gases with increased efficiency. Cellulose-based fibers produced according to the invention are particularly suitable for the preparation of lotions/creams/ointments or pastes for applications on skin or mucous membranes. They improve water retention on the surface of the skin and mucous membranes as well as improve emulsifiability of hydrophilic and lipophilic compounds as well as the incorporation of compounds such as antioxidants or sunscreen compounds and lead to improved smoothness of skin and mucosal areas.

Furthermore, cellulose-based fibers are very well suited as separation agents for food products/food, which are cooked at high temperatures with direct or indirect heat, such as roasting, baking, grilling or deep-frying. Thus, cellulose-based fibers are applicable as a separation agent or as a substitute for breadings/breadcrumbs, for example in preparations of meat or fish, and meat- or fish-products, potato or dough preparations. Furthermore, cellulose-based fibers are suitable for formulating or preserving other nutrients or food ingredients. This is in particular the case in the production of protein products, such as protein concentrates or isolates. However, preparations with oils/fats and/or soluble or complexed carbohydrates or aromas and flavors can be prepared and/or formulated and/or stored with the cellulose-based fibers according to the invention. Furthermore, cellulose-based fibers are suitable for creating a long-lasting moisture sensation on mucous membranes. Therefore, cellulose-based fibers are particularly suitable for treating a dry oral mucosa. In addition, cellulose-based fibers are suitable for reducing odors/aromas; in particular they are suitable for reducing or preventing halitosis.

Lignin-rich shell fractions, for example, are useful for adsorption and/or storage/transport of lipid phases. Furthermore, their use is preferred for improving the water binding capacity of soils, in particular cultivated soils. Furthermore, they are useful for formulating pet food products.

Furthermore, lignin-rich shell fractions are obtained, which due to the high water-binding capacity and the natural degradability and biocompatibility can be used to improve soil quality, especially in crop cultivation. But they can also be used for oil up-take/separation due to their high oil binging and absorption capacity.

The obtainable complex carbohydrates are preferably ground to raw materials for food in the form of a flour or starch. As such, they are suitable for the preparation of food preparations for humans and animals. These flours are also free of off-flavors.

The process according to the invention makes it possible to obtain protein fractions from a very wide variety of starting materials in an odorless and taste-neutral form and that can be prepared as a concentrate or isolate, in liquid to dry and powdered consistency. Therefore, the obtainable protein products can be used in all areas of life, especially for the nutrition of humans and animals. Furthermore, combination products can be produced with improved product properties in relation to the production and formulation of foods or food preparations.

Preference is given to the production of GMO-free products obtainable from vegetable GMO-free starting material.

EXAMPLES

Unless otherwise indicated, the following analytical procedures were used in the investigations:

The crude protein content of the samples was determined in accordance with LMBG § 3 5 L 03.00-27 based on the nitrogen determination using the Dumas method. To convert the nitrogen content into the crude protein content of the samples, the factor 6.25 was used. The determination of nitrogen was carried out with the Leco system FP-528.

The fat content of the samples was determined according to Caviezel® with the DGF unit method K-I 2c (00). Determination was carried out with a Buchi B-815 extraction unit and a Buchi B-820 fat estimator.

The proportion of free fatty acids in the lipid phase was determined by methanolic KOH titration. Values are in % by weight (g/100 g). The pH was determined with a glass capillary electrode (Blue-Line, ProLab 2000, SI-Analytics, Germany).

The concentration of benzo-a-pyrene was carried out according to the DGF method III 17a.

Droplet or particle size determinations were made by non-invasive laser light backscatter analysis (DLS) (Zetasizer Nano S, Malvern, UK). For this purpose, 2 ml of a liquid to be analyzed was filled into a cuvette, which was then inserted into the measuring cell. The analysis on particles or phase boundary droplets is performed automatically. It covers a measuring range from 0.3 nm to 10 µm.

Quantification of the turbidity (turbidimetry) of the water phases (aqueous emulsions) was also carried out by means of scattered light detection, in which the re-entry of a scattered beam at 90° is determined with a probe immersed in a sample volume of 10 ml (InPro 8200-measuring sensor, M800-1 transmitter, Mettler Toledo, Germany). The measuring range is 5 to 4000 FTU. Each sample was always tested in duplicate.

The water binding capacity (WBC) of the protein products was determined at room temperature. The method was essentially based on AACC method 56-20.

A 2 g sample was weighed to the nearest 0.01 g placed in a centrifuge tube and mixed with 40 ml demineralized water for one minute with a test tube shaker. After 5 min and after 10 min, the mixture was vigorously mixed with the test tube shaker for 30 seconds. It was then centrifuged at 1,000*g and 20° C. for 15 min. The supernatant was decanted. The centrifuge tube was back weighed. The weight of the water-saturated sample was determined.

The fat binding capacity of the protein products was determined at room temperature. Aliquots of 3 g were dispersed in a graduated 25 ml centrifuge tube in 20 ml of oil (commercial corn oil). Subsequently, it was centrifuged at 700*g for 15 min. The volume of unbound oil was determined. The oil binding capacity is given in ml of oil/g protein.

To determine protein solubility at a defined pH, the method according to C. V. Morr was used. Samples of 1 g were weighed and placed into a 100 ml beaker. With stirring, 40 ml of a 0.1 mol/l sodium chloride solution with defoamer was added. The pH was adjusted to the desired value with 0.1 mol/l hydrochloric acid or 0.1 mol/l sodium hydroxide solution. The solution was transferred to a 50 ml volumetric flask and made up to the defined volume with 0.1 mol/l sodium chloride solution. From the solution, 20 ml were pipetted into a centrifuge tube and centrifuged for 15 min at 20,000*g. The resulting supernatant was filtered through a Whatman No. 1 filter. In the filtered supernatant, the nitrogen was determined according to Dumas (system Leco FP 521).

In the clarified process water phase after separation of the condensates, the amounts of 4-O-caffeoxylchin acid and ferulic acid were determined.

To determine the emulsifiability of the protein fraction, 20 g of the dried protein mass was dissolved in deionized water (for this purpose, one part of protein is emulsified with 10 parts of water and oil (1:10:10) to determine the amount of oil that separates from the emulsion). After complete dissolution carried out at 25° C., a refined rapeseed oil (phosphorus content <0.5 mg/kg) in increments of 10 ml over 2 minutes was added. Thereafter, the emulsion was allowed to rest for 5 minutes and then checked to see if an oil phase was forming. The total amount of oil until phase separation was reached was calculated from the initial amount of protein dry mass. (Emulsifying activity index [EAI] according to Pearce and Kinessla (PEARCE, K. N., and KINSELLA, J. E.: Emulsifying properties of proteins: Evaluation of a turbidimetric technique J. Agric., Food Chem., 26, 716-723 (1978))

All investigations were carried out under normal pressure conditions (101.3 Pa) and at room temperature (25° C.), unless stated otherwise.

Example 1

Studies on the Unlocking of Plant-Based Press and Ground Products.

Samples of 500 g of rapeseed press cake (RPK) in the form of pellets with a residual oil content of 9% and 500 g of flour of dried lentils (LM) with a mean particle size of 200 µm, respectively, was filled into beakers. An investigation series was carried out in which the time course and the up-take of aqueous unlocking solutions were investigated.

For this purpose, 250 ml of the aqueous solutions were initially added to the press cake pellets and the ground products, respectively, in test series A), and the contents of the beakers were slowly mixed with a kneading stirrer. Once no free water phase was visible, 25 ml of the corresponding aqueous solution was added. This procedure was carried out until a homogeneous slurry not containing a liquid phase had formed. The study was terminated after 6 hours, unless the study target had already been reached. The average amount of the aqueous solutions which was completely absorbed in each case in test series A was added directly to the press cake or flour series of tests (B), and mixed with the kneading stirrer for 15-minute intervals for a total duration of 6 hours. In the follow-up experiment B1), at the end of each time point in the test series B), 10 g of the mass was dissolved in 90 ml of water in a narrow graduated glass cylinder and the mixture was shaken well. Subsequently, the sedimentation behavior of the visible components was observed. In a further follow-up experiment B2) 10 g of the mixtures obtained as for B1) were dissolved in 90 ml of water by shaking and then passed through a vibrating sieve with a mesh size of 100 µm. The sieve residue was dried in a vacuum oven to complete dryness and then weighed. On the basis of the determined values, the time at which the lowest amount of solids was obtained was identified. The sieve residue of the repeat tests was examined by reflected light microscopy. It was assessed whether the particles are coherent and adhesions of organic compounds are recognizable; furthermore the morphology of the particles were evaluated.

The following aqueous solutions were prepared and used: 1) deionized water, 2) 0.1 molar sodium hydroxide solution, 3) SDS 3% by weight, 4) arginine 300 mmol/l, 5) lysine 300 mmol/l, 6) histidine 300 mmol/l.

Results:

Upon exposure to water, the presscake disintegrated into large particles with virtually no dissolution of soluble components, thus, no complete dissolution of the particles took place during the investigation period. Therefore, the required liquid volume for complete solution could not be determined. However, for RPK and LM, which were unlocked with the unlocking solutions 2)-6) and were present as a homogeneous mushy mass, decomposition into soluble and insoluble corpuscular constituents in an aqueous dispensing volume was observed. In the case of the mixtures which had been prepared with unlocking solutions 2) and 3), a coarse-grained pulp was produced during the investigation period, whereby the maximum amount of liquid taken up was less than that obtained when using unlocking solutions 4)-6). With the dispensing step in experiment B1), the corpuscular constituents of RPK and LM rapidly sedimented in solutions 4)-6) to form a black solid layer at the bottom, followed by a layer of beige solids, which was covered by a homogeneous yellow overlying suspension. In the dispensing solutions of compounds 2) and 3) large particles quickly settled, while smaller aggregates sedimented more slowly, so that the sedimentation process was completed much later than was the case after unlocking with the compounds 3)-6). Furthermore, there was no layer formation of the differently colored particles in the sediment phase. In the B2 study series, the minimum achievable sieve residue mass was significantly less for samples treated with the unlocking compounds 4)-6) than for samples treated with solutions of compounds 2) and 3).

Even after the maximum exposure time of the solutions 2) and 3), the recoverable sieve residue of the unlocking phases was significantly greater than that which had been achieved with the unlocking solutions 4)-6) after 30 minutes. In the microscopic analysis, coherent aggregates of numerous smaller particles were found at all time points in the specimens prepared with unlocking solutions 1)-3). Furthermore, the aggregates or particles were predominantly covered by an organic layer, the caking and amount of adhering material correlated with the determined dry weight of these samples. In contrast, after an unlocking time of between 10 (LM) and 30 (RPK) minutes in the samples treated with unlocking solutions 4)-6), no coherent aggregates of particles were present and the particles were isolated. Furthermore, attachments of organic material to the surfaces of the particles were only occasionally present. In these preparations, material with cotton-like or coral-like tissue-like structures was discovered, which was determined to be cellulose-based fibers in a later analysis. In addition, shell particles were identifiable, which were later analyzed to be lignin-rich shells. Furthermore, the lighter colored particles having different configurations were later identified as starch aggregates in a later analysis.

Example 2

Investigation of Unlocking Conditions in Plant-Based Starting Materials.

The following press residues in the form of pellets and milling products in the form of a flour with following contents of the main ingredients were investigated: soya press cake (SPK): proteins 38% by weight, carbohydrates 26% by weight, fibers 21% by weight, oil 11% by weight, other 4% by weight; Rapeseed press cake (RPK): proteins 35% by weight, carbohydrates 21% by weight, fibers 30% by weight, oil 9% by weight, other 5% by weight; jatropha press cake (JPK): proteins 32% by weight, carbohydrates 22% by weight, fibers 25% by weight, oil 13% by weight, other 8% by weight; oatmeal (HM): proteins 40% by weight, carbohydrates 30% by weight, fibers 18% by weight, oil 8% by weight, other 4% by weight; lentil flour (LM): proteins 33% by weight, carbohydrates 33% by weight, fibers 25% by weight, oil 6% by weight, other 3% by weight.

First, the required time for unlocking was determined independently for 50 g of each starting material, which was placed in glass vessels containing 1,000 ml of solutions a) arginine 0.2 molar, b) histidine and lysine each 0.1 molar, c) poly-arginine 0.1 molar and glutamic acid 0.1 molar, d) NH3 0.2 molar, e) KOH, 0.2 molar, f) urea 0.3 molar, and mixed at frequency of 50/min. The time required until there were no more visible solid aggregates present in the forming suspension. The suspension was then passed through a vibrating screen with a screen mesh size of 100 µm and the filter residue was examined microscopically in accordance with Example 1. Then a test was carried out to determine the minimum volume required for complete impregnation/wetting and unlocking of the starting materials by adding to each 100 g of the starting materials, starting at a weight ratio of 1:1, whereby another 50 ml of the respective unlocking solution was admixed with slow rotation for the period of time determined in the preceding study that was required for complete unlocking for the respective unlocking solution. Samples were taken at the end of the respective minimum exposure duration and centrifuged at 3,000 rpm for 3 minutes.

The sufficient volume to produce a complete swelling was determined for the mass ratio between the starting material and the unlocking solution ($P_{ref}$), in which after centrifugation of a sample, only a minimal free liquid layer was present as a supernatant. Then 10 g from each of the batches, with which the minimum required volume of the respective batches had set a maximum achievable swelling, was added to 90 ml of city water, dispensed by shaking and then passed through a vibrating sieve with a sieve mesh size of 100 µm. The eluate was passed through a 10 µm ultrafine screen. The respective filter residue was suspended in water and the particulate structures present therein were analyzed microscopically after an identically performed filtration (test procedure according to Example 1). The sieve residue was dried during a test repetition and the substance amount of the retained particles was determined. In a further study, 100 g of the mass of the mixture $P_{ref}$ were mixed in 900 ml of water with a laminar rotary mixer for 5 minutes. The suspension was then passed through a vibrating screen. From the eluate (eluate 1), a 10 ml sample was taken for the determination of nitrogen content. The sieve residue was freed of bound water in a chamber filter press and the residual moisture content was determined. Then the press residue was suspended in a 0.5 molar NaOH solution and mixed for 1 hour. The suspension was again passed through the vibrating screen and the filter residue was dried with a chamber filter press. In the obtained eluate (eluate 2), the content of nitrogen-containing compounds was analyzed and the relative proportion to the amount of nitrogen-containing compounds contained in the eluate 1 was calculated. Furthermore, the mass ratio between the protein content determined in eluate 1 at the individual examination times and the protein content determined in eluate 1 at which maximum swelling (ZP $Q_{max}$) was determined.

Eluate 1 of the various starting products was used to obtain a protein fraction. For this purpose, the following solutions were added dropwise to 10 ml each of the eluate 1:1) citric acid, 2) lactic acid, 3) aluminum chloride, 4) calcium chloride, in each case as a 10% solution by weight. The contents of the container were slightly agitated. As soon as clearly discernible cloudy or flake-like structures became visible after a batch-wise addition, an investigation was carried out on the completeness of the condensability of dissolved organic compounds before further metering. For this purpose, a sample (2 ml) was removed from the reaction mixture and centrifuged. To the supernatant a small amount (50 µl) of the condensing agent was added and mixed therewith. If there was no further formation of recognizable structures, sufficient dosing of the condensing agent was achieved and the addition of condensing agents was stopped. After a 15 minute standing time, centrifugation was carried out at 3000 rpm. The pH of the supernatant was determined and an examination of the degree of turbidity and of the presence of suspended matter was carried out. The resulting solid was separated and the dry weight determined. Subsequently, the protein content of the dry matter obtained was then determined (for the determination procedure see analysis method). The determined value was related to the protein content which had been determined in $P_{ref}$.

Results:

Despite a significantly larger swelling volume which was present in an unlocking process with the solutions a)-c), compared to the solutions d)-f) (+160 to +240 wt % vs.+80 to +140 wt %) the duration to achieve this, was significantly shorter (8 to 20 minutes vs. 45 to 300 minutes).

In the sieve residue (sieve mesh size 100 µm) obtained after dispensing of the samples of the unlocking mixtures at the time of maximum swelling in a dispensing volume which had been prepared by unlocking with the solutions a)-c), no aggregates of solid matter were found in the microscopic analysis which were virtually free of adhering organic residues. In contrast, in residue of an unlocking process with unlocking mixtures prepared with solutions d)-f) at ZP $Q_{max}$, numerous aggregates/conglomerates of solid matter were partially or completely enclosed by organic matter. In contrast to the sieve residues of the samples which had been obtained with solutions a)-c), in which large-volume and expanded cellulose-based fibers were present, these were only recognizable in isolated and slightly expanded form. On the very fine filter (sieve size 10 µm) of the eluate of the previously performed filtration, virtually no particulate structures were detectable after unlocking with the solutions a) to c), whereas the eluates resulting from an unlocking process with solutions d) to f) contained numerous solid particles partly covering the filter surface; these particles were predominantly cellulose-based fibers which had a high content of organic compounds. The dry weight of the sieve residues after unlocking and dispensing of the soluble and dissolved constituents was significantly greater for the samples obtained from unlocking with solutions d-f) than for those obtained by unlocking with the solutions a)-c) (+130 to +350% by weight). The protein content in eluate 1 at ZP $Q_{max}$ (as well as at all other measurement time points) was significantly higher if the starting materials were unlocked with one of the solutions a)-c) (58 to 82% by weight), than after unlocking with the solutions d)-f) (49 to 56% by weight). By unlocking of the sieve residue with an alkali, which had been obtained after unlocking with the solutions a) to c), virtually no more proteins were released by the material, while in the sieve residue of the unlocking mixture obtained by approach with the solutions d) to f) further proteins were removed (between 8 and 22% by weight).

With the condensing agents, in the protein-containing eluate 1, which had been obtained after unlocking with solutions a) to c), there was condensing and formation of large-volume cloud-like structures observed already after the addition of small volumes, thus, leading to a clarification of the previously strongly turbid water phases and resulting in formation of condensates which sedimented only very slowly. The volumes sufficient for complete condensation were between 2 and 12% by volume for solutions 1-4. In contrast to this, for the condensation of the eluates after unlocking with the solutions d)-f) significantly greater addition volumes were required or a clarification of the water phase was not possible/achievable (condensation solution 4 without effect, therefore without result) (addition volume between 15 and 26 (maximum permissible dosing volume) Vol %). The pH of the clarified water phases of the eluates obtained after unlocking with solutions a) to c) ranged between 6.8 and 7.5. In contrast, the pH ranged between 3.8 and 5.2 after addition of condensation solutions 1-3, in which condensation occurred, for the eluates prepared with unlocking solutions d) to f).

Example 3

Investigation on Obtaining Protein Products.

Non-pelleted sunflower seed press-cake (SPK) and a soybean meal (SM) were used for the investigations, with proportions of the main constituents of: proteins 36% by weight, carbohydrates 27% by weight, fibers 23% by weight, oil 9% by weight, others 5% by weight, and proteins 42% by weight, carbohydrates 25% by weight, fibers 21% by weight, oil 10% by weight, other 2% by weight, respectively. A study was carried out on the unlocking duration and the determination of the minimum volume of the unlocking solution according to Example 2 with the unlocking compounds a) histidine 0.2 molar, lysine 0.1 molar, valine-isoleucine peptide 0.2 molar; b) lysine 0.1 molar, glutamic acid 0.1 molar; c) arginine 0.2 molar, d) poly-lysine and histidine 0.2 molar. The least amount of time for complete unlocking in the presence of the largest swelling volume was given in SPK by unlocking solution c), a 7 minute period and a volume ratio of the unlocking solution to the SPK of 2.5:1 and in SM by solution d) for a time of 8 minutes and a volume ratio of the unlocking solution to the SM of 3:1. In each case, 5 kg of SPK and SM were unlocked with the abovementioned solutions and concentrations of the unlocking compounds and the adjustment parameters, performed at 25° C. in a container which allowed continuous mixing. Successful unlocking was tested according to the experiment described in Example 2, by shaking 50 g of the unlocking mass in 1,000 ml of water and then filtering it through a vibrating screen with a sieve mesh size of 100 µm. The unlocking process was complete when there were no aggregates of solid matter in the filter residue. The water volume addition ratio for the dispensing phase was determined by preparing a dilution series in which water was added in increasing proportion to 50 g of the unlocking mixture and after vigorous shaking dehydration was performed in a 2-stage filtration with a sieve size of 100 µm and 10 µm. By doing so, the water volume ratio which resulted in no adherence of organic material to the solid filter residue fractions and no discernible deposit on the 10 µm sieve by microscopic examination was determined. The total amount of water added to dispense the ingredients was set for SPK to a dry matter ratio of 8:1 and for SM to 12:1. Then 10% of the determined water volume was added to the unlocking mixture to produce a mushy mass which is flowable and pumpable. A convey was achieved to a piping system connected to an in-line rotor-stator shear mixer (LDF, Fluko, Germany). Connected to the piping system was an inlet for water from a reservoir, the supply and metering of the flow rates as carried out in each case by a progressing cavity pump, so that an adjustable ratio was supplied to the mixer. The phases were mixed at a rotation speed of 2,500 rpm and a volume flow rate of 2 l/min. The dispensing solution was placed in a container with a conical bottom using continued dispensing with a laminar mixer. The dispensing phase was passed through a bottom outlet via a 3-stage vibrating sieve device (sieve mesh dimensions: 500 µm, 100 µm and 10 µm), the eluate was introduced into a further collecting container with a conical bottom and the sieve residues were placed in separate containers. Samples of the eluate (100 ml each) were added in portions to aqueous solutions of increasing concentrations of citric acid, lactic acid, $CaCl_2$ and $MgCl_2$ individually and in combination, and the amount of condensate formed was determined by centrifugation after 15 minutes. The condensing agent solution or combination in which complete condensation of the dissolved organic compounds was possible with the lowest additional volume (test method according to Example 2) was selected for the further experimental procedure: for SPK 33% citric acid solution in a volume ratio of 2% by volume and 20% by weight % $CaCl_2$ solution in a volume ratio of 3.5% by volume; SM 15% lactic acid solution in a volume ratio of 4% by volume and a 20% by weight $MgCl_2$ solution in a volume ratio of 4% by volume. In each case, the solutions were mixed by a laminar mixing process followed by a settling time (service life) of 60 minutes.

The container contents were pumped to a decanter (Baby 1, Piralisi, Germany) at a delivery rate of 200 l/h and a centrifugal acceleration of 3,000*g. In both experiments, a dimensionally stable mass was obtained in which the content of water, proteins and carbohydrates was determined. The clarified process water phase (PWP1) was sent to collecting tank 1. One liter of the clarified water phase was evaporated and the dry matter of the residue determined. Furthermore, the protein content of the dry residue was determined. Finally, the sieve residues were dewatered by means of a chamber filter press and the water phase obtained was filled into collection tank 1. The experiments were repeated twice, with the addition of water for the dispensing phase from the respective collection tank, which included the clarified process water phase of the previous experiment.

Results:

It could be shown that by using process parameters that have been determined in a test series, SPK and the SM could be unlocked so that the soluble components could be obtained and separated from the solid matter without leaving any residue. Only if the residues on the 100 µm sieve showed no adhesions of soluble organic constituents, particles were present which were microscopically indistinctly and unsharply bordered and were not separable from each other or there was a continuous coating present on the 10 micron sieve. Unless there was any evidence of build-up of soluble organic compounds on the solid matter residues that were present on the 100 µm sieve, there was no discernible residue on the 10 µm sieve. Upon obtainment of residues that are free from organic attachments, voluminous cotton-like tissue-like structures were usually present in the residues of the 100 µm sieve. Furthermore, residue-free particles which corresponded to complex carbohydrates in the chemical analysis were present only in the sieve residue of the 500 µm sieve, if the solid matter of the sieve residue in the 100 µm sieve was obtained without any soluble organic residue. With the chosen condensing agents a virtually complete removal of the dissolved proteins was achieved; in the clarified water phase <1% by weight of the amount of proteins contained in the starting material was present. The centrifugally separated masses had a protein content of 64% by weight for SBK and 72% by weight in SM. Carbohydrates were also present in a proportion of 34% by weight and 26% by weight. The residual moisture content of the masses was 72% by weight or 67% by weight. Upon repeating the investigations, in which the clarified water phase after protein separation was completely reused, there were no procedural differences in the process sequence compared to the initial process execution. The protein content in the resulting protein fraction tended to increase slightly.

Example 4

Examination for Removal of Toxic and Bitter Agents of Plant Seed Components and Plant Grain Products In each case, 500 g of Jatropha (JKP) and soybean (SPK) press cakes and market-pea (MEM) and lupine (LM) flours with a mean grain size of 300 µm were investigated.

Unlocking was carried out in JPK and SPK with an aqueous solution mixture of arginine 0.3 molar, lysine 0.2 molar and alanine 0.2 molar (pH 12.2) in a volume ratio of 1.5:1 and in MEM and LM with an aqueous solution mixture of arginine 0.2 molar, lysine 0.3 molar, phenylalanine 0.2 molar, benzyl-glutamate 0.1 molar in a volume ratio of 2.5:1.

After complete mixing, a standing time of 6 hours was carried out, wherein one half of the batches were stored at 25° C. (t25) and the other half at 50° C. (t50) in a closed vessel. The dispensing phase was carried out with tap water in a volume ratio of 9:1 for JPK and SPK and 8:1 for MEM and LM. The mixing and separation of the aqueous protein solutions as well as the examination for the completeness of removal of dissolved compounds were carried out as described in Examples 2 and 3. The obtained protein masses were placed onto a filter pad (screen mesh size 80 µm) and dehydrated at a pressure of 100 kg/cm$^2$ and dehydrated. The residual moisture content before and after the dehydration was determined. The dehydrated protein fraction was sampled to determine the water retention. For this purpose, in each case 0.5 g of a sample was suspended in a 100 ml Erlenmeyer flask in 50 ml of distilled water. After agitation for 1 hour at 20° C., the free water phase was separated using a G3 glass frit; afterwards, the sample material along with the glass frit was centrifuged at 2,000*g for 15 min. The water retention value (WRR) was calculated on the basis of the amount of centrifuged liquid and the sample weight (for formula see Methods). The dehydrated protein preparations were tasted by 3 experts. The following were evaluated: taste neutrality, presence of astringents/bitter substances, oral solubility. Samples of the starting material and of the protein mass obtained were taken to analyze the protein concentration and the toxins/bitter substances and from this the reduction achieved was calculated.

Results:

The unlocking procedures allowed fiber-free protein solutions to be obtained in which complete condensation and separation of the proteins was achieved. The protein content was between 62 and 81% by weight. Mechanical extraction allowed dehydration of the resulting pulpy protein masses to be achieved. The proportion of water was reduced from 150 to 280% by weight to 50 to 80% by weight so that the condensed protein fractions had a consistency that was dimensionally stable. There were WRR values between 51 and 75% for the resulting dehydrated proteins, which could be resuspended very well in a water phase. In the sensory evaluation, none of the samples had a typical (intrinsic) taste, the preparations were completely or almost taste-neutral. Also, no bitter substances were noticeable and there was no astringent effect. All dehydrated protein preparations dissolved quickly in the mouth, leaving a pleasant mouthfeel. In the chemical analysis, a reduction of the toxic or undesirable compounds could be shown for the dehydrated protein fractions obtained as compared to the starting material, e.g. there was a reduction of soybean agglutinins by 92% by weight and free fatty acids were reduced to values <0.1% by weight.

Example 5

Investigation of the Separability of Complex Carbohydrates and Starch Granules and their Properties.

500 g each of the following starting materials (mean particle size/distribution range) mechanically disintegrated into a groats or a coarse flour were investigated: lenses (LG) (375/80-1,080 µm), peas (EG) (290/50-780 µm), soybean (SG) (350/120-2,300 µm) and corn (MG) (245/180-2,100 µm).

An unlocking process was carried out according to Example 2 with 1) poly-arginine+lysine 0.3 molar; 2) histidine+poly-lysine+benzylglutamate 0.2 molar, which were dissolved in water. Initially, an investigation was carried out to determine the maximum swelling volume and the determination of the dispensing volume to obtain sufficient dispensing of the constituents according to Examples 1 to 3. In the preparations LG and SG unlocking was performed, in that have been treated according to the swelling method according to Example 1, which was followed by subsequent dispensing in a dispensing volume. For preparations EG and MG, unlocking was carried out by adding the preparations immediately to the total volume of aqueous phases determined in the pre-examination for the unlocking of the constituents. The suspension was filtered with a sieve (sieve mesh size 180 µm), which was overflowed by the suspension. The sieve residue was resuspended in water in a weight ratio of 1:3 and the suspension was filtered in 2 stages (sieves mesh sizes 500 and 150 µm). The filter residues were analyzed by reflected-light microscopy according to the evaluation criteria of Example 1 and an analysis of the size distribution of the particles was carried out by differential sieving (Analysette 3, Fritsch, Germany). The sieve residue of the 500 µm sieve (SR 1) was placed on a sieve and dried in a circulating air drying oven at 70° C. A sample of the filter residue of the fine sieve 150 µm/SR2) was also dried and the rest stored refrigerated. The dried SR 1 was again analyzed for size distribution of the particles.

Thereafter, the dried residues were ground to an average particle size of 150 to 250 µm and then used for baking experiments. To this end, 50 g of the flour was mixed with 35 ml of water, 2 g baker's yeast and 0.2 g of salt and stored for 1 hour and then baked. The volumes of the baking samples after the initial preparation and after the storing phase were determined. For comparison, baking samples were prepared with commercial flours of the starting materials and with a flour obtained from the respective starting materials which was ground in order to obtain a comparable result concerning the particle size and in which the same preparation conditions were used. The baking results were evaluated sensory by 4 experts with regard to the volume and the air chamber distribution of the dough (s), the taste and the mouthfeel.

Results:

With both the swelling process and the process in which liquid volume corresponding to the sum volume required for maximum swelling and sufficient dispensing of constituents of the starting material is use immediately, it was possible to unlock and separate the soluble and insoluble constituents of the starting material. The filter residue which was obtained after separation of the soluble constituents of the starting material contained only a small amount of soluble constituents which could still be removed when redistributed in a water phase. By using a coarse filter (500 µm) it was possible to separate practically selectively complex carbohydrates, from the suspension of solid matter which are present in the form of intact starch granules and fragments of such granules which, as was evident in microscopy, were swollen. Adhesions of other components were not recognizable. In the sieve analysis, it was found that the drying resulted in a reduction in the particle size of the particles by 140 to 250%. The dried material was easily ground to a gritty granulate and ground to a fine flour. The flour had a carbohydrate content of >95%.

The proportion of nitrogen-containing compounds was <1%, the proportion of fibers was <0.5% by weight.

In the baking test, the volume of the baking samples made with the flours obtained from the unlocking process compared to that of samples made from the flour of the ground starting material was larger at an extent of between 150 and 220% by volume after pasting and between 270-300% after baking, and in comparison to comparative products this difference was between 60 to 110 vol % after pasting and between 120 to 180 vol % after baking. The air chamber distribution of the baking samples prepared with flour from the unlocking process was finer compared to a preparation with a comparative preparation and was much more finely dispersed than when a flour of the starting material was used. The sensory evaluation gave a very good taste and mouthfeel for baked samples made with a flour of the complex carbohydrates obtainable by the unlocking process which were comparable or better to that of baked samples made with a commercial product. The baked samples made with a flour from the starting materials had a negative rating of taste and mouthfeel.

Example 6

Investigation of the Unlocking and Separation of Lignin-Rich Shell Fragments and Cellulose-Based Fibers.

The chamber filter residue after unlocking of the Jatropha (JPK) and the rapeseed press cake (RPK) from Example 2, which had a residual moisture after pressing of 35 or 45% by weight, were used for the following experiment. Each 100 g of the crumbly residues were dispensed in 2 liters of tap water (LW) with a shear mixer for 60 seconds. After passage of the agitated suspension through a preliminary sieve with a mesh size of 500 µm, the filtrate was introduced into a hydrocyclon (Akavortex, AKW, Germany) by means of a pump at a pressure difference of 1 bar. The drain from the lower outlet was collected and mixed with tap water in a 1:5 ratio and recycled to the hydrocyclone. The drain from the upper outlet of both separation processes was freed of suspended matter by a vibrating sieve with a sieve mesh size of 200 µm to obtain sieve residue 1 (SR 1). The underflow was separated from the free water phase and minute particles by a 200 µm vibrating screen to give screen residue 2 (SR 2). The masses of lignin-rich shells (SR2) as well as a sample of the cellulose-based fibers (SR1) were spread on a fine screen and dried with warm air. The remaining mass of cellulosic-based fiber was pressed to remove bound water and stored under cooled conditions until further use. Samples were then taken for microscopic and chemical analysis. The dried SR2 was then milled. Samples were taken for reflecting-light microscopic and chemical analysis of the composition of the particles. To test the water binding capacity, 100 g of each was added to a narrow-base beaker, which had a lateral discharge in the bottom area. Water was added dropwise to the shell material from the top until water emerged from the outlet. The volume ratio between the dry matter amount and the bound water was calculated. The same experiment was carried out with a lamp oil instead of water and the oil binding capacity was calculated. A sample of the SR1 was suspended in deionized water in a volume ratio of 1:10 for 3 minutes by stirring, and then the dimensions of the cellulosic based fibers herein were determined with a FiberLab FS 300 (Valmet).

The entire experiment was repeated using the same volume of clarified process water phase (PWP 1) from Example 3 instead of fresh water (LW). The process water phases of the repeat experiment obtained after the separation process were combined and stored as PWP 2 under refrigeration.
Results:

The solid matter which was contained in the filter cake, and made obtainable following the unlocking process could easily be resuspended and hydrated upon redispersing in water, which was evidenced by rapid spontaneous separation of the lignin-rich shell portions from the cellulose-based fibers which settled rapidly, while the cellulose-based fibers had only a low sedimentation rate. By means of a hydrocyclone, a separation efficiency between cellulose-based fibers and liginin-rich shell fractions of about 80% for the fraction from the upper drain and about 70% for the fraction from the lower drain could be estimated during the first separation.

After the 2nd separation of the individual solid phases, the separation result for both fractions was >95% in both fractions. Microscopically, no deposits of organic constituents were recognizable on the resulting solid preparations. The water binding capacity of the dried lignin-rich shells was between 250 and 300 wt % and the oil binding capacity between 280 and 320 wt %. For the dried cellulose-based fibers, values of the water-binding capacity of 290 to 340% by weight and for the oil-binding capacity of 220 to 310% by weight were determined. The chemical analysis of the lignin-rich shell constituents revealed a lignin content of between 52 and 73% by weight.

When using clarified process water phase PWP1, which was obtained following condensation and separation of the soluble compounds from the reaction mixture, for the hydration of cellulose-based fibers and lignin-rich shell portions which have previously largely freed from binding water, it was found that the cellulose-based fibers had a lower sedimentation rate after hydration compared to the use of fresh water. Furthermore, the process water phase obtained at the end after the separation of the solid matter was significantly more turbid than the comparable process water phases when using a fresh water phase. There was also a difference in the products obtained when using PWP1 compared to fresh water. In an analysis of the volume dimensions of cellulose-based fibers, which were resuspended upon receipt from this separation process, it was found that significantly larger volumes (+158 to +340 vol %) were present in cellulose-based fibers, which had been dispensed and solvated with the PWP 1 than those obtained from the same process but using a fresh water phase. Furthermore, a larger water (WBK) and oil-binding capacity (OBK) was achieved for lignin-rich shell fractions and cellulose-based fibers when PWP 1 was used for dispensing and rinsing: lignin-rich shell fractions: WBK+80 to +120%, OBK+40 to +110%; cellulose-based fibers: WBK+180 to 240%, OBK+30 to +130%. Furthermore, in the first separation cycle with the hydrocyclone there was a better selectivity for cellulose-based fibers (>90%) and lignin-rich shell fragments (>80%) than was the case when the dispensing and rinsing process was carried out with fresh water.

The chemical analysis showed that the nitrogen content present in the cellulose-based fibers and in the lignin-rich shell fractions was 40 to 55% lower when the dispensing of the press residue was carried out with PWP 1.

Example 7

Investigation of the Thermal Disintegration of Plant Starting Materials.

For the investigations, 3 kg of each of the following raw materials in uncomminuted and untreated form were carried out with the specified constituents: Soybeans (SB): proteins 35% by weight, carbohydrates 19% by weight, fibers 25% by weight, oil 18% by weight, other 3% by weight; Kidney beans (KB): proteins 38% by weight, carbohydrates 20% by weight, fibers 32% by weight, oil 8% by weight, other 2% by weight; Hazelnuts (HK): proteins 29% by weight, carbohydrates 22% by weight, fibers 28% by weight, oil 18% by weight, other 3% by weight; Peas (E): proteins 40% by weight, carbohydrates 32% by weight, fibers 22% by weight, oil 4% by weight, other 2% by weight; Lentils (L): proteins 33% by weight, carbohydrates 33% by weight, fibers 25% by weight, oil 6% by weight, other 3% by weight. Aqueous unlocking solutions were prepared with the following compounds which were completely dissolved in the water (city water): 1) arginine 0.3 mol/L+glutamic acid 0.1 mol/L; 2) lysine 0.3 mol/l+histidine 0.2 mol/l. In the test series A), the starting materials SB, KB and HK were each added to an unlocking solution in a weight ratio of 1:2 in a container which was placed in an autoclave and treated at a temperature of 120° C. and a pressure of 1 bar for 4 to 10 minutes. In test series B), the starting materials E and L were each added to an unlocking solution in a weight ratio of 1:3 and the process mixture was heated to 80° C. for 20 minutes with thorough mixing. Afterwards, the completeness of the disintegration was checked and recognized by the easy crushability of the disintegrated starting materials. If this was not achieved, the experiment was repeated using a longer heating period. On the basis of a sample, the determination of the required dispensing volume was carried out according to Example 3.

For the dispensing, the obtained disintegrated masses that still kept the shape of the starting materials were divided, whereby dispensing was performed with the determined dispensing volume, which was fresh water in the test series 1 of and the process water phase 2 of Example 6 in the test series 2. Dispensing was carried out with a rotor-stator mixer (LDF, Fluko, Germany) for 10 minutes. Subsequently, the suspensions were kept at a temperature of 70° C. for 15 minutes during which they were not agitated; afterwards the oil phase that separated was completely removed. A separation of the solid matter according to Example 3 was performed after or during a thorough mixing of the reaction mixture. The separated solids were freed from bound water by a screw press device and a sample was taken for a microscopic analysis according to Example 1, which was based on the analysis of the sieve residue after resuspension in water; the remaining solid was separated according to Example 6 in the separable solids fractions, wherein the clarified process water phase present at the end of the main process phase was used for resuspension of the solid mixture. The products separated from this side-stream process were dewatered by using a chamber filter press and stored under refrigeration until further use, and the process water phases obtained were combined (PWP2). Samples from the obtained turbid eluate phases were taken for the determination of particulate solids and the content of proteins, soluble carbohydrates and neutral fats. A study on the condensability of the dissolved constituents of the starting material was conducted according to Example 3. As a result, a 30% citric acid solution in which lactic acid was dissolved at 10% by weight for the condensation of SB and KB and a solution containing 10% by weight of aluminum chloride and 20% by weight of ascorbic acid for condensing the dissolved constituents in HK, E and L were prepared and added in the determined volume amount with mixing. After a standing phase of 15 to 60 minutes, the phases were separated using a decanter (MD80, Lemitec, Germany). Samples were taken for analysis from the compressed condensate masses obtained and from the clarified process water phases.

Results:

In the uncrushed seeds, beans and kernels investigated, a disintegration and disconnection/detachment of the constituents of the starting material could be achieved by thermal treatment, whereby a complete separability of the constituents could be obtained by the unlocking process according to the invention. Thus, it was found that the solid matter of the sieve residue had no or almost no adhesions of organic matter and was easily separable with the absence of aggregates of the particles. On the other hand, the aqueous process solution was free of particles >3 µm. Furthermore, there was a spontaneous separation of neutral fats, which accumulated in phase floating on the aqueous phases and which could be easily and completely separated in this form. The analysis of the aqueous solutions with dissolved compounds showed that, converted to the dry weight, the content of proteins was between 70 and 82 wt %, the content of dissolved carbohydrates was between 10 and 24% by weight and that of neutral fats was between 6 and 13 wt %. The addition of condensing agents resulted in nearly complete condensation of the dissolved proteins, which were separable as creamy to stable masses. During condensation, the neutral fats still present in the aqueous solution were not included or only to a minimal extent in the forming condensate phase. The analysis of the constituents of the protein fractions obtained revealed a protein concentration of between 78 and 92% by weight, a content of soluble carbohydrates between 7 and 22% by weight and of neutral fats of less than 1% by weight. A less dense lipid phase was observed on the clarified water phases. The lipid phases of all fractions were combined and a phase separation carried out by means of a decanter. A slightly turbid triglyceride phase was obtained. Toxic compounds and hazardous substances, such as kidney bean hemagglutinins, were reduced by 88 to 96% by weight compared to the initial content.

Example 8

Investigation on De-Oiling of Starting Materials.

The investigations were carried out with 3 kg of each of the following starting materials with the stated constituents: Soybean meal (SS): proteins 38% by weight, carbohydrates 22% by weight, fibers 27% by weight, oil 12% by weight, other 1% by weight; Peanut flour (EM): proteins 30% by weight, carbohydrates 28% by weight, fibers 32% by weight, oil 8% by weight, other 2% by weight; Ground hazelnuts (HK): proteins 29% by weight, carbohydrates 22% by weight, fibers 28% by weight, oil 18% by weight, other 3% by weight. An aqueous unlocking solution (city water) with dissolved arginine 0.4 mol/l was prepared. Using a sample of the starting material, the volume for complete swelling with the unlocking solution was established using the method in Example 2 (test to determine volume required to achieve complete swelling).

The starting materials were placed in a mixing drum; the contents were then sprayed with the unlocking solution which was taken from a reservoir. The degree of impregnation/wetting was evaluated every 2 minutes based on the degree of permeation of the aqueous medium that was visually recognized by the change of color of the divided material. Upon detection of complete impregnation/wetting of the starting material, the addition of the unlocking solution was stopped. After 4 hours, one sample was taken from each of the mixtures and the required water volume for the dispensing process was determined according to the method described in Example 3. The unlocking mixture was dispensed in the determined volume of the process water phase 2, which had been obtained in the side-stream process of Example 6, and mixed intensively as in Example 7, for 10 minutes. Subsequently, the solid matter was separated using a 3-stage sieving procedure (500 µm, 150 µm, 10 µm) by means of a vibrating screening device and dehydrated in a chamber filter press. The filtrate was examined for the presence of particles >3 µm. The filtrate was subdivided for the further course according to procedures 1 and 2 (V1, or V2), which differed in that after a standing period of 30 minutes, the condensing agent selected in accordance with example 3 (investigation of the condensability of dissolved constituents) was admixed in the required amount of the addition volume at solution temperature of 30° C. (V1) or temperature of the solution was 60° C. (V2). After admixing, no further heating of the mixtures was undertaken during a residence time of 60 minutes while these mixtures cooled down. Each of the upper fractions of the clarified water phases was completely discharged into a separating funnel. In these, a further unification of a floating lipid phase took place. The lower portion of the reaction mixture containing the condensate phase was dehydrated with a decanter (MD80, Lemitic, Germany). Samples were taken for analysis from the obtained protein fractions.

Results:

By means of an impregnating/wetting process, complete unlocking of the constituents of the starting material could be achieved, with 35% or 40%, respectively of the volume of the solution being sufficient for complete swelling or of the volume of the solution being sufficient for maximum swelling. The reuse of the process water phase from a side-stream process was easily possible. In the course of a standing time after dispensing of the constituents in the aqueous dispensing mixture, a lipid phase separated which was easy to remove. The solid matter obtained from the dispensing phase had no apparent adherences of soluble organic compounds. A particle-free phase with dissolved constituents was obtained. Further separation of neutral fats was then observed following initiation of condensation of the dissolved organic constituents, whereas formation of a separate lipid phase tended to occur more rapid when condensate formation took place in a heated medium. The resulting dehydrated cream-colored protein masses contained, based on the dry matter, the following constituents: SS: protein content 88% by weight, carbohydrates 11% by weight, other 1% by weight; EM: protein content 86% by weight, carbohydrates 22% by weight, other 2% by weight; HK: proteins 79% by weight, carbohydrates 20% by weight, other 1% by weight. The proportion of neutral fats was <1% by weight for all samples.

Example 9

Investigation for the Purification of Process Water Phases.

The investigations were carried out with process water phases from the main process step 5) (PWP HP) and the side-stream process method 3-I (PWP NSP), which had been carried out with one of the amino acid and/or peptide solutions according to the invention in experiments 4, 5 and 7 and were obtained in each case after separation of the condensates or solid matter as well as the water phases that accumulated during the drainage of the condensates and solids which were fed to the corresponding process water phases. In addition, the corresponding process water phases were used for repeat tests of these studies, which had already been carried out with these process water phases. The process water phases were subjected to a purification in 3 different purification arrangements whose main function can be classified as A) removal of toxic/hazardous substances, B) removal of organic compounds, C) sterilization/preservation of the process water phases. For this purpose, an appropriate reaction container, which had the following features, was used: A) a conical bottom outlet for receiving filter media, such as activated carbon or silica gels, located between 2 fine sieves, a stirring device, measuring instruments, for measuring, for example, pH and temperature, different filling devices, some were connected to titration devices. The reaction container is made of stainless steel, can be heated or cooled and complies with the ATEX protection regulations. It can be connected either to an electrodialysis unit (EDE) or to a vacuum distillation unit (VDE). B) The reaction vessel is equipped with a stirring device, instruments, for measuring, for example, pH, temperature, ion concentrations, conductivity and has various filling devices, some of which are connected to titration devices. The reaction container is made of stainless steel and can be heated or cooled. It has a floor drain which is optionally connected with a filtration unit for ultra-fine filtration/ultrafiltration (FFE/UFE) or with a separator (S) or decanter (D). C) The reaction container is equipped with a stirring device, measuring instruments, for measuring, for example, pH and temperature, different filling devices, some of which are connected to titration devices. The reaction container is made of stainless steel, can be heated or cooled and pressurized (DB). It can be connected to either a pipe irradiation unit (RBE) or an ultrafiltration unit (UFE).

In the study series 1 (U1), the following main process water phases (example number/starting material) are cleaned according to the following treatment steps and process conditions:

U1a) Example 4/JPK: A) Titration with HCl to pH 3/process temperature 90° C. for 1 h+mixing/neutralization with NaOH/discharge via EDE; B) Addition of calcium carbonate/stirring 15 min/discharge via FFE into V5a.

U1b) Example 4/SPK: A) Introduction of ethanol/titration with NH3 to pH13/mixing 1 h/discharge via VDE into V5a U1c) Example 5/EG/1: B) Introduction of AlCl3/mixing 15 min., discharge via S; C) Temperature 60° C. 45 min/discharge into V5a.

U1d) Example 7/HK: B) Introduction of kieselguhr/mixing 1 h/discharge via D; C) Titration to pH 12 with NaOH/mixing 15 min/discharge via UFE into V5a.

U1d) Example 5/LE/2: C) Temp 80° C. at BD 1.5 bar 15 min/discharge via UFE into V5a.

U1e) Example 7/KB: A) Titration with HCl to pH 5/mixing 15 min/discharge via silica gel bed; C) Titration with NaOH to pH 8/mixing 10 min/discharge via RBE into V5a.

In the test series 2 (U2), the side-stream process steps are purified (data as in U1):

U2a) Example 6/JPK/PWP2: A) Titration with HCl to pH 3/process temperature 90° C. for 1 h+mixing/neutralization with NaOH/discharge via EDE into V5b.

U2b) Example 6/RPK/PWP2: B) Introduction of calcium carbonate/stirring 15 min/discharge via FFE into V5b.

U2c) Example 7/SB/2/PWP2: A) Introduction of ethanol/titration with NH3 to pH13/mixing 1 h/discharge via VDE; C) Titration with HCl to pH 8/removal via UFE into V5b.

U2d) Example 7/E/1/PWP2: B) Introduction AlCl3/mixing 15 min. Discharge via 5; C) Temperature 60° C. 45 min/discharge into V5b.

E) Example 7/L/1/PWP2: C) Temperature 60° C. 45 min/discharge via RBE into V5b.

From the PWP, samples were taken for analysis (including, but not limited to, HPLC of amino acids/peptides, toxins such as phorbol esters, TOC, microbiology) prior to initiation and discharge of the purification.

Results:

Compared to the levels of amino acids used and/or peptides present in the PWP HP, the levels in the PWP NSP were higher by 8 to 18% by weight. At the same time, the contents of the condensing agents used in the PWP NSP were 25 to 45 wt % lower than in the PWP HP. Purification step A) resulted in a reduction of 89 and 92% of the toxins contained in the PWP, such as in U1a) and U2a), and of 95% and 100% of lectins in U1b) and U2c) or phytate in U2C of 98% and other hazardous substances such as insecticides or fungicides are removed or inactivated by >90% from the process water phases. With the purification step B), among others, a reduction of organic compounds from the process water phases of between 55 and 95% has been achieved, e.g. TOC were reduced in U1c), U1d) and U2b and U2d) by 65, 72, 68 and 89%, respectively, in particular increased concentrations of dissolved carbohydrates could be reduced, as in U1c) and U1b) by 76% and 88%. In purification step C), a reduction in the number of germs or viable spores could be achieved by 98% to 100% of the treated PWP.

Example 10

Investigation of the Process Control with Reuse of Process Water Phases.

In process step 1) 100 kg rapeseed press residue obtained by a screw press to separate the oil fraction was used, containing the following main constituents: protein 45%, carbohydrates 32%, fiber material 12%, shell-fractions 8%, fats 2% and were placed in reactor container (R1). In process step 2a), 150 l of an aqueous solution was prepared in which the following amino acids were dissolved in receiving tank 1 (V1): arginine 0.3 molar, lysine 0.2 molar, alanine 0.2 molar. The solution was added to R1 and mixed. A homogeneous mixture was prepared with a kneading stirrer in R1. After a standing time of 5 hours at 20° C., in each case 10 kg of the moist mass was conveyed to another reactor (R1a) in process step 2b). For the first dispensing phase, 100 l of city water, which was present in storage tank V2, was added to reactor container R1a) and the reaction mass was suspended with a propeller stirrer. Using a pump, the suspension was passed through a colloid mill, resulting in intensive mixing and dispensing. Subsequently, the suspension was passed through a 3-fold vibrating sieve unit (Mod. 450LS18S33, Sweko, Germany) comprised of a 450 µm, 100 µm and a 20 µm sieve in process step 3. The filtrate was fed into reactor container R2. The filter residues from the various filters were combined and dewatered in a chamber filter press.

The press liquid was fed to the reaction container R2. The pressed filter residue was filled into reaction container R3 in the side-stream process step 3-Ia and in the first run of the process mixed with city water in a ratio of 10:1 until complete suspension. In subsequent process sequences the addition of this water volume was taken from the storage tank V5a. In side-stream process step 3-Ib the suspension was passed through a vibrating sieve (sieve mesh size 500 µm) and the resulting suspension was then pumped into a hydrocyclone (Akavortex, AKW, Germany) at a pressure of 1.5 bar in side-stream process step 3-Ic. The differential pressure was 1 bar. The phases of the lower and the upper drain are each fed to a 2-fold vibrating screen (125 µm and 20 µm or 200 µm and 20 µm). The two filtrates (PWP 2) are combined and fed into storage tank V5b. The filter residues are subjected separately to a chamber filter press and then filled into product containers P2 to P4. The filtrate of the filter press was also introduced into storage tank V5b).

In process step 4), the aqueous solution of condensing agents (citric acid 30% by weight) was introduced through a metering unit into reaction container R2 and mixed using a stirring device. The process progress is monitored visually and by means of continuous pH measurement. The pH of the reaction mixture should not fall below 6.6. After a standing time of 1 hour, sedimentation of organic condensates was completed and the suspension was fed into process step 5 through the conical bottom outlet of the reaction container to a decanter (Pirallisi, Baby II/2800 g). The condensed and dehydrated protein mass was filled into product container P1. The separated process liquid was led into storage tank 5a.

The process water phase 2 obtained from the side-stream process in storage tank V5b was fed to reaction container R4, which in this application had the equipment feature B) according to Example 9. After discharge, the purified process water was forwarded to storage tank V5c and stored until reuse.

In further batches, the unlocking mixture from reactor 1 was treated as described, wherein the process control was changed as follows for the purpose of reusing the process liquids: In the subsequent process steps V2a, the water required for dissolving the selected unlocking compounds was taken from storage tank V5c and forwarded to storage tank V2. The process water contained in the storage tank V5b is fed into storage tank V3 and, if necessary, city water is added to obtain the required dispensing volume for the process step to be carried out. Furthermore, introduction of the process water phase, which is stored in the storage tank V5a, to reaction container R3 in the secondary flow process step 3-Ia is performed.

The protein fractions of consecutive process runs contained in product container P1 were analyzed for composition and dry matter. The solids fractions which were present in product containers 2 to 4 were examined microscopically (according to Example 1) over the further course.

The protein mass of product container P1 was diluted 1:1 with tap water and pumped into a vacuum spray dryer. A pale yellowish powder was obtained. The shell fraction of product container P3 was dewatered with a decanter and then dried with a belt dryer. The fiber fractions of product container P2 were fed to a belt dryer and dried.

Results:

After the initial addition of fresh water to carry out the main process steps V2 and V3, the used water phases that have been obtained after the respective separations of the solution or suspension were recovered were used again in the process. Thus a complete recycling of the water phases used can be achieved. The fractions obtained were not different in their nature and compositions during the course of the investigations. The protein fraction had a protein content of 68% by weight (first separation) and 67% by weight (9th and last separation). The residual moisture and the dry weight of the protein fraction did not change during the course of the subsequent extraction. Neither the shell-fractions nor the cellulose-based fibers showed any attachment of proteins or carbohydrates.

Example 11

Cleaning/Conditioning and Functionalization of Process Products.

The following products (example number/starting material/product number) from the examples given above, which have been prepared by using one of the amino acid and/or peptide solutions according to the invention, have been used for carrying out the side-stream process steps (NSV) 3-I and 4-1 with the specified process steps (a)-c)):

1.) Example 4/SPK/P3+P4: NSV3-Ia and -Ib: Material added to a 5% by weight DMSO solution
2.) Example 6/JPK/P3+P4: NSV3-Ia: Passage of an ethanolic vapor phase through the product
3.) Ex. 7/KB/P2+P3: NSV3-Ib and Ic): rinsing with a nano-emulsion of arginine and oleic acid 4.) Example 7/E/P1: NSV 4-Ib: Passage of a water vapor of 125° C.
5.) Ex. 8/SS/P1: NSV 4-Ia: Passage of a 30% by weight ethanol solution
6.) Ex. 8/EM/P1: NSV4-Ic: Mixture with calcium carbonate (5% by weight)

The products were in a filter chamber during treatment (2.)-5.)) or were dispensed or mixed in a reaction container (1) or 6.)). The final processing was carried out using a belt dryer (2.), 3.), 4.), 6.)) whereas in 3.) the product was first dewatered with a press. In 1.) the free water phase was drained through a sieve and the wet mass was used to prepare a protein powder (P3) and an animal food granulate (P4). In 6.) the product was spray-dried.

Results:

With the methods for the purification and/or surface modification and/or introduction of compounds, products P1-P4 obtained from the main and the side-stream process methods could be treated. In this case, water-insoluble compounds, such as colorants, as well as toxins, such as phorbol esters, could be removed/reduced by 62 to 98%. Furthermore, surfaces of the products in which hydrophobic or hydrophilic or anti-static surface functionality had been established could be obtained. Furthermore, compounds could be added to or combined with the products, resulting in better formulatability.

Due to the process techniques, there were virtually no product losses.

Example 12

Investigation of Physical Properties of Protein Fractions.

The following products (example number/starting material/product/unlocking solution) were used for the investigations:

1.) Example 2/SPK/P1/a; 2) Example 2/HM/P1/b; 3.) Example 2/LM/P1/c; 4.) Example 2/SPK/P1/e; 5.) Example 2/HM/P1/f; 6) Ex. 2/LM/P1/d; 7.) commercial soy protein concentrate, 8.) commercial milk protein concentrate. As a reference (ref.) fresh egg white was used.

The protein preparations were suspended in tap water so that 10% by weight (in terms of dry matter) suspensions were obtained. After 6 hours, the foaming capacity (SBK) and the foam stability (SSt) of the protein solutions were investigated (pH 7), which were whipped for 10 minutes at 20° C. with an electric stirrer. The relative volume increase of the generated foam in relation to the initial volume was determined. For the determination of the foam stability, the ratio of the foam volume was calculated after 60 minutes to that after the foam production. The strength of the foams was determined by the penetration rate (Pen) of a measuring body for the penetration to a distance of 4 cm. To test the emulsion stability, 5% by weight protein solutions (pH 7) of refined soybean oil were mixed (Ultrathurrax, Germany, 10,000 rpm for 20 seconds) and stored for 4 days at 20° C. (LS20°) and 30° C. (LS 30°). Subsequently, the liquid phase was discharged through a sieve and the ratio between the amount by weight and the initial weight of the emulsion was calculated.

The surface hydrophobicity (HI) of the air-dried proteins was assayed with 1-anilinonaphthalene-8-sulphonate (ANS, Sigma, Germany) reagent according to the method of Kato & Nakai (1983). The ANS binding was determined by using phosphate buffer (pH 7) with different concentrations by means of fluorescence spectroscopy (Perkin Elmer LS-50, Germany). As a reference value, the slope of the fluorescence graph was used in the determination of dried egg white. The water binding capacity (WBK) was determined by freeing the hydrated proteins from free water with a filter (screen size 10 µm) in a suction filter unit and weighing the no longer flowable residue and drying in a drying oven and then determining the dry weight. From the weight difference in relation to the dry weight, the water binding capacity was calculated. For the determination of fat binding capacity (FBK), dried protein preparations in powdered form were used. In each case 10 g in a narrow, calibrated glass tube, which was sealed at the bottom with a cellulose filter paper was dropwise fed with a refined rapeseed oil. Once oil was observed on the filter paper, the addition was stopped and the ratio between the amount of oil addition to the powder that retained the oil drop-free and the amount of protein used was calculated.

Results: (Numerical Results See Table 1)

The protein products (1-6) prepared according to the invention had excellent emulsifying properties, which were characterized by a high foaming capacity and foam stabilizing ability, which corresponded to the reference product (HE) and was considerably better than those achieved with protein fractions not obtained using the inventive unlocking process These properties were also significantly better than those that could be achieved with protein concentrates from the prior art. This was also manifested in a greater cohesiveness of such protein foams, as can be seen, in a significantly lower penetrability of these foams, which was significantly lower than in the foams prepared with the protein preparations of the prior art. In the case of the proteins produced according to the invention, there is a considerably lower surface hydrophobicity than is the case with proteins of the same type in which no dispensing process according to the invention has been carried out. Furthermore, there is a much greater uptake/retention capacity for fats than with protein fractions that were not prepared according to the invention or is the case with prior art protein concentrates.

This property is also responsible for the significantly greater emulsion stability found which the protein fractions form with an oil when produced according to the invention. The oil-in-water emulsions obtained with the protein fractions produced according to the invention had significantly greater stability over the course of 4 days than the emulsions with proteins that had not been produced according to the invention or with proteins from the prior art. With the latter, there was a rapid change in the appearance of the emulsion, from milky-white to oily-yellow, due to an increase in the formation of oil droplets.

Example 13

Investigation of Sensory and Functional Properties of Protein Fractions.

For the investigations 2 kg of oatmeal (HF), pea flour (EM) and maize flour (MM) were used. The protein fraction contained herein was obtained by treating the respective starting material in an aqueous solution containing arginine 0.2% by weight, histidine 0.1% by weight and alanine 0.5% by weight in a weight ratio of 0.8 to 1.5 (solution/solid) which were left standing for 4-6 hours (method according to Example 1). Subsequently, tap water was used to dispense the sample in a volume ratio of 8:1 to 10:1 (determination of the volume according to Example 3) by mixing with a hand blender. Thereafter, the suspension was introduced into a chamber filter press. The respective filtrate was divided into 3 fractions to which the following solutions with condensing agents were admixed (dose determination and procedure according to Example 3): 1. Citric acid in a concentration of 10% by weight in a volume ratio of 5 to 10%, 2) lactic acid in a concentration of 15% by weight in a volume ratio of 8 to 12% and $CaCl_2$) (10% by weight) were admixed. After a residence time of 2 hours, separation was carried out with a decanter (MD80, Lemitec, Germany). The resulting mass was mixed with tap water in a volume ratio of 1:1 and then dehydrated with the decanter. Samples for analysis (TM, protein content) were taken from the obtained semi-solid protein mass. Based on the dry weight, the protein masses were suspended in tap water to give a protein concentration (10% by weight). From these, samples were subjected to spray drying. For comparative purposes, the investigations were also carried out with 2 commercially available protein concentrates (protein contents about 60 and 80% by weight) of soybean (SP1 and SP2) and milk (MP1 and MP2) and (as a reference for the emulsifying capacity) chicken egg white (HE) with which corresponding suspensions were made.

The suspensions were examined for emulsifying properties and the emulsifying activity index [EAI] according to Pearce and Kinessla was determined (for the procedure see examination methods).

The water solubility (WL) was investigated by agitating 10 g of powder in 100 ml of deionized water with a magnetic stirrer at 400 rpm in a beaker, whereby a 2 ml aliquot was removed from the medium every 60 seconds, in which the particle size was determined with a laser light backscatter analyzer (Zetasizer, Malvern, Germany). Complete solubility was considered to be achieved when <10% of the analyzed particles were >10 µm. The time needed for complete dissolution was determined (WL/sec). Further, the water retention capacity (WRR) was determined by suspending 0.5 g of the protein powder in 50 ml of distilled water in a 100 ml Erlenmeyer flask and agitating it for 1 hour at 20° C. The free water phase was removed by filtering on a G3 glass frit, and the sample material was centrifuged with the glass frit at 2,000*g for 15 min. The amount of centrifuged liquid and the sample weight are determined. The WRR is calculated according to the formula given in the methods section.

Furthermore, liquid preparations of the protein preparations were made with an ion-poor water, so that a liquid (Z1) (dry matter 10 wt %) and a semi-solid mass (Z2) (TG 50 wt %) were prepared and tasted by 4 experts. Evaluated were the chewability (ZB) (not for Z1), the fineness of the (chewed) material (FH) and the mouthfeel (MG) on a scale from 1 (very low/very bad) to 10 (very high/very good). Results: (Numerical Results are Shown in Table 2).

Protein fractions with a protein content of 68 to 86% by weight could be separated from the starting materials. Spray drying could be performed on all preparations. The powdered proteins obtained showed very good and rapid water solubility (95-98%) and very high water retention capacity, which was greater than that of the comparison products. Furthermore, there was a superior emulsifying ability which was equivalent to that of egg white. The sensory evaluations of the liquid and chewable preparations prepared with water were markedly better than those of the comparative products. There was an absence of any kind of typical (intrinsic) smell or taste in all the products according to the invention; furthermore, no off-flavors were found.

Example 14

Investigation of Use of Lignin-Based Plant Shells for Oil Binding.

The lignin-rich shell fractions obtained from experiments 6 (jatropha (JS), oilseed rape (RS)), 3 (sunflower (SS)) and from an unlocking process of apple seeds (AS) as product 3 of one or more unlocking methods, performed with the amino acid and/or peptide solutions according to the invention and a lignin-rich shell fractions of jatropha and rapeseed, digested with NaOH (NO), were obtained and prepared, and finally air-dried and separated. The mean particle size distribution and the volumetric weight were determined. The dried shell material was filled to a height of 20 cm into a 10 mm diameter glass tube having a conical tip, which was closed by an open pore PP fabric. The weight of the filled shell mass was determined. For comparison, commercial oil sorbents (ÖAM1: Clean Sorb, BTW, Germany, ÖAM2: PEA SORB, Zorbit, Germany) were also filled into according glass tubes. The filled glass tubes were mounted vertically in a holder, so that each of the tips was immersed in a bath of sunflower oil and in another experiment of oleic acid. Every 5 minutes the height of the oil front, which was clearly visible by a change in color or the reflection, was registered. The experiments were stopped after 2 h and the height of the oil rise (O-StH 1) and the difference in volume of oil of the bath present initially and at the end (ads. Oil 1) were determined. Subsequently, the entire content of each of the riser pipes was carefully blown into a beaker and weighed. Thereafter, 100 ml of ethanol was added to each sample. The suspensions were agitated under exclusion of air and heated to 60° C. with a magnetic stirrer for 30 minutes. After the liquid phase was removed with a suction filter, the sieve residues of the shell mass were rinsed twice (ethanol/H2O) and then the residues were dried at 60° C. for 12 h. Then the weight and the consistency of the dried masses were determined/calculated (Gew-Diff). Subsequently, the experiment was repeated with the obtained dried mass fractions and the oil height (Ö-StH 2) and the volume of adsorbed oil (ads. Oil 2) were determined again.

Results (Numerical Results in Table 3)

Lignin-rich plant-based shell fractions which have been obtained and produced with the unlocking solutions according to the invention exhibited, in contrast to lignin-rich shell fractions prepared by other methods, a very rapid and high absorption capacity for oils, which was also better than that of comparable commercial oil adsorption material. This concerned both the power for up-take against gravity and the total volume adsorbed. Purification of the adsorbed oils by a solvent was largely completely possible with the plant-based lignin-rich shells obtained with the unlocking solutions according to the invention, whereas in the case of lignin-rich shell fractions not obtained according to the invention, the adsorbed oil could only be removed incompletely. Even with the commercial products, the extraction of adsorbed oil was incomplete. In a renewed cycle with the previously purified adsorbents, in the lignin-rich shell fractions prepared with the unlocking solutions of the present invention, the rate and amount of oil uptake was comparable to that of the previously conducted experiment, while the oil adsorption performance was significantly behind the first one-cycle cycle with the other purified and recycled preparations.

Example 15

Investigation into the Use of Lignin-Rich Plant Shells for Oil Separation from Oily Aerosols.

Lignin-rich plant shells of Jaropha (JKP) from example 4 prepared with the unlocking solutions a) arginine 0.2 molar (JKPa) and d) NH3 0.2 molar (JKPd), were distributed between 2 sieve plates of 10×10 cm with a filling height by 2 cm and then the sieves were locked in a frame. The sieve frame was inserted into a ventilation shaft to which it was connected laterally in an air-tight manner. A compressed air source ensured a constant air flow (70° C.) through the filter with a flow rate of 50 m³/h. An ultrasonic nebulizer was placed in the air stream which vaporized an oil-water emulsion at a constant rate. The pressure that build up below the filter was monitored. Above the screen, the air outlet is setup with an oil mist separator (contec), which ensures retention of 99.5% of oil from an air mixture. For comparison, conventional air filters (LF), steel mesh filters (SGF), activated carbon filters (AKF), membrane filters (MF) were mounted in the air shaft in further experiments. The experiments were completed after 30 minutes, while an oil volume of 20 ml was vaporized. Subsequently, the membrane filter was removed and the difference in weight to the initial value was determined. The lignin-rich shell fractions were removed from the filter housing and suspended in acetone in a beaker in order to extracted bound oil. The separated acetone phases were evaporated and the residue weighed. The oil separation rate was calculated from the weight difference of the oil adsorption material and the vaporized oil.

Results:

When using a membrane and an activated carbon filter, there was an increase in pressure in the supply shaft (maximum pressure difference 35 or 52 mbar) due to an increase in the airflow resistance. When using JKPd) there was initially a higher pressure than in experiments with lignin-rich shell fractions, which were obtained with the unlocking solutions according to the invention (JKPa). In the course of the experiment, there was also no pressure increase in the supply shaft, while the pressure in using preparation JKPd) increased slightly. The oil separation rate in the conventional air filters was between 48 and 62% by weight. Lignin-rich shell fractions not prepared according to the invention had an oil separation rate of 55% by weight, while the lignin-rich shell fraction which had been prepared with the unlocking solutions according to the invention had an oil separation rate of 98% by weight. From this fraction, 18.4 g of oil could be recovered by extraction, while in the preparation JKPd) only 5.2 g could be recovered.

Example 16

Investigation of the Use of Cellulose-Based Plant Fibers and Protein Fractions for Food Preparations.

The following cellulose-based fibers from the examples given were used: Jatropha from example 11 (test number 2) (JF), pea from example 7 (unlocking solution 1) (EF), kidney beans from example 7 (unlocking solution 2) (KBF) and soy from example 7 (unlocking solution 1) (SF). Deep-frozen stored preparations with a residual moisture content of between 40 and 60% by weight (GFP) and dried and disc-ground powdered preparations (GTP) of the cellulose-based fibers were used. After thawing, the GFPs were resuspended in water with a hand blender and then pressed in a filter cloth to a residual moisture content of between 70 and 80% by weight. As comparison preparations cellulose fiber preparations were used, which consisted of a milling of husks or stem mass of wheat (WF) and bamboo (BF) and which were present as a powder with fiber lengths <30 µm. One part was suspended in deionized water followed by pressing so that the required residual moisture content was obtained.

Further, the following protein products (Example No./unlocking solution No.) were selected: Oats (HP) (Ex. 2/a)), sunflowers (Ex. 3/a)) (SP), lupins (Example 4/-) (LP) and Ex. 11/Experiment No. 5). The preparations were fresh with a residual moisture content of 70 to 80% by weight (FP) or were present as powder (TP) obtained by spray-drying. As comparison preparations, a soybean (SPK) and a pea protein concentrate (EPK) were used, which were available as a powder and which were partially suspended for the experiments with a deionized water and pressed to the required residual moisture.

The combination of the preparations and the comparator preparations for the production of combination preparations (KP) from insoluble fiber materials and proteins was carried out by various modalities: M1: GFP+TP; M2: GTP+FP; M3: GTP+TP. The preparations were kneaded together in M1 and M2 and mixed in M3, in a ratio (TM) of cellulose-based fibers to proteins of 1:5.

An evaluation of the sensory properties according to Example 5 was carried out with the KP obtained. The following food preparations were also prepared/carried out:

A) Patty: broth and spices dissolved in water were added in an amount to the powdered preparations (80 g per serving) required to produce a homogeneous, soft, non-sticky and mouldable mass when blended together;

B) Cheesecake: 300 g of the powdered preparations plus 200 g of sugar and flavors and lemon juice were mixed by means of an agitator with a quantity of water which allowed for an easily stirrable homogeneous dough mass. Beaten egg whites were folded into the obtained dough mass and the dough mass was filled into a short crust pastry;

C) Foam cream: to 50 g of the powdered preparations, water with dissolved sugar, vanilla sugar, and vanilla flavoring was admixed until a readily flowable homogeneous mass was formed, followed by homogenization with a hand blender until a light, creamy/foamy mass had formed. Thereafter, steam was let to pass through the mass until a stable foam mass was present.

The preparations A) and B) were cooked under standardized conditions, preparation A) was tasted in the heated state, preparation B) in the cooled state after 6 hours and preparation C) was tasted immediately after receipt by 4 experts and, among others, the following properties were rated on a scale ranging from 1 (very poor/low) to 10 (very good/much): for A): product cohesion (PZ), chewability (Z); for B) product cohesion (PZ), stickiness (K); for C) creaminess (S), fattening sensation (M), furthermore the presence of sensory defects, such as fibrousness/graininess (FK) and mouthfeel (MG) were evaluated for all.

Samples of 100 g of the powdered KP were stored under exclusion of air for 6 and 12 months and then examined for microbial colonization, physical properties (e.g. consistency, flowability) and water absorbency, and compared to those documented for KP immediately after production. Furthermore, the preparation experiments were repeated with the stored samples.

Results (numerical results of the sensory evaluation are presented in extracts in Table 4): Mixtures of the protein and fiber products, which still contained a residual moisture content or were dried, were prepared with different modalities, either non-dusting fine-grained and non-sticky homogeneous mass or powdery mixtures that could be easily processed by adding water to a homogeneous non-sticky mass. When using comparable preparations, the recoverable mixtures were by part not homogeneous and/or were sticky. It was possible to produce KP with a protein content of between 52 and 75% by weight. The dried KP showed no change in their physical properties during storage for 12 months. There was no microbial load in the preparations.

The qualitative and sensory properties of identical preparations prepared with the stored KP corresponded to the results given here.

In the analysis of the powdered KP obtained, the following fractions were further determined: insoluble carbohydrates 22 to 46% by weight, soluble carbohydrates 0.1 to 2.5% by weight, fats <0.01 to 0.9% by weight. In the microscopic analysis of the KP, it was found that, in the preparation modalities 1 and 2, proteins were enclosed in the cellulose-based fibers as well as agglomerated with them. There were only a few particles of proteins that were not bound to cellulose-based fibers or were contiguous. In contrast, the proteins were predominantly present in agglomerated form when using cellulose fibers derived from husks or stem mass, so that the aggregated proteins constituted the perimeter of the agglomerates. Furthermore, partial detachments of the protein coating from individual fibers or aggregates existed here.

In preparation A), the raw masses obtained when using cellulose fibers originating from husks or stem material were sticky, whereas this was not the case when using cellulose-based fibers. Patties made with cellulose-based fibers exhibited the best cohesion and best chewability, while patties made with cellulose fibers from husk and stem material, especially when made together with the comparative protein concentrates, broke apart during the cooking process under formation of hard aggregates, which led to a negative evaluation during taste testing.

In the preparation of preparation B), the folding in of beaten egg whites was significantly better possible in the doughs that were made with cellulose-based fibers, resulting in a more uniform distribution of air bubbles compared to doughs that were produced with cellulose fibers from husk or stem material. Preparations prepared with KP from cellulose-based fibers and proteins produced according to the invention resulted in a significantly greater cohesion of the dough and a lower stickiness after cooking than was the case with preparations in which cellulose fibers originating from husk or stem material and when the comparative protein concentrates had been used. In the preparation of preparation C), cellulose fibers made from husks or stem pulp did not stabilize the foam made by steam treatment, whereas preparations prepared with cellulose-based fibers resulted in a very good stabilization of the foam. On the other hand, there was less foam stability and decreased sensory rating when cellulose-based fibers and commercial protein concentrates were combined in preparations. In the sensory evaluation, the preparations using cellulose-based fibers were judged to be significantly creamier with less rigidity than formulations made with cellulose fibers from husk or stem mass or with comparable protein concentrates.

Example 17

Investigation on the formulability of food by preparing with the obtained products.

The possibility to formula protein fractions with cellulose-based fibers was investigated. For this purpose, the following undried protein fractions and dried (tr) or undried (Ntr) cellulose-based fiber fractions (CBF) from the above-mentioned examples were used: Soy protein (SP) from Example 11 Experiment No. 5, Oat protein (HP) from Example 13, Pea protein (EP) from example 7 unlocking solution no. 1, furthermore cellulose-based fiber fractions of jatropha (JF) from example 6, rape seed (RF) from example 6, kidney beans (KBF) from example 2—unlocking solution 2 and soybean (SF) from example 11—test number 1.

The tr-CBFs were ground with a disk mill to a particle size of <100 μm, the remaining fiber material were used, as they were obtained from the manufacturing process.

Furthermore, commercially available protein concentrates of peas (VP1) and soybean (VP2) as well as cellulose fibers of oats (VF1) and wheat (VF2) (CFF, Germany) with a fiber length of 90 μm were used for comparison. The protein concentrates were dissolved with water so that the same water content was the same as other protein fractions.

In each case 100 g of the protein fractions in the test series V-1 were admixed to 50 g of the fibers and in the test series V-2 as much of the respective fiber fraction was added until a crumb-forming mixture, which was no longer coherent, was obtained. The resulting mixtures were rolled or spread on baking sheets and dried at 60°. Subsequently, the dried mixtures were ground with a cone mill to a particle size of 200 μm.

The resulting powders were evaluated microscopically (dark field and reflected light microscopy) for size, surface texture and agglomeration.

Further series of tests to coat/load up cellulose-based fibers were carried out:

V-3. The still wet fiber mass is rinsed twice with a 10% citric acid solution for 30 minutes, the water is removed with a filter press, and then the fiber mass is added to a solution of the protein fractions (DW 15% by weight) in an amount until a non-sticky, fine crumbly mass is obtained. After air drying, the coating process is repeated 3 times.

V-4. Cellulose-based fibers which had been dried by hot air were separated using a granulator and stirred into a highly viscous protein suspension. Subsequently, the suspension was placed on fleece and hot air dried.

V. 5 The cellulose-based fibers prepared as in V-4 were coated in a rotating drum under continuous air flow with protein suspensions that had been vaporized at a pressure of 20 bar. This process was carried out until a dry matter ratio of 10:1 of the proteins and cellulose-based fibers was obtained.

Then 10 g each of the resulting powders were dissolved in 10 ml of water (25° C.) under continuous stirring (100 rpm). Every 10 seconds, the agitation was stopped and the dissolution progress was inspected until complete dissolution was achieved, with a maximum observation period of 10 minutes.

The dried fractions obtained were crushed with an impact mill to a particle size of 200 to 300 μm.

With 50 g each of the powders obtained, the emulsification properties in the preparation of a sauce and the sensory effects were investigated by first suspending a curry-based spice mixture in 100 ml of water at 70° C. and then adding the powders under continuous stirring. The stirring was continued for 10 minutes at 90° C., then the sauces were allowed to stand and then the sensory characteristics were evaluated twice at a temperature of 60° C. by 4 blinded experts. In the sensory examination (sensory result 1) the following were evaluated: the mouthfeel, the fullness of the taste, off-taste (for evaluation ratings see Table 5).

The sauces were tested at a temperature of 25° C. for the following properties (properties 1): consistency, settling, flow properties, skin formation (for evaluation ratings see Table 5). With 200 g each of the powdered preparations, a baking test was carried out for the production of muffins. For this, 3 eggs were beaten until frothy with the addition of 160 g sugar and 50 g butter, as well as flavors and 0.5 g salt. Thereafter, 150 ml of water and the preparations and 2 g of sodium bicarbonate were stirred in. Reference baking samples were produced under otherwise identical conditions using milk instead of water and wheat meal in the same amount instead of the preparations. The baked samples then underwent a sensory examination (sensory result 2), which was performed by 4 experts according to the evaluation criteria: mouthfeel, fullness of taste, chewing properties (for evaluation ratings, see Table 5).

Furthermore, the following properties (properties 2) were investigated: the volume of the baking results (values given refer to the relation of the volume compared to that of the reference sample), the uniformity of the air spaces in the dough and the compressibility of a cube of 1 cc which was compressed by a weight, here the weight needed to compress the sample by 5 mm was determined. Thereafter, the percentage that the compressed sample expanded again after 10 minutes was determined (for evaluation ratings, see Table 5). Results (Numerical Results See Table 5):

In the preparation of the mixtures of fiber materials and the moist protein masses, a much better possibility to uniformly bring in/contact the cellulose-based fiber materials with the protein preparations was found compared with the cellulose preparations. Furthermore, virtually no lumps were formed, while there was a higher absorption capacity of the cellulose-based fibers compared to the cellulose preparations. In the microscopic examination, the protein mass was completely enclosed in the cellulose-based fiber mass and predominantly present as isolated, relatively spherical particles. The cellulose preparations were only partially covered by a protein layer with some visible scattering, and many protein agglomerates were present. In the solution experiments, the cellulose-based fibers which had been coated with the proteins obtained according to the invention got hydrated much more rapidly in water than was the case with cellulose-based fibers which had been coated with commercial protein preparations. Even significantly slower was the solution of preparations in which cellulose fibers from husks or stem mass had been coated with comparable protein preparations. Cellulose-based fibers absorbed a significantly larger volume of dissolved proteins until crumb formation occurred than was the case with cellulose preparations. In comparison with the commercial protein preparations, a greater amount of dry matter could be bound to the cellulose-based fibers or incorporated therein using the protein products produced according to the invention.

In the baking experiment, the doughs, where the cellulose-based fibers coated with protein fractions obtained according to the invention have been used, exhibited both a more homogeneous dough and a better baking result, in which there was a greater volume of baked goods, with a finer distribution of air chambers, than were the baking test results with commercial cellulose fibers coated with protein preparations. The sensory results of the baking test products which had been combined with cellulose-based fibers produced according to the invention and with protein preparations prepared according to the invention were also clearly superior to those of baked goods which had been produced with cellulose fibers. In the case of the cellulose preparations which had been coated with the commercially available protein concentrates, an intrinsic taste of the respectively related protein source still existed in some cases. The sensory quality of the protein-coated cellulose-based fibers was markedly better than that of protein-coated cellulose.

After the sauces had cooled, a skin formed on the sauces made with protein-coated cellulose. Furthermore, there was a settling of finest particles in these sauces and an inhomogeneous flow behavior (thin at the top and viscous at the bottom), which was not the case with sauces which were prepared with protein-coated cellulose-based fiber produced according to the invention.

Example 18

Investigation of the Use of Process Water Phases for the Production of Cellulose-Based Fibers.

For the study, the process water phase (PW1), which was obtained after filtration of the aggregated organic compounds in Examples 2 (JPK) and 3 (SPK) (pH 6.2), and a fresh water phase (FW) with the same volume, for the removal of dissolved soluble compounds obtained in product phase 2 of Examples 2 HM/c) and 3 SS/c) were used. These masses of cellulose-based fibers had a residual moisture of 75 to 85% by weight and had a protein content between 1.8 and 2.3% by weight as determined by determination of the nitrogen content.

Then 100 g of each mass of the cellulose-based fibers was suspended in 500 ml of PW1 or FW and singulated with a hand-held blender. After 10 minutes, cellulose-based fibers were separated from the suspensions by means of a filter cloth and squeezed out to a water content identical to the initial water content. Samples were taken to determine the protein content. The fiber masses obtained before and after the cleaning step were rolled as to give a film of a thickness of 2 mm and dried at 100° C., followed by grinding, and then the water absorption capacity of the obtained powder was determined. There was a sensory examination of the powder 15 minutes after insertion into water.
Results:

The protein content of cellulose-based fibers, which were obtained from the unlocking process as product phase 2, could be reduced by 82 to 90% by weight by separating and rinsing of the fiber mass with process water phase 1. Using a fresh water phase, a reduction of 43 to 62% by weight was achieved. The powder of the dried masses which had not been post-treated had only a small water-holding capacity, and the water-holding capacity of the powder subjected to a post-treatment with a fresh water phase was only slightly higher. The water absorption capacity after treatment of the fiber mass with the process water phase 1 was high, with a swelling volume that corresponded to >80 vol % of the initial swelling. These differences were reflected in the results of sensory testing, such as a hard and dull mouthfeel in cellulose-based fiber powders that had not been treated or treated with fresh water and a soft and creamy mouthfeel was present when using process water phase 1 for post-treatment of the fiber mass.

Example 19

Investigation of the Separability of Soluble Compounds and the Influence of Proteins and Other Soluble Organic Compounds on the Product Quality of the Obtained Organic Matter.

Soya (SS) and rapeseed meal (RS) were used for the investigations. Samples of 100 g each were placed in 300 ml of the following solutions for 3 hours: 1. tap water with a pH of 6.8; 2. sodium hydroxide solution with a pH between 8 and 12.5; 3. HCl solution with a pH range between 4 and 6.5; 4. aspartic acid with a pH between 5.5 and 7.5; 5. histidine with a pH between 7.5 and 9; 6. lysine with a pH between 8 and 11.5; 7. aspartic acid and arginine with a pH between 7 and 12.5. The buffering to achieve the pH ranges was carried out as needed with NaOH or HCl. Subsequently, in each case the amount of free water phase present was determined by pouring the suspension into a filter. The filtrate phases were divided and filled in each case into vessels with 250 ml of tap water. In the subsequent dispensing process step, the solids fractions were dispensed using a water phase, A) by means of a handheld blender and B) with an intensive mixer (Silverson L5M-A with a fine dispersion tool/10,000 rpm), in each case over 3 minutes. Subsequently, the solids were filtered off with a filter cloth and dewatered by means of a press to a residual moisture content of 70% by weight. Samples were taken for the determination of protein content and soluble carbohydrates.

The obtained solid phases of RS were suspended in 500 ml of tap water and fed to a cyclone separation method (hydrocyclone) to separate the solid fractions of different densities. The separated solid fractions as well as the solid fraction of SS were thinly rolled onto a film and dried at 100° C. for 60 minutes.

This was followed by grinding of the fractions with cellulose-based fibers and distribution and singling of the dried lignin-rich shells. In the case of the cellulose-based fiber powders, the water absorption capacity (tap water) and the swelling behavior were investigated 15 minutes after immersion in water. The swollen fiber masses underwent sensory evaluations to determine taste neutrality and the absence of hard or pointed particles by 3 investigators. For the lignin-rich shell fractions, the oil-binding capacity was investigated.

Results (Numerical Results in Tables 6-9):

Treatment with water or an acidic solution resulted in only slight swelling of the insoluble but swellable solids. In this case, the content of proteins and soluble carbohydrates contained herein could be discharged only to a small extent by a mechanical dispensing procedure. Alkali lye increased the swellability of the solids, but the protein content of the solids was only slightly reduced during the dispensing procedure. The acidic and neutral pH amino acid solution improved swellability and protein dischargeability, but the effect was significantly enhanced by adding a cationic amino acid in a basic solution. It was found that cellulose-based fibers regularly have a pleasant and creamy mouthfeel provided the protein content was less than 1.5% by weight. Such cellulose-based fibers were then tasteless. By using an intensive mixing process, the swelling and thus the water binding capacity of the cellulose-based fibers compared to a mixture with a hand mixer could be significantly improved, which also led to a reduced content of proteins and soluble carbohydrates in the solid matter and to a sensory improvement of the cellulose-based fibers at a lower pH of the unlocking solutions. The microscopic analysis showed that the solids recovered after an intensive mixing process in all of the investigations Nos. 5-7 were absolutely free of adhesions with soluble organic compounds, whereas individual adhesions were still detectable when a hand mixer was used herein. The oil binding capacity was also dependent on the residual protein and carbohydrate content in the lignin-rich shells. The highest values for the oil binding capacity were achieved when a protein content of <2 wt % of the fibrous solids was achieved using an amino acid solution. Dried cellulose-based fibers that have been obtained after treatment with tap water or an acid solution, did virtually not swell, regardless of whether intensive mixing had been performed. Also, the solids fractions placed in NaOH had insufficient swellability and had a very strong discoloration. The cellulose-based fibers swollen in test number 4, however, did exhibited hard particles in the sensory examination. This was not the case with the cellulose-based fiber products of investigation Nos. 5-7: the powders were completely swollen within 10 minutes and gave a soft and creamy mouthfeel. The separation of cellulose-based fibers and lignin-rich shells was only incompletely possible in investigations Nos. 1 to 4. In the investigations Nos. 5-7 separation accuracy was of >95% by weight, provided the pH was >7.5 in the preparation. Such lignin-rich shells had a high oil-binding capacity, whereas the oil-binding capacity of the otherwise obtained lignin-rich shells (which, however, were complexed with cellulose-based fibers) was less than 50%.

Example 20

Investigation of the Re-Solubility and Physical Properties of Produced Protein Fractions.

In the way of example, the influence of different amino acids on the dissolution and separation of soluble organic compounds in organic starting materials was investigated as well as their influence on a later usability of obtainable products. For this purpose, amino acids were selected that were nonpolar: leucine and methionine, or polar: cysteine and glutamine, or acidic: glutamic acid or cationic: arginine, histidine and lysine for the investigation. The amino acids were dissolved to 0.1 molar solutions and the pH adjusted to 8 by addition of a cationic amino acid. Soybean meal was treated as in Example 3 using an intensive mixer. In the filtrate phases, which were obtained after separation of the swollen solid phase, an aggregation was initiated according to Example 3. The condensed proteins were separated by means of a PP filter (80 μm) from the free water phase. The subsequently dehydrated protein phases were rolled out thinly, dried at 90° C., and then finely ground. The resulting powders were subjected to a sensory examination (4 examiners) in which the texture, odor, taste and solubility in the mouth were evaluated. Further, samples were dissolved in warm water over 15 minutes, followed by intensive mixing for 1 minute. Thereafter, the foaming power and the completeness of the dissolution of the powder in the water phase were evaluated. Furthermore, a determination of the protein content of the dehydrated solid phase was carried out.

Results:

Aqueous solutions with amino acid combinations and a pH of the solution of >7.5 are suitable to solvate (hydrate) soluble organic compounds in plant-based starting materials, whereby they become separable in a dispensing volume. It was found that this effect was significantly less by using amino acids containing one or more sulfur groups. Swellability of the dried protein phase as well as the foam stability and the completeness of the solubility in water were inferior when sulfur-containing amino acids have been used. When using acidic or apolar amino acids in conjunction with one of the cationic amino acids there were very good sensory properties of the dried protein powders which exhibited very good foaming properties as well as complete solubility.

Example 21

Investigation of the Separation of Dissolved Soluble Compounds from Plant-Based Starting Materials.

In experiment a) pea flour (EM) in a weight ratio of 1:3 with a 0.1 molar solution containing glutamine and arginine and in experiment b) a flour made from kidney beans (KBM) in the same weight ratio with a 0.1 molar solution included threonine and lysine were wetted/impregnated for 3 hours. Subsequently, the water phases were completely absorbed. The masses were divided equally and in the experimental series 1. dewatered by means of a filter press to a residual moisture content of 50% by weight or suspended in tap water in a weight ratio of 1:5 (experiments a)1 and b)1) and in the experimental series 2. dispensed with a mixer, and in the test series 3. dispensed with a rotor-stator shear mixer (Silverson L5M-A with a fine dispersing tool/10,000 rpm) for 2 minutes each.

The suspensions obtained from test series 2 and 3 were divided equally and, in one case, dehydrated as in experiment 1 (experiments a) 2-1, b) 2-1 and a) 3-1, b) 3-1) and in the other case, the solids were separated by centrifugation (3,000 g) for 5 minutes (experiments a) 2-2, b) 2-2 and a) 3-2, b) 3-2). Subsequently, protein and starch contents were determined in the resulting solid phases. The solids fractions were dried, ground and evaluated for sensory investigation and solubility as in Example 20.

Results

The protein content at starting was 33% and 45% by weight for flours from EM and from KBM, respectively. The solid material of experiment a)1 had a protein content of 25 wt % and b)1 had a protein content of 31 wt %, respectively. The protein contents of the solid matter of experiments a) 2-1, b) 2-1 and a) 3-1, b) 3-1 were 5.1 wt % and 4.8 wt % and 1.1 and 0.8 wt %, respectively, and that in the experiments a) 2-2, b) 2-2 and a) 3-2, b) 3-2) were 7.5 wt % and 6.9 wt % and 3.5 and 2.8, respectively. The starch content correlated with the protein content. The swellability of the powders of Experiments 1 was greatly reduced, those of the powders of Experiments 2 showed moderate swellability, and the powders which had been treated in the experimental series 3 with an intensive mixer had optimum and complete swellability when separation was performed with a filter and then were dehydrated. The sensory evaluation correlated inversely with the protein content and the swellability, whereas the preparations which had a proportion of proteins of >1.5% by weight had an unpleasant taste and did not have a creamy and soft character after swelling.

Example 22

Investigation of Separability of Dissolved Soluble Compounds and Production of Products.

Sunflower seed flour was impregnated with an aqueous solution contained 0.2 molar lysine, 0.1 molar asparagine and 0.5 molar isoleucine (solution A) and an aqueous solution containing 0.1 molar arginine, 0.5 molar serine and 0.05 molar alanine (Lsg. B) in a weight ratio of 3:1 for 1 hour. Subsequently, no free liquid was present, and the sample for control of completeness of the moisture penetration throughout the starting material according to Example 1 was positive. Half of the thoroughly impregnated/wetted material was dewatered in a filter press to a residual moisture content of 45% by weight to obtain filtrate phase 1 and eluate phase 1. The respective filtrate phase 1 and the other impregnated starting materials were each suspended in a weight ratio of 1:5 with tap water and dispensed by an intensive mixer procedure (Silverson L5M-A with a fine dispersing device/10,000 rpm) for 2 minutes each. Subsequently, the solid matter was filtered by means of a 100 μm vibration sieve and respective filtrate phase 2 and respective eluate phase 2 were obtained. A portion of the eluate phases 1 and 2 were combined together in a volume ratio of 1:3 (E1-2). For each 200 ml of the filtrate phases, one of the following solutions (in each case 10% by weight) was introduced dropwise into test series 1) with slight agitation: 1. HCl, 2.H2SO4, 3.H3PO4, 4. acetic acid, 5. lactic acid, 6. citric acid, 7. ascorbic acid. The pH of the solution was continuously recorded. In each case, separate approaches were performed as to reach a final pH of 3, 4, 5, 6 and 7. After the solutions were allowed to stand for 3 hours, they were filtered through a 80 μm polypropylene screen. The respective eluates were collected and centrifuged (4,000 rpm/10 minutes).

From the available protein phases, samples were taken to determine the protein and carbohydrate concentrations. The obtained protein phases were dehydrated to a residual moisture content of 60% by weight and sensory evaluations were performed by 4 experts for the criteria: a) creaminess, b) off-flavors, c) astringent properties. Protein phases which were present as aggregate masses were spread thin on a film and dried at 70° C. Subsequently, the dried platelets were ground and the powder was dissolved in warm water.

Results:

The resulting aqueous eluates were light brown and turbid, the pH was between 7.5 and 8.4. The addition of the various acids resulted in a milk-like turbidity when the pH of the process solution was below 7. In the case of acids 5, 6 and 7, further additions resulted in development of aggregates which were easily recognizable to the naked eye; identification was improved by the simultaneous clarification the water phase. In the samples in which a pH<5 was achieved by the further addition of these acids, the aggregates dissolved and there was a milk-like suspension. In the case of the acids 1 and 2, aggregates were not recognizable at any time, milky suspensions formed. In acids 3 and 4, fine-grained aggregates were present in a pH range of 5.5 to 6, which dissolved as the pH of the process solution was lowered. Filtration of aggregated protein complexes was only possible for acids 5-7 in a pH range between 5 and 7. The eluates were absolutely clear (pH 5.5-6.5) or slightly turbid. In all other filtration experiments, no or only minimal amounts of a whitish liquid phase remained on the filter. Centrifugation allowed the dissolved protein phase to be concentrated in a centrifuge tube as a "heavy phase". These phases were soft to liquid and difficult to separate from each other. In the eluates of the batches, in which the protein fraction could be recovered by filtration, virtually no solid was separated by centrifugation. Protein samples in which acids 1. to 5. have been used were present only in liquid or thin-liquid form and could not be tasted due to the strong acid taste at pH values <5. Even at higher pH values, the protein fractions obtained by these acids were not edible. A mild acidic taste was present in the protein fractions obtained by acids 5-7 at pH levels between 5.5 and 6; protein fractions with a pH of > or equal to 6 were rated as neutral in taste, had a good creaminess, astringents were not perceived. The powders recovered from the obtained protein aggregate phases (acids 5-7, in each case pH was >5.5) after drying and grinding had very good solubility in water, a complete solubilization to a milk-like suspension was achieved without residual solids (complete passage of the suspension through a filter with a screen mesh size of 10 μm). Using a shear mixer a stable foam could be produced with these preparation. The protein content determined in the dry matter was between 92 and 96% by weight. It could be shown that particularly large aggregates formed when the eluate phases 1 and 2 (E1-2) were treated together, such aggregates sedimented very rapidly and exhibited the fastest dewatering on a filter.

Example 23

Investigation on the use of sulfur-containing amino acids for an aqueous unlocking process. For the investigations, a soybean meal was used. Solutions (0.1 molar) with the following amino acids were prepared: 1. leucine/lysine; 2. methionine/histitin; 3. cysteine/lysine; 4. glutamine/arginine; 5. glutamic acid/arginine. The solutions were added to the flour in a weight ratio of 2:1. After 3 hours, the impregnated mass was dispensed in 250 ml aqueous solution by means of an intensive mixer procedure, then dewatered with a filter cloth to obtain a residual moisture content of the solid of 50% by weight. The aqueous filtrate was collected and used later. The dewatered mass was thinly rolled onto a film, dried at 100° C. and then finely ground. The protein content of the fiber mass was determined.

The protein-containing aqueous filtrate was added with citric acid until obtaining a pH of 6, and the sediment that had been formed after 3 hours was drained and filtered, followed by dehydration to a residual moisture content of 60% by weight. The protein paste and the powders of the dried cellulose-based fibers swollen in water for 15 minutes underwent sensory evaluations as described before.
Results (Numerical Results in Table 10).

The use of sulfur-containing amino acids resulted in a reduced dissolution and detachability of proteins from the impregnated starting material. The protein remaining in the cellulose-based fibers resulted in poorer swellability and a worse sensory evaluation of the swollen powder of the cellulose-based fibers. Furthermore, the protein obtained using solutions containing sulfur-containing amino acids had an unpleasant taste and showed reduced solubility and foam stability when resuspended in water.

Further embodiments of the invention are:
1. A method for disconnection/detachment of the constituents of a biogenic starting material by means of aqueous solutions which is characterized by the method steps:
   1) providing biogenic starting materials,
   2a) adding the starting material of step 1) with an aqueous solution containing dissolved amino acids and/or peptides for disconnection/detachment of the constituents of the starting material,
   2b) providing an aqueous dispensing volume and dispensing of the disconnected/detached constituents of the mixture from step 2a),
   3) separation of solid matter from the dispensing mixture of step 2b) to obtain a fiber-free aqueous solution of dissolved constituents of the starting material,
   4) condensation/aggregation/complexation of the dissolved constituents of the aqueous solution of step 3) to obtain an aqueous phase containing condensed soluble constituents of the starting material,
   5) separation and dehydration of the condensed soluble constituents of the starting material of step 4) and obtaining a dehydrated condensate of step 4) and a clarified process water phase,
   6) use of the clarified process water phase of step 5) for one or more of the optional process steps:
      6.1) providing a process water phase for a side-stream process;
      6.2) return of the process water phase of step 6.1) available from a side-stream method procedure and providing the used process water phase from a side-stream method procedure
      6.3) purification of the process water phase obtainable from process steps 5) and/or 6.2)
      6.4) provision of a clarified and purified process water phase,
   7) reuse of the clarified and/or clarified and purified process water phase.
2. The aforementioned method according to item 1, wherein the starting material is plant-based starting material.
3. The aforementioned method according to item 1-2, wherein in the step 2ba impregnation/wetting of the plant-based starting material is carried out with an aqueous solution containing dissolved amino acids and/or peptides.
4. The above-mentioned method according to items 1-3, wherein in step 2a) and/or 2b) a disintegration of the starting material is accomplished by means of an aqueous solution containing dissolved amino acids and/or peptides, whereby the constituents of the starting material are obtained in pure form.
5. The aforementioned method according to items 1-4, in which the solubility of toxins and hazardous substances in the aqueous protein solution is maintained or increased in step 3) and/or 4).
6. The aforementioned method according to items 1-5, wherein in step 2b) and/or 3) and/or 4) a separation of lipophilic constituents of the starting material takes place by one or more lipophilic compound (s) which are added to the reaction mixture in the process steps 2a) and/or 2b) and mixed with it and/or de-oiling of plant proteins is performed at room temperature and/or elevated temperature.
7. The aforementioned method according to items 1-6, wherein in step 3) protein-free complex carbohydrates and/or starch granules are separable in pure form.
8. The aforementioned method according to items 1-7, wherein in step 3) cellulose-based fibers, lignin-rich shell fractions, and/or complex/complexed carbohydrates can be separated and used in pure form.
9. The aforementioned method according to items 1-8, in which in step 3) the solid matter and the dissolved proteins are completely or almost completely separated from one another by means of filtration separation techniques.
10. The aforementioned method according to items 1-9, wherein an aqueous solution is obtained in step 3) with proteins dissolved and hydrated therein which are free from solid matter.
11. The aforementioned method according to items 1-10, wherein the solubility minimum of dissolved proteins is shifted to a pH range being between 6 and 8.
12. The aforementioned method according to items 1-11, in which in step 4) dissolved carbohydrates and/or phospholipids and/or glycoglycerolipids are condensed/agglomerated/complexed together with dissolved proteins, whereby protein condensates/agglomerates/complexes containing carbohydrates and/or phospholipids and/or glycoglycerolipids are obtained.
13. The aforementioned method according to items 1-12, wherein in step 4a) one or more compound (s) are added to the aqueous process solution in order to bind and/or incorporate them to/into dissolved and/or condensing/aggregating/complexing proteins, and/or condensed/aggregated/complexed proteins, before, during or after initiation of the condensation/aggregation/complexation of the proteins.
14. The aforementioned method according to items 1-13, wherein in step 4b) compounds which are dissolved in the aqueous process solution are bound to the dissolved proteins by condensing/aggregating/complexing these compounds with the dissolved proteins.
15. The aforementioned process according to items 1 to 14, in which in step 5) dehydrated proteins are obtained which are completely or almost completely odorless and/or tasteless and dissolve very rapidly in water and convey no or virtually no colorant agents into the aqueous medium.

16. The aforementioned process according to items 1-15, in which in step 2b) and/or 3) and/or 4) odor and/or flavoring and/or anti-nutritive compounds and/or endogenous or exogenous toxins are dissolved from the constituents and separated.

17. The aforementioned method according to items 1-16, wherein in step 5) a clarified process water phase is obtained, which is used in a side-stream-process method for rinsing/cleaning and then is purified and then reused in one of the main process steps.

18. Lignin-rich shell fraction and/or cellulose-based fibers, with an oil and/or fat binding capacity of >200% by weight, obtainable by one of the inventive methods of items 1-17.

19. Low-odor and low-flavor and/or low-toxin and low-hazardous agent protein fractions, obtainable by one of the processes according to the invention of items 1 to 17.

20. Cellulose-based fiber materials, lignin-rich shell fractions and/or complex/complexed carbohydrates, obtainable by one of the methods according to the invention of items 1-17.

Tables

TABLE 1

| No. | A-M | WBK (g · g) | FBK (%) | HI | LS 20° C. (%) | LS 30° C. (%) | SBK (%) | SSt (%) | Pen (mm s$^{-1}$) |
|---|---|---|---|---|---|---|---|---|---|
| Ref. | H-E | n.a. | n.d. | 1 | 68 | 60 | 452 | 98 | 0.1 |
| 1 | SPK | 5.2 | 205 | 12 | 72 | 63 | 432 | 96 | 0.3 |
| 2 | HM | 4.9 | 195 | 15 | 70 | 61 | 411 | 97 | 0.4 |
| 3 | LM | 5 | 175 | 21 | 68 | 59 | 130 | 70 | 0.5 |
| 4 | SPK | 2.6 | 80 | 47 | 32 | 20 | 160 | 68 | 42 |
| 5 | HM | 1.8 | 60 | 53 | 35 | 18 | 120 | 70 | 38 |
| 6 | LM | 2.3 | 60 | 50 | 30 | 12 | 198 | 60 | 37 |
| 7 | SP-Kom | 2.8 | 90 | 64 | 45 | 40 | 287 | 68 | 15 |
| 8 | MP-Kom | 3.1 | 100 | 88 | 42 | 38 | 299 | 61 | 10 |

A-M = starting material;
H-E = Egg white protein;
WBK = water binding capacity;
FBK = fat binding capacity;
HI = hydrophobicity index;
LS 20° = storage stability at 20° C.;
LS 30° = storage stability at 30° C.;
SBK = foaming capacity;
SSt = foam stability, Pen = penetration rate.
n.a. = Not applicable, as completely soluble.
n.d. = not done

TABLE 2

| Material | KM | EAI [m$^2$ g$^{-1}$] | WL (Sek) | WWR (%) | FH Z1 | MG Z1 | ZB Z2 | FH Z2 | MG Z2 |
|---|---|---|---|---|---|---|---|---|---|
| HF | 1 | 31.2 | 10 | 125 | 8 | 10 | 10 | 9 | 9 |
|  | 2 | 29.3 | 12 | 110 | 9 | 9 | 9 | 9 | 9 |
|  | 3 | 30.8 | 9 | 132 | 9 | 10 | 10 | 1 | 9 |
| EM | 1 | 30.2 | 11 | 145 | 8 | 9 | 8 | 10 | 9 |
|  | 2 | 29.6 | 10 | 118 | 9 | 10 | 10 | 8 | 10 |
|  | 3 | 28.7 | 9 | 120 | 9 | 10 | 9 | 9 | 10 |
| MM | 1 | 26.4 | 9 | 130 | 8 | 10 | 10 | 9 | 10 |
|  | 2 | 27.6 | 11 | 126 | 9 | 8 | 9 | 10 | 10 |
|  | 3 | 26.9 | 9 | 118 | 9 | 9 | 9 | 10 | 9 |
| SP-1 | — | 19.1 | 45 | 67 | 4 | 5 | 4 | 4 | 4 |
| SP-2 | — | 16.3 | 65 | 72 | 4 | 4 | 5 | 5 | 4 |
| MP1 | — | 21.2 | 38 | 90 | 6 | 6 | 4 | 6 | 5 |
| MP2 | — | 15.1 | 42 | 66 | 4 | 4 | 3 | 4 | 4 |
| HE | — | 30.2 | n. a. | n. a. | n.a. | n.a. | n.a. | n.a. | n.a. |

KM: condensing agent;
EAI = emulsifying activity index;
ZK = chewability (not for Z1), FH = fineness of the material;
MG = mouthfeel;
Z1 = preparation 1;
Z2 = preparation 2;
WRR = water retention value;
n.a. = not applicable

TABLE 3

| | O-StH 1 (cm) | Oil 1 (ml) | WD (g) | O-StH 2 (cm) | Oil 2 (ml) |
|---|---|---|---|---|---|
| JS | 6.4 | 3.1 | 3.1 | 6.4 | 3.1 |
| RS | 5.8 | 2.9 | 2.8 | 5.7 | 2.8 |
| SS | 5.2 | 2.8 | 2.7 | 5.2 | 2.7 |
| AS | 5 | 2.6 | 2.6 | 5.2 | 2.6 |
| JS-NO | 2.3 | 1.1 | 0.5 | 0.8 | 0.4 |
| RS-NO | 1.2 | 0.9 | 0.4 | 0.5 | 0.2 |
| ÖAM1 | 3.2 | 1.9 | 1.1 | 2.2 | 0.8 |
| ÖAM2 | 3.6 | 2.2 | 1.6 | 2.6 | 1.2 |

O-StH1 = height of the oil front in the riser tube 1st cycle; ads.
Oil1 = amount of adsorbed oil 1st cycle;
Weight Diff. = weight difference of adsorbents before/after solvent extraction;
O-StH2 = height of the oil front in the riser tube 2nd cycle; ads.
Oil2 = amount of adsorbed oil 2nd cycle;

TABLE 4

| ZB | Mod | TM | PK | PZ | Z | K | S | M | FK | MG |
|---|---|---|---|---|---|---|---|---|---|---|
| A) | 1 | SF | LP | 10 | 9 | 2 | n.a. | n.a. | 1 | 10 |
| A) | 2 | SF | LP | 9 | 10 | 1 | n.a. | n.a. | 1 | 10 |
| A) | 3 | EF | LP | 8 | 9 | 1 | n.a. | n.a. | 1 | 9 |
| A) | 1 | JF | SP | 8 | 9 | 2 | n.a. | n.a. | 1 | 10 |
| A) | 2 | JF | SP | 10 | 9 | 2 | n.a. | n.a. | 1 | 9 |
| A) | 3 | JF | SP | 9 | 9 | 1 | n.a. | n.a. | 1 | 9 |
| A) | 1 | KF | HP | 9 | 10 | 2 | n.a. | n.a. | 1 | 10 |
| A) | 2 | KF | SP | 10 | 10 | 1 | n.a. | n.a. | 1 | 9 |
| A) | 3 | KF | SP | 9 | 9 | 2 | n.a. | n.a. | 1 | 9 |
| A) | 1 | WF | HP | 6 | 5 | 4 | n.a. | n.a. | 4 | 5 |
| A) | 2 | WF | SP | 5 | 5 | 4 | n.a. | n.a. | 4 | 4 |
| A) | 3 | BF | SP | 5 | 4 | 4 | n.a. | n.a. | 5 | 5 |
| A) | 1 | BF | SPK | 3 | 2 | 5 | n.a. | n.a. | 6 | 2 |
| A) | 2 | BF | EPK | 3 | 1 | 5 | n.a. | n.a. | 7 | 2 |
| A) | 3 | WF | SPK | 1 | 1 | 6 | n.a. | n.a. | 6 | 1 |
| B) | 1 | SF | HP | 9 | n.a. | 1 | 8 | 4 | 1 | 10 |
| B) | 2 | SF | HP | 10 | n.a. | 2 | 9 | 4 | 1 | 10 |
| B) | 3 | EF | HP | 10 | n.a. | 2 | 7 | 3 | 1 | 9 |
| B) | 1 | JF | SP | 9 | n.a. | 1 | 7 | 3 | 1 | 10 |
| B) | 2 | JF | SP | 9 | n.a. | 2 | 8 | 4 | 1 | 10 |
| B) | 3 | JF | SP | 10 | n.a. | 2 | 7 | 3 | 1 | 10 |
| B) | 1 | KF | LP | 10 | n.a. | 2 | 8 | 3 | 1 | 9 |
| B) | 2 | KF | LP | 10 | n.a. | 1 | 8 | 4 | 1 | 9 |
| B) | 3 | KF | LP | 9 | n.a. | 2 | 7 | 3 | 1 | 9 |
| B) | 1 | WF | SP | 5 | n.a. | 5 | 4 | 6 | 5 | 4 |
| B) | 2 | WF | HP | 4 | n.a. | 5 | 3 | 7 | 5 | 3 |
| B) | 3 | WF | SPK | 3 | n.a. | 7 | 3 | 6 | 7 | 3 |
| B) | 1 | BF | SPK | 4 | n.a. | 7 | 4 | 6 | 6 | 3 |
| B) | 2 | BF | EPK | 3 | n.a. | 7 | 3 | 6 | 6 | 2 |
| B) | 3 | BF | EPK | 3 | n.a. | 6 | 2 | 6 | 7 | 2 |
| C) | 1 | SF | HP | n.a. | n.a. | 1 | 9 | 3 | 1 | 10 |
| C) | 2 | SF | HP | n.a. | n.a. | 1 | 9 | 3 | 1 | 9 |
| C) | 3 | SF | HP | n.a. | n.a. | 1 | 8 | 2 | 1 | 9 |
| C) | 1 | EF | SP | n.a. | n.a. | 1 | 10 | 4 | 1 | 10 |
| C) | 2 | EF | SP | n.a. | n.a. | 2 | 9 | 3 | 1 | 10 |
| C) | 3 | EF | LP | n.a. | n.a. | 2 | 9 | 3 | 1 | 9 |
| C) | 1 | KF | SP | n.a. | n.a. | 1 | 8 | 4 | 1 | 10 |
| C) | 2 | KF | SPK | n.a. | n.a. | 6 | 6 | 6 | 6 | 4 |
| C) | 3 | KF | HP | n.a. | n.a. | 2 | 8 | 4 | 2 | 9 |
| C) | 1 | WF | HP | n.a. | n.a. | 4 | 5 | 6 | 6 | 4 |
| C) | 2 | WF | SP | n.a. | n.a. | 4 | 5 | 7 | 5 | 3 |
| C) | 2 | BF | SP | n.a. | n.a. | 6 | 5 | 6 | 5 | 4 |
| C) | 1 | BF | EPK | n.a. | n.a. | 6 | 2 | 6 | 5 | 3 |
| C) | 3 | BF | EPK | n.a. | n.a. | 6 | 2 | 6 | 6 | 3 |

ZB = Preparation;
Mod = Modality of preparation: Modality 1 = GFP + TP; Modality 2: GTP + FP; Modality 3: GTP + TP;
sensory evaluation: PZ = product cohesion, Z = chewability, K = stickiness, S = creamynes, M = fattening sensation, FK = fibrousness/graininess, MG = mouthfeel; ranging from 1 (very poor/low) to 10 (very good/much).
N.a. = not applicable.

TABLE 5

| SCF | SP | TS | OBD | solubility | SR 1 | Properties 1 | SR 2 | Properties 2 |
|---|---|---|---|---|---|---|---|---|
| JF | SP | V-1 | 3 | 30 | 1/1/1/1 | 1/0/1/0 | 1/1/1/1 | 95/1/75/80 |
| JF | VP1 | V-1 | 1 | 550 | 3/2/1/2 | 2/1/2/1 | 2/2/1/2 | 60/2/140/40 |
| JF | HP | V-4 | 3 | 60 | 1/1/1/1 | 1/0/1/0 | 1/1/1/1 | 110/1/60/90 |
| JF | VP1 | V-4 | 2 | 530 | 2/2/2/2 | 2/2/2/2 | 2/2/1/2 | 50/2/150/35 |
| JF | EP | V-3 | 3 | 40 | 1/1/1/1 | 1/0/1/0 | 1/1/1/1 | 90/1/70/70 |
| JF | VP2 | V-3 | 1 | 450 | 3/3/1/2 | 2/1/2/3 | 2/3/1/2 | 60/2/130/40 |
| RF | SP | V-2 | 3 | 30 | 1/1/1/1 | 1/0/1/0 | 1/1/1/1 | 90/1/80/75 |
| RF | VP1 | V-2 | 1 | 440 | 3/2/1/2 | 2/2/2/2 | 3/2/1/1 | 50/2/150/35 |
| RF | HP | V-3 | 3 | 50 | 1/1/1/1 | 1/0/1/0 | 1/1/1/1 | 115/1/65/85 |
| RF | VP2 | V-3 | 2 | 560 | 3/3/1/2 | 2/1/2/1 | 3/2/1/1 | 60/2/130/40 |
| RF | EP | V-5 | 3 | 60 | 1/1/1/1 | 1/0/1/0 | 1/1/1/1 | 105/1/70/80 |
| RF | VP2 | V-5 | 1 | 630 | 3/3/1/2 | 2/1/3/3 | 3/2/1/2 | 50/2/140/40 |
| KBF | SP | V-1 | 3 | 40 | 1/1/1/1 | 1/0/1/0 | 1/1/1/1 | 95/1/80/70 |
| KBF | VP1 | V-1 | 1 | 650 | 3/2/1/3 | 2/1/2/1 | 3/3/1/2 | 40/2/130/30 |
| KBF | HP | V-3 | 3 | 50 | 1/1/1/1 | 1/0/1/0 | 1/1/1/1 | 110/1/60/90 |
| KBF | VP1 | V-3 | 2 | 570 | 3/2/1/3 | 2/2/3/1 | 3/2/1/2 | 40/2/140/35 |
| KBF | EP | V-2 | 3 | 60 | 1/1/1/1 | 1/0/1/0 | 1/1/1/1 | 90/1/85/70 |
| KBF | VP2 | V-2 | 1 | 620 | 3/3/1/2 | 2/2/2/3 | 4/3/1/2 | 50/2/150/40 |
| LDF | SP | V-3 | 3 | 30 | 1/1/1/1 | 1/0/1/0 | 1/1/1/1 | 95/1/70/70 |
| LDF | VP1 | V-3 | 2 | 540 | 2/2/1/2 | 2/1/3/2 | 2/2/1/2 | 40/2/130/40 |
| LDF | HP | V-4 | 3 | 50 | 1/1/1/1 | 1/0/1/0 | 1/1/1/1 | 115/1/65/90 |
| LDF | VP1 | V-4 | 1 | 580 | 3/2/2/2 | 2/2/2/1 | 3/3/2/3 | 50/2/140/30 |
| LDF | EP | V-2 | 3 | 60 | 1/1/1/1 | 1/0/1/0 | 1/1/1/1 | 90/1/75/70 |
| LDF | VP2 | V-2 | 1 | 620 | 3/3/2/3 | 2/2/3/2 | 3/3/2/3 | 40/2/150/30 |
| VF1 | SP | V-1 | 2 | 150 | 2/2/2/2 | 2/1/1/0 | 2/2/2/2 | 25/2/250/10 |
| VF1 | VP1 | V-1 | 1 | 720 | 3/2/2/3 | 2/2/2/2 | 3/2/2/3 | 20/3/200/0 |
| VF1 | HP | V-2 | 2 | 210 | 2/2/2/2 | 2/1/1/0 | 2/2/2/2 | 40/2/180/10 |
| VF1 | VP1 | V-2 | 1 | 830 | 3/3/2/3 | 2/2/2/2 | 4/3/1/2 | 20/3/200/0 |
| VF1 | EP | V-4 | 2 | 190 | 2/2/2/2 | 2/1/1/0 | 2/2/2/2 | 45/2/190/10 |
| VF1 | VP2 | V-4 | 1 | 670 | 3/2/2/3 | 2/1/2/1 | 2/2/1/2 | 20/3/230/0 |
| VF2 | SP | V-2 | 2 | 200 | 2/2/1/2 | 2/1/1/0 | 2/2/1/2 | 40/2/210/0 |
| VF2 | VP1 | V-2 | 1 | 760 | 3/3/2/3 | 2/2/2/2 | 3/3/2/3 | 25/3/200/10 |
| VF2 | HP | V-3 | 2 | 180 | 2/2/2/2 | 2/1/1/0 | 2/1/2/2 | 30/2/180/15 |
| VF2 | VP1 | V-3 | 1 | 690 | 3/3/2/3 | 2/1/2/1 | 3/3/2/3 | 30/3/190/10 |

TABLE 5-continued

| SCF | SP | TS | OBD | solubility | SR 1 | Properties 1 | SR 2 | Properties 2 |
|---|---|---|---|---|---|---|---|---|
| VF2 | EP | V-4 | 2 | 160 | 2/2/1/2 | 2/1/1/0 | 2/2/1/2 | 30/2/200/15 |
| VF2 | VP2 | V-4 | 1 | 730 | 3/3/2/3 | 2/2/2/2 | 4/3/2/3 | 20/3/220/0 |

SCF = Sorce (starting material) of cellulose-based Fiber; SP = Source of Protein; TS = series of tests to coat/load up cellulose-based fibers; OBD = Proportion of surface coverage: 1 = 30% or more of the Fibermaterial surfaces are uncovered, 2 = no covering is present in 0-30%, 3 = complete coverage by protein, a free surface of fiber material is not apparent.
Solubility: Duration to complete solid solution (seconds)
SR1 = Sensory result 1: Sensory testing of the sauces according to: mouthfeel/fullness of taste: 1 = very good, 2 = good, 3 = satisfactory, 4 = poor; off-taste/graininess: 1 = none, 2 = slight, 3 = distinct, 4 strong
Properties 1: Evaluation of the sauces at 25° C. for consistency: 1 = homogeneous, 2 = inhomogeneous;/segregations: 0 = none, 1 = low, 2 = distinct;/Flow properties: 1 = easy- flowing, 2 = aqueous, 3 = viscous;/Skin formation: 0 = none, 1 = slight, 2 = distinct.
SR 2 = Sensory result 2: Sensory examination of the baking sample according to: mouthfeel/fullness of taste: 1 = very good, 2 = good, 3 = satisfactory, 4 = poor;/Chewing properties: 1 = easy to chew and swallow, 2 = tough or bad to swallow, 3 = sticky/graininess: 1 = none, 2 = easy, 3 = distinct, 4 = pronounced.
Properties 2: Volume ratio to the reference sample (%)/uniformity of the air spaces in the dough: 1 = homogeneous, 2 = slightly inhomogeneous, 3 = strongly inhomogeneous;/Weight to achieve compression (g);/relative regain of volume (%).

TABLE 6

Soy coarse meal

| Investigation number | pH | free water-phase (vol %) | Protein content (wt %) | Carbonhydrate content (wt %) | taste | mouth feel |
|---|---|---|---|---|---|---|
| A) 1 | 6.8 | 65 | 15.4 | 4.3 | 2 | 3 |
| A) 2 a | 8 | 55 | 12.2 | 2.1 | 2 + 3 | 3 |
| A) 2 b | 8.5 | 55 | 13 | 2 | 2 + 3 | 3 |
| A) 2 c | 9 | 53 | 11.8 | 2 | 2 + 3 | 3 |
| A) 2 d | 9.5 | 54 | 10.5 | 1.8 | 2 + 3 | 3 |
| A) 2 e | 10 | 52 | 9.8 | 1.6 | 2 + 3 | 3 |
| A) 2 f | 10.5 | 50 | 8.8 | 1.4 | 2 + 3 | 3 |
| A) 2 g | 11 | 51 | 9.4 | 1.5 | 2 + 3 | 3 |
| A) 2 h | 11.5 | 48 | 9 | 1.3 | 2 + 3 | 3 |
| A) 2 i | 12 | 48 | 8.6 | 1.2 | 2 + 3 | 3 |
| A) 2 j | 12.5 | 45 | 8.8 | 1.2 | 2 + 3 | 3 |
| A) 3a | 4 | 74 | 16.1 | 6.3 | 2 + 3 | 4 |
| A) 3b | 4.5 | 75 | 16.4 | 6.4 | 2 + 3 | 4 |
| A) 3c | 5 | 70 | 15.9 | 6.3 | 2 + 3 | 4 |
| A) 3d | 5.5 | 72 | 15.4 | 6.2 | 2 + 3 | 4 |
| A) 3e | 6 | 72 | 14.1 | 6 | 2 + 3 | 4 |
| A) 3f | 6.5 | 70 | 14.8 | 6.1 | 2 + 3 | 4 |
| A) 4a | 5.5 | 66 | 11.3 | 3.6 | 2 | 3 |
| A) 4b | 6 | 65 | 11 | 3.1 | 2 | 3 |
| A) 4c | 6.5 | 65 | 9.5 | 2.9 | 2 | 3 |
| A) 4d | 7 | 58 | 6.3 | 2.5 | 2 | 3 |
| A) 4e | 7.5 | 52 | 5.9 | 2 | 2 | 2 |
| A) 5a | 7.5 | 42 | 1.9 | 1.3 | 2 | 2 |
| A) 5b | 8 | 40 | 1.5 | 1 | 1 | 2 |
| A) 5c | 8.5 | 35 | 0.9 | 0.7 | 1 | 1 |
| A) 5d | 9 | 32 | 0.7 | 0.3 | 1 | 1 |
| A) 6a | 8 | 38 | 0.9 | 0.3 | 1 | 1 |
| A) 6b | 8.5 | 35 | 0.7 | 0.3 | 1 | 1 |
| A) 6c | 9 | 32 | 0.7 | 0.1 | 1 | 1 |
| A) 6d | 9.5 | 30 | 0.5 | 0.2 | 1 | 1 |
| A) 6e | 10 | 30 | 0.5 | 0.1 | 1 | 1 |
| A) 6f | 10.5 | 28 | 0.4 | <0.1 | 1 | 1 |
| A) 6g | 11 | 28 | 0.3 | <0.1 | 1 | 1 |
| A) 7a | 7 | 35 | 2.1 | 0.9 | 1 | 1 |
| A) 7b | 7.5 | 30 | 1.1 | 0.5 | 1 | 1 |
| A) 7c | 8 | 28 | 0.8 | 0.2 | 1 | 1 |
| A) 7d | 8.5 | 26 | 0.6 | 0.1 | 1 | 1 |
| A) 7e | 9 | 24 | 0.6 | 0.1 | 1 | 1 |
| A) 7f | 9.5 | 24 | 0.5 | <0.1 | 1 | 1 |
| A) 7g | 10 | 22 | 0.4 | <0.1 | 1 | 1 |
| A) 7h | 10.5 | 23 | 0.3 | <0.1 | 1 | 1 |
| A) 7i | 11 | 20 | 0.4 | <0.1 | 1 | 1 |
| A) 7j | 11.5 | 20 | 0.3 | <0.1 | 1 | 1 |
| A) 7k | 12 | 18 | 0.2 | <0.1 | 1 | 1 |
| A) 7l | 12.5 | 18 | 0.2 | <0.1 | 1 | 1 |

Taste: 1 = neutral, 2 = intrinsic (plant-typical) taste, 3 = artificial (technical) taste
Mouth feel: 1 = soft and creamy, 2 = soft without sensorially perceptible particular matter, 3 = soft with sensorially perceptible particular matter, 4 = mainly sensorially perceptible particular matter

TABLE 7

Soy coarse meal

| Investigation number | pH | free water phase (vol %) | Protein content (wt %) | Carbon hydrate content (wt %) | taste | mouth feel |
|---|---|---|---|---|---|---|
| B) 1 | 6.8 | 51 | 12.4 | 3.1 | 2 | 3 |
| B) 2 a | 8 | 48 | 11.3 | 1.6 | 2 + 3 | 3 |
| B) 2 b | 8.5 | 48 | 11.4 | 1.2 | 2 + 3 | 3 |
| B) 2 c | 9 | 46 | 10.8 | 1.2 | 2 + 3 | 3 |
| B) 2 d | 9.5 | 44 | 9.5 | 1 | 2 + 3 | 3 |
| B) 2 e | 10 | 40 | 9.1 | 0.8 | 2 + 3 | 3 |
| B) 2 f | 10.5 | 36 | 8.2 | 0.9 | 2 + 3 | 3 |
| B) 2 g | 11 | 38 | 7.5 | 0.8 | 2 + 3 | 3 |
| B) 2 h | 11.5 | 36 | 6.5 | 0.7 | 2 + 3 | 3 |
| B) 2 i | 12 | 34 | 6.1 | 0.6 | 2 + 3 | 3 |
| B) 2 j | 12.5 | 30 | 5.8 | 0.6 | 2 + 3 | 3 |
| B) 3a | 4 | 68 | 14.3 | 5.9 | 2 + 3 | 4 |
| B) 3b | 4.5 | 66 | 14 | 6 | 2 + 3 | 4 |
| B) 3c | 5 | 68 | 14.1 | 5.9 | 2 + 3 | 4 |
| B) 3d | 5.5 | 64 | 13.8 | 5.9 | 2 + 3 | 4 |
| B) 3e | 6 | 62 | 13.6 | 5.6 | 2 + 3 | 4 |
| B) 3f | 6.5 | 58 | 13.6 | 5.4 | 2 + 3 | 4 |
| B) 4a | 5.5 | 58 | 9.8 | 2.8 | 2 | 3 |
| B) 4b | 6 | 56 | 9.1 | 2.2 | 2 | 3 |
| B) 4c | 6.5 | 52 | 8.5 | 2 | 2 | 3 |
| B) 4d | 7 | 50 | 5.8 | 1.8 | 2 | 3 |
| B) 4e | 7.5 | 48 | 5.1 | 1.6 | 2 | 2 |
| B) 5a | 7.5 | 48 | 1.1 | 1.2 | 2 | 1 |
| B) 5b | 8 | 40 | 0.8 | 0.8 | 1 | 1 |
| B) 5c | 8.5 | 34 | 0.7 | 0.6 | 1 | 1 |
| B) 5d | 9 | 28 | 0.5 | 0.4 | 1 | 1 |
| B) 6a | 8 | 24 | 0.4 | 0.3 | 1 | 1 |
| B) 6b | 8.5 | 22 | 0.4 | 0.1 | 1 | 1 |
| B) 6c | 9 | 18 | 0.3 | 0.1 | 1 | 1 |
| B) 6d | 9.5 | 16 | 0.3 | <0.1 | 1 | 1 |
| B) 6e | 10 | 12 | 0.3 | <0.1 | 1 | 1 |
| B) 6f | 10.5 | 8 | 0.4 | <0.1 | 1 | 1 |
| B) 6g | 11 | 8 | 0.2 | <0.1 | 1 | 1 |
| B) 7a | 7 | 22 | 1.1 | 0.6 | 1 | 1 |
| B) 7b | 7.5 | 20 | 0.8 | 0.3 | 1 | 1 |
| B) 7c | 8 | 16 | 0.4 | 0.1 | 1 | 1 |
| B) 7d | 8.5 | 16 | 0.3 | <0.1 | 1 | 1 |
| B) 7e | 9 | 12 | 0.2 | <0.1 | 1 | 1 |
| B) 7f | 9.5 | 8 | <0.2 | <0.1 | 1 | 1 |
| B) 7g | 10 | 8 | <0.2 | <0.1 | 1 | 1 |
| B) 7h | 10.5 | 4 | <0.2 | <0.1 | 1 | 1 |
| B) 7i | 11 | 8 | <0.2 | <0.1 | 1 | 1 |
| B) 7j | 11.5 | 4 | <0.2 | <0.1 | 1 | 1 |
| B) 7k | 12 | 4 | <0.2 | <0.1 | 1 | 1 |
| B) 7l | 12.5 | 4 | <0.2 | <0.1 | 1 | 1 |

Taste: 1 = neutral, 2 = intrinsic (plant) taste, 3 = artificial (technical) taste
Mouth feel: 1 = soft and creamy, 2 = soft without sensorially perceptible particular matter, 3 = soft with sensorially perceptible particular matter, 4 = mainly sensorially perceptible particular matter

TABLE 8

Rape seed coarse meal

| Investigation number | pH | free water phase (vol %) | Protein content (wt %) | Carbon hydrate content (wt %) | taste | mouth feel |
|---|---|---|---|---|---|---|
| A) 1 | 6.8 | 70 | 17.3 | 5.8 | 2 | 3 |
| A) 2 a | 8 | 62 | 14.5 | 3.5 | 2 + 3 | 3 |
| A) 2 b | 8.5 | 60 | 15 | 3.3 | 2 + 3 | 3 |
| A) 2 c | 9 | 58 | 12.9 | 3.2 | 2 + 3 | 3 |
| A) 2 d | 9.5 | 58 | 11.1 | 2.9 | 2 + 3 | 3 |
| A) 2 e | 10 | 59 | 10.5 | 2.6 | 2 + 3 | 3 |
| A) 2 f | 10.5 | 55 | 9.2 | 2.4 | 2 + 3 | 3 |
| A) 2 g | 11 | 54 | 9.5 | 2.5 | 2 + 3 | 3 |
| A) 2 h | 11.5 | 52 | 9.4 | 2.4 | 2 + 3 | 3 |
| A) 2 i | 12 | 50 | 9 | 2.2 | 2 + 3 | 3 |
| A) 2 j | 12.5 | 48 | 8.9 | 2.2 | 2 + 3 | 3 |
| A) 3a | 4 | 76 | 17.2 | 7.3 | 2 + 3 | 4 |
| A) 3b | 4.5 | 73 | 17 | 7.3 | 2 + 3 | 4 |
| A) 3c | 5 | 72 | 17.2 | 7.2 | 2 + 3 | 4 |
| A) 3d | 5.5 | 70 | 16.3 | 7.1 | 2 + 3 | 4 |
| A) 3e | 6 | 71 | 15.8 | 6.8 | 2 + 3 | 4 |
| A) 3f | 6.5 | 70 | 14.9 | 6.6 | 2 + 3 | 4 |
| A) 4a | 5.5 | 68 | 12.6 | 3.4 | 2 | 3 |
| A) 4b | 6 | 66 | 12.4 | 3.1 | 2 | 3 |
| A) 4c | 6.5 | 66 | 10.8 | 2.9 | 2 | 3 |
| A) 4d | 7 | 60 | 7.3 | 2.6 | 2 | 3 |
| A) 4e | 7.5 | 54 | 6 | 2.4 | 2 | 2 |
| A) 5a | 7.5 | 44 | 1.8 | 1.6 | 2 | 2 |
| A) 5b | 8 | 41 | 1.5 | 1.3 | 1 | 2 |
| A) 5c | 8.5 | 36 | 1.2 | 0.7 | 1 | 1 |
| A) 5d | 9 | 33 | 1 | 0.4 | 1 | 1 |
| A) 6a | 8 | 33 | 0.8 | 0.4 | 1 | 1 |
| A) 6b | 8.5 | 32 | 0.7 | 0.3 | 1 | 1 |
| A) 6c | 9 | 30 | 0.8 | 0.3 | 1 | 1 |
| A) 6d | 9.5 | 30 | 0.5 | 0.2 | 1 | 1 |
| A) 6e | 10 | 28 | 0.4 | 0.1 | 1 | 1 |
| A) 6f | 10.5 | 26 | 0.4 | <0.1 | 1 | 1 |
| A) 6g | 11 | 26 | 0.3 | <0.1 | 1 | 1 |
| A) 7a | 7 | 28 | 2.3 | 0.8 | 1 | 1 |
| A) 7b | 7.5 | 30 | 1.5 | 0.7 | 1 | 1 |
| A) 7c | 8 | 30 | 1.1 | 0.6 | 1 | 1 |
| A) 7d | 8.5 | 28 | 0.8 | 0.4 | 1 | 1 |
| A) 7e | 9 | 26 | 0.6 | 0.2 | 1 | 1 |
| A) 7f | 9.5 | 26 | 0.6 | 0.1 | 1 | 1 |
| A) 7g | 10 | 24 | 0.5 | <0.1 | 1 | 1 |
| A) 7h | 10.5 | 22 | 0.3 | <0.1 | 1 | 1 |
| A) 7i | 11 | 20 | 0.4 | <0.1 | 1 | 1 |
| A) 7j | 11.5 | 20 | 0.3 | <0.1 | 1 | 1 |
| A) 7k | 12 | 18 | 0.2 | <0.1 | 1 | 1 |
| A) 7l | 12.5 | 18 | 0.2 | <0.1 | 1 | 1 |

Taste: 1 = neutral, 2 = intrinsic (plant) taste, 3 = artificial (technical) taste
Mouth feel: 1 = soft and creamy, 2 = soft without sensorially perceptible particular matter, 3 = soft with sensorially perceptible particular matter, 4 = mainly sensorially perceptible particular matter

TABLE 9

Rape seed coarse meal

| Investigation-number | pH | free water-phase (vol %) | Protein-content (wt %) | carbon-hydrate-content (wt %) | taste | mouth-feel |
|---|---|---|---|---|---|---|
| B) 1 | 6.8 | 52 | 13.5 | 3.6 | 2 | 3 |
| B) 2 a | 8 | 44 | 12.3 | 2.5 | 2 + 3 | 3 |
| B) 2 b | 8.5 | 46 | 12 | 2.5 | 2 + 3 | 3 |
| B) 2 c | 9 | 44 | 11.4 | 2.2 | 2 + 3 | 3 |
| B) 2 d | 9.5 | 42 | 11.1 | 2.3 | 2 + 3 | 3 |
| B) 2 e | 10 | 40 | 8.8 | 2.1 | 2 + 3 | 3 |
| B) 2 f | 10.5 | 40 | 7.9 | 1.9 | 2 + 3 | 3 |
| B) 2 g | 11 | 42 | 6.3 | 1.9 | 2 + 3 | 3 |
| B) 2 h | 11.5 | 40 | 6.6 | 1.7 | 2 + 3 | 3 |
| B) 2 i | 12 | 38 | 7 | 1.8 | 2 + 3 | 3 |
| B) 2 j | 12.5 | 36 | 7.1 | 1.6 | 2 + 3 | 3 |
| B) 3a | 4 | 70 | 14.2 | 6.9 | 2 + 3 | 4 |
| B) 3b | 4.5 | 70 | 13.8 | 7 | 2 + 3 | 4 |
| B) 3c | 5 | 72 | 12.1 | 6.9 | 2 + 3 | 4 |
| B) 3d | 5.5 | 70 | 11.6 | 6-.7 | 2 + 3 | 4 |
| B) 3e | 6 | 70 | 12.3 | 6.5 | 2 + 3 | 4 |
| B) 3f | 6.5 | 68 | 11 | 6.4 | 2 + 3 | 4 |
| B) 4a | 5.5 | 68 | 12.3 | 2.1 | 2 | 3 |
| B) 4b | 6 | 66 | 9.6 | 1.9 | 2 | 2 |
| B) 4c | 6.5 | 64 | 8.2 | 1.7 | 2 | 2 |
| B) 4d | 7 | 60 | 6.9 | 1.8 | 2 | 2 |
| B) 4e | 7.5 | 52 | 6.1 | 1.6 | 2 | 2 |
| B) 5a | 7.5 | 36 | 1.1 | 1.6 | 2 | 1 |
| B) 5b | 8 | 32 | 1.2 | 1.1 | 1 | 1 |
| B) 5c | 8.5 | 30 | 0.9 | 0.6 | 1 | 1 |
| B) 5d | 9 | 30 | 0.7 | 0.4 | 1 | 1 |
| B) 6a | 8 | 28 | 0.5 | 0.3 | 1 | 1 |
| B) 6b | 8.5 | 26 | 0.5 | 0.3 | 1 | 1 |
| B) 6c | 9 | 24 | 0.6 | <0.1 | 1 | 1 |
| B) 6d | 9.5 | 24 | 0.4 | <0.1 | 1 | 1 |
| B) 6e | 10 | 24 | 0.2 | <0.1 | 1 | 1 |
| B) 6f | 10.5 | 22 | 0.2 | <0.1 | 1 | 1 |
| B) 6g | 11 | 22 | 0.2 | <0.1 | 1 | 1 |
| B) 7a | 7 | 24 | 1.1 | 0.4 | 1 | 1 |
| B) 7b | 7.5 | 20 | 0.9 | 0.4 | 1 | 1 |
| B) 7c | 8 | 18 | 0.6 | 0.2 | 1 | 1 |
| B) 7d | 8.5 | 18 | 0.4 | <0.1 | 1 | 1 |
| B) 7e | 9 | 14 | 0.4 | <0.1 | 1 | 1 |
| B) 7f | 9.5 | 16 | 0.2 | <0.1 | 1 | 1 |
| B) 7g | 10 | 14 | 0.2 | <0.1 | 1 | 1 |
| B) 7h | 10.5 | 12 | 0.2 | <0.1 | 1 | 1 |
| B) 7i | 11 | 12 | 0.2 | <0.1 | 1 | 1 |
| B) 7j | 11.5 | 12 | 0.2 | <0.1 | 1 | 1 |
| B) 7k | 12 | 14 | 0.2 | <0.1 | 1 | 1 |
| B) 7l | 12.5 | 10 | 0.2 | <0.1 | 1 | 1 |

Taste: 1 = neutral, 2 = intrinsic (plant) taste, 3 = artificial (technical) taste
Mouth feel: 1 = soft and creamy, 2 = soft without sensorially perceptible particular matter, 3 = soft with sensorially perceptible particular matter, 4 = mainly sensorially perceptible particular matter

TABLE 10

| | Protein content | Sensory rating | swellability | foamability | solubility |
|---|---|---|---|---|---|
| Leucine/Lysine | 1.2 | 1/0 | 2 | 1 | 1 |
| Methionine/Histidine | 2.3 | 1/1 | 1 | 0 | 0 |
| Cysteine/Lysine | 2.5 | 1/1 | 1 | 0 | 0 |
| Glutamine/Arginine | 0.8 | 0/0 | 2 | 2 | 2 |
| Glutamic acid/Arginine | 0.7 | 0/0 | 2 | 2 | 2 |

Sensory rating: Particle hardness: 0 = soft/1 = hard/2 = very hard; taste: 0 = neutral/1 = slight intrinsic (plant) taste/2 = marked intrinsic (plant) taste.
Swellability: 0 = not swellable, 1 = modarately swellable within 15 minutes, 2 = intensely swellable within < 15 minutes.
Foamability: 0 = defoams within 1 minute, 1 = moderate foamability, remains stable for 5 minutes, 2 = intense foamability, stable for 5 minutes.
Solubility: 0 = sedimentation of a large number of solid particles, 1 = sedimentation of a small number of solid particles, 2 = no sedimentation of solid particles.

What is claimed is:

1. A method for process-economic disconnection/detachment of constituents of a protein-containing biogenic starting material selected from seeds, grains, kernels, nuts, legumes, bulbous plants, tubers, vegetables, fruits or roots, the constituents comprising: water-soluble and dissolved compounds comprising proteins and carbohydrates, flavoring substances coloring agents, fats, toxic substances; solid matter comprising cellulose-based fibers and/or lignin-rich shells present in compacted form; and optionally further comprising water-soluble and undissolved compounds comprising starch; wherein the method comprises the steps:
1) providing the protein-containing biogenic starting material,
2a) adding to the protein-containing biogenic starting material of step 1) an aqueous solution having a pH between 7.5 and 13.5, containing at least one dissolved cationic amino acid with a molar mass of less than 400 g/mol and a solubility of at least 35 g/L in water at 20° C. and/or at least one peptide containing a cationic amino acid, for complete impregnation of the constituents of the protein-containing biogenic starting material, until a moisture content of >20% by weight is achieved, and disconnected/detached constituents of the protein-containing biogenic starting material as hydrated soluble compounds and solid matter are obtained, maintaining a residence time of at least at least 10 minutes between complete impregnation and performance of the next method step, wherein the concentration of the cationic amino acid and/or the peptide containing a cationic amino acid is between 1 mmol/L and 0.5 mol/L;
2b) adding to the disconnected/detached constituents from step 2a) an aqueous dispensing volume having a weight ratio to the dry mass of the protein-containing biogenic starting material between 5:1 and 500:1, and mixing to obtain a mixture of dispensed disconnected/detached constituents, thereby obtaining dissolved water-soluble compounds, and decompacted solid matter;
3) separation of the decompacted solid matter and optionally undissolved water-soluble compounds from the mixture of dispensed constituents of step 2b) to obtain an aqueous solution of the dissolved water-soluble compounds, without the decompacted solid matter and without the optional undissolved water-soluble compounds;
4) adding an aggregating agent comprising an aqueous solution containing at least one organic acid and aggregating the dissolved water-soluble compounds comprising proteins or proteins and carbohydrates of the aqueous solution of step 3) until a suspension of aggregated compounds comprising aggregated proteins, or aggregated proteins and aggregated carbohydrates and an aqueous phase containing the non-aggregated, dissolved water-soluble compounds is obtained, wherein step 4) is carried out without the use of an organic solvent; wherein in step 4) the pH value of the aqueous solution of step 3) is adjusted to a pH value in the range between 5.5 and 8;
5) separation of the suspension of step 4) and dehydration of the aggregated compounds comprising aggregated proteins or aggregated proteins and aggregated carbohydrates by separation of water and obtaining dehydrated aggregated compounds comprising dehydrated aggregated proteins or dehydrated aggregated proteins and dehydrated aggregated carbohydrates; and a clarified aqueous phase, wherein >95% by weight of the proteins contained in the protein-containing biogenic starting material are separated and obtained in step 5) as dehydrated aggregated proteins, wherein, if the protein-containing biogenic starting material contains toxins and hazardous agents and/or odorants and flavorings, the aggregated proteins contain <5% of toxins and hazardous agents compared to content of toxins and hazardous agents in the protein-containing biogenic starting material and/or the aggregated proteins contain <5% of odorants and flavorings compared to the content of odorants and flavorings in the protein-containing biogenic starting material; and wherein the aggregated proteins have a protein solubility index >80%; and optionally purifying the clarified aqueous phase by adsorption, aggregation, complexation or dialysis procedures, thermal treatment, centrifugation, filtration, or irradiation;
6) purifying the separated solid matter from step 3) by rinsing or flushing with the clarified aqueous phase from step 5), or purifying the separated solid matter from step 3) by rinsing or flushing with the clarified aqueous phase from step 5) and adding the aqueous rinsing phase as an aqueous solution to step 2a) and/or as aqueous dispensing volume to step 2b), wherein pH of the aqueous solutions during the process does not fall below the value of 5, and no coagulation or precipitation of the proteins occurs wherein in step 3) after the separation of the decompacted solid matter from the mixture of dispensed disconnected/detached constituents of step 2b) by means of a preliminary sieve, separated decompacted solid matter and a fiber-free aqueous solution of the dissolved water-soluble compounds of the protein-containing biogenic starting material are obtained, and wherein in a step 3a) decompacted cellulose-based fibers and/or decompacted lignin-rich shell fractions, and/or complex/complexed carbohydrates, which are free of dissolved water-soluble constituents, are obtained from the separated decompacted solid matter by means of a cyclone separation method or filter techniques or centrifugal methods;
wherein the decompacted cellulose-based fibers have a water binding capacity of >200% by volume, three-dimensional spatial and surface structure with average diameters between 50 and 500 um with an aspect ratio (length/diameter) of 1:1 to 100:1 and weight length <70 mg/100 m and/or wherein the decompacted lignin-rich shell fractions have a fat-binding capacity of >200%.

2. The method according to claim 1, wherein the dissolved water-soluble compounds comprise proteins and carbohydrates, and wherein step 4) comprises:
adding an aggregating agent comprising an aqueous solution containing at least one organic acid and aggregating dissolved water-soluble proteins of the aqueous solution of step 3) until a suspension of aggregated proteins and an aqueous phase containing non-aggregated, dissolved water-soluble compounds comprising carbohydrates is obtained, and
4a) separation of the aggregated proteins and subsequent addition of one or more further aggregating agent (s) to the aqueous phase containing non-aggregated, dissolved water-soluble compounds comprising carbohydrates for aggregation of the dissolved water-soluble carbohydrates until a suspension of aggregated carbohydrates and an aqueous phase containing the non-aggregated, dissolved water-soluble compounds is obtained.

3. The method according to claim 1, wherein in step 2b) the mixing to obtain the mixture of dispensed disconnected/detached constituents is performed by means of an intensive mixing process.

4. The method according to claim 1, wherein in step 3) the separation of the decompacted solid matter from the mixture of dispensed disconnected/detached constituents of step 2b) is performed by means of a filtration or sedimentation.

5. The method according to claim 1, wherein the at least one peptide containing a cationic amino acid is a peptide having 2 to 50 cationic amino acid units, and wherein the aqueous solution having a pH between 7.5 and 13.5 has no further amino acid present in addition to the at least one cationic amino acid and/or the at least one peptide.

6. The method according to claim 1, wherein in step 5) the separation of the suspension of step 4) is carried out by a filtration process.

7. The method according to claim 1, wherein in the step 2b), 3) and/or 4) a de-oiling of plant proteins is performed at room temperature or at a temperature between 50° C. and 95° C.

8. The method according to claim 1
wherein protein-free complex carbohydrates and/or starch granules are separated in a step 3a) after step 3) from the separated decompacted solid matter.

9. The method according to claim 1, in which in step 4) dissolved carbohydrates and/or phospholipids and/or glycoglycerolipids are aggregated together with dissolved proteins by adding carbonate, chelating agents, $NaSO_4$, ammonium sulfate, $CaCl_2$, $MgCl_2$, acetates, tartrates or silicates, and the method further comprising after step 5) a step 5a):
   5a) obtaining protein aggregates containing carbohydrates and/or phospholipids and/or glycoglycerolipids.

10. The method according to claim 1, wherein the at least one organic acid in step 4) is selected from the group consisting of lactic acid, citric acid, oxalic acid, and ascorbic acid.

11. The method according to claim 1, wherein the steps 2a), b) and 3) are carried out at a temperature <10° C.

12. The method according to claim 1, wherein in step 2a) the weight ratio of the aqueous solution to the protein-containing biogenic starting material is between 0.5:1 and 2:1.

13. The method according to claim 1, wherein the method further comprises
   adding the clarified aqueous phase from step 5) as the aqueous solution to step 2a) and/or as the aqueous dispensing volume to step 2b).

14. The method according to claim 1, wherein in step 2a) one or more lipophilic compound(s) are added; and
   wherein in step 2b), 3) and/or 4) a separation of lipophilic constituents of the protein-containing biogenic starting material is carried out.

15. The method according to claim 1, wherein in step 2a) one or more lipophilic compound(s) are added; and
   wherein in step 2b), 3) and/or 4 a de-oiling of plant proteins is performed at room temperature or at a temperature between 50° C. and 95° C.

16. The method according to claim 1, wherein in step 2b) one or more lipophilic compound(s) are added to and mixed with the mixture of dispensed disconnected/detached constituents; and
   wherein in step 2b), 3) and/or 4) a separation of lipophilic constituents of the protein-containing biogenic starting material is carried out.

17. The method according to claim 1, wherein in step 2b) one or more lipophilic compound(s) are added to and mixed with the mixture of dispensed disconnected/detached constituents; and
   wherein in step 2b), 3) and/or 4 a de-oiling of plant proteins is performed at room temperature or at a temperature between 50° C. and 95° C.

* * * * *